United States Patent
Sato et al.

(10) Patent No.: US 7,854,864 B2
(45) Date of Patent: Dec. 21, 2010

(54) METHOD FOR MANUFACTURING AN OPTICAL FILM HAVING A CONVEXOCONCAVE STRUCTURE

(75) Inventors: Akira Sato, Ritto (JP); Masaru Iwagaki, Hachioji (JP); Hirokazu Sato, Hino (JP); Shigeto Ohmori, Kawachinagano (JP); Kazuhiro Miyazawa, Hachioji (JP); Takashi Murakami, Hachioji (JP); Hirokazu Koyama, Hino (JP); Nobuo Kubo, Hachioji (JP); Koji Tasaka, Hino (JP); Shigeki Oka, Kunitachi (JP)

(73) Assignee: Konica Minolta Opto, Inc., Tokyo (JP)

( * ) Notice: Subject to any disclaimer, the term of this patent is extended or adjusted under 35 U.S.C. 154(b) by 714 days.

(21) Appl. No.: 11/737,199

(22) Filed: Apr. 19, 2007

(65) Prior Publication Data

US 2007/0252293 A1 Nov. 1, 2007

(51) Int. Cl.
*B29D 11/00* (2006.01)
(52) U.S. Cl. ............... 264/1.6; 264/1.34; 264/1.7; 264/216; 264/217
(58) Field of Classification Search ............ 264/1.1, 264/1.6, 1.7, 2.7, 216, 217, 1.31, 1.34
See application file for complete search history.

(56) References Cited

U.S. PATENT DOCUMENTS 6,849,558 B2 * 2/2005 Schaper .................. 438/758

FOREIGN PATENT DOCUMENTS

| JP | 10-119067 | * | 5/1998 |
| JP | 10119067 | | 5/1998 |
| JP | 2004-230614 | * | 8/2004 |

OTHER PUBLICATIONS

Chinese Office Action mail dated Sep. 9, 2010 and English translation thereof.

* cited by examiner

*Primary Examiner*—Mathieu D. Vargot
(74) *Attorney, Agent, or Firm*—Lucas & Mercanti, LLP

(57) ABSTRACT

A manufacturing method of an optical film provided with a convexoconcave structure, comprises the steps of: coating a resin solution including a first resin solved by a solvent onto an endless or roll-like mold provided with a convexoconcave structure, and forming a resin solution layer on the mold; laminating a film substrate onto the resin solution layer to make a laminated film before the solvent in the resin solution layer is completely dried, the film substrate including a second resin, which is capable of absorbing the solvent or is soluble by the solvent; and peeling the laminated film from the mold before the solvent in the laminated film is completely dried.

6 Claims, 5 Drawing Sheets

METHOD FOR MANUFACTURING AN OPTICAL FILM HAVING A CONVEXOCONCAVE STRUCTURE

TECHNICAL FIELD

The present invention relates to the method for manufacturing an optical film having a convexoconcave structure thereon, an optical film, a wire grid polarizer and a retardation film.

RELATED ARTS

In the field of display and others, there has been an intense demand for a large-area thin sheet provided with a convexoconcave structure. For example, a wire grid polarizer used to improve brightness and to separate polarized light can be manufactured by forming a metallic wire through the use of a convexoconcave structure. A convexoconcave structure having a pitch smaller than that of the wavelength can also be used in a retardation film based on the structural birefringence. It can also be used in an orientated film of a polarizer or liquid crystal and an antireflection structure.

Nano-imprint technology is known as a method of manufacturing the thin sheet having a convexoconcave structure. A thermo-imprint technique has been proposed, wherein a heated mold several tens of centimeters square is pressed against a flat resin sheet, and the form of the mold is transferred. In the thermo-imprint technique, it is difficult to press a large-area mold against the sheet at a uniform force, and this has been an obstacle to stable production. Further, to make a model of a microscopical structure on the order of submicrons with satisfactory transferability, long transfer time is required. This means a lower productivity. When a photocurable resin or thermosetting resin is used, a photocurable resin or thermosetting resin is applied on the film as a substrate. Then a mold several tens of centimeters square is pressed against the film, and the mold is released after the shape has been transferred. To ensure high-precision transfer onto a large area, a film as a substrate must be pressed against the mold at a sufficient pressure. High-speed transfer will be difficult especially when a microscopical structure on the order of submicrons is to be transferred. This method also has difficulties with high-speed production by a roll mold and others. The photocurable or thermosetting resin must be coated to a considerable thickness. A coating process is also required. This has caused a cost increase in the conventional art.

Another known method for manufacturing a thin sheet is to cast a solution into a mold provided with a convexoconcave structure (also called nanocast method). When a cast solution is applied to the mold, the shape can be transferred, and a sheet of a large area having a convexoconcave structure can be manufactured with comparative ease. According to what is proposed in the Patent Document 1, a doping solution with triacetyl cellulose dissolved therein is cast onto the surface equipped with a convexoconcave structure, and the film obtained subsequent to evaporation and solidification of the solvent is separated from a support member. According to the proposal of the Patent Document 2, a polymer solution is applied to a traveling belt having a convexoconcave structure, and the coated film is dried and solidified so that a pattern is formed. Then the coated film is separated. In another proposal, subsequent to drying and solidification of the coated film, the film is separated by being adhered to another sheet.

However, in these manufacturing method having been proposed so far, the mold is separated subsequent to sufficient drying and solidification until separation can be made on the roll or belt having a convexoconcave structure. This takes a long drying time. Further, this requires use of a very long endless belt (2 through 3 meters long) or a large-sized roll. The mold provided with a microscopically fine structure was difficult to form into such a large area and caused cost up. Another problem is poor maintainability of the roll and belt provided with a microscopically fine structure. In the method of separating the coated film adhered to the support member after drying and solidification, it also takes a longer transfer time, and use of a large-sized roll and endless belt has been essential. In addition to this problem, a separate adhesive layer is required.

In one of the techniques of forming a convexoconcave structure known in the conventional art, PVA (Poly vinyl alcohol) is cast into a mold of convexoconcave structure, and is bonded onto the PVA disk before drying and solidification (e.g., Patent Document 3). However, this method does not take high speed production of sheets into account. After bonding, the mold is separated after considerable drying and solidification. Thus, this method has a problem in that the transfer of the mold takes long time.

[Patent Document 1] Unexamined Japanese Patent Application Publication No. Hei 10-119067
[Patent Document 2] Unexamined Japanese Patent Application Publication No. 2004-230614
[Patent Document 3] U.S. Pat. No. 6,849,558

SUMMARY

One aspect of the present invention is to solve the aforementioned problems and to provide a method for high-precision and high-speed production of optical film wherein a microscopically convexoconcave structure is provided in a large area. Another aspect of the present invention is to provide an optical film, wire grid polarizer and retardation film which are manufactured by this method, and are characterized by a high degree of productivity and uniformity.

The aforementioned problem can be solved by the following structures.

Item 1. A manufacturing method of an optical film provided with a convexoconcave structure, comprises the steps of:
coating a resin solution including a first resin solved by a solvent onto an endless or roll-like mold provided with a convexoconcave structure, and forming a resin solution layer on the mold;
laminating a film substrate onto the resin solution layer to make a laminated film before the solvent in the resin solution layer is completely dried, the film substrate including a second resin, which is capable of absorbing the solvent or is soluble by the solvent; and
peeling the laminated film from the mold before the solvent in the laminated film is completely dried.

Item 2. The manufacturing method of Item 1, wherein the first resin is substantially the same as the second resin.

Item 3. The manufacturing method of Item 1, wherein the first resin is cellulose ester.

Item 4. The manufacturing method of Item 1, wherein the second resin is cellulose ester.

Item 5. The manufacturing method of Item 2, wherein the first resin and the second resin are cellulose ester.

Item 6. The manufacturing method of any one of Items 1 to 5, wherein the time from lamination of the film substrate onto the resin solution layer to the separation of the laminated film is 30 seconds or less.

Item 7. An optical film manufactured by the manufacturing method of any one of Items 1 to 6.

Item 8. A wire grid polarizer comprising the optical film of Item 7 and metallic thin wire formed on a concave or convex portion of the convexoconcave structure formed on the optical film.

Item 9. An retardation film utilizing the optical film of Item 7.

The present invention provides a method for high-precision and high-speed manufacturing of an optical film provided with a microscopically convexoconcave structure over a large area. The present invention also provides an optical film, wire grid polarizer and retardation film of high productivity and uniformity manufactured by the aforementioned technique.

PREFERRED EMBODIMENTS

Figure 1:
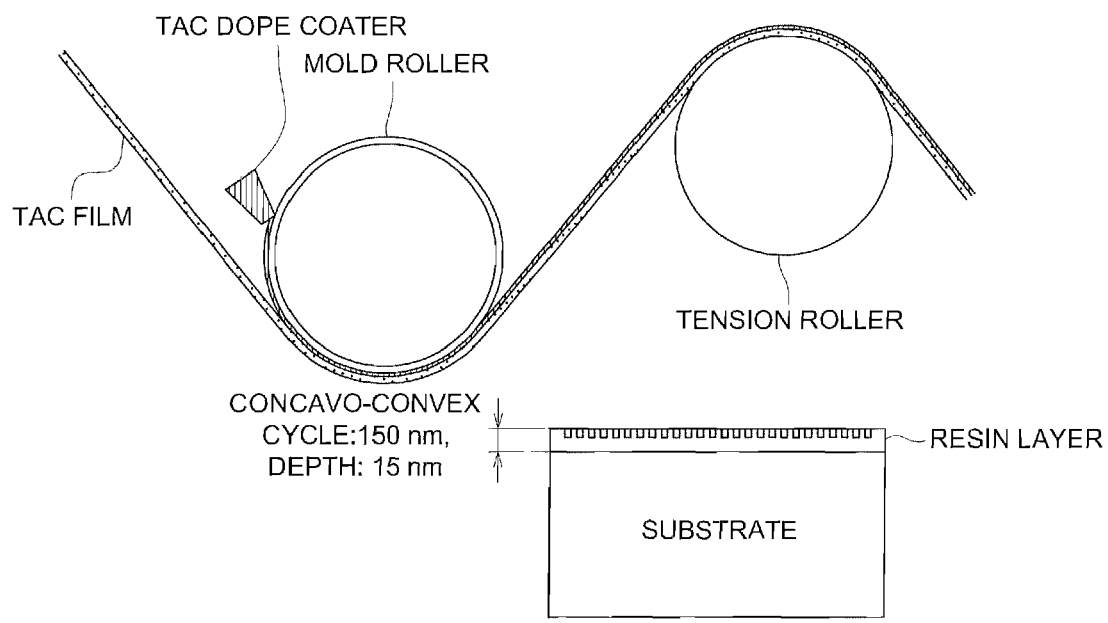
FIG. 1 shows a schematic drawing of an apparatus and process for forming the convexoconcave structure by the nonacast method of the invention.

The following describes the preferred embodiment for carrying out the present invention, without the present invention being restricted thereto.

The present invention relates to a method of manufacturing an optical film provided with a convexoconcave structure, comprises the steps of:

coating a resin solution including a first resin solved by a solvent onto an endless or roll-like mold provided with a convexoconcave structure, and forming a resin solution layer on the mold;

laminating a film substrate onto the resin solution layer to make a laminated film before the solvent in the resin solution layer is completely dried, the film substrate including a second resin, which is capable of absorbing the solvent or is soluble by the solvent; and peeling the laminated film from the mold before the solvent in the laminated film is completely dried.

According to the embodiment, since the film substrate including a second resin, which is capable of absorbing the solvent or is soluble by the solvent, is laminated to the resin solution layer including the first resin solved by the solvent before the solvent in the resin solution layer is completely dried, at least a part of the solvent in the resin solution layer can be transferred to the film substrate. Thus, the dry time for the resin solution layer can be shortened.

Further, since the film substrate is capable of absorbing the solvent or is soluble by the solvent in the resin solution layer, the adhesiveness of the interface between the film substrate and the resin solution layer is strengthened. And thus, the optical film can be peeled from the mold before the solvent is completely dried, and the manufacture rate of the optical film can be improved.

Still further, by laminating the film substrate onto the resin solution layer having the convexo-concave structure, the necessary strength for the transportation can be given to the optical film. By that, since the optical film can be peeled and transported before the solvent in the optical film is completely dried, the manufacturing speed of the optical film can be hastened. While a conventional manufacturing method of a long optical film required an endless belt having a length of several meters or a roll mold having a large diameter, according to the present embodiment, the optical film can be manufactured by a short endless belt having the length of several dozens of centimeters or a small roll mold having the diameter of several dozens of centimeters.

Especially, it is preferred for the present embodiment that the resin solution includes the same resin as the film substrate includes. In the other words, it is preferred that the first resin in the resin solution layer and the second resin in the film substrate is the same resin.

In the preferred embodiment of the present invention, the aforementioned film substrate is a cellulose ester film, and the resin solution layer has a cellulose ester.

Although the speed of drying and solidification depends on the conditions such as film thickness and volatility of the liquid composition, or thickness of the film substrate and the resin solution layer, it is preferred that the time from lamination of the film substrate onto the resin solution layer to the separation of the laminated film is 30 seconds or less. If the optical film having the convexo-concave structure is peefed from the mold after the solvent in the optical film is completely dried, a part of the convexo-concave structure may be deteriorated by the adhesion of the structure to the mold.

To ensure high-speed transfer of the resin solution in the half-dried and solidified state, the thickness of the layer of the convexo-concave structure to be transferred is preferably smaller and drying speed is preferably higher. A sufficient strength as a film can be provided by laminating a film substrate to the convexo-concave structure. To ensure high speed transfer, a mold is released when solidified to the state sufficient for release (half-dried state), without waiting for the solution to be 100% dried and solidified.

In the manufacturing method of the present invention, the optical film provided with a microscopical structure can be arranged directly on the film substrate, without using an intermediary of an adhesive layer. The manufacturing method of the present invention is preferably applied especially to the production of a wire grid polarizer and retardation film having a large area.

The following describes the details of the present invention:

(Mold Manufacturing Method)

In the method of manufacturing a microscopically convexo-concave structure, a latent image is formed on the resist by the technique of beam exposure (mask exposure, reduction projection exposure, interference exposure, etc.), electron beam exposure or X-ray exposure and is then developed, whereby a roughened pattern is formed. Especially when the convexo-concave structure of large area is to be produced at a high rate of productivity, a beam exposure technique such as two-light flux interference exposure is preferably used. A mold can be manufactured by electroforming technology from the convexo-concave structure of the resist having been produced. Alternatively, etching is performed using the resist as a mask, whereby the shape is transferred onto the silicon, quartz glass and metal, and processing is made directly to produce a roll- or belt-like form, which can be used as a mold. Further, the shape is transferred onto the resin sheet from the mold manufactured from one of the techniques, whereby a roll- or belt-like mold is produced directly. Alternatively, the shape is transferred by the electroforming from the resin sheet, whereby a roll- or belt-like mold is produced.

<Specific Mold Manufacturing Method: Laser Interference Exposure Method>

Using the ultraviolet laser (wavelength 266 nm), liquid immersed 2-light flux interference exposure is applied at an inclination of 35 degrees in the normal direction, and interference fringe is formed on the resist. The "MBD266 by Coherent Inc." is used as a laser light source. In this case, a negative type resist with resist remaining on the exposed portion is employed. The "TDUR-009P by Tokyo Ohka Kogyo Co., Ltd." is utilized as a resist material. In the liquid immersed exposure optical system, the beam diameter is 80 mm, and other than the exposed portion is masked and used as an unexposed portion. After development, a microscopically groove structure having an exposure size of 50 mm square is formed on a quartz glass (70 mm square, 1.2 mm thick) by dry etching.

A convexo-concave structure is transferred over the entire surface on a 1000 mm-square resin substrate (acryl resin, 1 mm thick) from the matrix of quartz glass having a 50 mm square exposure area (substrate: 70 mm square) by nano-imprinting (thermo-imprinting), based on a step-and-repeat basis. Placed with the roughened surface facing inward, the resin substrate having been produced is processed in a cylindrical form. Nickel electroforming is applied to the convexo-concave structure of the inner side, thereby producing a roll-shaped nickel mold (1000 mm square, 1 mm thick) having a diameter of 30 cm.

According to an alternative method, an ultraviolet curable resin is coated on a 1000 mm-square resin substrate (acryl resin, 1 mm thick), and a matrix of quartz glass having an exposure area of 50 mm square (substrate size: 70 mm square) is pressed against it. Then curing is performed by exposure of the 50 mm square exposure area to ultraviolet rays, and the convexo-concave structure is transferred over the entire surface based on a step-and-repeat basis. Placed with the side of convexo-concave structure facing inward, the resin substrate having been produced is processed in a cylindrical shape. Then nickel electroforming is applied to the convexo-concave structure of the inner side, whereby a 30 cm-diameter roll-shaped nickel mold (1000 mm square, 1 mm thick) is produced.

According to a still another method, a resist is coated on a 1000 mm square quartz substrate (1 mm thick), and liquid immersed 2-light flux interference exposure is carried out using an ultraviolet laser (wavelength: 266 nm). Thus, an interference fringe is formed on the resist. In the liquid immersed exposure optical system, the beam diameter is 80 mm, and other than the exposed portion is masked and used as an unexposed portion. The 1000 mm square quartz substrate is fed by the amount corresponding to the size of the exposed portion, thereby performing exposure over the entire surface on a step-and-repeat basis. Then the 1000 mm square quartz substrate is developed, and a nickel mold of large area (1000 mm square, 1 mm thick) is produced by nickel electroforming. The nickel mold is wound on the cylindrical roll support member, and is bonded to produce a rolled mold having a diameter of about 30 cm.

According to still further method, a convexo-concave structure is formed on the fluorine resin by thermo-imprinting, and the fluorine resin is formed in a roll, whereby a rolled mold is obtained.

According to still further method, a resist is coated on the surface of the roll-like quartz glass. Then beam exposure is applied and the shape is transferred onto the quartz glass by etching, whereby a rolled mold is obtained.

(Resin)

There is no restriction to the type of the resin solution forming the resin layer of the present invention if it contains the solvent capable of dissolving and casting the resin, and the resin capable of forming a transparent optical film after drying. Such a transparent optical film has a light transmittance of 80% or more, preferably 85% or more, more preferably 90% or more, still more preferably 93% or more.

The solvent dissolving resin used in the present invention is exemplified by polymethyl methacrylate, polycarbonate, polystyrene, polyether sulfone, norbornane based resin, amorphous polyolefin and cellulose ester. In the optical film of the present invention, from the viewpoint of optical and physical characteristics and usability, the resin is preferably selected from the norbornane based resin and cellulose ester as a main component of the cellulose ester film (to be described later). Of these, the cellulose ester is used with particular preference.

The resin to be selected for the resin solution layer is preferably characterized by good adhesion with a film substrate. For example, when a cellulose ester resin is used for the film substrate, cellulose ester and acryl based resin are preferably used for the resin used in the resin solution layer from the viewpoint of adhesion.

The molecular weight of the resin can be properly selected from the viewpoint of viscosity of the resin solution and the strength of the film having been produced. The resin of low molecular weight is preferably used from the viewpoint of casting. The resin of high molecular weight is preferably used from the viewpoint of the strength after production.

(Solvent)

The organic solvent for dissolving the aforementioned resins is exemplified by an aliphatic hydrocarbon such as dioxane, dioxolane, tetrahydrofuran, benzene, toluene, methylene chloride, chloroform, ethylene chloride, anone, acetone, methyl ethyl ketone, hexane, heptane, petroleum benzine and cyclohexanone; an aromatic hydrocarbon such as benzene, xylene, and ethyl benzene; halogen based hydrocarbon such as methylene chloride, carbon tetrachloride and trichloroethane; alcohol such as methanol, ethanol and n-propanol; ether such as ethyl ether and tetrahydrofuran; a ketone such as methyl ethyl ketone and cyclohexane; an ester such as methyl formate and acetic acid-n-propyl; a polyvalent alcohol derivative such as ethylene glycol monoethyl ether; an aliphatic acid such as acetic acid; and other compounds including phenol, nitrogen and sulfur. They can be used independently or two or more of them, or can be combined for use.

Depending on the resin to be used, the solvent of resin solution can be broadly classified as a rich solvent characterized by satisfactory solubility, a poor solvent characterized by inferior solubility, and a non-solvent that does not dissolve. For example, when the cellulose ester preferably used as a resin in the present invention has been selected, the solvent that dissolves the cellulose ester to be used independently is defined as a rich solvent, while the solvent that swells independently or fails to dissolve is defined as a poor solvent. In the case of the cellulose ester, the distinction between rich solvent and poor solvent varies depending on the average degree of acetification. For example, when acetone is used as a solvent, if the amount of combined acetic acid of the cellulose ester is 55%, it is a rich solvent; whereas, if the amount of combined acetic acid is 60%, it is a poor solvent.

There is no restriction to the rich solvent used in the present invention. For example, in the case of cellulose triacetate, an organic halogen compound such as methylene chloride, dioxolanes and methyl acetate can be mentioned. In the case of cellulose acetate propionate, methylene chloride, acetone and methyl acetate can be mentioned.

There is no restriction to the poor solvent used in the present invention. For example, methanol, ethanol, i-propylalcohol, n-butanol, cyclohexane, acetone and cyclohexanone are preferably utilized.

After the resin solution has been cast into the mold, it is preferably gelatinized to achieve high productivity. To put it more specifically, one or more of the rich solvent, poor solvent and non-solvent are selected for the resin, and are preferably used as a mixed solvent, In this case, if the evaporation speed of the rich solvent is higher that of the poor one, the percentage of the poor solvent in the resin can be increased in the process of drying. This allows easier release of the mold.

Generally in the mixed solution, the viscosity tends to increase if the percentage of the rich solvent is higher. The viscosity tends to decrease if the percentage of poor and/or non-solvent is higher. From the viewpoint of reducing the viscosity in casting, the percentage of the poor solvent and/or non-solvent is preferably higher. In the meantime, if the percentage of the rich solvent is higher, the percentage of resin constituent in the resin solution can be increased. When the percentage of the poor and/or non-solvent is higher, the percentage of resin constituent in the resin solution will be reduced. When consideration is given to adhesion time from casting to the adhesion to the substrate, the percentage of the rich solvent is preferred to be higher.

In the present invention, from the viewpoint of high productivity, the solvent of lower vapor pressure is preferably selected.

For the PVA that is dissolved in water, water can be used as a solvent.

When consideration is given to the adhesion between the film substrate and half-dried resin solution layer, the solvent of low vapor pressure is preferably the rich solvent for the film substrate. Selection of such as solvent improves the shape transferability from the mold of the resin solution having been cast, and ensures excellent adhesion with the film substrate.

Further, when consideration is given to the entry of solvent into the mold, the contact angle between the solvent and mold is preferably low. To put it more specifically, the contact angle is preferably 50 degrees or less, more preferably 20 degrees or less, still more preferably 10 degrees or less.

(Coating of Resin Solution, Lamination and Separation)

According to the present embodiment, the manufacturing method of the optical film comprises the steps of: coating a resin solution including a first resin solved by a solvent onto an endless or roll-like mold provided with a convexo-concave structure, laminating a film substrate onto the resin solution layer to make a laminated film before the solvent in the resin solution layer is completely dried, the film substrate including a second resin, which is capable of absorbing the solvent or is soluble by the solvent; and peeling the laminated film from the mold before the solvent in the laminated film is completely dried. The time from the lamination of the film support onto the resin solution layer to the separation from the mold is preferably 30 seconds or less. This time is more preferably 1 second to 30 seconds, still more preferably 3 to 20 seconds, most preferably 5 to 15 seconds.

Excessively high speed of separation is accompanies by such a problem that the convexoconcave structure of the resin solution formed at the time of separation will collapse and the transfer performance will deteriorate. Further, to increase the speed of drying and solidification and to reduce the cycle time of the apparatus, speedy separation is preferably implemented after having reached the level of drying and solidification wherein there is no possibility of collapse in shape.

[Coating]

The mold can be coated with a resin solution by such techniques known in the conventional art as spin coating, gravure coating, dip coating, reverse coating, wire bar coating, extrusion coating and inkjet coating methods. From the viewpoint of continuous production, extrusion coating method and inkjet method are preferably used.

When the extrusion coating method is used and the resin solution is cast on the mold at a high speed, the pressure on the upstream side in the casting direction is preferably reduced to prevent entry of the bubbles.

When coating the mold using the inkjet method, the piezo type inkjet method using a piezoelectric device or bubble jet method can be used as the inkjet method. Particularly, the piezo type inkjet method is preferably used because the liquid composition of wide-ranging viscosities from several through about 100 cp can be emitted. The liquid composition is charged into the inkjet head and is emitted from the nozzle to coat the required portion of the mold surface.

From the viewpoint of charging the microscopical structure of the mold with the liquid composition, the viscosity of the resin solution is preferred to be low. To put it more specifically, the preferred range is from 1 cp through 500 P, and the more preferred range is from 2.5 cp to 1 P. The viscosity of the liquid composition can be adjusted and reduced by selecting the composition and solid concentration of the aforementioned solvent, and the molecular weight of the weight. Further, the viscosity of the liquid composition can be adjusted by adding an appropriate plasticizer to the resin.

The mold of the present invention is preferably shaped to permit continuous coating. To put it more specifically, a roll-like or endless belt shape is preferably used.

When the mold is shaped like a roll, and a roll is used to support the endless belt mold, such a roll is preferably formed into a jacket so that the temperature can be adjusted as required.

A microscopically convexo-concave structure can be selected as required in conformity to the optical film to be manufactured. To put it more specifically, when preparing a fine wire pattern, approximately parallel arrangement in the direction of casting is preferred because this arrangement prevents the space between fine wire patterns from being changed in response to the depth. It also ensures easy charging the microscopical structure with a resin solution at the time of coating a resin solution.

For easy charging of the microscopical structure with the solution, the mold and coater are preferably installed by being tilted from the vertical position wherein the mold is used as a reference.

To ensure high-speed drying, the film thickness obtained by multiplying the solid component ratio of the resin solution by the thickness of the film substrate immediately after coating of the aforementioned resin solution layer is preferably equal to or less than the thickness of the film substrate to be laminated. To put it more specifically, this thickness is preferably equal to or less than one fifth the thickness of the film substrate, more preferably equal to or less than one tenth the thickness of the film substrate.

There is no restriction to the dry film thickness of the resin layer to be formed on the film substrate. The thickness is preferably 0.01 through 20 μm, more preferably 0.05 through 10 μm, still more preferably 0.05 through 5 μm.

The solvent concentration in the film substrate and resin solution is preferably 0.1% or more without exceeding 100%. If it is insufficient, the support member cannot be dissolved or bonded. If it is excessive, the flatness of the manufactured optical film will be lost, and too much time will be required for the solvent to shift to the film substrate to be evaporated and separated. This means a reduced level of productivity. Further, the solid concentration in the resin solution in this case is preferably 80% or less. Drying can be started at the time of coating the solution. If the solid concentration is excessive, the dried and solidified resin will fail to adhere to the film substrate, and spontaneous separation from the mold will occur before adhesion with the film substrate.

[Before Lamination]

<Coating the Mold Releasing Agent>

The mold of the present invention is preferably coated with a mold releasing agent since it is separated, with the dried and solidified resin solution layer sticking onto the film substrate side. The mold releasing agent is exemplified by tridecafluoro-1,1,2,2-tetrahydrooctyl trichlorosilane [$CF_3$—$(CF_2)_5$—$CH_2$—$CH_2SiCl_3$] as a silane coupling agent containing a chloride based fluorine resin. The mold is surface-treated so that a chemical adsorption film of fluorine resin is formed on the microscopical surface. The details are described in the following Non-patent Documents 1 and 2.

Non-patent Document 1: M. Colburns, S. Johnson, M. Stewart, S. Damle, T. Bailey, B. Choi, M. Wedlake, T. Michaelson, S. V. Sreenivasan, J. Ekerdt and C. G. Willson, Proc. of SPIE 3676, (1999)378

Non-patent Document 2: T. Bailey, B. J. Choi, M. Colburn, M. Meissl, S. Shaya, J. G. Ekerdt, S. V. Sreenivasan, C. G. Willson; "Step and Flash Imprint Lithography: Template Surface Treatment and Defect Analysis." J. Vac. Sci. Technol. B, 18 (6), 3572-3577 (2000).

Further, the fluorine based mold release processing agent represented by Optool (by Daikin Industries Ltd.) and Novec (by 3M) is preferably used as the mold release processing agent. A mold release processing agent of single molecule is preferably used for separation of the microscopically convexoconcave structure on the order of submicrons for the mold.

The optimum process of mold releasing is selected according to the combination between the resin solution and mold. Generally, when the resin solution is solidified, a higher degree of mold release characteristic is preferred. The mold release characteristic is poor, transfer failure will occur and the film will remain on the mold. In the meantime, a higher degree of wettability with the mold is preferred in the liquid state. If the wettability is poor, the liquid composition cannot easily permeate the microscopic structure, with the result that a transfer failure tends to occur.

In the present invention, when the mold is made of fluorine resin and there is originally an excellent release characteristic between the liquid composition and mold subsequent to solidification, there is no need for releasing treatment.

Immediately before the film substrate is laminated onto the resin solution having been cast into the mold, a vapor of solution component may be applied to the surface of the film substrate or resin solution in order to improve the power of lamination. However, to prevent the solvent from boiling in the resin solution when the film substrate has come into contact with the resin solution, the vapor of the solvent of lower boiling point in the resin solution is preferably applied in principle. A solvent atmosphere may be created from the solution coater to the laminated portion.

[Lamination]

When the roll-like mold is used in the present invention, the film holding angle (angle from the laminated portion to the separated portion) with respect to the roll-like mold is preferably 45 degrees or more without exceeding 270 degrees, although it depends on the shape and sized of the roll and coater.

In the present embodiment, the film substrate is laminated before the resin solution is completely dried and solidified. If the film is laminated too late, the degree of adhesion between the film and resin solution will not be increased.

[Drying Conditions]

To promote transfer of solvent from the resin solution to the film substrate and volatilization from the film substrate on the mold, the film substrate is preferably heated to the extent that a buddle due to boiling of the solvent will not be generated. However, the separation portion is preferably kept at a lower temperature for the purpose of facilitating separation. To put it more specifically, when the film is laminated and is present on the mold, hot air is applied to the surface, and a low-temperature air is applied to the separation portion.

The surface temperature of the roll-like mold is preferably lower than the boiling point of the solvent having a lower boiling point in the resin solution. If there is an excessive distance from the coater to the laminated portion for the structural reason and the aforementioned solid concentration cannot be met, then the temperature of the roll-like mold may be reduced below the room temperature.

[Transfer to Separation]

When the film substrate is attached to the resin solution layer, the film tension is preferably 100 N/m or more without exceeding 1000 N/m in order to reduce the adhesion between the film substrate and resin solution and deformation due to shrinkage of the resin solution inside the mold. Further, the tension of the separated portion is preferably lower than the tension of the laminated portion in order to reduce a possible change in the shape of the formed convexoconcave structure. It is preferably kept at 50 N/m or more without exceeding 500 N/m.

The distance from the laminated portion of the roll-like mold to the roll located on the front is 1 meter or less, and can be close to the film substrate thickness. The same applies to the distance from the separated portion to the next roll.

FIG. 1 is a schematic diagram showing the apparatus and process wherein a convexoconcave structure formed by nanocasting in the present invention is placed on an optical film.

The doping solution formed by dissolving cellulose ester in a solvent is coated through extrusion onto the roll-like mold arranged on the microscopically convexoconcave structure by an extrusion coating method. The cellulose ester film fed continuously is wound on the roll-like mold, and the half-dried doping solution is laminated onto the film. Then the cellulose ester film is separated from the roll-like mold within a predetermined time, and the resin layer having a convexoconcave structure is transferred onto the cellulose ester film.

The height of the convexoconcave structure to be formed is preferably 0.05 μm or more without exceeding 5 μm. The effective use of the present invention is ensured in the microscopical structure within this range. When the height of the convexoconcave structure is 0.05 μm or less, the optical function cannot be accomplished. When the height of the convexoconcave structure is 5 μm or more, the liquid composition to be coated will be thick and sufficient drying cannot be achieved.

(Cleaning)

A mold cleaning apparatus is preferably installed in the area from the roll-like mold separated portion to the resin solution coated portion.

There is no restriction to the type of a cleaning apparatus. It can be exemplified by a wet cleaning apparatus for impregnating the mold with the solvent for dissolving the support member component, and a dry type cleaning apparatus for removing foreign substances by application of air. The blade method for scraping foreign substances can be mentioned as a method for cleaning.

(Forming a Metallic Wire (Wire Grid))

The following describes the method of manufacturing the wire grid polarizer or wire grid retardation film by forming a metallic wire only on the convex or concave portion of the optical film surface wherein a convexoconcave structure is formed by nanocasting of the present invention. There is no restriction to the method of forming a metallic wire as long as a targeted metallic wire can be formed.

There is no restriction to the material of the wire grid. It is possible to choose the material which has a high reflection factor to the visible light and a high degree of conductivity. From this viewpoint, the metallic material such as silver and aluminum is preferably used as the material of the wire grid.

One of the factors that determines the performance of the wire grid polarizer is the relationship between the pitch p (nm) and wavelength λ (nm) of the incoming beam. When the pitch p of the wire grid is approximately one half temperature through twice the wavelength, there is a considerable reduction in the polarized light separation performance with respect to the light of specific wavelength. Such a phenomenon is commonly called the "Rayleigh resonance". The longest wavelength (the maximum resonance wavelength) λres-max wherein this resonance occurs is known to be expressed by the following Formula (1): The details are given in Philosophical Magazine, Vol. 14 No. 79.60 (1907).

$$\lambda res\text{-max} = p(n + \sin \theta) \quad \text{Formula (1)}$$

In the Formula, n and θ indicate the refractive index of a substrate and the incident angle of light, respectively.

Before and after the wavelength wherein the Rayleigh resonance occurs, there is a sudden drop in the performance of the wire grid polarizer. To exhibit the sufficient polarized light separation performance with respect to the visible light, the maximum resonance wavelength λres-max should be shorter than the wavelength of visible light.

The required value for the height t (metal thickness) of the wire grid is determined by the polarized light separation performance of the wire grid polarizer. To put it more specifically, it is sufficient only if the light transmittance is 1% or less. If the thickness is 30 nm or more, excellent performance can be obtained. If the metal is too thin, transmission of light cannot be ignored, with the result that the polarized light separation performance will deteriorate. Conversely, if the metal is too thick, the light utilization efficiency will deteriorate, and hence the upper limit of the thickness is about 200 nm. When the wire grid is made of aluminum, the metal thickness is preferably about 40 through 200 nm.

When the incident angle is 0 degree and the refractive index n of the vacuum is 1, the pitch p of the wire grid is satisfactory so long as the maximum resonance wavelength λres-max derived from the Formula (1) does not exceed the wavelength of the light to be used. If it is 400 nm for the visible light, there is no problem. Thus, pitch p is 380 nm or less, preferably 100 through 200 nm, more performance 160 nm or less from the viewpoint of separation capacity of polarized light.

When the width of the wire grid is about half the pitch p, the polarized light separation performance of the wire grid polarizer is improved. The preferred range is 0.3 p<w<0.7 p.

From the viewpoint of improving the transmittance of the transmitted light (light in the direction of polarized light to be transmitted), the preferred range is 0.3 p<w<0.5 p.

There is no restriction to the cross section of the wire grid. The wire grid can be regular square, rectangular, trapezoidal, circular, elliptical and otherwise.

The pitch, width and shape of the wire grid are controlled by the formation of the convexoconcave structure by nanocasting of the present invention.

In the present invention, the coating solution (hereinafter abbreviated as "metallic particle coating solution" in some cases) containing the dispersion solution of the metallic particles or nano particles is applied onto the film surface with a convexoconcave structure formed thereon by nanocasting, and is then dried. In this case, the surface tension of the film surface is controlled by surface treatment, or the surface tension of the metallic particle coating solution is adequately adjusted by a solvent species and activator, whereby metallic wire can be formed only on the concave portion or convex portion.

For example, when the film surface with the convexoconcave structure formed thereon by nanocasting of the present invention is coated with the metallic particle coating solution having the surface tension equivalent to, or slightly higher than, that of the film surface, then the coating solution is deposited only on the convex portion, without the coating solution permeating the concave portion. Thus, a metallic wire is formed only on the convex portion.

Alternatively, when the film surface with the convexoconcave structure formed thereon by nanocasting of the present invention is provided with corona discharge processing, processing is applied more effectively to the convex portion than the concave portion, due to the potential and the distance between electrodes. The convex portion has a higher surface energy than the concave portion. In this case, the output of the surface treatment is adjusted, or using two or more species of solvents having different surface tensions as the solvent of the metallic particle coating solution, proportion is adjusted in such a way that the solution is wetted by the convex portion but not by the concave portion. Alternatively, an activator is added after the type and amount thereof has been adjusted in such a way that the metallic particle coating solution is wetted by the convex portion but not by the concave portion, or these steps are combined. Using any one of these alternatives, metallic particle coating solution is deposited only on the convex portion, and hence a metallic wire is formed only on the convex portion.

Alternatively, after sufficiently having improved the wettability (increased the surface tension) of both the concave and convex portions of the film surface with the convexoconcave structure formed thereon by nanocasting of the present invention by high-output corona discharge processing or plasma processing, these portions are coated with the metallic particle coating solution made up of a mixture between a solvent of lower boiling point and lower surface tension and a solvent of higher boiling point and higher surface tension. In this case, the coating solution will spread all around the concave and convex portions immediately before coating.

With the progress of drying, the amount of the solvent of lower boiling point and lower surface tension will decrease. Then the surface tension of the liquid will increase, and the coating solution tends to repellent. This may be caused by the shape, but repellency starts from the convex portion and the liquid remains on the concave portion. Thus, a metallic wire is formed only on the concave portion. In this case, the corner of the convex portion is preferably round, because the liquid remaining in the corner of the convex portion prevents the metal from being segregated.

The surface tension of the concave and convex portions on the film surface can be changed by using the temperature difference of the concave and convex portions. For example, the convex portion in contact with the roll is heated immediately after coming into contact with the thermally treated roll, but the temperature is reduced with the lapse of time. Thus, the temperature of the convex portion becomes lower. This phenomenon can be utilized.

The surface tension of the concave and convex portions can also be changed by spraying the solvent or the like in a slanting direction so that the only solvent will stick to the convex portion alone.

It should be noted that the surface tension of the film surface can be measured according to the wettability test method JIS K 6768.

The following method can be used to a metallic wire on the convex or concave portion of the film surface with the convexoconcave structure formed thereon by nanocasting of the present invention: In the first place, a step is taken to adjust the amount of static charge on the convex or concave portion of the film with the convexoconcave structure formed thereon by nanocasting of the present invention. After that, the metallic particle powder or metallic particle coating solution is sprayed on the film so that it can be attached on the concave or convex portions on a selective basis. The amount of static charge can be adjusted, for example, as follows: After discharging the film, the roll or film using the agent with the triboelectric series separated from the resin used in the film is brought into contact with the film surface with the convexoconcave structure formed thereon by nanocasting of the present invention, and is separated therefrom, whereby the convex portion is charged. Alternatively, electrically charged particles are blown in a slanting direction, whereby the amount of static charge on the concave and convex portions can be adjusted.

The following method can also be used to form a metallic wire on only the convex or concave portion of the film surface with the convexoconcave structure formed thereon by nanocasting of the present invention: Similarly to the aforementioned procedure, a metallic particle layer is formed on an selective basis only on the convex or concave portion of the film surface with the convexoconcave structure formed thereon by nanocasting of the present invention. After that, the resin forming the concave or convex portion is applied to the roll and, together with the resin forming the concave or convex portion of the metallic layer, it is transferred onto the film. This procedure allows a metallic wire to be formed only on the convex or concave portion of the film.

According to a further method, a thermal transfer ribbon using the metallic particles or metal nanoparticles is manufactured, instead of the pigment of the ink ribbon of the heat-sensitive fusible transfer material, and a convexoconcave structure is formed by nanocasting of the present invention. This is thermally transferred onto the film. In this case, the pressure of the platen roll and the temperature of the thermal transfer head are adjusted so that the metallic portion can be transferred only to the convex portion.

A still further method uses a mirror capable of forming an adhesive/non-adhesive portion on a selective basis by the irradiation as described in the Japanese Patent No. 3308140. An adhesive portion is formed in conformity to the nanocast convex portion, and this mirror is transferred on a selective basis onto the convex portion of the film with a convexoconcave structure formed thereon. The adhesive/non-adhesive portion can be formed as follows: Polarized light is applied to the rear surface of the nanocast film, and the adhesive/non-adhesive portion is formed using the retardation resulting from the difference in film thickness on the concave and convex portions of the nanocast film.

According to a still further method, a metal is vapor-deposited obliquely onto the film surface with the convexoconcave structure formed thereon by nanocasting of the present invention, whereby metal is deposited only on the convex portion. If the amount of the deposited metal is insufficient, electroless plating, electrolytic plating, or processing of physical development in the case of silver can be used in combination.

Further, instead of metallic particles, carbon fine particles can be used to form a photo-absorbent fine wire only on the convex or concave portion of the film surface with the convexoconcave structure formed thereon by nanocasting of the present invention, using the aforementioned procedure. Further, if the lamination structure made up of a carbon fine particle layer and a metallic particle layer is created, one surface can be used as an absorbent polarizer, whereas the reverse surface can be used as a reflective polarizer.

Figure 2:
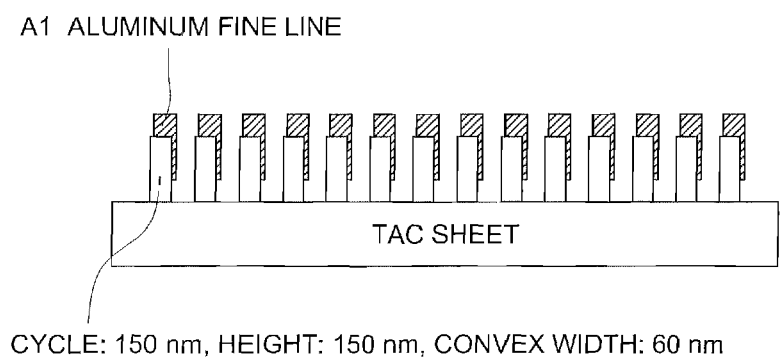
FIG. 2 shows a schematic drawing of a wire grid polarization element prepared by vapor depositing fine metal lines of aluminum on the concave portion of the film on which the convexoconcave structure by the nonacast method according to the invention.

FIG. 2 is a schematic diagram showing the wire grid polarizer made up of the aluminum wire vapor-deposited on the convex portion on the film surface with a convexoconcave structure formed thereon by nanocasting of the present invention.

Next, a film substrate used for the present invention will be explained in detail.

(Film Substrate)

As a film substrate used for the present invention, a cellulose type resin film (TAC, DAC, CAP, CAB, etc.), a norbornane type resin film, and a film of polymethylmethacrylate (PMMA), polycarbonate (PC), polystyrene (PS), polyethylene terephthalate (PET), polyethylenenaphthalate (PEN), diethylene-glycol-bis carbonate (CR-39), styrene/acrylonitrile copolymer (SAN), styrene/methacrylic acid copolymer (MS), alicyclic acryl resin and alicyclic polyolefin resin may be listed up, and it is desirable in the present invention that the film substrate is a film with high absorptivity to a solvent of a resin solution or a film being soluble to the solvent. From view points of optical characteristics, physical characteristics, easiness in handling, and the film being a film absorbing a solvent contained in the resin layer or being soluble to the solvent, a quality of material of an optical film according to the present invention is particularly preferably that of a cellulose type film, especially, that of a cellulose ester film is most preferable.

A cellulose ester film used for the present invention may be one produced by a dope casting method or one produced by a melt casting method.

The cellulose ester used in the present invention is a carboxylate ester having from 2 to 22 carbon atoms, and specifically, a lower fatty acid ester of a cellulose is preferably used. The lower fatty acid represents one having carbon atoms of 6 or fewer, including, for example: cellulose acetate, cellulose propionate, cellulose butyrate, cellulose acetate phthalate and mixed fatty acid esters of for example: cellulose acetatepropionate and cellulose acetatebutyrate disclosed in JP-A 10-45804, JP-A 8-231761, and U.S. Pat. No. 2,319,052. Among these, as a lower-fatty-acid ester of a cellulose used especially preferably, cellulose triacetate, cellulose acetatepropionate and Cellulose acetate butyrate are specifically preferable. These cellulose esters are preferably also used in combination.

The total acyl substitution degree of a cellulose ester is preferably 2 to 3.

Especially, in the case of cellulose triacetate, one having a total acyl substitution degree (acetyl substitution degree) of from 2.6 to 2.9 may be preferably employed.

Another preferable cellulose ester besides cellulose triacetate, is one having an acyl group with from 2 to 4 carbon atoms as a substituent, and simultaneously satisfying the following formulas (I) and (II) when X represents the substitution degree of an acetyl group, while Y represent the substitution degree of a propionyl group or a butyryl group:

$$2.0 \leq X+Y \leq 3.0 \quad \text{Formula (I)}$$

$$0 \leq X \leq 2.8 \quad \text{Formula (II)}$$

Especially, cellulose acetate propionate with $1.0 \leq X \leq 2.5$ and $0.1 \leq Y \leq 2.0$ (while X+Y corresponds to the total acyl substitution degree) is preferable. A hydroxyl group remains in the part where acyl substitution is not carried out. These esters may be prepared through any well-known method in the art.

An acyl substitution degree can be determined through a method prescribed in ASTM-D817-96.

The value of Mw/Mn of the cellulose ester used for the present invention is from 1 to 10, preferably from 1 to 5, and more preferably from 1.4 to 3.0. Meanwhile, a cellulose ester film preferably contains cellulose ester having a Mw/Mn value of from 1.4 to 3.0 as a material, however the Mw/Mn value of the whole cellulose ester (preferably, cellulose triacetate or cellulose acetate propionate) contained in an optical film of the present invention may be preferably within a range of from 1.4 to 3.0. It may be difficult to make it less than 1.4 in a synthetic process of cellulose ester. On the other hand, although it may be possible to obtain cellulose ester having an equal molecular weight by fractionating with gel filtration, it may be not desirable, because cost remarkably becomes high. If the value of Mw/Mn is 3.0 or less, it may be desirable, because a flatness becomes excellent. Further, the value of Mw/Mn of from 1.7 to 2.2 is more preferable.

Further, a number average molecular weight (Mn) of cellulose ester is preferably from 60,000 to 200,000, more preferably from 80,000 to 200,000.

The average molecular weight and the molecular weight distribution can be determined by any well known method in the art using high-speed liquid chromatography, a number average molecular weight and a weight average molecular weight are calculated utilizing the same and the ratio (Mw/Mn) thereof can be determined.

The measurement conditions are as follows:

Solvent: methylene chloride

Column: Shodex K806, K805, K803G (three columns of products by Showa Denko K. K. were utilized in a junction)

Column temperature: 25° C.

Sample concentration: 0.1 percent by weight

Detector: RI Model 504 (produced by GL Science Co.)

Pump: L6000 (produced by Hitachi, Ltd.)

Flow rate: 1.0 ml/min

Calibration curve: calibration curves based on 13 samples of standard polystyrene STK, standard polystyrene (manufactured by Tosoh Corp.) Mw=500 to 1,000,000, were utilized. The intervals among the 13 samples should be almost equal.

Cellulose ester can be prepared using cotton linter, wood pulp or kenaf as starting materials which may be used alone or in combination. It is particularly preferable to use a cellulose ester prepared from cotton linter (hereafter described merely as linter) or from wood pulp.

These cellulose esters may also be used by mixing with each other in any ratio. In case, an acid anhydride (acetic anhydride, propionic anhydride, and butyric anhydride) is used as an acylation agent, cellulose ester can be prepared through a common reaction using an organic acid such as acetic acid and an organic solvent such as methylene chloride, in the presence of a protic catalyst such as sulfuric acid.

In the case of an acetyl cellulose, it is necessary to prolong the acetylation duration in order to obtain a higher degree of acetylation, however, a too long acetylation duration may result in a undesirable reaction such as cutting off of a polymer chain or a decomposition of an acyl group. Accordingly, the acetylation duration should be limited within an appropriate range, however, specifying a degree of acetylation with an acetylation duration is not fully recommended because the acetylation conditions differ when a different reactor or different equipment is utilized. In general, during decomposition of a polymer, the distribution of the molecular weight increases, so that, also in the case of a cellulose ester, the degree of decomposition can be specified by the commonly used Mw/Mn value, where Mw represents a weight average molecular weight and Mn denotes a number average molecular weight. Namely, the Mw/Mn value can be used as one of the parameters representing the degree of acetylation reaction at which the decomposition of the polymer has not been excessive and, at the same time, sufficient acetylation has already been achieved.

An example of a preparation method of cellulose ester is described below. Cotton linter of 100 weight parts as a starting material of cellulose was crushed, and after adding 40 weight parts of acetic acid, the system was pretreated for activation at 36° C. for 20 minutes. Thereafter, 8 weight parts of sulfuric acid, 260 weight parts of acetic anhydride and 350 weight parts of acetic acid were added, after which esterification was performed at 36° C. for 120 minutes. The system was saponification ripened at 63° C. for 35 minutes after being neutralized with 11 weight parts of 24% magnesium acetate aqueous solution to obtain acetyl cellulose. After the system was stirred with adding ten times of an acetic acid solution (acetic acid/water=1/1, based on weight ratio) at ambient temperature for 160 minutes, the resulting solution was filtered and dried to obtain a purified acetyl cellulose having an acetyl substitution degree of 2.75. The obtained acetyl cellulose exhibited Mn of 92,000, Mw of 156,400, and Mw/Mn of 1.7. In a similar manner, cellulose esters having different substitution degrees and different Mw/Mn ratios can be synthesized by controlling the esterification conditions of cellulose ester (temperature, duration and stirring rate) as well as hydrolysis conditions.

Incidentally, with regard to the synthesized cellulose ester, removal of low molecular weight component by refining and removal of non-acetized component by filtering from the prepared cellulose ester are also preferably carried out.

Further, a cellulose ester of mixed acids can be prepared by a reaction employing the method described in JP-A 10-45804. The acyl substitution degree can be measured according to the definition of ASTM-D817-96.

The properties of a cellulose ester are influenced by residual amounts of metal components which may be originated from the water used in the manufacturing process. Metal components which may cause insoluble cores should preferably be minimal. Metal ions of iron (Fe), calcium (Ca), magnesium (Mg) and other metals may form insoluble cores by forming salts in combination with decomposition products of polymers which may possibly contain organic acid groups. Accordingly these metal ions should be minimal. The amount of iron is preferably less than 1 ppm. Calcium is contained in a considerable quantity in groundwater or in river water, and an appreciable quantity of which forms hard water. Calcium easily forms a coordinated compound, namely a complex, with acid components such as carbonic acid, sulfuric acid, or with various ligands, and causes much insoluble scum (insoluble residue and turbidity).

The preferable amount of calcium is commonly less than 60 ppm, and is more preferably from 0 to 30 ppm. Too much magnesium may also cause insoluble residue, and the preferable amount is from 0 to 70 ppm, more preferably from 0 to 20 ppm. After an absolutely dry cellulose ester film is treated with a microdigest wet-decomposer (sulfuric acid-nitric acid decomposing) followed by being subjected to alkali fusion, the amounts of iron, calcium, magnesium are determined by means of IPC-AES (Inductively Coupled Plasma-Atomic Emission Spectroscopy).

<Plasticizer>

A cellulose ester film used for the present invention preferably contains a plasticizer.

Especially by containing two or more kinds of plasticizers, it may be possible to minimize elution of the plasticizers. Although the reasons for it is not clear, it seems that the elution is suppressed by the capability of reducing the added amount per one kind of plasticizers and the interaction between the two kinds of plasticizers and among the plasticizers and cellulose ester.

The plasticizers are not specifically limited, however, they may be selected from, for example: a multivalence carboxylic acid ester type plasticizer, a glycolate type plasticizer, a phthalate ester plasticizer, a fatty-acid-ester type plasticizer and a polyhydric alcohol ester type plasticizer, a polyester type plasticizer, an acrylics type plasticizer, etc. At least one of the plasticizers is preferably a polyalcohol ester type plasticizer.

A polyalcohol ester used as a plasticizer in the present invention is an ester prepared from a monocarboxylic acid and an aliphatic polyalcohol having a valence of 2 or more. It preferably contains an aromatic ring or a cycloalkyl ring in the molecule. An aliphatic polyalcohol ester having the valence of from 2 to 20 is preferably used.

A polyalcohol used in the present invention is represented by formula (3):

$$R_1-(OH)_n \quad \text{Formula (3)}$$

Wherein: $R_1$ represents an organic acid having a valence of n, n represents a positive integer of 2 or more and OH represents an alcoholic and/or a phenolic hydroxyl group.

Examples of a preferable polyalcohol are listed below, however, the present invention is not limited thereto: adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol. Specifically, triethylene glycol, tetraethylene glycol, dipropylene glycol, tripropylene glycol, sorbitol, trimethylolpropane and xylitol are preferable.

A mono carboxylic acid to be used for the polyalcohol ester is not specifically limited, and well known compounds such as aliphatic monocarboxylic acid, alicyclic monocarboxylic acid and aromatic monocarboxylic acid may be used. Alicyclic monocarboxylic acid or aromatic monocarboxylic acid is preferably used with respect to improving moisture permeability and retention of additives.

Examples of preferable monocarboxylic acids are listed below, however, the present invention is not limited thereto.

For aliphatic monocarboxylic acids, normal or branched fatty acids having from 1 to 32 carbon atoms are preferably used. The number of carbon atoms is more preferably from 1 to 20 and still more preferably from 1 to 10. The use of an acetic acid will help improve the mutual solubility, so that a mixture of an acetic acid and other monocarboxylic acids is also preferable.

Examples of preferable aliphatic mono carboxylic acids include saturated fatty acids such as: acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecanoic acid, stearic acid, nonadecane acid, arachidic acid, behenic acid, lignoceric acid, cerotinic acid, heptacosanoic acid, montanic acid, melissic acid, lacceric acid, as well as unsaturated fatty acids such as: undecylic acid, oleic acid, sorbic acid, linoleic acid, linolenic acid and arachidonic acid.

Examples of preferable alicyclic monocarboxylic acids include: cyclopentanecarboxylic acid, cyclohexanecarboxylic acid, cyclooctanecarboxylic acid, and derivatives thereof.

Examples of preferable aromatic monocarboxylic acids include: benzoic acid and toluic acid, both of which have benzene ring in which alkyl groups are introduced, biphenylcarboxylic acid, naphthalenecarboxylic and tetralincarboxylic acid having 2 or more benzene rings, and derivatives thereof, of these, benzoic acid is specifically preferred.

The molecular weight of the polyalcohol ester is not limited, however, the molecular weight is preferably from 300 to 1,500 and more preferably from 350 to 750. A higher molecular weight is preferable in that the volatility of the polyalcohol is reduced, while a lower molecular weight is preferable with respect to moisture permeability, or to mutual solubility with cellulose ester.

To be used for a polyalcohol ester, carboxylic acid may be used alone or in combination of two or more carboxylic acids. Hydroxyl groups in a polyalcohol may be completely esterified or partially esterified remaining unsubstituted hydroxyl groups.

Specific examples of polyalcohol esters are shown below:

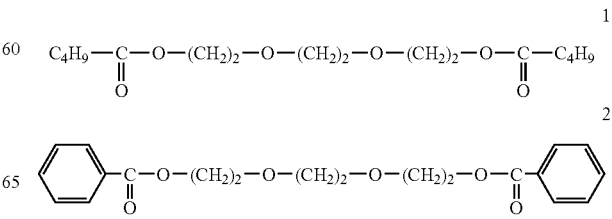

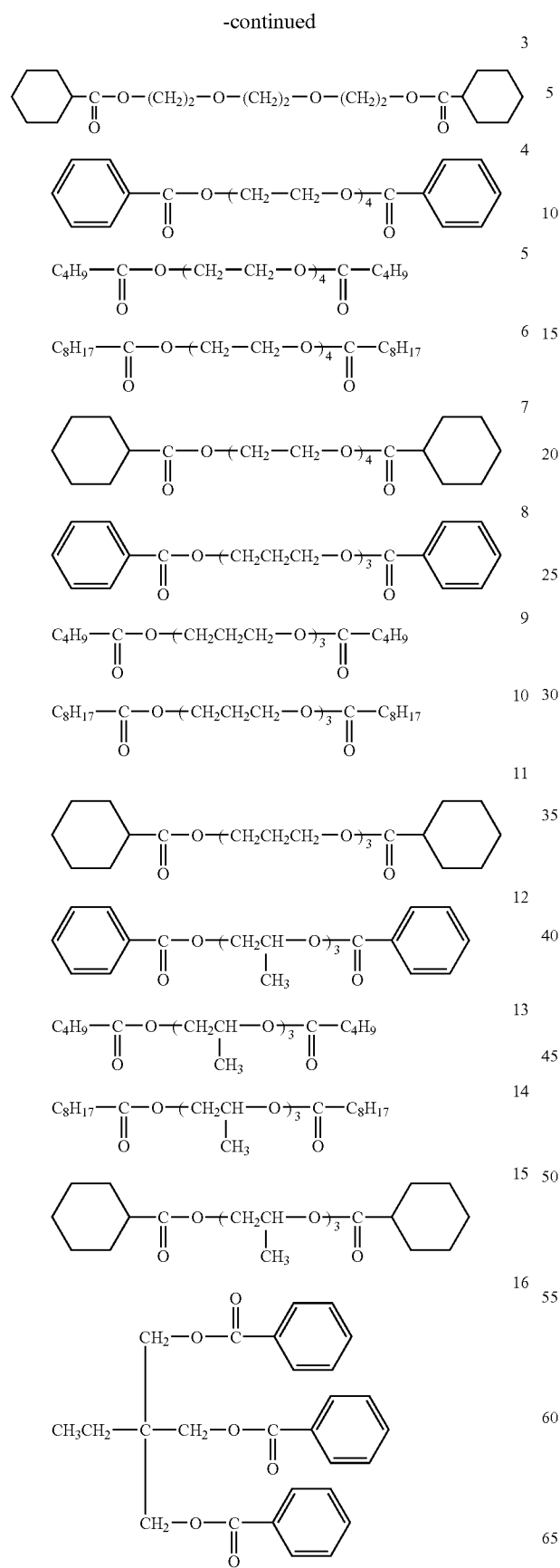
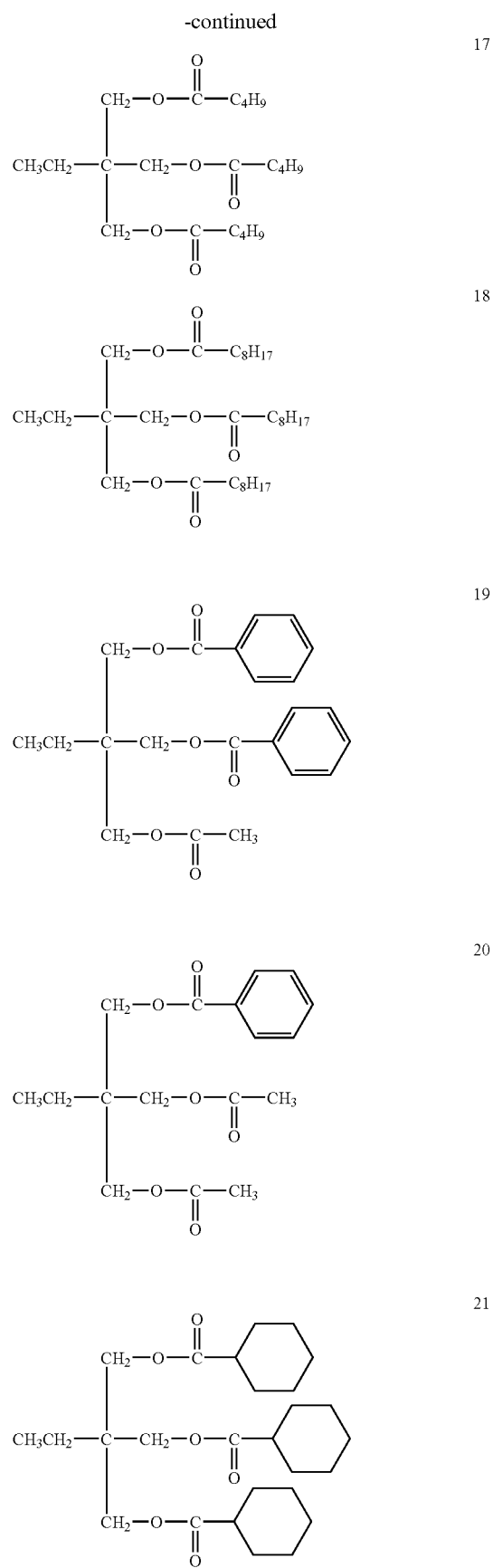

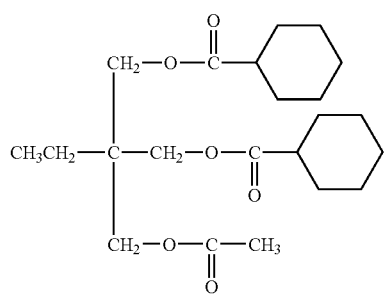
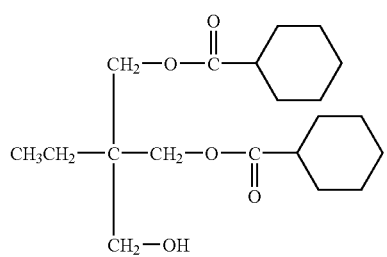
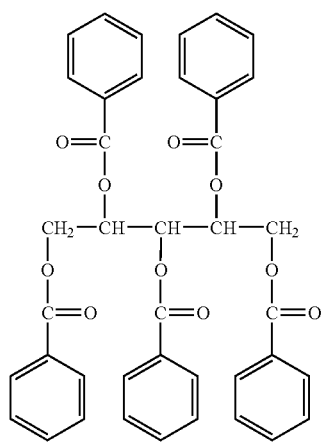
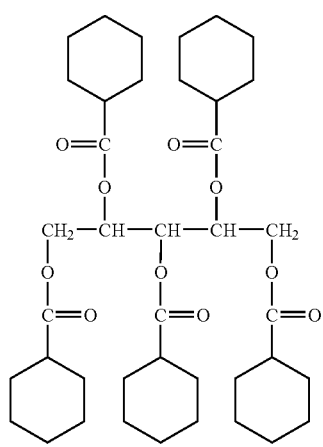
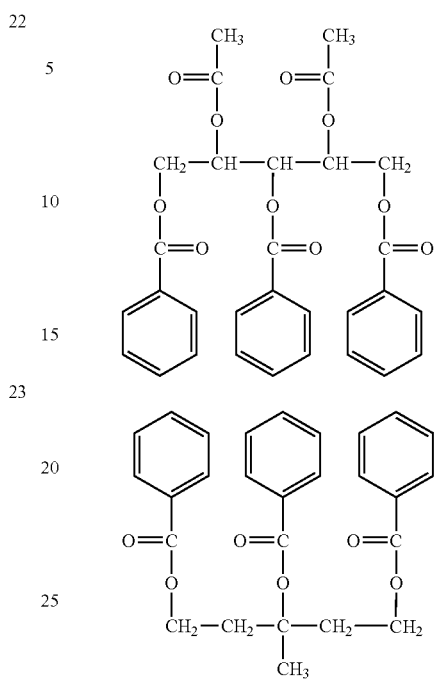
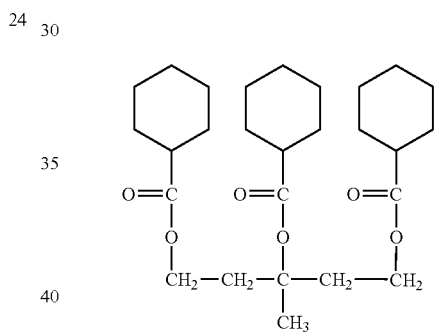
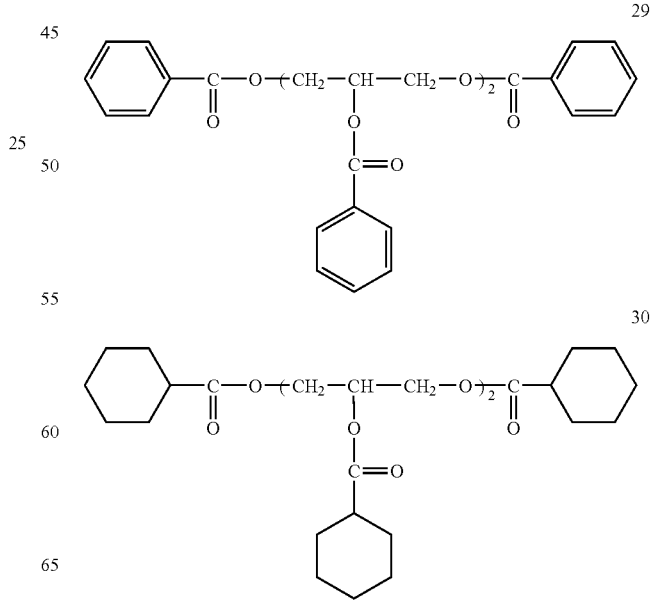

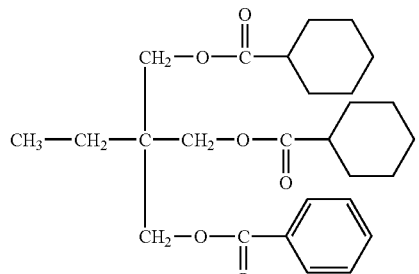

31

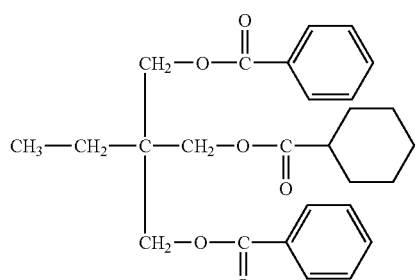

32

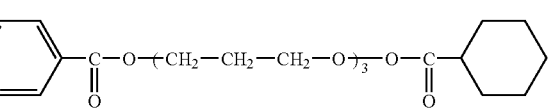

33

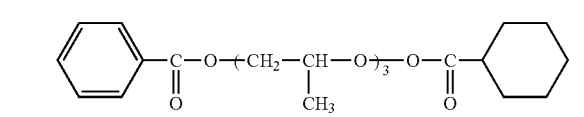

34

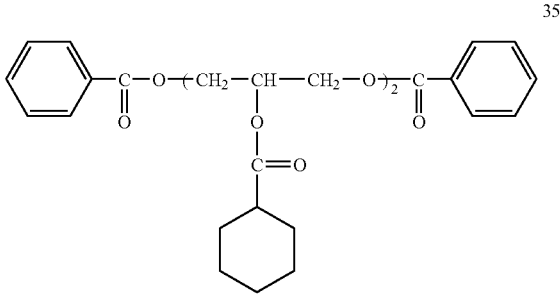

35

A glycolate ester type plasticizer is not specifically limited, however, an alkylphthalylalkyl glycolate type is preferably used, which include, for example:

methylphthalylmethyl glycolate, ethylphthalylethyl glycolate, propylphthalyl-propyl glycolate, butylphthalylbutyl glycolate, octylphthalyloctyl glycolate, methylphthalylethyl glycolate, ethylphthalylmethyl glycolate, ethylphthalylpropyl glycolate, methylphthalylbutyl glycolate, ethylphthalylbutyl glycolate, butylphthalylmethyl glycolate, butylphthalylethyl glycolate, propylphthalylbutyl glycolate, butylphthalylpropyl glycolate, methylphthalyloctyl glycolate, ethylphthalyloctyl glycolate, octylphthalylmethyl glycolate and octylphthalylethyl glycolate.

A phthalic ester type plasticizer includes, for example: diethyl phthalate, dimethoxyethyl phthalate, dimethyl phthalate, dioctyl phthalate, dibutyl phthalate, di-2-ethylhexyl phthalate, dioctyl phthalate, dicyclohexyl phthalate and dicyclohexyl terephthalate.

A citrate ester type plasticizer includes, for example: acetyltrimethyl citrate, acetyltriethyl citrate and acetyltributyl citrate.

A fatty acid ester type plasticizer includes, for example: butyl oleate, methylacetyl ricinoleate and dibutyl sebacate.

A phosphoric ester type plasticizer includes, for example: triphenyl phosphate, tricresyl phosphate, cresylphenyl phosphate, octyldiphenyl phosphate, diphenylbiphenyl phosphate, trioctyl phosphate and tributyl phosphate.

The total content of plasticizers in a cellulose ester film is preferably 3 to 30 weight % to the total amount of solid content, still more preferably, is 5 to 20 weight %, still more preferably 6 to 16 weight %, and still more preferably is 8 to 13 weight %. Moreover, when making two or more kinds of plasticizers contain, each plasticizer content is desirably at least one or more weight %, and it is desirable that the content per one kind is 2-15 weight % As for polyvalent alcohol ester tyoe plasticizer, it is desirable to contain it in an amount of 1 to 20 weight %, and it is more desirable to contain it in amount of 3 to 15 weight % especially. By containing polyvalent alcohol ester tyoe plasticizer, it may be possible to obtain a cellulose ester film excellent in flatness. The ratio of the polyvalent alcohol ester tyoe plasticizer to other plasticizers may be desirable in a range of from 1:4 to 4:1, and more desirably in a range of from 1:3 to 3:1.

A cellulose ester film used for the present invention preferably contains an aromatic terminal ester type plasticizer represented by the following Formula (P).

$$B\text{-}(G\text{-}A)_n\text{-}G\text{-}B \qquad \text{Formula (P)}$$

where B represents benzene monocarboxylic acid group, G represents an alkylene glycol group having 2-12 carbon atoms, an aryl glycol group having 6-12 carbon atoms, or an oxyalkylene glycol group having 4-12 carbon atoms, A represents an alkylene dicarboxylic acid having 4-12 carbon atoms, or an aryl dicarboxylic acid group having 6-12 carbon atoms, and n represents an integer of 1 or more.

A compound represented by Formula (P) is structured by benzene monocarboxylic acid group represented with B, an alkylene glycol group or an oxyalkylene glycol group or an aryl glycol group represented with C, and an alkylene dicarboxylic acid group or an aryl dicarboxylic acid group represented with A and is prepared through a reaction similar to the preparation reaction of a common polyester plasticizer.

Examples of a benzene monocarboxylic acid component of the aromatic terminal ester plasticizer used for the present invention include: benzoic acid, p-tert-butyl benzoic acid, o-toluic acid, m-toluic acid, p-toluic acid, dimethyl benzoic acid, ethyl benzoic acid, n-propyl benzoic acid, aminobenzoic acid and acetoxy benzoic acid, which may be used alone or in combination of two or more acids.

Examples of an alkylene glycol component having 2-12 carbon atoms of the aromatic terminal ester plasticizer used for the present invention include: ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (also known as neopentylglycol), 2,2-diethyl-1,3-propanediol (also known as 3,3-dimethylol pentane), 2-n-butyl-2-ethyl-1,3-propanediol (also known as 3,3-dimethylol heptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, which may be used alone or in combination of two or more glycols.

Examples of an oxyalkylene glycol component having 4-12 carbon atoms of the aromatic terminal ester of the present invention include: diethylene glycol, triethylene glycol, tetraethylene glycol, dipropylene glycol and triropylene glycol, which may be used alone or in combination of two or more glycols.

Examples of an aryl glycol component having 6-12 carbon atoms of the aromatic terminal ester of the present invention include: hydroquinone, resorcinol, bisphenol A, bisphenol F, bisphenol, which may be used alone or in combination of two or more glycols. Examples of an alkylene dicarboxylic acid component having 4-12 carbon atoms of the aromatic terminal ester of the present invention include: succinic acid, maleic acid, the fumaric acid, glutaric acid, adipic acid, azelaic acid, sebacic acid and dodecane dicarboxylic acid, which may be used alone or in combination of two or more acids. Examples of an arylene dicarboxylic acid component having 6-12 carbon atoms include: phthalic acid, terephthalic acid, 1,5-naphthalene dicarboxylic acid and 1,4-naphthalene dicarboxylic acid.

The number average molecular weight of the aromatic terminal ester type plasticizer used for the present invention is preferably 300-2000, and more preferably 500-1500. The acid value of the ester plasticizer used in the present invention is preferably not more than 0.5 mgKOH/g and more preferably not more than 0.3 mgKOH/g. The hydroxyl value of the ester plasticizer used in the present invention is preferably not more than 25 mgKOH/g and more preferably not more than 15 mgKOH/g.

(Acid Number, Hydroxyl Value of Aromatic Terminal Ester)

The acid number means a milligram quantity of potassium hydroxide required in order to neutralize the acid (carboxyl group which existing in a molecule terminal end) contained in 1 g of Sample. The acid number and hydroxyl value are measured based on JIS K0070.

Examples of a synthetic method of an aromatic terminal ester plasticizer are shown below:

<Sample No. 1 (Aromatic Terminal Ester Sample)>

In a container, 820 parts (5 mols) of phthalic acid, 608 parts (8 mols) of 1,2-propylene glycol, 610 parts (5 mols) of benzoic acid, and 0.30 parts of tetra-isopropyl titanates (as a catalyst) were loaded at a time. While stirring under a nitrogen atmosphere, the mixture was heated at 130-250° C. until the acid value decreased to 2 or less while refluxing an excess monovalent alcohol thorough a reflux condenser and produced water was continuously removed. Then, the container was evacuated to $6.65 \times 10^3$ Pa and, finally, to $4.0 \times 10^2$ Pa at 200-230° C., while the distillate was removed. The product was filtered to obtain an aromatic terminal ester having the following natures, and the obtained aromatic terminal ester has a structure of the following exemplification compound (1).

Viscosity (25° C., mPa·s): 19815
Acid value: 0.4

<Sample No. 2 (Aromatic Terminal Ester Sample)>

An aromatic terminal ester having the following natures was prepared in the same manner as Sample No. 1 except that 500 parts (3.5 mols) of adipic acid, 305 parts (2.5 mols) of benzoic acid, 583 parts (5.5 mols) of diethylene glycol and 0.45 parts of tetra-isopropyl titanates (as a catalyst) were used, the obtained aromatic terminal ester has a structure of the following exemplification compound (2).

Viscosity (25° C., mPa·s): 90
Acid value: 0.05

<Sample No. 3 (Aromatic Terminal Ester Sample)>

An aromatic terminal ester having the following natures was prepared in the same manner as Sample No. 1 except that 570 parts (5.5 mols) of isophtalic acid, 305 parts (2.5 mols) of benzoic acid, 737 parts (5.5 mols) of dipropylene glycols, and 0.40 parts of tetra-isopropyl titanates (as a catalyst) were used, the obtained aromatic terminal ester has a structure of the following exemplification compound (3).

Viscosity (25° C., mPa·s): 33400
Acid value: 0.2

Although concrete compounds of the aromatic terminal ester type plasticizer used for the present invention are shown below, the present invention is not limited to these.

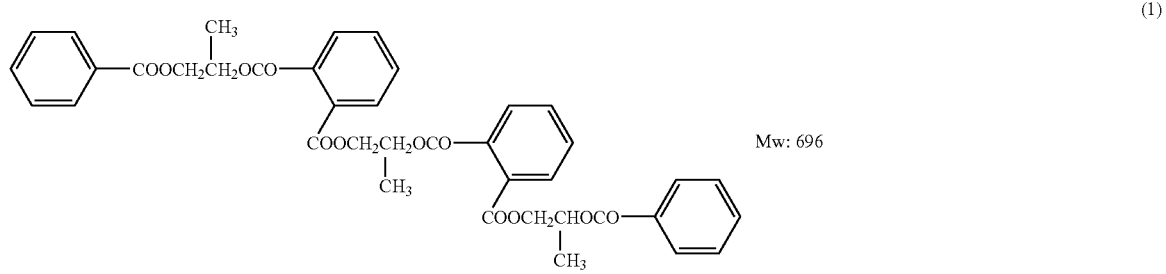

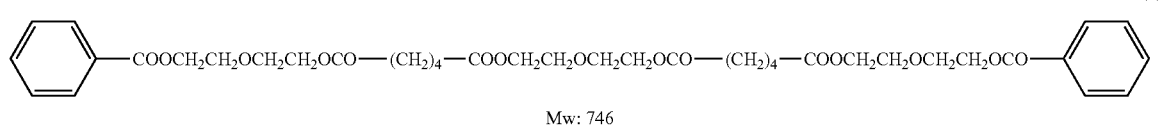

-continued
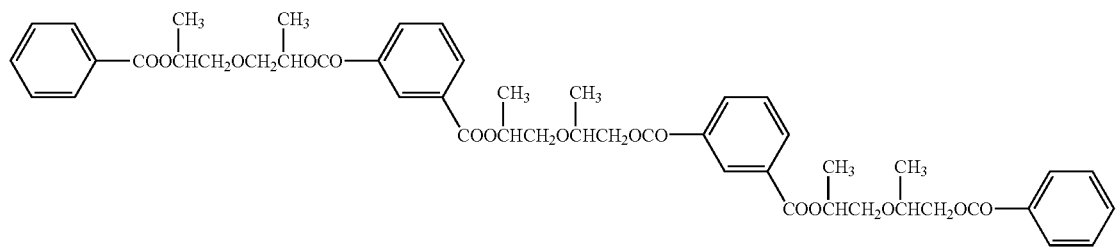
Mw: 830 (3)
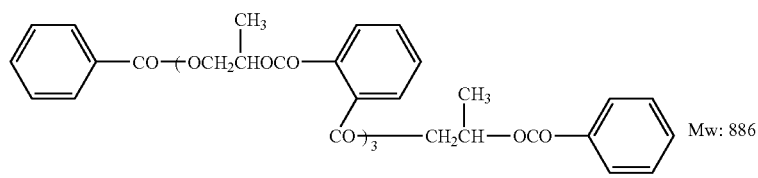
Mw: 886 (4)
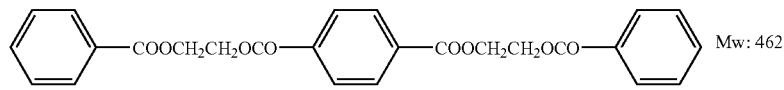
Mw: 462 (5)
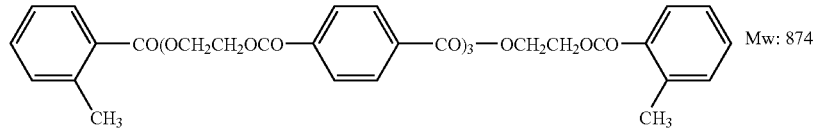
Mw: 874 (6)
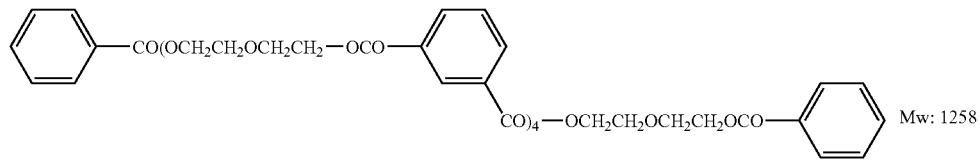
Mw: 1258 (7)
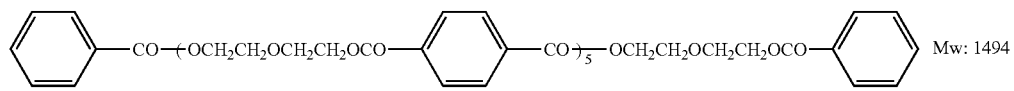
Mw: 1494 (8)
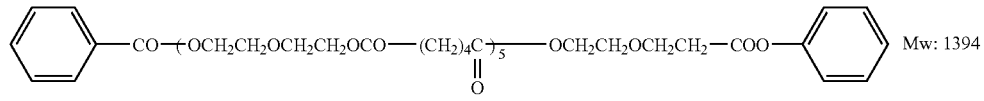
Mw: 1394 (9)
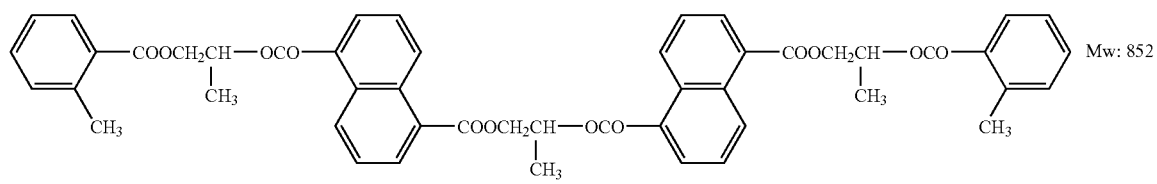
Mw: 852 (10)
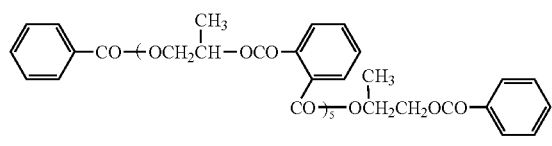
Mw: 1314 (11)
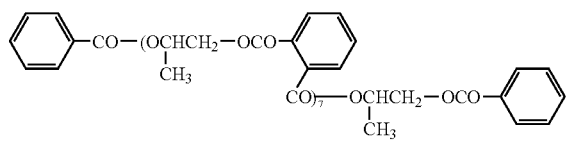
Mw: 1726 (12)

The aromatic terminal ester type plasticizer used for the present invention is preferably contained in an amount of 1 to 20 weight % in a cellulose ester film, more preferably in an amount of 3 to 11 weight % especially.

It is also preferable that the cellulose ester film to be used for the invention contains a polymer principally composed of polyester, polyester ether or vinyl ester.

As the above polymer, ones which does not cause phase separation in a cellulose ester dope or a cellulose ester film are selected. The polymer is a polymer principally composed of a polyester and polyester ether having a weight average molecular weight of from 400 to 5,000 and preferably from 400 to 1,000 and vinyl ester having a weight average molecular weight of from 5,000 to 150,000, preferably from 7,000 to 100,000 and further preferably from 10,000 to 80,000.

The content of the polyester or the polyester ether in a cellulose ester film advantageous for the invention is 5 to 30%, and more preferably from 7 to 20%, by weight of cellulose ester. The content of the polymer principally composed of the vinyl ester in a cellulose ester film advantageous for the invention is 5 to 45%, and more preferably from 7 to 35%, by weight of cellulose ester.

The polyester effectively usable in the invention is described below. The dibasic acid as one of the composition of the polyester is preferably an aliphatic dibasic acid, an alicyclic dibasic acid and an aromatic dibasic acid. Examples of the aliphatic dibasic acid include malonic acid, succinic acid, glutaric acid, adipic acid, pimelic acid, suberic acid, azelaic acid, sebacic acid, undecane dicarboxylic acid and dodecane dicarboxylic acid. Examples of the aromatic dibasic acid include phthalic acid, terephthalic acid, isophthalic acid, and 1,4-xylidene-dicarboxylic acid, and those of the alicyclic dibasic acid include 1,3-cyclobutane dicarboxylic acid, 1,3-cyclopentane dicarboxylic acid, 1,4-cyclohexane dicarboxylic acid and 1,4-cyclohexane diacetic acid. Aliphatic dicarboxylic acid having 4 to 12 carbon atoms, alicyclic dibasic acid and aromatic dibasic acid are particularly preferred. At least one of them is used, namely two or more kinds of the dibasic acids may be used in combination. As glycol as the other constituting component, for example, ethylene glycol, diethylene glycol, 1,2-propylene glycol, 1,3-propylene glycol, 1,2-butylene glycol, 1,3-butylene glycol, 1,4-butylene glycol, 1,5-pentanediol, 1,6-hexanediol, 1,4-cyclohexanediol, 1,5-pentylene glycol, 1,4-cyclohexanedimethanol, diethylene glycol, triathlon glycol and tetraethylene glycol can be cited. Among them, ethylene glycol, 1,2-propylene glycol, 1,3-propylene glycol, 1,2-butylene glycol, 1,3-butylene glycol, 1,4-butylene glycol, 1,6-hexanediol, 1,4-cyclohexanedimethanol, diethylene glycol and triethylene glycol are preferable, and 1,3-propylene glycol, 1,4-butylene glycol, 1,6-hexanediol and diethylene glycol are more preferably usable.

The poly(ester ether) effectively usable in the invention can be obtained by polyesterification reaction or ester interchanging reaction of the above polyester, the dibasic acid or an alkyl ester of them and the compound having OH groups at both terminals of the ether unit by a thermal melt condensation method or a etherification reaction of a polyester having a OH group at the terminal thereof. Any ether unit may be used without any limitation, for example, a compound of represented by $HO(RO)_n ROH$, in which R is an alkylene group, an arylene group, an aralkylene group or a di-functional alicyclic group, they may be mixed and n is an integer of from 1 to 100, for example, diethylene glycol, triethylene glycol, tetraethylene glycol, poly(ethylene glycol), poly(propylene glycol), polybutylene glycol, polyphenylene glycol and poly(cyclohexylene glycol) are usable, they may be used in combination. The method for controlling the molecular weight of the polymer can be similarly applied in the case of the polyester without any limitation.

Polyesters suitable for the invention are available on the market. Examples of them include copolymerized esters of Hytrel manufactured of du Pont Co., Ltd., polymers of Galflex manufactured by GAF Co., Ltd., and Adecasizer RS series manufactured by Asahi Denka Kogyo Co., Ltd.

The kind of the polymer principally composed of the vinyl ester advantageously used in the invention is not specifically limited as long as the polymer does not cause phase separation. As the monomer forming the polymer principally composed of the vinyl ester, vinyl acetate, vinyl propionate, vinyl butylate, vinyl isobutylate, vinyl venerianate, iso-valerianate, vinyl methylethylacetate, vinyl pivarate, vinyl caproate, vinyl isocaproate, vinyl enanthate, vinyl caprilate, vinyl caprate, vinyl laurate and vinyl myristate can be cited. Here, the polymer principally composed of vinyl ester is a polymer containing not less than 40% by weight of the vinyl ester. As the copolymerizing component of the vinyl ester, a vinyl ether such as methyl vinyl ether, ethyl vinyl ether, propyl vinyl ether and butyl vinyl ether, a vinyl ketone such as methyl vinyl ketone, ethyl vinyl ketone, propyl vinyl ketone and butyl vinyl ketone, an acylate or methacrylate such as methyl acrylate, ethyl acrylate, propyl acrylate, butyl acrylate, pentyl acrylate, hexyl acrylate, 2-ethylhexyl acrylate, 2-hydroethylhexyl acrylate, cyclohexyl acrylate, heptyl acrylate, octyl acrylate, benzyl acrylate, phenetyl acrylate and those in which the acrylic acid is replaced by methacrylic acid can be cited. Other than the above monomers, a monomer such as a maleate, fumarate, vinyl chloride and butadiene are applicable as the copolymerization component.

Cellulose ester to be used in the invention is obtained by polycondensation reaction of a glycol (a) having an average carbon number of from 2 to 3.5 and a dibasic acid (b) having an average carbon number of from 4 to 4.5. It is also preferable that the cellulose ester contains polyester having a number average molecular weight Mn of from 1,500 to 10,000.

The above polyester is produced by usual method such as dehydration condensation of a glycol (a) having an average carbon number of from 2 to 3.5 and a dibasic acid (b) having an average carbon number of from 4 to 5.5 or by addition and polycondensation of such the glycol (a) and a dibasic acid anhydrate (b).

Examples of the glycol (a) include ethylene glycol, diethylene glycol, 1,2-propylene glycol, 1,3-propylene glycol, 2-methyl-1,3-propanediol, 1,4-butylene glycol, neopentyl glycol, 3-methyl-1,5-pentanediol and 1,6-hexanediol, which may be used singly or in combination of two or more kinds thereof. For example, ethylene glycol or a mixture of ethylene glycol and diethylene glycol are particularly preferably used.

As to the above glycol (a), it is important that the average number of carbon atom is within the range of from 2 to 3.5. When the average carbon atom number of the glycol (a) is less than 2, polyester is difficulty produced. When the average carbon number is larger than 3.5, a cellulose ester improving agent inferior in the compatibility with cellulose and cellulose film inferior in the physical property such as transparency are obtained. The average carbon atom number of the glycol (a) is preferably 2.1 to 2.8 or 3.2 to 3.5. Polyester having crystallinity and melting point near those of usually used one can be obtained and the production efficiency of itself can be improved by the use of the glycol having the carbon atom number within such the range.

When a mixture of ethylene glycol and diethylene glycol is used as the glycol (a), the mole ratio of ethylene glycol/diethylene glycol is preferably from 25 to 100/75 to 0. Thus an improving agent for cellulose ester superior in the compatibility with the cellulose ester can be obtained. The ratio is more preferably 25 to 40/75 to 60 and 60 to 95/40 to 5. By applying such the ratio, the polyester having crystallinity and melting point near those of usually used one can be obtained and the production efficiency of itself can be improved.

As the dibasic acid (b) constituting the polyester, for example, succinic acid, glutaric acid, adipic acid and sebacic acid can be cited, they may be used singly or in combination of two or more kinds thereof, and succinic acid and a mixture of succinic acid and terephthalic acid are particularly preferred.

As to the above dibasic acid (b), it is important that the average number of carbon atom of the dibasic acid is within the range of from 4 to 5.5. When the average carbon atom number of the dibasic acid (b) is less than 4, polyester is difficulty produced. When the average carbon number is larger than 5.5, a cellulose ester improving agent inferior in the compatibility with cellulose and cellulose film inferior in the physical property such as transparency are obtained. The average carbon atom number of the dibasic acid (b) is preferably 4.1 to 4.8 or 5.2 to 5.5. Polyester having crystallinity and melting point near those of usually used one can be obtained, and the production efficiency of itself can be improved by the use of such the dibasic acid having the carbon number within such the range.

When a mixture of succinic acid and phthalic acid is used as the dibasic acid (b), the mole ratio of succinic acid/phthalic acid is preferably from 25 to 100/75 to 0. Thus an improving agent for cellulose ester superior in the compatibility with the cellulose ester can be obtained. The ratio is more preferably 25 to 40/75 to 60 and 60 to 95/40 to 5. By applying such the ratio, polyester having crystallinity and melting point near those of usually used one can be obtained and the production efficiency of itself can be improved.

The combination of the glycol (a) and the dibasic acid (b) constituting the foregoing polyester to be used in the invention includes a combination other than the above and a combination is preferable, in which the sum of the average carbon atom number of the glycol (a) and that of the dibasic acid is from 6 to 7.5.

The number average molecular weight of the polyester obtained by the glycol (a) and the dibasic acid (b) may be within the range of from 1,500 to 200,000, the polyester is basically one having a hydroxyl group at the terminal thereof and a number average molecular weight of from 1,500 to 5,000, particularly from 1,500 to 4,000, is preferably used. A plasticizer for cellulose ester superior in the compatibility with the cellulose ester can be obtained by using the polyester having the number average molecular weight within such the range.

It is preferable for obtaining the effect of the invention that the film contains the above polyester having the number average molecular weight of not less than 1,500 in a ratio of from 10 to 30% and more preferably from 10 to 20% by weight. The number average molecular weight larger than the above range causes degradation in the compatibility and the effect of reducing moisture permeability, and the reserving ability is tends to be lowered. Therefore, the above range is preferable. Practically, the content of the polymer in the film is decided within the range in which the phase separation is not caused in the dope, web or after film formation, depending on the kind and the weight average molecular weight of the polymer in accordance with properties such as the dimensional stability, the reserving ability and the transparence.

The content of the carboxyl group terminal of the polyester to be used in the invention is preferably not more than 1/20 and more preferably not more than 1/40 in mole number of the hydroxyl group terminal standing on the viewpoint of the physical properties.

A known esterification catalyst such as an organic salt or a chelate of metal such as titanium, zinc, lead and zirconium or antimony oxide can be used on the occasion of preparation of the above polyester. As such the esterification catalyst, for example, tetraisopropyl titanate and tetrapropyl titanate are preferably used, and the using amount is preferably from 0.0005 to 0.02 parts by weight to 100 parts by weight of the sum of glycol (a) and dibasic acid (b).

The polycondensation of the polyester is carried out by a usual method. The polyester can be easily synthesized by, for example, a direct reaction of the dibasic acid with the glycol, a thermal melt condensation method by a esterification reaction or an ester interchanging reaction of the above dibasic acid or an alkyl ester thereof such as a methyl ester with the glycol, or a dehydrohalogenation reaction of an acid chloride of the dibasic acid with the glycol. The direct reaction is preferably applied for preparing the polyester having a relatively small weight average molecular weight. The polyester having high frequency of molecular weight on the lower molecular weight side shows considerably high compatibility with the cellulose ester and cellulose ester film having low moisture permeability and high transparency can be obtained after formation of the film. The method for controlling the molecular weight is not specifically limited and usual methods can be applied. For example, the molecular weight can be controlled by adding amount of a mono-valent acid or a mono-valent alcohol in a method for blocking the molecular terminal by the mono-valent acid or the mono-valent alcohol in accordance with the polymerization condition. In such the case, the control by the mono-valent acid is preferable for the stability of the polymer. As examples of such the acid, acetic acid, propionic acid, butylic acid, pivalic acid and benzoic acid can be cited. One of such the acid is selected, which is difficulty distilled out to the reaction system during the polymerization reaction and easily distilled out at the time for removing the mono-valent acid after stopping the polymerization reaction. These acids may be used in mix. In the case of the direct reaction, the number average molecular weight can be controlled by deciding the time for stopping the reaction according to the amount of water distilled out in the course of reaction. The control of the number average molecular weight can be also carried out by biasing the mole number of the glycol or the dibasic acid or by controlling the reaction temperature.

The content of the polyester in the cellulose ester film is preferably from 1 to 20% and particularly preferably from 3 to 11% by weight.

A cellulose ester film used for the present invention preferably contains as additives a polymer synthesized from a monomer having an ethylenic unsaturated bond, or additives selected from general formulas (1) to (14) mentioned later.

As the polymer synthesized from a monomer having an ethylenic unsaturated bond, the following polymer X and Polymer Y are preferably listed.

The polymer X is a polymer having a weight average molecular weight of 2000 or more without exceeding 30000 and obtained by copolymerization between an ethylenic unsaturated monomer Xa without containing an aromatic ring and a hydrophilic group in the molecule and an ethylenic unsaturated monomer Xb containing a hydrophilic group without an aromatic ring in the molecule; and the polymer Y is a polymer having a weight average molecular weight of 500 or more without exceeding 3000 and obtained by polymerization of an ethylenic unsaturated monomer Ya not having aromatic ring. The polymer synthesized from a monomer having an ethylenic unsaturated bond such as the polymer X and the polymer Y may be preferably used together with other additives and compounds shown in the following formula (1) to (14).

A cellulose ester used in the present invention preferably contains simultaneously the polymer X and the polymer Y.

In the case of using the polymer X and the polymer Y together, it may be preferable that the weight average molecular weight of the polymer Y<the weight average molecular weight of the polymer X, further that the weight average molecular weight of the polymer Y+500<the weight average molecular weight of the polymer X≦30000.

<Polymer X and Polymer Y>

Various methods are known and anyone can also be adopted as a way of adjusting Ro and Rth of the present invention. However, from a point of transparency, it is desirable that a cellulose ester film contains a polymer X having an average molecular weight of 5000 to 30000 and obtained by copolymerization of an ethylenic unsaturated monomer Xa not having an aromatic ring and a hydrophilic group in a molecule thereof and an ethylenic unsaturated monomer Xb having a hydrophilic group and not having an aromatic ring in a molecule thereof, preferably contains a polymer Y having an average molecular weight of 300 to 3000 and obtained by polymerization of an ethylenic unsaturated monomer Ya not having an aromatic ring.

Generally, among monomers, it is well know that a substance which has an aromatic ring especially in a main chain has a positive birefringence property like a birefringence property of a cellulose ester. And it is desirable to add a material having a negative birefringence property in a film, because it does not negate a retardation value Rth of a cellulose ester film.

A polymer X used in the present invention is a polymer having a weight average molecular weight of 5000 or more without exceeding 30000, obtained by copolymerization between an ethylenic unsaturated monomer Xa without containing aromatic ring and hydrophilic group in its molecule and an ethylenic unsaturated monomer Xb containing a hydrophilic group without an aromatic ring in its molecule.

Preferably, Xa is an acryl monomer or a methacryl monomer each not having an aromatic ring and a hydrophilic group in a molecule thereof and Xb is an acryl monomer or a methacryl monomer each having a hydrophilic group and not having an aromatic ring in a molecule thereof.

A polymer X used in the present invention is preferably expressed by the following General Formula (1):

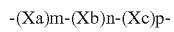  General Formula (1)

More preferably, it is a polymer expressed by the following General Formula (1-1):

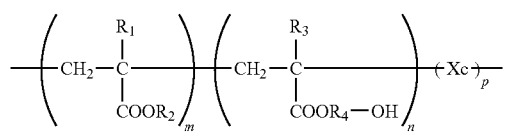

(where $R_1$ and $R_3$ in the Formula represent H or $CH_3$, $R_2$ represents an alkyl group or a cycloalkyl each having carbon atoms of 1-12, and $R_4$ denote $—CH_2—$ or $—C_2H_4—$ or $—C_3H_6—$. Xc represents a monomer unit polymerizable with Xa and Xb, and m n and p indicate a mole composition ratio. Here, m≠0, n≠0, and m+n+p=100)

The following lists up monomers as a monomer unit constituting the polymer X in the present invention without being restricted thereto. In X, a hydrophilic group means a hydroxyl group and a group which has an ethylene oxide chain.

The ethylenic unsaturated monomer Xa without containing either aromatic ring or hydrophilic group in a molecule is exemplified by methyl acrylate, ethyl acrylate, propyl acrylate (i-, n-), butyl acrylate (n-, i-, s-, t-), pentyl acrylate (n-, i-, s-), hexyl acrylate (n-, i-), heptyl acrylate (n-, i-), octyl acrylate (n-, i-), nonyl acrylate (n-, i-), myristyl acrylate (n-, i-), (2-ethylhexyl) acrylate, (ε-caprolactone) acrylate, (2-hydroxy ethyl) acrylate, and (2-ethoxy ethyl) acrylate. Among them, methyl acrylate, ethyl acrylate, methyl methacrylate, ethyl methacrylate or propyl methacrylate (i-, n-) is preferably used.

The ethylenic unsaturated monomer Xb containing the hydrophilic group without an aromatic ring in the molecule is preferably an acrylic acid or methacrylic acid ester as a monomer unit having a hydroxyl group. The preferred one is exemplified by (2-hydroxy ethyl) acrylate, (2-hydroxy propyl) acrylate, (3-hydroxy propyl) acrylate, (4-hydroxy butyl) acrylate, and (2-hydroxy butyl) acrylate, or these substances with the acrylate thereof replaced by methacrylate. Of these, (2-hydroxy ethyl) acrylate, (2-hydroxy ethyl) methacrylate, (2-hydroxy propyl) acrylate, and (3-hydroxy propyl) acrylate are more preferably used.

If a monomer as Xc is a copolymerizable ethylenic unsaturated monomer other than Xa and Xb, the monomer is not limited, however, it is desirable that the monomer has not an acromatic ring.

The mole composition ratio m:n of Xa and Xb is preferably in the range of 99:1 to 65:35, more preferably in the range of 95:5 to 75:25. The mole composition ratio "p" of Xc is 0 to 10. Xc may be a plurality of monomer units.

If the mole composition ratio Xa is greater, compatibility with the cellulose ester will be improved but retardation value Rt along the film thickness will be increased. Further, the mole composition ratio of Xb exceeds the above range, haze may be caused at the time of film production. It may desirable to optimize these and determine the mole composition ratio of Xa and Xb.

The polymer X preferably has a weight average molecular weight of 5000 or more without exceeding 30000, more preferably a weight average molecular weight of 8000 or more without exceeding 25000.

If the molecular weight is greater than 5000, there are such advantages as smaller dimensional variation of the cellulose ester film at a high temperature and humidity and smaller curl as a polarizing plate protective film. When the weight average molecular weight does not exceeds 30000, compatibility with cellulose ester will be improved, refraining a problem as bleed-out at a high temperature and high humidity or an optical haze immediately after formation of the film.

The weight average molecular weight of polymer X in the present invention can be adjusted by the known method for molecular weight adjustment. Such a method for molecular weight adjustment can be exemplified by the method of adding a chain transfer agent such as carbon tetrachloride, laurylmercaptan, and octyl thioglycolate. The polymerization temperature is kept within the range from room temperature through 130 degrees Celsius, preferably from 50 through 100 degrees Celsius. This temperature or polymerization reaction time can be adjusted.

The weight average molecular weight can be measured according to the following method:

(Method of Measuring the Molecular Weight)

The weight average molecular weight Mw is measured by gel permeation chromatography.

The following describes the measurement conditions:

Solvent: methylene chloride

Column: Shodex K806, K805 and K803G (Three pieces manufactured by Showa Denko K.K. were connected for use)

Column temperature: 25 degrees Celsius

Sample concentration: 0.1% by mass

Detector: RI Model 504 (manufactured by GL Science Co., Ltd.)

Pump: L6000 (manufactured by Hitachi Limited)

Flow rate: 1.0 ml/min.

Calibration curve: The calibration curve using 13 samples of the standard polystyrene STK standard polystyrene (manufactured by Toso Co., Ltd.) was employed, wherein Mw=1000000 through 500. These 13 samples were placed at an approximately equally spaced interval.

The polymer Y used in the present invention is a polymer having a weight average molecular weight of 500 or more without exceeding 3000, being produced by polymerization of ethylenic unsaturated monomer Ya without aromatic ring. If the polymer has a weight average molecular weight of 500 or more, it is desirable, because the amount of the remaining monomer will be reduced. If the weight average molecular weight is 3000 or less, it is desirable, because the performance for reducing the level of retardation Rt can be maintained. Ya is preferably an acryl monomer or a methacryl monomer each not having an aromatic ring.

A polymer Y used in the present invention is preferably expressed by the following General Formula (2):

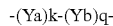   General Formula (2)

More preferably, it is preferably a polymer expressed by the following General Formula (2-1):

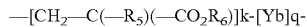

(where $R_5$ in the Formula represents H or $CH_3$, $R_6$ represents an alkyl group or a cycloalkyl each having carbon atomses of 1-12, and Yb represents a monomer unit polymerizable with Ya, and k and q indicate a mole composition ratio. Here, k≠0, and k+q=100)

If a monomer as Yb is a copolymerizable ethylenic unsaturated monomer with Ya, the monomer is not limited. Yb may be plural. k+q=100, q is preferably 0 to 30.

The ethylenic unsaturated monomer Ya constituting the polymer Y obtained by polymerization of the ethylenic unsaturated monomer without containing an aromatic ring is exemplified by:

an acrylic acid ester such as methyl acrylate, ethyl acrylate, propyl acrylate (i-, n-), butyl acrylate (n-, i-, s-, t-), pentyl acrylate (n-, i-, s-), hexyl acrylate (n-, i-), heptyl acrylate (n-, i-), octyl acrylate (n-, i-), nonyl acrylate (n-, i-), myristyl acrylate (n-, i-), cyclohexyl acrylate, (2-ethylhexyl) acrylate, ε-caprolactone) acrylate, (2-hydroxyethyl) acrylate, (2-hydroxypropyl) acrylate, (3-hydroxypropyl) acrylate, (4-hydroxybutyl) acrylate, (2-hydroxybutyl) acrylate;

a methacrylic acid ester such as the one with the aforementioned acrylate replaced by methacrylate; and an unsaturated acid such as acrylic acid, methacrylic acid, maleic anhydride, crotonic acid and itaconic acid.

A monomer as Yb is not specifically limited, if the monomer is an ethylenic unsaturated monomer copolymerizable with Ya. The monomer as Yb is exemplified by:

a vinyl ester such as vinyl acetate, vinyl propionate, vinyl butyrate, vinyl valerate, vinyl pivalate, vinyl caproate, vinyl caprate, vinyl laurate, vinyl myristate, vinyl palmitate, vinyl stearate, vinyl cyclohexane carboxylate, vinyl octoate, vinyl methacrylate, vinyl crotonate, vinyl sorbate, and vinyl cinnamate. Yb may be plural.

When producing such a polymer X and Y, the molecular weight cannot be easily controlled by the conventional polymerization. In this case, it is preferred to use a method capable of ensuring the uniform molecular weight without much increasing the molecular weight. Such a preferred polymerization method is exemplified by: a method of using the peroxide polymerization initiator such as cumene peroxide and t-butyl hydroperoxide; a method of using a greater amount of polymerization initiator than in the conventional way; a method of using a chain transfer agent such as a mercapto compound and carbon tetrachloride in addition to the polymerization initiator; a method of using a polymerization terminator such as benzoquinone and dinitrobenzene in addition to the polymerization initiator; and a method for bulk polymerization based on a compound including one thiol group and secondary hydroxyl group or a polymerization catalyst using this compound and organic metal compound as disclosed in the Japanese Non-Examined Patent Publication 2000-128911 or 2000-344823. These methods are all preferably used. Especially, for the polymer Y, a polymerization method which uses a compound having a thiol group and a hydroxyl group of a 2nd class in a molecule as a chain transfer agent, is desirable. In this case, at a terminal end of the polymer Y, it has a hydroxyl group resulting from a polymerization catalyst and a chain transfer agent and thioether. With this terminal residue group, the compatibility of Y and cellulose ester can be adjusted.

The hydroxyl group value of the polymer X is preferably 30 through 150 [mg KOH/g].

(Method of Measuring the Hydroxyl Group Value)

The hydroxyl group value was measured according to the JIS K 0070(1992). The hydroxyl group value can be defined as the value in terms of mg of the potassium hydroxide required to neutralize the acetic acid bonded with the hydroxyl group, when 1 g of the sample is acetylated. To put it more specifically, the following steps were taken: weighing X g (about 1 g) of sample accurately; putting it into a flask; adding 20 ml of acetylation reagent (pyridine added to 20 ml of acetic anhydride to get 400 ml) accurately thereto; providing the outlet of the flask with an air cooling tube; healing the solution in a glycerine bath having a temperature of 95 through 100 degrees Celsius; cooling the solution after the lapse of one hour and 30 minutes; and adding 1 ml of purified water 1 ml through the air cooling tube so that the acetic anhydride was decomposed into acetic acid. This was followed by the step of titration by a potential difference titration apparatus using a 0.5 mol/L potassium hydroxide ethanol solution. The inflection point of the titration curve having been obtained was defined as a terminal point. Then titration was carried out in an idle test wherein a sample was not put therein. Thus, the inflection point of the titration curve was obtained, and the hydroxyl group value was calculated according to the following Equation.

Hydroxyl group value=$\{(B-C) \times f \times 28.05/X\}+D$ where B denotes the amount (ml) of 0.5 mol/L potassium hydroxide ethanol solution used in the idle test, C indicates the amount (ml) of 0.5 mol/L potassium hydroxide ethanol solution used in the titration, f shows the factor of 0.5 mol/L potassium hydroxide ethanol solution, D represents an acid value, and 28.05 is equivalent to a half of 56.11 as 1 mol potassium hydroxide.

The above-mentioned polymer X and polymer Y each excels in compatibility with a cellulose ester. Also these polymers have neither evaporation nor volatilization, these polymers are excellent in manufacturing efficiency, and their permanence properties as a protection film for polarizing plates are preferable, and their water vapour permeability is small, and thy are excellent in dimensional stability.

The contents of the polymers X and Y in the cellulose ester film preferably meet the following Formulae (i) and (ii): assuming that the content of the polymer X is Xg (% by mass=the mass of the polymer X/the mass of the cellulose ester×100), and that of the polymer Y is Yg (b by mass), $5 \leq Xg+Yg \leq 35$ (% by mass)   Formula (i)

$0.05 \leq Yg/(Xg+Yg) \leq 0.4$   Formula (ii)

where Formula (i) is preferably in the range from 10 through 25% by mass.

When the total amount of the polymers X and Y must be 5% by mass or more; a sufficient reduction in retardation value Rt can be achieved. Further, when the total amount is 35% by mass or less; the adhesiveness of the polarizer PVA will be excellent.

The polymers X and Y as materials constituting the aforementioned doping solution can be directly added and dissolved. Alternatively, they can be put into the doping solution after having been dissolved in the organic solvent for dissolving the cellulosic ester.

It may be preferable to make a cellulose ester film contain compositions represented by formulas (1) to (14).

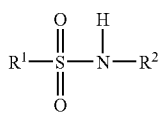

Formula (1)

wherein $R^1$ and $R^2$ each independently represents an alkyl group which may have a substituent or an aryl group which may have a substituents.)

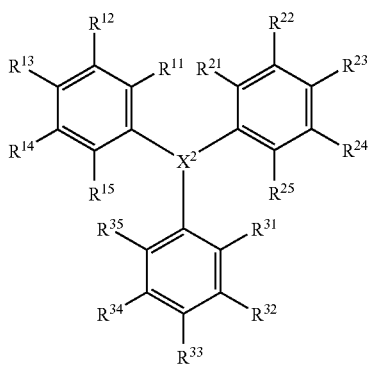

Formula (2)

wherein $X^2$ represents B, C—R (wherein R represents a hydrogen atom or a substituent), or N; and $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$, and $R^{35}$ each represent a hydrogen atom or a substituent, R1-(OH)n   Formula (3)

wherein R1 represents an organic group having a valence of n, and n represents an integer of 2 or more.

$$Y^{31}-L^{31}-Y^{32} \quad \text{Formula (4)}$$

$$Y^{33}-L^{32}-\underset{\underset{Y^{34}}{\overset{\overset{V^{31}}{|}}{\underset{L^{33}}{|}}}}{C}-L^{32}-Y^{32} \quad \text{Formula (5)}$$

$$Y^{36}-L^{35}-\underset{\underset{Y^{37}}{\overset{\overset{Y^{39}}{|}}{\underset{L^{36}}{|}}}}{C}-L^{37}-Y^{38} \quad \text{Formula (6)}$$

$$Y^{40}-L^{39}-\underset{\underset{Y^{41}}{\overset{\overset{V^{32}}{|}}{\underset{L^{40}}{|}}}}{C}-L^{43}-\underset{\underset{Y^{42}}{\overset{\overset{V^{33}}{|}}{\underset{L^{41}}{|}}}}{C}-L^{42}-Y^{43} \quad \text{Formula (7)}$$

$$Y^{45}-L^{44}-\underset{\underset{Y^{46}}{\overset{\overset{Y^{44}}{|}}{\underset{L^{45}}{|}}}}{C}-L^{48}-\underset{\underset{Y^{47}}{\overset{\overset{V^{34}}{|}}{\underset{L^{46}}{|}}}}{C}-L^{47}-Y^{48} \quad \text{Formula (8)}$$

$$Y^{49}-L^{49}-\underset{\underset{Y^{50}}{\overset{\overset{V^{35}}{|}}{\underset{L^{50}}{|}}}}{C}-L^{54}-\underset{\underset{Y^{51}}{\overset{\overset{V^{36}}{|}}{\underset{L^{51}}{|}}}}{C}-L^{55}-\underset{\underset{Y^{52}}{\overset{\overset{V^{37}}{|}}{\underset{L^{52}}{|}}}}{C}-L^{53}-Y^{53} \quad \text{Formula (9)}$$

$$Y^{45}-L^{56}-\underset{\underset{Y^{55}}{\overset{\overset{Y^{59}}{|}}{\underset{L^{57}}{|}}}}{C}-L^{43}-\underset{\underset{Y^{56}}{\overset{\overset{Y^{58}}{|}}{\underset{L^{58}}{|}}}}{C}-L^{59}-Y^{57} \quad \text{Formula (10)}$$

$$Y^{60}-L^{62}-\underset{\underset{Y^{61}}{\overset{\overset{V^{38}}{|}}{\underset{L^{63}}{|}}}}{C}-L^{67}-\underset{\underset{Y^{62}}{\overset{\overset{Y^{65}}{|}}{\underset{L^{68}}{|}}}}{\underset{\overset{L^{71}}{|}}{C}}-L^{70}-\underset{\underset{Y^{63}}{\overset{\overset{V^{39}}{|}}{\underset{L^{69}}{|}}}}{C}-L^{66}-Y^{64} \quad \text{Formula (11)}$$

Formula (12)

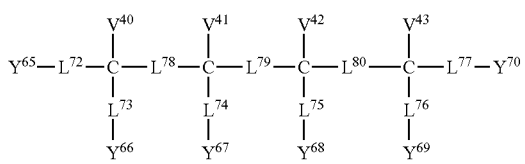

wherein $Y^{31}$-$Y^{70}$ each independently represent an acyloxy group having 1-20 carbon atoms, an alkoxycarbonyl group having 2-20 carbon atoms, an amido group having 1-20 carbon atoms, a carbamoyl group having 1-20 carbon atoms or a hydroxyl group; $V^{31}$-$V^{43}$ each independently represent a hydrogen atom or an aliphatic group having 1-20 carbon atoms; and $L^{31}$-$L^{80}$ each independently represent a single bond or a divalent saturated linking group having 1-40 total atoms and 0-20 carbon atoms; and $V^{31}$-$V^{43}$ and $L^{31}$-$L^{80}$ each may further have a substituent, Formula (13)

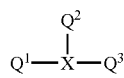

wherein $Q^1$, $Q^2$, and $Q^3$ each independently represent a group having a 5- or 6-membered hydrocarbon ring or a 5- or 6-membered heterocycle, and the ring may be combined with another ring to form a condensed ring.

Formula (14)

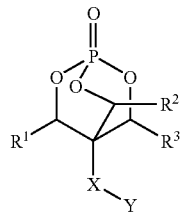

wherein $R^1$, $R^2$, and $R^3$ each independently represents a hydrogen atom or an alkyl group having 1-5 carbon atoms; X represents a single bond, —O—, —CO—, an alkylene group, or an arylene group; and Y represents a hydrogen atom, an alkyl group, an aryl group or an aralkyl group.

In Formula (1), the summation of the number of carbon atoms in $R^1$ and $R^2$ is preferably ten or more.

Examples of a preferable substituent represented by $R^1$ or $R^2$ include: a fluorine atom, an alkyl group, an aryl group, an alkoxy group, a sulfone group, and a sulfonamide group. Of these, specifically preferable are an alkyl group, an aryl group, an alkoxy group, a sulfone group and a sulfonamide group.

The alkyl group may be a normal chain alkyl group, a branched chain alkyl group or a cyclic alkyl group. Preferable are alkyl groups having 1-25 carbon atoms, more preferably having 6-25 carbon atoms and specifically preferably having 6 to 20 carbon atoms, examples of which include: a methyl group, an ethyl group, a propyl group, an isopropyl group, a butyl group, an isobutyl group, a t-butyl group, an amyl group, an isoamyl group, a t-amyl group, a hexyl group, a cyclohexyl group, a heptyl group, an octyl group, a bicyclooctyl group, a nonyl group, an adamantyl group, a decyl group, a t-octyl group, an undecyl group, a dodecyl group, a tridecyl group, a tetradecyl group, a pentadecyl group, a hexadecyl group, a heptadecyl group, an octadecyl group, a nonadecyl group and a didecyl group.

As the aryl group, preferable are those having 6-30 carbon atoms and specifically preferable are those having 6-24 carbon atoms, examples of which include: a phenyl group, a biphenyl group, a terphenyl group, a naphthyl group, a binaphthyl group, a triphenyl group.

Preferable examples of a compound represented by Formula (1) will be shown below, however, the present invention is not limited thereto.

A-1
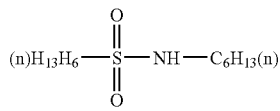

A-2
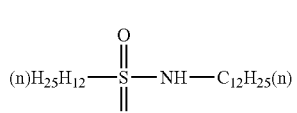

A-3
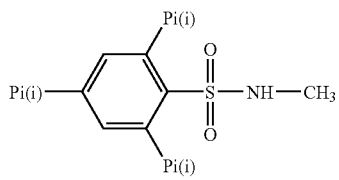

A-4
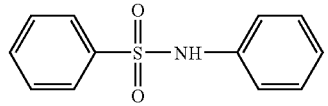

A-5
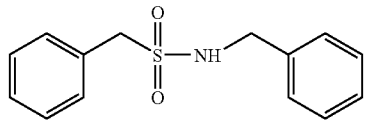

A-6
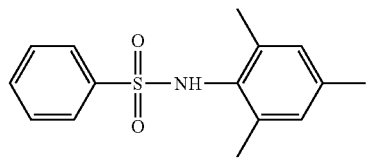

A-7
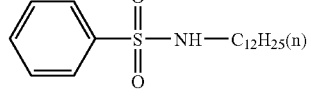

A-8
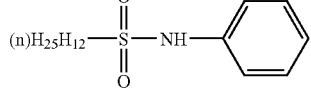

A-9
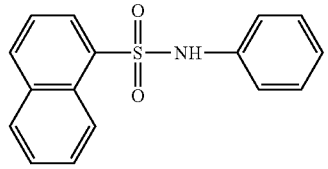

-continued

A-10 A-11 A-12 A-13 A-14 A-15 A-16 A-17 A-18 A-19 A-20 A-21 A-22 A-23 A-24 A-25 A-26 A-27 A-28 A-29

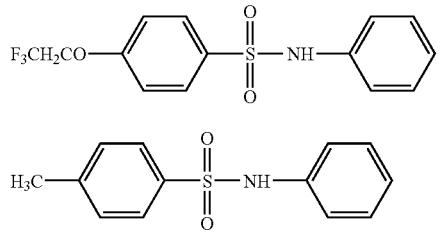

A-30

A-31

Next, the compounds represented by Formula (2) will be described in detail.

X represents B, C—R (R representing a hydrogen atom or a substituent), N, P, or P═O. Preferably, X represents B, C—R (wherein as examples of R, preferable are an aryl group, a substituted or unsubstituted amino group, an alkoxy group, an aryloxy group, an acyl group, an alkoxy carbonyl group, an aryloxycarbonyl group, an acyloxy group, an acylamino group, an alkoxycarbonylamino group, an aryloxycarbonylamino group, a sulfonylamino group, a hydroxy group, a mercapto group, a halogen atom (for example, a fluorine atom, a chlorine atom, a bromine atom and an iodine atom) and a carboxyl group; more preferable are an aryl group, an alkoxy group, an aryloxygroup, a hydroxy group and a halogen atom; further more preferable are an alkoxy group and a hydroxy group; and specifically preferable is a hydroxyl group), N and P═O, and more preferably X represents C—R or N, and specifically preferably X represents C—R.

$R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ each independently represent a hydrogen atom or a substituent. As a substituent, the substituent T which will be described later is applicable. Preferable examples of $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}R^{34}$ and $R^{35}$ include: an alkyl group, an alkenyl group, an alkynyl group, an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a sulfamoyl group, a carbamoyl group, an alkylthio group, an arylthio group, a sulfonyl group, a sulfinyl group, an ureido group, a phosphoric acid amide group, a hydroxy group, a mercapto group, and a halogen atom (for example, a fluorine atom, a chlorine atom, a bromine atom and an iodine atom), a cyano group, a sulfo group, a carboxyl group, a nitro group, a hydroxamic acid group, a sulfino group, a hydrazino group, an imino group, a heterocycle group and a silyl group, more preferably include: an alkyl group, an aryl group, a substituted or unsubstituted amino group, an alkoxy group, and an aryloxy group, and further more preferably include an alkyl group, an aryl group, and an alkoxy group, wherein the heterocycle group preferably has 1 to 30 carbon atoms and more preferably 1 to 12 carbon atoms, examples of the hetero atom include: a nitrogen atom, an oxygen atom, a sulfur atom, and a concrete examples of the hetero group include: an imidazolyl group, a pyridyl group, a quinolyl group, a furyl group, a piperidyl group, a morpholino group, a benzoxazolyl group, a benzimidazolyl group, a benzthiazolyl group.

These substituents may further be substituted. When two or more substituents are contained, those substituents may be the same or different. Moreover, the substituents may be combined to form a ring.

The above mentioned substituent R will now be explained. Examples of the substituent R include: an alkyl group (preferably having 1 to 20 carbon atoms, more preferably having 1 to 12 carbon atoms and still more preferably having 1 to 8 carbon atoms, and examples of an alkyl group include: a methyl group, an ethyl group, an iso-propyl group, a tert-butyl group, an n-octyl group, an n-decyl group, an n-hexadecyl group, a cyclopropyl group, a cyclopentyl group and a cyclohexyl group); an alkenyl group (preferably having 2 to 20 carbon atoms, more preferably having 2 to 12 carbon atoms and specifically preferably having 2 to 8 carbon atoms, and examples of the alkenyl group include: a vinyl group, an allyl group, a 2-butenyl group and 3-pentenyl group); an alkynyl group (preferably having 2 to 20 carbon atoms, more preferably having 2 to 12 carbon atoms and specifically preferably having 2 to 8 carbon atoms, and examples of the alkynyl group include: a propargyl group and a 3-pentynyl group); an aryl group (preferably having 6 to 30 carbon atoms, more preferably having 6 to 20 carbon atoms and specifically preferably having 6 to 12 carbon atoms, and examples of the aryl group include: a phenyl group, a p-methylphenyl group and a naphthyl group); a substituted or unsubstituted amino group (preferably having 0 to 20 carbon atoms, more preferably having 0 to 10 carbon atoms and specifically preferably having 0 to 6 carbon atoms, and examples of the amino group include: an amino group, a methylamino group, a dimethylamino group, a diethylamino group and a dibenzylamino group); an alkoxy group (preferably having 1 to 20 carbon atoms, more preferably having 1 to 12 carbon atoms and specifically preferably having 1 to 8 carbon atoms, and examples of the alkoxy group include: a methoxy group, an ethoxy group and a butoxy group); an aryloxy group (preferably having 1 to 20 carbon atoms, more preferably having 1 to 12 carbon atoms and specifically preferably having 1 to 8 carbon atoms, and examples of the aryloxy group include: a phenyloxy group and a 2-naphthyloxy group); an acyl group (preferably having 1 to 20 carbon atoms, more preferably having 1 to 16 carbon atoms and specifically preferably having 1 to 12 carbon atoms, and examples of the, acyl group include: an acetyl group, a benzoyl group, a formyl group and a pivaloyl group); an alkoxycarbonyl group (preferably having 2 to 20 carbon atoms, more preferably having 2 to 16 carbon atoms and specifically preferably having 2 to 12 carbon atoms, and examples of the alkoxycarbonyl group include: a methoxycarbonyl group and an ethoxycarbonyl group); an aryloxycarbonyl group (preferably having 7 to 20 carbon atoms, more preferably having 7 to 16 carbon atoms and specifically preferably having 7 to 10 carbon atoms, and a phenyloxycarbonyl group is cited as an example of the alkoxycarbonyl group); an acyloxy group (preferably having 2 to 20 carbon atoms, more preferably having 2 to 16 carbon atoms and specifically preferably having 2 to 10 carbon atoms, and examples of the acyloxy group include: an acetoxy group and a benzoyloxy group); an acylamino group (preferably having 2 to 20 carbon atoms, more preferably having 2 to 16 carbon atoms and specifically preferably having 2 to 10 carbon atoms, and examples of the acylamino group include: an acetylamino group and a benzoylamino group); an alkoxycarbonylamino group (preferably having 2 to 20 carbon atoms, more preferably having 2 to 16 carbon atoms and specifically preferably having 2 to 12 carbon atoms, and examples of the alkoxycarbonylamino group include: a methoxycarbonylamino group); an aryloxycarbonylamino group (preferably having 7 to 20 carbon atoms, more preferably having 7 to 16 carbon atoms and specifically preferably having 1 to 12 carbon atoms, and examples of the aryloxycarbonylamino group include: a phenyloxycarbonylamino group); a sulfonylamino group (preferably having 1 to 20 carbon atoms, more preferably having 1 to 16 carbon atoms and specifically preferably having 1 to 2 carbon atoms, and examples of the sulfonylamino group include: a methanesulfonylamino group and a benzensulfonylamino group); a sulfamoyl group (preferably having 0 to 20 carbon atoms, more preferably having 0 to 16 carbon atoms and specifically preferably having 0 to 12 carbon atoms, and examples of the sulfamoyl group include: a sulfamoyl group, a methylsulfamoyl group, a dimethylsulfamoyl group and a phenylsulfamoyl group); a carbamoyl group (preferably having 1 to 20 carbon atoms, more preferably having 1 to 16 carbon atoms and specifically preferably having 1 to 12 carbon atoms, and examples of the carbamoyl group include: a carbamoyl group, a methylcarbamoyl group, a diethylcarbamoyl group and a phenylcarbamoyl group); an alkylthio group (preferably having 1 to 20 carbon atoms, more preferably having 1 to 16 carbon atoms and specifically preferably having 1 to 12 carbon atoms, and examples of the alkoxy group include: a methylthio group and an ethylthio group); an arylthio group (preferably having 6 to 20 carbon atoms, more preferably having 6 to 16 carbon atoms and specifically preferably having 6 to 12 carbon atoms, and examples of the arylthio group include: a phenylthio group); a sulfonyl group (preferably having 1 to 20 carbon atoms, more preferably having 1 to 16 carbon atoms and specifically preferably having 1 to 12 carbon atoms, and examples of the sulfonyl group include: a mesyl group and a tosyl group); a sulfinyl group (preferably having 1 to 20 carbon atoms, more preferably having 1 to 16 carbon atoms and specifically preferably having 1 to 12 carbon atoms, and examples of the sulfinyl group include: a methanesulfinyl group and a benzenesulfinyl group); an ureido group (preferably having 1 to 20 carbon atoms, more preferably having 1 to 16 carbon atoms and specifically preferably having 1 to 12 carbon atoms, and examples of the ureido group include: an ureido group, a methylureido group and a phenylureido group); a phosphoric acid amide group (preferably having 1 to 20 carbon atoms, more preferably having 1 to 16 carbon atoms and specifically preferably having 1 to 12 carbon atoms, and examples of the phosphoric acid amide group include: a diethyl phosphoric acid amide group and a phenyl phosphoric acid amide group);

a hydroxy group; a sulfhydryl group; a halogen atom (for example, a fluorine atom and a chlorine atom, a bromine atom and an iodine atom); a cyano group; a sulfo group; a carboxyl group; a nitro group; a hydroxamic acid group; a sulfino group; a hydrazino group; an imino group; a heterocycle group (preferably having 1 to 30 carbon atoms and more preferably having 1 to 12 carbon atoms, and examples of a hetero atom include: a nitrogen atom, an oxygen atom and a sulfur atom, and concrete examples include: an imidazolyl group, a pyridyl group, a quinolyl group, a furyl group, a piperidyl group, a morpholino group, a benzoxazolyl group, a benzimidazolyl group and a benzthiazolyl group); and a silyl group (preferably having 3 to 40 carbon atoms, more preferably having 3 to 30 carbon atoms and specifically preferably having 3 to 24 carbon atoms, and examples of the silyl group include: a trimethylsilyl group and a triphenylsilyl group). These substituents may further be substituted, and, when two or more substituents are included, they may be the same or different. Further, the substituents may be combined to form a ring.

The present invention will now explained in detail, below, using specific examples of a compound represented by Formula (2), however, the present invention is not limited thereto.

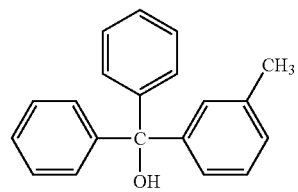
C-1

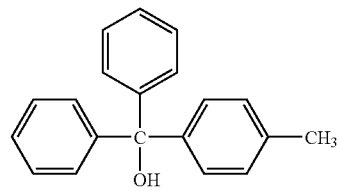
C-2

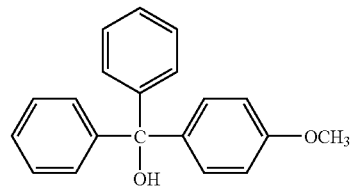
C-3

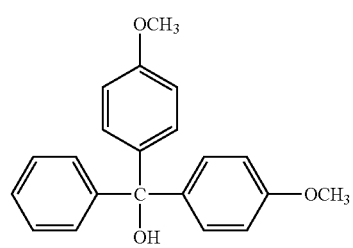
C-4

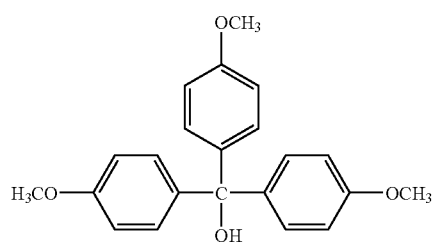
C-5

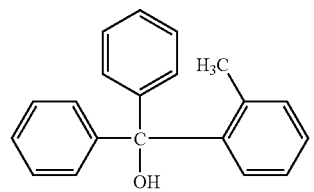
C-6

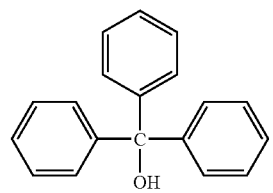
C-7

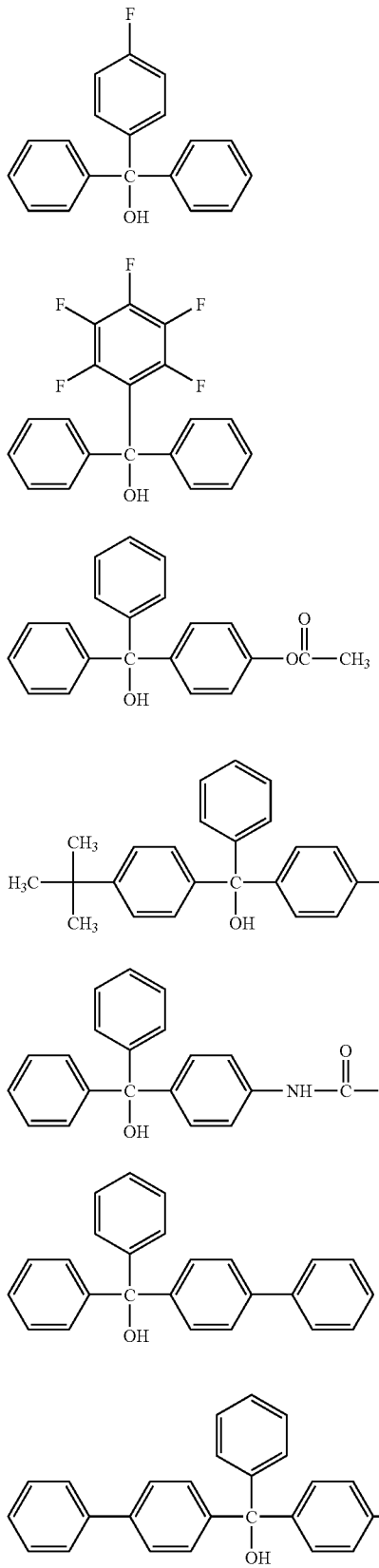
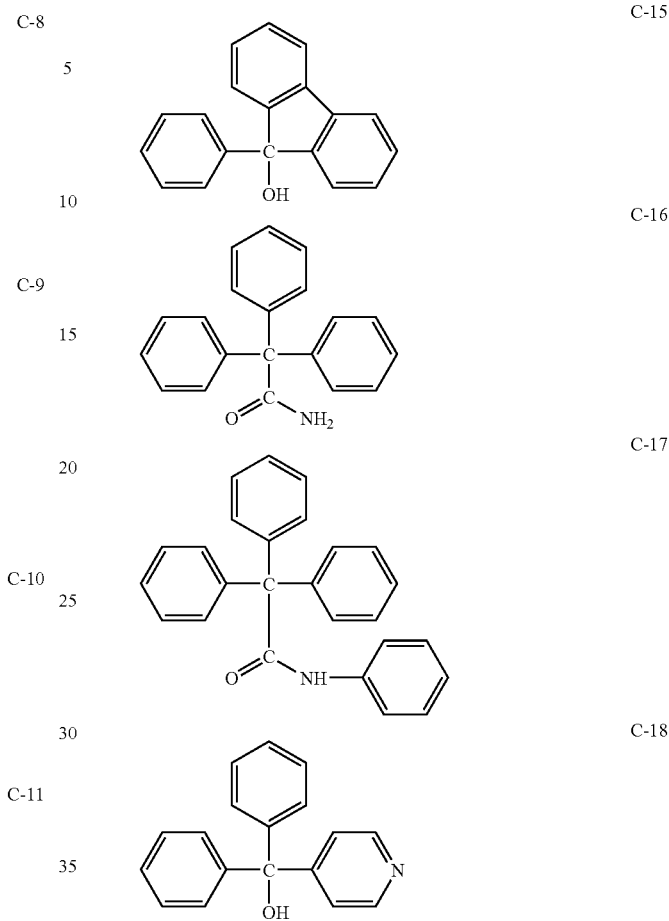

A polyalcohol ester is prepared by esterification of an aliphatic polyalcohol of dihydric or more and a monocarboxylic acid. Preferable is an aliphatic monocarboxylic acid ester.

The polyalcohol employed in the present invention is represented by the above mentioned Formula (3).

In addition to the concrete compositions shown in the formula (3), a trimethylolpropanetriacetate and a pentaerythritoltetraacetate are used preferably. The compound represented by one of Formulas (1)-(3) is preferably used in an amount of 0.01-30 weight parts or more preferably 0.5-25 weight parts in 100 weight parts of cellulose ester. The compound may be added in a dope after dissolved in an organic solvent such as an alcohol, methylene chloride or dioxolane, may be directly added in a dope.

The compounds represented by Formulas (4)-(12) will now be explained.

In Formulas (4)-(12), $Y^{31}$-$Y^{70}$ each independently represent an acyloxy group having 1-20 carbon atoms, an alkoxycarbonyl group having 2-20 carbon atoms, an amide group having 1-20 carbon atoms, a carbamoyl group having 1-20 carbon atoms or a hydroxy group. $V^{31}$-$V^{43}$, each independently represent a hydrogen atom or an aliphatic group having 1-20 carbon atoms. $L^{31}$-$L^{80}$ each independently represent a single bond or a saturated linking group having total atom number of 0-40 and having 0-20 carbon atoms. $V^{31}$-$V^{43}$, and $L^{31}$-$L^{80}$ may further have a substituent.

An acyloxy group preferably has 1-16 carbon atoms and more preferably 2-12 carbon atoms. Examples of an acyloxy group include: acetoxy, propionyloxy, butyryloxy, vleryloxy, isovaleryloxy, 2,2-dimethylpropionyloxy, 2-methylbutyryloxy, hexanoiloxy, 2,2-dimethylbutyryloxy, heptanoiloxy, cyclohexyl carbonyloxy, 2-ethylhexanoiloxy, octanoyloxy, decanoyloxy, dodecanoiloxy, phenylacetoxy and 1-naphthoyloxy 2-naphthoyloxy and 1-adamantanecarbonyloxy.

An alkoxycarbonyl group preferably has 2-16 carbon atoms and more preferably has 2-12 carbon atoms. Examples of an alkoxycarbonyl group include: methoxycarbonyl, ethoxycarbonyl, propyloxycarbonyl, isopropyloxycarbonyl, butoxycarbonyl, t-butoxycarbonyl, isobutyloxycarbonyl, sec-butyloxycarbonyl, pentyloxycarbonyl, t-amyl oxycarbonyl, hexyloxycarbonyl, cyclohexyloxycarbonyl, 2-ethylhexyloxycarbonyl, 1-ethylpropyloxycarbonyl, octyloxycarbonyl, 3,7-dimethyl-3-octyloxycarbonyl, 3,5,5-trimethylhexyloxycarbonyl, 4-t-butylcyclohexyloxycarbonyl, 2,4-dimethylpentyl-3-oxycarbonyl, 1-adamantaneoxycarbonyl, 2-adamantaneoxycarbonyl, dicyclopentadienyloxycarbonyl, decyloxycarbonyl, dodecyloxycarbonyl, tetradecyloxycarbonyl and hexadecyloxycarbonyl.

An amide group preferably has 1-16 carbon atoms and more preferably has 1-12 carbon atoms. Examples of an amide group include: acetoamido, propioneamido, butylamido, isobutylamido, pentanamido, 2,2-dimethylpropioneamido, 3-methylbutylamido, 3-methylbutylamido, capronamido, 2,2-dimethylbutylamido, heptaneamido, cyclohexylcarboxamido, 2-ethylcapronamido, 2-ethylbutaneamido, caprylamido, nonaneamido, 1-adamantanecarboxamido, 2-adamantanecarboxamido, decaneamido, tridecaneamido, hexadecaneamido, and heptadecaneamido.

A carbamoyl group preferably has 2-16 carbon atoms and more preferably has 2-12 carbon atoms. Examples of a carbamoyl group include methylcarbamoyl, dimethylcarbamoyl, ethylcarbamoyl, diethylcarbamoyl, propylcarbamoyl, isopropylcarbamoyl, butylcarbamoyl, t-butylcarbamoyl, isobutylcarbamoyl, sec-butylcarbamoyl, pentylcarbamoyl, t-amylcarbamoyl, hexylcarbamoyl, cyclohexylcarbamoyl, 2-ethylhexylcarbamoyl, 2-ethylbutylcarbamoyl, t-octylcarbamoyl, heptylcarbamoyl, octylcarbamoyl, 1-adamantylcarbamoyl, 2-adamantylcarbamoyl, decylcarbamoyl, dodecylcarbamoyl, tetradecylcarbamoyl and hexadecylcarbamoyl.

Examples of the substituent of $Y^{31}$-$Y^{70}$ include: a halogen atom (a fluorine atom, a chlorine atom, a bromine atom and an iodine atom), a normal chain, branched chain or cycle alkyl group (including a bicycle alkyl group or an activated methine group), an alkenyl group, an alkynyl group, an aryl group, a heterocycle group, an acyl group, an alkoxycarbonyl group, an aryloxycarbonyl group, a heterocycle-oxycarbonyl group, a carbamoyl group, an N-acylcarbamoyl group, an N-sulfonylcarbamoyl group, an N-carbamoylcarbamoyl group, an N-sulfamoylcarbamoyl group, a carbazoyl group, a carboxy group or its salt, an oxalyl group, an oxamoil group, a cyano group a carbonimideyl group (a carbonimidoyl group), a formyl group, a hydroxyl group, an alkoxy group (including a group in which an ethyleneoxy group or a propyleneoxy group unit is repeated), an aryloxy group, a heterocycleoxy group, an acyloxy group, an alkoxycarbonyloxy group, an aryloxycarbonyloxy group, a carbamoyloxy group, a sulfonyloxy group, an amino group, an alkylamino group, an arylamino group, a heterocycle-amino group, an amide group, a sulfonamide group, an ureido group, a thioureido group, an imide group, an alkoxycarbonylamino group, an aryloxycarbonylamino group, a sulfamoylamino group, a semicarbazide group, an ammonio group, the oxamoylamino group, an N-alkylsulfonylureido group, an N-arylsulfonylureido group, an N-acylureido group, an N-acylsulfamoylamino group, a heterocycle group containing a quarternarized nitrogen atom (for example, a pyrizinio group, imidazolio group, quinolinio group and iso-quinolinio group), an isocyano group, an imino group, an alkylsulfonyl group, an arylsulfonyl group, an alkylsulfinyl group, an arylsulfinyl group, a sulfo group and its salt, a sulfamoyl group, an N-acylsulfamoyl group, an N-sulfonylsulfamoyl group and its salt, a phosphino group, a phosphinyl group, a phosphinyloxy group, a phosphinylamino group, a silyl group and a phosphate group.

$Y^{31}$-$Y^{70}$ may form a substituent formed by combining the above-mentioned substituent. Examples of a combined substituent include: an ethoxyethoxyethyl group, a hydroxyethoxyethyl group and an ethoxycarbonylethyl group.

The aliphatic group represented by $V^{31}$-$V^{43}$ preferably has 1-16 carbon atoms and more preferably has 1-12 carbon atoms. Still more preferable is a linear, branched or cycle-alkyl group, alkenyl group or alkynyl group.

Example of an alkyl group include: methyl, ethyl, propyl, isopropyl, butyl, isobutyl, sec-butyl t-butyl, pentyl, t-amyl, hexyl, octyl, decyl, dodecyl, eicosyl, 2-ethylhexyl, cyclopentyl, cyclohexyl, cycloheptyl, 2,6-dimethyl cyclohexyl, 4-t-butylcyclohexyl, cyclopentyl, 1-adamantyl, 2-adamantyl, and bicyclo[2.2.2]octane-3-yl.

Examples of an alkenyl group include: vinyl, allyl, prenyl, geranyl, oleyl, 2-cyclopentene-1-yl and 2-cyclohexene-1-yl.

Examples of an alkynyl group include: ethynyl and propargyl.

The examples of the substituent represented by of $V^{31}$-$V^{43}$ are common to the examples of the substituent represented by $Y^{31}$-$Y^{70}$.

Examples of the linking group represented by $L^{31}$-$L^{80}$ include: an alkylene group (for example, methylene, ethylene, propylene, trimethylene, tetramethylene, pentamethylene, hexamethylene, methylethylene and ethylethylene), a divalent cyclic group (for example, cis-1,4-cyclohexylene, trans-1,4-cyclohexylene and 1,3-cyclopentylidene), an ether group, a thioether group, an ester group, an amide group, a sulfone group, a sulfoxide group, a sulfide group, a sulfonamide group, an ureylene group and a thioureylene group.

Two or more linking groups may be combined to form a divalent complex linking group may be formed. Examples of such a complex linking group include: —(CH$_2$)$_2$—O—(CH$_2$)$_2$—, —(CH$_2$)$_2$—O—(CH$_2$)$_2$—O—(CH$_2$)—, —(CH$_2$)$_2$—S—(CH$_2$)$_2$— and —(CH$_2$)$_2$—O—CO—(CH$_2$)$_2$—.

$L^{31}$ to $L^{80}$ may further have a substituent, and examples of such a substituent include those cited as the substituents which may substitute $R^{11}$-$R^{13}$.

Examples of a compound represented by Formula (4)-(12) include: a citrate ester (for example, O-acetyl triethyl citrate, and O-acetyl tributyl citrate, acetyl triethyl citrate, acetyl tributyl citrate, O-acetyl tri(ethyloxycarbonylmethylene) citrate); an oleate ester (for example, ethyl oleate, butyl oleate, 2-ethylhexyl oleate, phenyl oleate, cyclohexyl oleate, octyl oleate); a ricinoleate ester (for example, methylacetyl ricinoleate); a sebacate ester (for example, dibutyl sebacate); a carboxylate ester of grycerin (for example, triacetin and tributyrin); a glycolate (for example, butylphthalylbutyl glycolate, ethylphthalylethyl glycolate, methylphthalylethyl glycolate, butylphthalylbutyl glycolate, methylphthalylmethyl glycolate, propylphthalylpropyl glycolate, butylphthalylbutyl glycolate and octylphthalyloctyl glycolate); a pentaerythritol carboxylate ester (for example, pentaerythritol tetraacetate and pentaerythritol tetrabutyrate); a dipentaerythritol carboxylate ester (for example, dipentaerythritol hexaacetate, dipentaerythritol hexabutyrate and dipentaerythritol tetraacetate); a carboxylate ester of trimethylolpropane (for example, trimethylolpropane triacetate, trimethylolpropane diacetate monopropionate, trimethylolpropane tripropionate, trimethylolpropane tributyrate, trimethylolpropane tripyvaloate, a trimethylolpropane tri(t-butyl acetate), trimethylolpropane di-2-ethylhexanate, trimethylolpropane tetra-2-ethylhexanate, trimethylolpropane diacetate monooctanate and trimethylolpropane tri(cyclohexanecarboxylate)); a pyprolidone carboxylate ester (for example, 2-pyrrolidone-5-carboxylic acid methyl ester, 2-pyrrolidone-5-carboxylic acid ethyl ester, 2-pyrrolidone-5-carboxylic acid butyl ester and 2-pyrrolidone-5-carboxylic acid 2-ethylhexyl ester); a cyclohexane dicarboxylic acid ester (an example, cis-1,2-cyclohexane dicarboxylic acid dibutyl ester, trans-1,2-cyclohexane dicarboxylic acid dibutyl ester, cis-1,4-cyclohexane dicarboxylic acid dibutyl ester and trans-1,4-cyclohexane dicarboxylic acid dibutyl ester); and a xylitol carboxylate ester (for example, xylitol pentaacetate, xylitol tetraacetate and xylitol pentapropionate) are included.

Glycerol ester has been disclosed in JP-A No. 11-246704 official gazette. Diglycerol ester has been disclosed in JP-A No. 2000-63560. Citrate has been disclosed in JP-A No. 11-92574.

In Formula (13), $Q^1$, $Q^2$, and $Q^3$ each independently represent a group having a 5-membered ring or a 6-membered ring. The ring include a hydrocarbon ring or a hetero ring, and may form a condensed ring together with another ring.

The hydrocarbon ring includes, preferably, a substituted or unsubstituted cyclohexane ring, a substituted or unsubstituted cyclopentane ring and an aromatic hydrocarbon ring, but more preferably an aromatic hydrocarbon ring.

A single ring or dicyclic aromatic hydrocarbon having 6-30 carbon atoms is preferable (for example, benzene ring or naphthalene ring). The number of carbon atoms is more preferably 6-20. Of these, benzene ring is the most preferable.

The heterocycle preferably contains an oxygen atom, a nitrogen atom, or a sulfur atom as a hetero atom. The heterocycle preferably has aromaticity.

Examples of a heterocycle include: furan, pyrrole, thiophene, imidazole, pyrazole, pyridine, pyrazine, pyridazine, triazole, triazine, indole, indazole, purine, thiazoline, thiazole, a thiadiazole, oxazoline, oxazole, oxydiazole, quinoline, isoquinoline, phthalazine, naphthylisine, quinoxaline, quinazoline, cinnoline, pteridine, acridine, phenanthroline, phenazine, tetrazole, benzimidazole benzoxazole, benzthiazole, benzotriazole, and tetrazaindene.

Of these, preferable are pyridine, triazine, and quinoline.

$Q^1$, $Q^2$ and $Q^3$ may have a substituent.

Example of a substituent include: an alkyl group, an alkenyl group, an alkynyl group, an aryl group, an amino group, a substituted amino group, an alkoxy group, an aryloxy group, an acyl group, an alkoxycarbonyl group, an aryloxycarbonyl group, an acyloxy group, an amido group, an alkoxycarbonylamino group, an aryloxycarbonylamino group, a sulfonamido group, a sulfamoyl group, a substituted sulfamoyl group, a carbamoyl group, a substitution carbamoyl group, an alkylthio group, an arylthio group, a sulfonyl group, a sulfinyl group, an ureido group, a phosphoric acid amido group, a hydroxyl group, a mercapto group, a halogen atom (a fluorine atom, a chlorine atom, a bromine atom and an iodine atom), a cyano group, a sulfo group, a carboxyl group, a nitro group, a hydroxamic acid group, a sulfino group, a hydrazino group, an imino group, a heterocycle group and a silyl group. These substituents may further have a substituent and a plurality of substituents may be the same or different. Further, the substituents may be combined to form a ring.

As for the number of carbon atoms of an alkyl group, preferable is 1-20, more preferably 1-12 and still more preferably 1-8. Examples of an alkyl group include: methyl, ethyl, isopropyl, tert-butyl octyl, decyl, hexadecyl, cycle propyl, cyclopentyl and cyclohexyl.

The alkenyl group preferably has 2-20 carbon atoms, more preferably 2-12 carbon atoms and most preferably 2-8 carbon atoms. Examples of an alkenyl group include: vinyl, allyl, 2-butenyl and 3-pentenyl.

The alkynyl group preferably has 2-20 carbon atoms, more preferably 2-12 carbon atoms and most preferably 2-8 carbon atoms. Examples of an alkynyl group include: propargyl and 3-pentynyl.

The aryl group preferably has 6-30 carbon atoms, more preferably 6-20 carbon atoms and most preferably 6-12 carbon atoms. Examples of an aryl group include: phenyl, p-methylphenyl and naphthyl.

The amino group preferably has 1-20 carbon atoms, more preferably 1-10 carbon atoms and most preferably 1-6 carbon atoms. Examples of an amino group include: methylamino, dimethylamino, diethylamino and dibenzylamino. The alkoxy group preferably has 1-20 carbon atoms, more preferably 1-12 carbon atoms and most preferably 1-8 carbon atoms. Examples of an alkoxy group include: methoxy, ethoxy and butoxy.

The aryloxy group preferably has 6-20 carbon atoms, more preferably 6-16 carbon atoms and most preferably 6-12 carbon atoms. Examples of an aryloxy group include: phenyloxy and 2-naphthyloxy.

The acyl group preferably has 1-20 carbon atoms, more preferably 1-16 carbon atoms and most preferably 1-12 carbon atoms. Examples of an acyl group include: acetyl, benzoyl, formyl and pivaloyl.

The alkoxycarbonyl group preferably has 2-20 carbon atoms, more preferably 2-16 carbon atoms and most preferably 2-12 carbon atoms. Examples of an alkoxycarbonyl group include: methoxycarbonyl and ethoxycarbonyl.

The aryloxycarbonyl group preferably has 7-20 carbon atoms, more preferably 7-16 carbon atoms and most preferably 7-10 carbon atoms. Examples of an aryloxycarbonyl group include: phenyloxycarbonyl.

The acyloxy group preferably has 2-20 carbon atoms, more preferably 2-16 carbon atoms and most preferably 2-10 carbon atoms. Examples of an acyloxy group include: acetoxy and benzoyloxy.

The amido group preferably has 2-20 carbon atoms, more preferably 2-16 carbon atoms and most preferably 2-10 carbon atoms. Examples of an amido group include: acetoamido and benzamido.

The alkoxycarbonylamino group preferably has 2-20 carbon atoms, more preferably 2-16 carbon atoms and most preferably 2-12 carbon atoms. Examples of an alkoxycarbonylamino group include: methoxycarbonylamino. The aryloxycarbonylamino group preferably has 7-20 carbon atoms, more preferably 7-16 carbon atoms and most preferably 7-12 carbon atoms. Examples of an aryloxycarbonylamino group include: phenyloxycarbonylamino. The sulfonamide group preferably has 1-20 carbon atoms, more preferably 1-16 carbon atoms and most preferably 1-12 carbon atoms. Examples of a sulfonamide group include: methanesulfonamide and benzenesulfonamide. The substituted sulfamoyl group preferably has 1-20 carbon atoms, more preferably 1-16 carbon atoms and most preferably 1-12 carbon atoms. Examples of a substituted sulfamoyl group include: methylsulfamoyl, dimethylsulfamoyl and phenylsulfamoyl.

The substituted carbamoyl group preferably has 2-20 carbon atoms, more preferably 2-16 carbon atoms and most preferably 2-12 carbon atoms. Examples of a substituted carbamoy group include: carbamoyl, methylcarbamoyl, diethylcarbamoyl and phenylcarbamoyl.

The alkylthio group preferably has 1-20 carbon atoms, more preferably 1-16 carbon atoms and most preferably 1-12 carbon atoms. Examples of an alkylthio group include: methylthio and ethylthio.

The arylthio group preferably has 6-20 carbon atoms, more preferably 6-16 carbon atoms and most preferably 6-12 carbon atoms. Examples of an arylthio group include: phenylthio.

The sulfonyl group preferably has 1-20 carbon atoms, more preferably 1-16 carbon atoms and most preferably 1-12 carbon atoms. Examples of a sulfonyl group include: mesyl and tosyl.

The sulfinyl group preferably has 1-20 carbon atoms, more preferably 1-16 carbon atoms and most preferably 1-12 carbon atoms. Examples of a sulfinyl group include: methanesulfinyl and benzenesulfinyl.

The ureido group preferably has 1-20 carbon atoms, more preferably 1-16 carbon atoms and most preferably 1-12 carbon atoms. Examples of an ureido group include: ureido, methylureido and phenylureido.

The phosphoric acid amido group preferably has 1-20 carbon atoms, more preferably 1-16 carbon atoms and most preferably 1-12 carbon atoms. Examples of a phosphoric acid amido group include: diethyl phosphoric acid amido and phenyl phosphoric acid amido.

The heterocycle group preferably has 1-30 carbon atoms and more preferably 1-12 carbon atoms. Examples of a hetero atom include: a nitrogen atom, an oxygen atom and a sulfur atom. Examples of a heterocycle group include: imidazolyl, pyridyl, quinolyl, furyl, piperidyl, morpholino, benzoxazolyl, benzimidazolyl and benzthiazolyl.

The silyl group preferably has 3-40 carbon atoms, more preferably 3-30 carbon atoms and most preferably 3-24 carbon atoms. Examples of a silyl group include: trimethylsilyl and triphenylsilyl.

The compounds represented by Formula (13) will now be described.

In Formula (13), X represents a tervalent group selected from B, C—R (R represents a hydrogen atom or a substituent), N, P, and P=O. As for X, B, C—R, and N are preferable, more preferable are C—R and N, and most preferable is C—R.

Example of the substituent, R include: an aryl group, an amino group, a substituted amino group, an alkoxy group, an aryloxygroup, an acyl group, an alkoxycarbonyl group, an aryloxycarbonyl group, an acyloxy group, an acylamino group, an alkoxycarbonylamino group, an aryloxycarbonylamino group, a sulfonylamino group, a hydroxyl group, a mercapto group, a halogen atom (for example, a fluorine atom, a chlorine atom, a bromine atom and an iodine atom) and a carboxyl group. Of these, preferable are an aryl group, an alkoxy group, an aryloxy group, a hydroxyl group and a halogen atom, more preferable are an alkoxy group and a hydroxyl group, and most preferable is a hydroxyl group.

The compound represented by Formula (13) is preferably a compound represented by Formula (a).

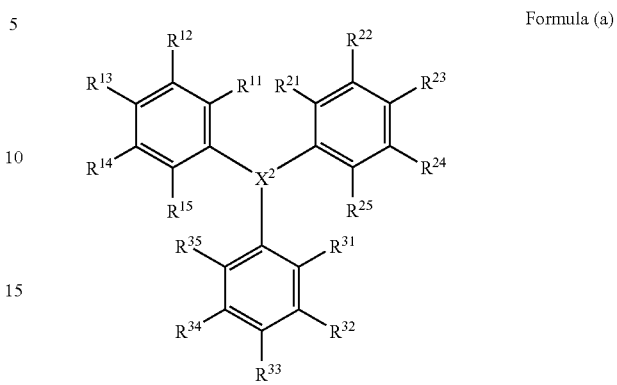

Formula (a)

In Formula (a), $X^2$ represents a tervalent group selected from B, C—R (R represents a hydrogen atom or a substituent), N. The detail of $X^2$ is common to that of X in Formula (13).

In Formula (a), $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$, and $R^{35}$ each represent a hydrogen atom or a substituent.

The detail of the substituent is common to that of the substituent, $Q^1$, $Q^2$ and $Q^3$ in Formula (13).

Preferable examples of $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$, and $R^{35}$ include: an alkyl group, an alkenyl group, an alkynyl group, an aryl group, an amino group, a substituted amino group, an alkoxy group, an aryloxy group, an acyl group, an alkoxycarbonyl group, an aryloxycarbonyl group, an acyloxy group, an amido group, an alkoxycarbonylamino group, an aryloxycarbonylamino group, a sulfonamide group, a sulfamoyl group, a substituted sulfamoyl group, a carbamoyl group, a substituted carbamoyl group, an alkylthio group, an arylthio group, a sulfonyl group, a sulfinyl group, an ureido group, a phosphoric acid amido group, a hydroxyl group, a mercapto group and a halogen atom (a fluorine atom, a chlorine atom a bromine atom and an iodine atom), a cyano group, a sulfo group, a carboxyl group, a nitro group, a hydroxamic acid group, a sulfino group, a hydrazino group, an imino group, a heterocycle group and a silyl group. More preferable are an alkyl group, an aryl group, an amino group, a substituted amino group, an alkoxy group and an aryloxygroup, and most preferable are an alkyl group, an aryl group and an alkoxy group.

These substituents may further have a substituent, and a plurality of substituents may be the same or different. Further, the substituents may be combined to form a ring.

In Formula (14), preferably, $R^1$, $R^2$, and $R^3$ each independently represent a hydrogen atom or an alkyl group having 1-5 carbon atoms. Specifically preferably, at least one of $R^1$, $R^2$, and $R^3$ is an alkyl group having 1-3 carbon atoms (for example, methyl, ethyl, propyl, isopropyl, butyl amyl and isoamyl). X preferably represents at least one divalent linking group selected from a single bond, —O—, —CO—, an alkylene group (preferably having 1 to 6 carbon atoms, and more preferably having 1-3 carbon atoms, for example, methylene, ethylene and propylene), an arylene group (preferably having 6 to 24 carbon atoms, and more preferably having 6-12 carbon atoms, for example, phenylene, biphenylene and naphthylene). More preferably, X represents at least one divalent linking group selected from —O—, an alkylene group and an arylene group. Y is preferably a hydrogen atom; an alkyl group (preferably having 2 to 25 carbon atoms, and more preferably having 2-20 carbon atoms, for example, ethyl, isopropyl, t-butyl, hexyl, 2-ethylhexyl, t-octyl, dodecyl, cyclohexyl, dicyclohexyl and adamantyl); an aryl group (preferably having 6 to 24 carbon atoms, and more preferably having 6-18 carbon atoms, for example, phenyl, biphenyl, terphenyl and naphthyl); or an aralkyl group (preferably having 7 to 30 carbon atoms, and more preferably having 7-20 carbon atoms, for example, benzyl, cresyl, t-butylphenyl, diphenylmethyl and triphenylmethyl). Specifically preferably, Y is an alkyl group, an aryl group or an aralkyl group. As a combination of —X—Y, —X—Y preferably has a total carbon number of 0-40, more preferably 1-30, and most preferably 1-25.

Preferable examples of a compound represented by Formula (14) will be shown below, however, the present invention is not limited thereto.

PL-1
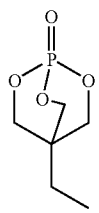

PL-2
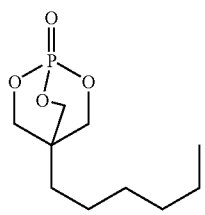

PL-3
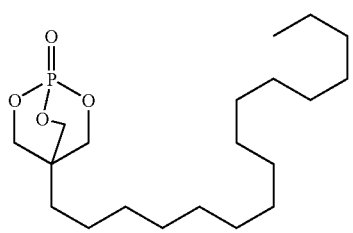

PL-4
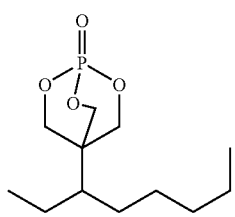

PL-5
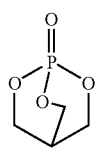

-continued

PL-6
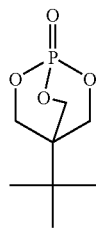

PL-7
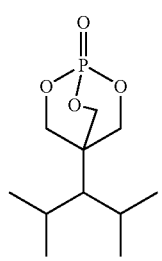

PL-8
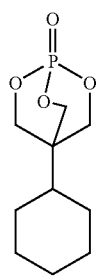

PL-9
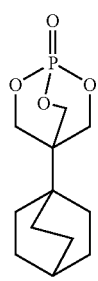

PL-10
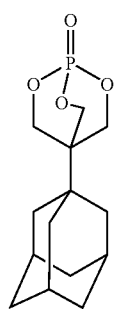

-continued
PL-11
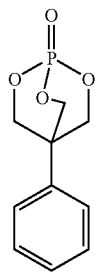
PL-12
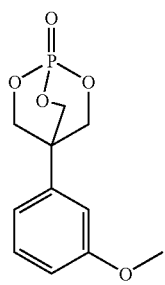
PL-13
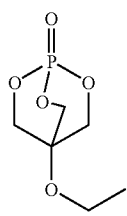
PL-14
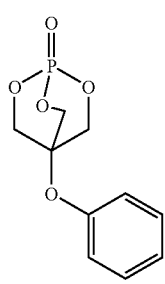
PL-15
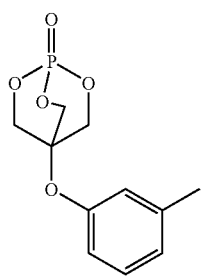
PL-16
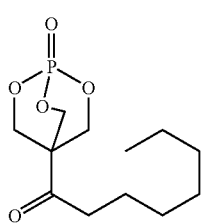
-continued
PL-17
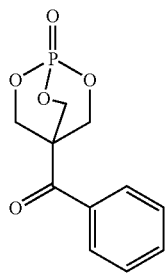
PL-18
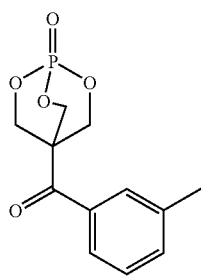
PL-19
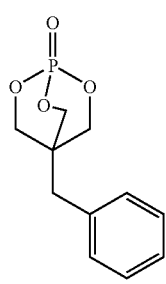
PL-20
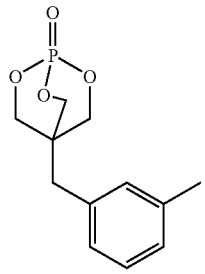
PL-21
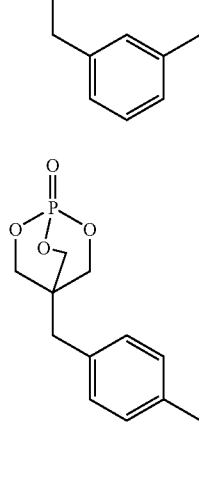

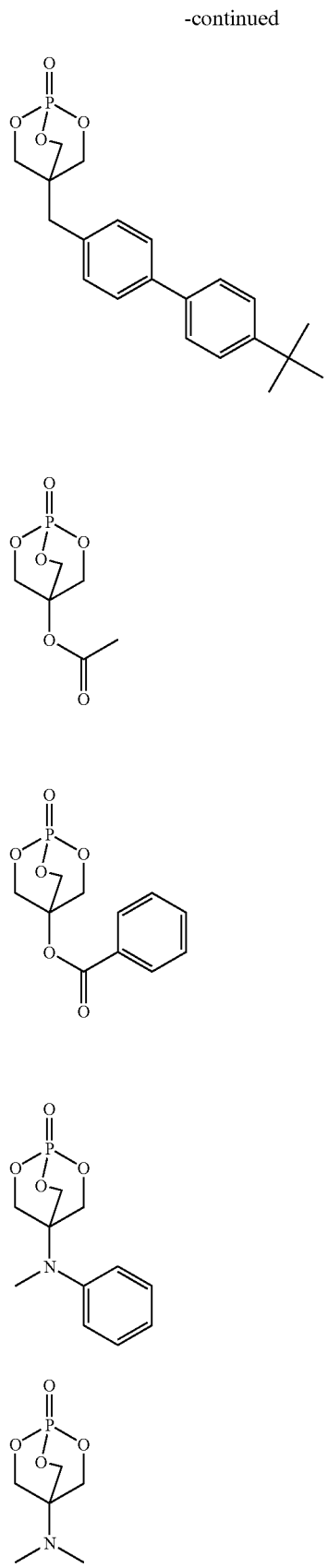

PL-32
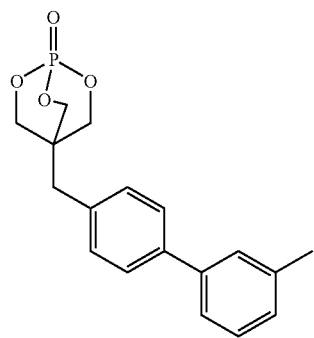
PL-33
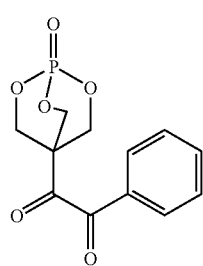
PL-34
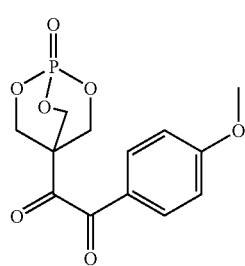
PL-35
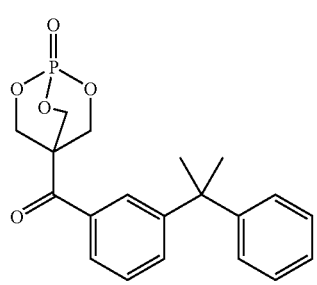
PL-36
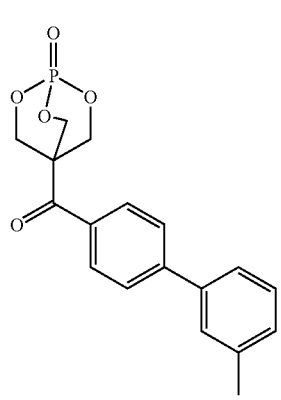
PL-37
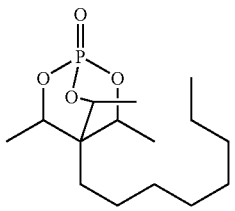
PL-38
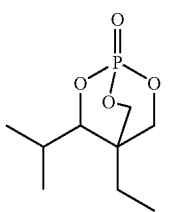
PL-49
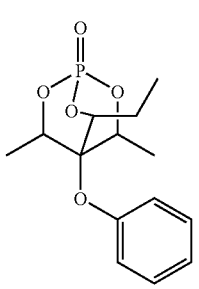
PL-40
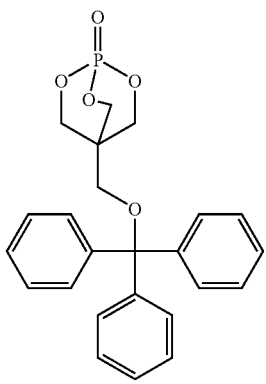
PL-41
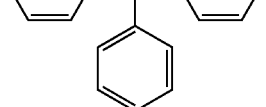
In addition, it is preferable to add the compound represented by the formula (17) to the cellulose ester of the present invention.
Formula (17)
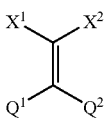

(in the formula, $Q^1$ and $Q^2$ each independently represent an aromatic ring, $X^1$ and $X^2$ represent a hydrogen atom or a substituent, provided that at least one of $X^1$ and $X^2$ represents a cyano group, a carbonyl group, a sulfonyl group or an aromatic heterocycle.) The aromatic ring represented by $X^1$ or $X^2$ may be an aromatic hydrocarbon ring or an aromatic heterocycle. These rings may be a single ring or may be combined with another ring to form a condensed ring.

The aromatic hydrocarbon ring is preferably monocyclic or bicyclic and preferably having 6-30 carbon atoms (for example, a benzene ring, a naphthalene ring). More preferably, the aromatic hydrocarbon ring has 6 to 20 carbon atoms, and still more preferably 6-12 carbon atoms. Specifically preferably the aromatic hydrocarbon is benzene.

The aromatic heterocycle preferably contains a nitrogen atom or a sulfur atom. Examples of the heterocycle include: thiophene, imidazole, pyrazole, pyridine, pyrazine, pyridazine, triazole, triazine, indole, indazole, purine, thiazoline, thiazole, a thiadiazole, oxazoline, oxazole, oxydiazole, quinoline, isoquinoline, phthalazine, naphthylizine, quinoxaline, a quinazoline, cinnoline, pteridine, acridine, phenanthroline, phenazine, tetrazole, benzimidazole, benzoxazole, benzthiazole, benzotriazole, tetrazaindene. Preferable aromatic heterocycle includes pyridine, triazine and quinoline.

The aromatic ring represented by $Q^1$ or $Q^2$ is preferably an aromatic hydrocarbon ring and more preferably a benzene ring.

$Q^1$ and $Q^2$ may further have a substituent, and the substituent is preferably substituent T which will be described below. Examples of substituent T include: an alkyl group (preferably having 1 to 20 carbon atoms, more preferably having 1 to 12 carbon atoms and still more preferably having 1 to 8 carbon atoms, and examples of an alkyl group include: a methyl group, an ethyl group, an iso-propyl group, a tert-butyl group, an n-octyl group, an n-decyl group, an n-hexadecyl group, a cyclopropyl group, a cyclopentyl group and a cyclohexyl group); an alkenyl group (preferably having 2 to 20 carbon atoms, more preferably having 2 to 12 carbon atoms and specifically preferably having 2 to 8 carbon atoms, and examples of the alkenyl group include: a vinyl group, an allyl group, a 2-butenyl group and 3-pentenyl group); an alkynyl group (preferably having 2 to 20 carbon atoms, more preferably having 2 to 12 carbon atoms and specifically preferably having 2 to 8 carbon atoms, and examples of the alkynyl group include: a propargyl group and a 3-pentynyl group); an aryl group (preferably having 6 to 30 carbon atoms, more preferably having 6 to 20 carbon atoms and specifically preferably having 6 to 12 carbon atoms, and examples of the aryl group include: a phenyl group, a p-methylphenyl group and a naphthyl group); a substituted or unsubstituted amino group (preferably having 0 to 20 carbon atoms, more preferably having 0 to 10 carbon atoms and specifically preferably having 0 to 6 carbon atoms, and examples of the amino group include: an amino group, a methylamino group, a dimethylamino group, a diethylamino group and a dibenzylamino group); an alkoxy group (preferably having 1 to 20 carbon atoms, more preferably having 1 to 12 carbon atoms and specifically preferably having 1 to 8 carbon atoms, and examples of the alkoxy group include: a methoxy group, an ethoxy group and a butoxy group); an aryloxy group (preferably having 1 to 20 carbon atoms, more preferably having 1 to 12 carbon atoms and specifically preferably having 1 to 8 carbon atoms, and examples of the aryloxy group include: a phenyloxy group and a 2-naphthyloxy group); an acyl group (preferably having 1 to 20 carbon atoms, more preferably having 1 to 16 carbon atoms and specifically preferably having 1 to 12 carbon atoms, and examples of the, acyl group include: an acetyl group, a benzoyl group, a formyl group and a pivaloyl group); an alkoxycarbonyl group (preferably having 2 to 20 carbon atoms, more preferably having 2 to 16 carbon atoms and specifically preferably having 2 to 12 carbon atoms, and examples of the alkoxycarbonyl group include: a methoxycarbonyl group and an ethoxycarbonyl group); an aryloxycarbonyl group (preferably having 7 to 20 carbon atoms, more preferably having 7 to 16 carbon atoms and specifically preferably having 7 to 10 carbon atoms, and a phenyloxycarbonyl group is cited as an example of the alkoxycarbonyl group); an acyloxy group (preferably having 2 to 20 carbon atoms, more preferably having 2 to 16 carbon atoms and specifically preferably having 2 to 10 carbon atoms, and examples of the acyloxy group include: an acetoxy group and a benzoyloxy group); an acylamino group (preferably having 2 to 20 carbon atoms, more preferably having 2 to 16 carbon atoms and specifically preferably having 2 to 10 carbon atoms, and examples of the acylamino group include: an acetylamino group and a benzoylamino group); an alkoxycarbonylamino group (preferably having 2 to 20 carbon atoms, more preferably having 2 to 16 carbon atoms and specifically preferably having 2 to 12 carbon atoms, and examples of the alkoxycarbonylamino group include: a methoxycarbonylamino group); an aryloxycarbonylamino group (preferably having 7 to 20 carbon atoms, more preferably having 7 to 16 carbon atoms and specifically preferably having 1 to 12 carbon atoms, and examples of the aryloxycarbonylamino group include: a phenyloxycarbonylamino group); a sulfonylamino group (preferably having 1 to 20 carbon atoms, more preferably having 1 to 16 carbon atoms and specifically preferably having 1 to 2 carbon atoms, and examples of the sulfonylamino group include: a methanesulfonylamino group and a benzensulfonylamino group); a sulfamoyl group (preferably having 0 to 20 carbon atoms, more preferably having 0 to 16 carbon atoms and specifically preferably having 0 to 12 carbon atoms, and examples of the sulfamoyl group include: a sulfamoyl group, a methylsulfamoyl group, a dimethylsulfamoyl group and a phenylsulfamoyl group); a carbamoyl group (preferably having 1 to 20 carbon atoms, more preferably having 1 to 16 carbon atoms and specifically preferably having 1 to 12 carbon atoms, and examples of the carbamoyl group include: a carbamoyl group, a methylcarbamoyl group, a diethylcarbamoyl group and a phenylcarbamoyl group); an alkylthio group (preferably having 1 to 20 carbon atoms, more preferably having 1 to 16 carbon atoms and specifically preferably having 1 to 12 carbon atoms, and examples of the alkoxy group include: a methylthio group and an ethylthio group); an arylthio group (preferably having 6 to 20 carbon atoms, more preferably having 6 to 16 carbon atoms and specifically preferably having 6 to 12 carbon atoms, and examples of the arylthio group include: a phenylthio group); a sulfonyl group (preferably having 1 to 20 carbon atoms, more preferably having 1 to 16 carbon atoms and specifically preferably having 1 to 12 carbon atoms, and examples of the sulfonyl group include: a mesyl group and a tosyl group); a sulfinyl group (preferably having 1 to 20 carbon atoms, more preferably having 1 to 16 carbon atoms and specifically preferably having 1 to 12 carbon atoms, and examples of the sulfinyl group include: a methanesulfinyl group and a benzenesulfinyl group); an ureido group (preferably having 1 to 20 carbon atoms, more preferably having 1 to 16 carbon atoms and specifically preferably having 1 to 12 carbon atoms, and examples of the ureido group include: an ureido group, a methylureido group and a phenylureido group); a phosphoric acid amide group (preferably having 1 to 20 carbon atoms, more preferably having 1 to 16 carbon atoms and specifically preferably having 1 to 12 carbon atoms, and examples of the phosphoric acid amide group include: a diethyl phosphoric acid amide group and a phenyl phosphoric acid amide group);

a hydroxy group; a sulfhydryl group; a halogen atom (for example, a fluorine atom and a chlorine atom, a bromine atom and an iodine atom); a cyano group; a sulfo group; a carboxyl group; a nitro group; a hydroxamic acid group; a sulfino group; a hydrazino group; an imino group; a heterocycle group (preferably having 1 to 30 carbon atoms and more preferably having 1 to 12 carbon atoms, and examples of a hetero atom include: a nitrogen atom, an oxygen atom and a sulfur atom, and concrete examples include: an imidazolyl group, a pyridyl group, a quinolyl group, a furyl group, a piperidyl group, a morpholino group, a benzoxazolyl group, a benzimidazolyl group and a benzthiazolyl group); and a silyl group (preferably having 3 to 40 carbon atoms, more preferably having 3 to 30 carbon atoms and specifically preferably having 3 to 24 carbon atoms, and examples of the silyl group include: a trimethylsilyl group and a triphenylsilyl group). These substituents may further be substituted, and, when two or more substituents are included, they may be the same or different. Further, the substituents may be combined to form a ring.

$X^1$ and $X^2$ each represent a hydrogen atom or a substituent, and at least one of them represents a cyano group, a carbonyl group, a sulfonyl group or an aromatic heterocycle group. Examples of $X^1$ and $X^2$ include the above-mentioned substituent T. The substituents $X^1$ and $X^2$ may further be substituted with other substituent, and, if possible, may be combined to form a condensed ring.

As $X^1$ and $X^2$, preferable are: a hydrogen atom, an alkyl group, an aryl group, a cyano group, a nitro group, a carbonyl group, a sulfonyl group and an aromatic heterocycle group; more preferable are: a cyano group, a carbonyl group, a sulfonyl group and an aromatic heterocycle group; still more preferable are: a cyano group and a carbonyl group; and specifically preferable are: a cyano group and an alkoxycarbonyl group (—C(=O)OR (R represents an alkyl group having 1-20 carbon atoms, an aryl group having 6-12 carbon atoms or combination thereof)).

Preferable as Formula (17) includes a compound represented by Formula (18).

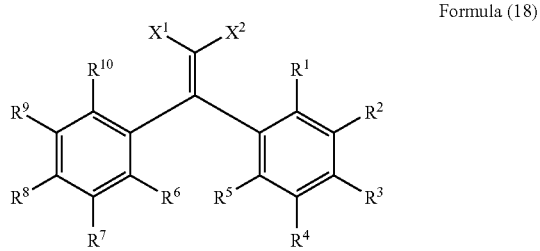

Formula (18)

(in the formula, $R^1$, $R^2$, $R^3$, $R^4$, $R^5$, $R^6$, $R^7$, $R^8$, $R^9$ and $R^{10}$ each independently represent a hydrogen atom or a substituent, $X^1$ and $X^2$ are common to $X^1$ and $X^2$ in Formula (17) and the preferable range is also common) independently among a formula, respectively.)

$R^1$, $R^2$, $R^3$, $R^4$, $R^5$, $R^6$, $R^7$, $R^8$, $R^9$ and $R^{10}$ each independently represent a hydrogen atom or a substituent and examples thereof include the above-mentioned substituent T. These substituents may further be substituted with other substituent. These substituents may be fused each other to form a ring.

As $R^1$, $R^2$, $R^4$, $R^5$, $R^6$, $R^7$, $R^9$ and $R^{10}$, preferable are: a hydrogen atom, an alkyl group, an alkenyl group, an alkynyl group, an aryl group, a substituted or unsubstituted amino group, an alkoxy group, an aryloxy group, a hydroxy group and a halogen atom; more preferable are: a hydrogen atom, an alkyl group, an aryl group, an alkyloxy group, an aryloxy group and a halogen atom; still more preferable are: a hydrogen atom and an alkyl group having 1-12 carbon atoms; specifically preferable are: a hydrogen atom and a methyl group; and most preferable is a hydrogen atom.

As $R^3$ and $R^8$, preferable are: a hydrogen atom, an alkyl group, an alkenyl group, an alkynyl group, an aryl group, a substituted or unsubstituted amino group, an alkoxy group, an aryloxy group, a hydroxy group and a halogen atom; more preferable are: a hydrogen atom, an alkyl group having 1-20 carbon atoms, an amino group having 0-20 carbon atoms, an alkoxy group having 1-12 carbon atoms, an aryloxy group having 6-12 carbon atoms and a halogen atom; still more preferable are: a hydrogen atom and an alkyl group having 1-12 carbon atoms and an alkoxy group having 1-12 carbon atoms; and specifically preferable is a hydrogen atom.

Preferable as Formula (17) includes a compound represented by Formula (19).

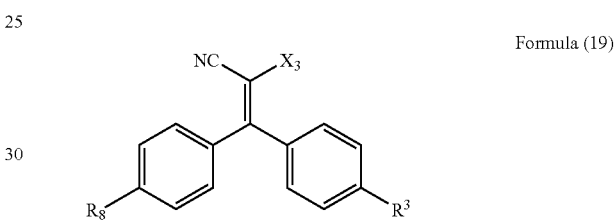

Formula (19)

(in the formula, $R^3$ and $R^8$ are common to $R^3$ and $R^8$ in Formula (17) and the preferable range is also common, and $X^3$ represents a hydrogen atom or a substituent)

$X^3$ represents a hydrogen atom or a substituent and examples thereof include the above-mentioned substituent T. As $X^3$, preferable are: a hydrogen atom, an alkyl group, an aryl group, a cyano group, a nitro group, a carbonyl group, a sulfonyl group and an aromatic heterocycle group; more preferable are: a cyano group, a carbonyl group, a sulfonyl group and an aromatic heterocycle group; still more preferable are: a cyano group and a carbonyl group; and specifically preferable are: a cyano group and an alkoxycarbonyl group (—C(=O)OR (R represents an alkyl group having 1-20 carbon atoms, an aryl group having 6-12 carbon atoms or combination thereof)).

Preferable as Formula (17) includes a compound represented by Formula (20).

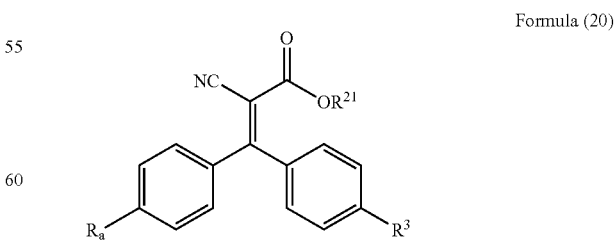

Formula (20)

(in the formula, $R^3$ and $R^8$ are common to $R^3$ and $R^8$ in Formula (18) and the preferable range is also common, and $R^{21}$ represents an alkyl group having 1 to 20 carbon atoms)

When both $R^3$ and $R^8$ each are a hydrogen atom, preferable as $R^{21}$ is an alkyl group having 2 to 12 carbon atoms, more preferable is an alkyl group having 4 to 12 carbon atoms, still more preferable is an alkyl group having 6 to 12 carbon atoms, specifically preferable is an n-octyl group, a tert-octyl group, a 2-ethylhexyl group, an n-decyl group or an n-dodecyl group, and most preferable is a 2-ethylhexyl group.

When $R^3$ and $R^8$ each are a group other than a hydrogen atom, preferable as $R^{21}$ is an alkyl group having a molecular weight of not less than 300 and having not more than 20 carbon atoms.

A compound represented by Formula (17) can be prepared according to the method described in Journal of American Chemical Society, Vol. 63, p 3452 (1941).

Examples of a compound represented by Formula (17) will be shown below, however, the present invention is not limited thereto.

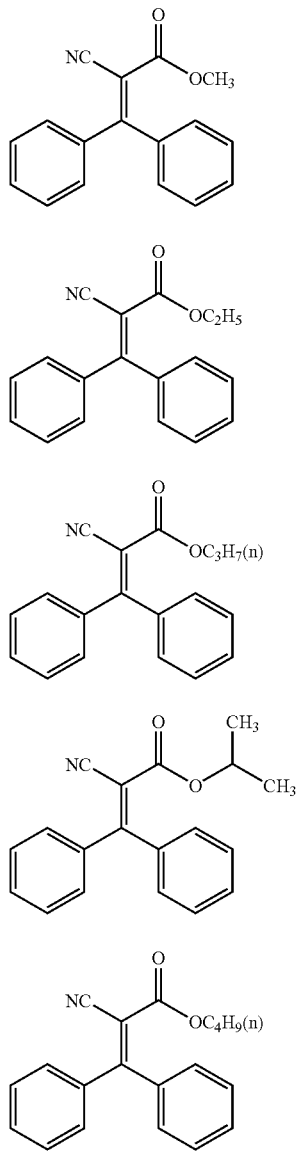

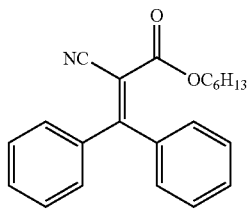

UV-206

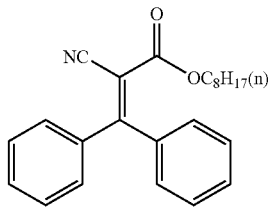

UV-207

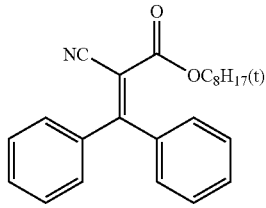

UV-208

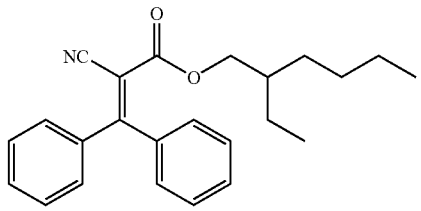

UV-209

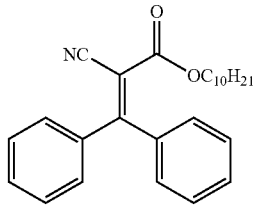

UV-210

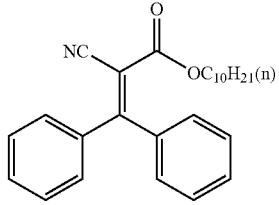

UV-211

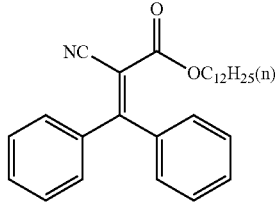

UV-212

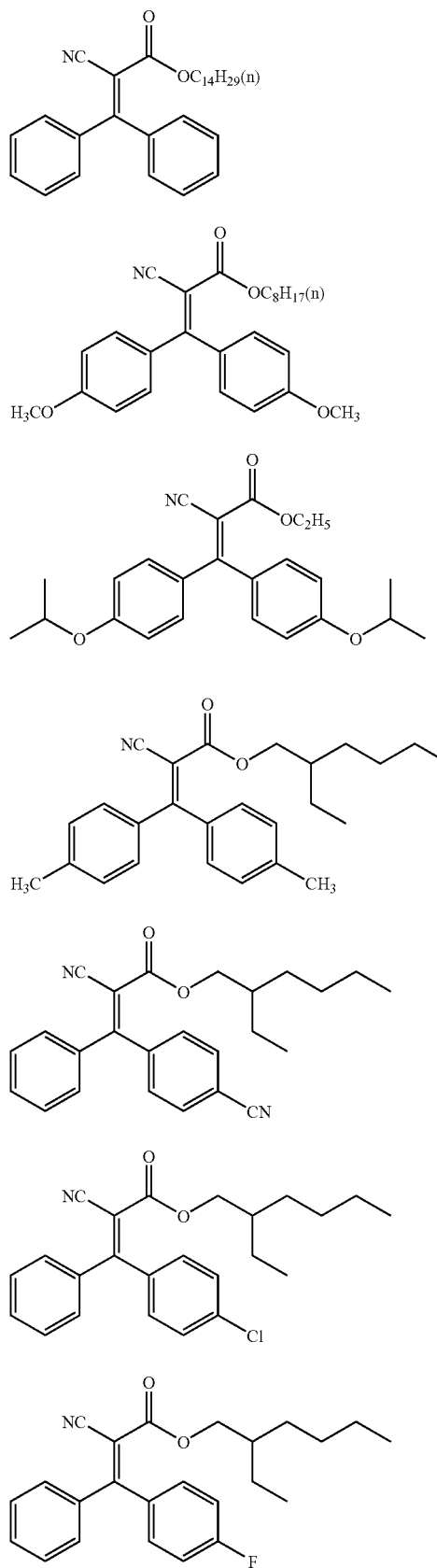
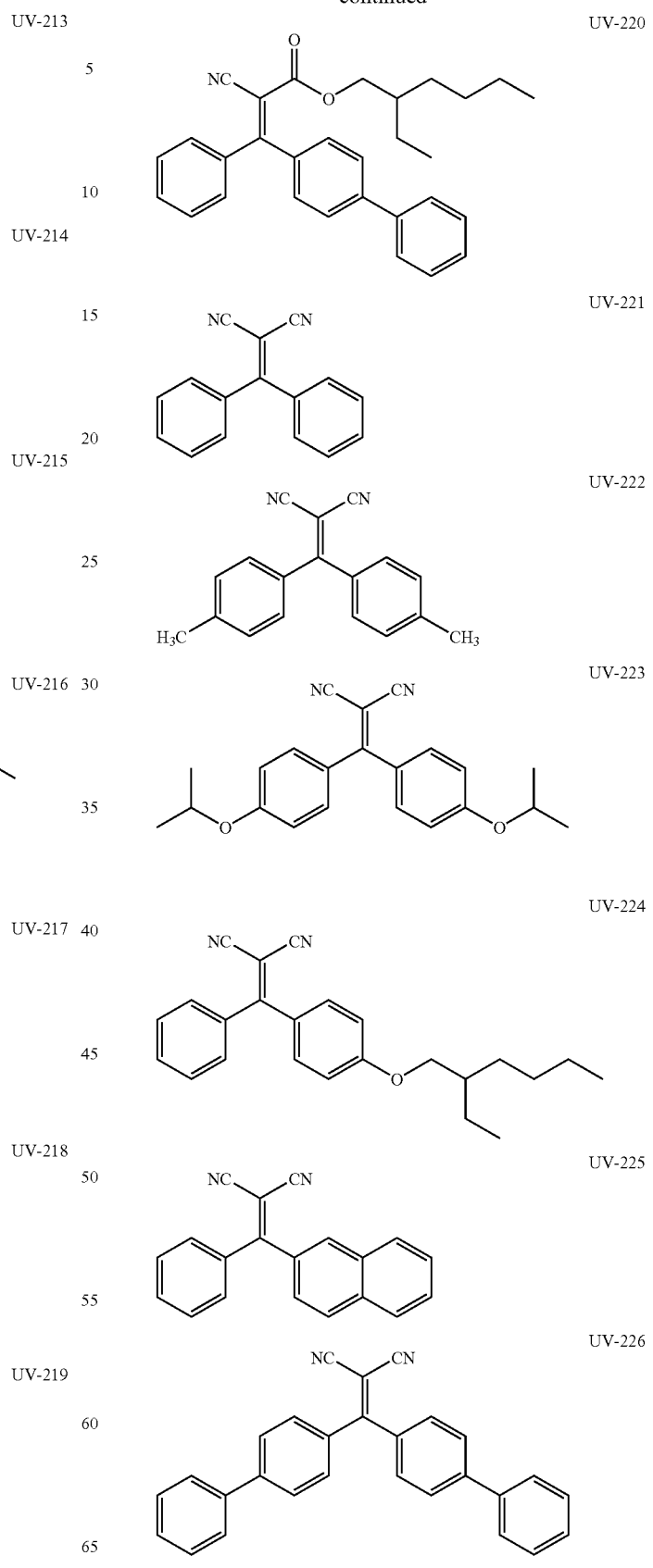

-continued

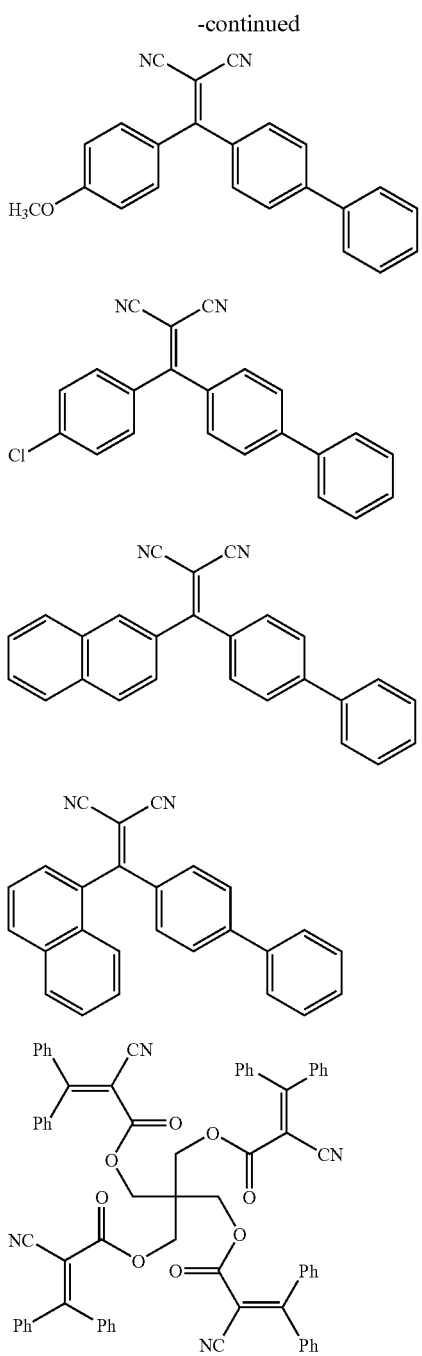

UV-227
UV-228
UV-229
UV-230
UV-231

These compounds can be incorporated with the content of 0.1-15 wt % in the cellulose ester film of the present invention.

<UV Absorbing Agent>

The cellulose ester film of the present invention includes a UV absorbing agent in order to increase a durability of the film by absorbing UV rays having a wavelength less than 400 nm. The transmittance at a wavelength of 370 nm is preferably not more than 10 percent and is more preferably not more than 5 percent and still more preferably not more than 2 percent.

For example, oxybenzophenone type compounds, benzotriazol type compounds, saricylate ester type compounds, benzophenone type compounds, cyanoacrylate type compounds, triazine type compounds, nickel complex salt type compounds and inorganic particles are included, however, the present invention is not limited thereto.

For example: 5-chloro-2-(3,5-di-sec-butyl-2-hyroxylphenyl)-2H-benzotriazole, (2-2H-benzotriazole-2-ile)-6-(straight chain and side chain dodecyl)-4-methylphenyl, 2-hydroxy-4-benziloxybenzophenone, and 2,4-benziloxybenzophenone; and TINUVIN 109, TINUVIN 171, TINUVIN 234, TINUVIN 326, TINUVIN 327 and TINUVIN 328 which are manufactured by Chiba Specialty Chemicals Co. Further, examples of the UV absorbing agents preferably used in the present invention include a benzotriazole UV absorbing agent, a benzophenone UV absorbing agent and a triazine UV absorbing agent, of these, a benzotriazole UV absorbing agent, a triazine UV absorbing agent is specifically preferable.

For example, as a benzotriazole UV absorbing agent, the compound represented by the following Formula (A) is applicable.

Formula (A)

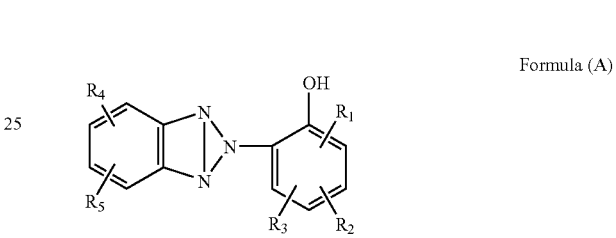

wherein $R_1$, $R_2$, $R_3$, $R_4$, and $R_5$ may be the same or may be different, and each represent a hydrogen atom, a halogen atom, a nitro group, a hydroxyl group, an alkyl group, an alkenyl group, an aryl group, an alkoxy group, an acyloxy group, an aryloxy group, an alkylthio group, an arylthio group, a mono or di alkylamino group, an acylamino group, or a heterocyclic group of 5-6 member; and R4 and R5 may be combined to form a 5-6 membered ring.

Each of the above mentioned groups may have an arbitrary substituent. Examples of a benzotriazole UV absorbing agent used for the present invention is given to below, however, the present invention is not limited thereto.

UV-1: 2-(2'-hydroxy-5'-methylphenyl)benzotriazole

UV-2: 2-(2'-hydroxy-3',5'-di-tert-butylphenyl) benzotriazole

UV-3: 2-(2'-hydroxy-3'-tert-butyl-5'-methylphenyl) benzotriazole

UV-4: 2-(2'-hydroxy-3',5'-di-tert-butylphenyl)-5-chloro benzotriazole

UV-5: 2-(2'-hydroxy-3'-(3",4",5",6"-tetrahydro phthalimidomethyl)-5'-methylphenyl)benzotriazole UV-6: 2,2-methylenebis(4-(1,1,3,3-tetramethylbutyl)-6-(2H-benzotriazole-2-yl)phenol)

UV-7: 2-(2'-hydroxy-3'-tert-butyl-5'-methylphenyl)-5-chlorobenzotriazole

UV-8: 2-(2H-benzotriazole-2-yl)-6-(n- and iso-dodecyl)-4-methylphenol (TINUVIN 171, product of Ciba Specialty Chemicals Inc.)

UV-9: Mixture of octyl-3-[3-tert-butyl-4-hydroxy-5-(chloro-2H-benzotriazole-2-yl) phenyl]propionate and 2-ethylhexyl-3-[3-tert-butyl-4-hydroxy-5-(5-chloro-2H-benzotriazole-2-yl) phenyl]propionate (TINUVIN 109)

Furthermore, the UV absorber preferably used for the present invention is a benzophenone type UV absorber or a triazine type UV absorber, and preferably is a triazine type UV absorber. It is desirable that a UV absorber does not contain a halogen atom in a molecule. As a benzotriazole UV absorbing agent, the compound represented by the following Formula (B) is preferably used.

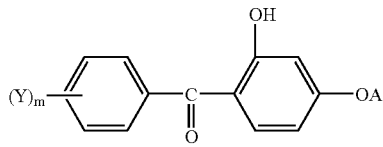

Formula (B)

wherein Y represents a hydrogen atom, a halogen atom, an alkyl group, an alkenyl group, an alkoxyl group, or a phenyl group, of these, the alkyl group, the alkenyl group, and the phenyl group may have a substituent; A represents a hydrogen atom, an alkyl group, an alkenyl group, a phenyl group, a cycloalkyl group, an alkylcarbonyl group, an alkylsulfonyl group, or —CO(NH)n-1-D group, wherein D represents an alkyl group, an alkenyl group or a phenyl group which may have a substituent; and m and n each represent 1 or 2.

In the above description, the alkyl group represents, for example, a normal or branched aliphatic group having not more than 24 carbon atoms, the alkoxyl group represents, for example, an alkoxyl group having not more than 18 carbon atoms, and the alkenyl group represents, for example, an alkenyl group having not more than 16 carbon atoms, such as an allyl group or a 2-butenyl group. Examples of a substituent to the alkyl group, the alkenyl group, and the phenyl group include, for example: a halogen atom such as a chlorine atom, a bromine atom and a fluorine atom, a hydroxyl group and a phenyl group (the phenyl group may further have an alkyl group or a halogen atom as a substituent).

Specific examples of a benzophenone related compound represented by Formula (B) are shown below, however, the present invention is not limited thereto.

UV-10: 2,4-dihydroxy benzophenone
UV-11: 2,2'-dihydroxy-4-methoxybenzophenone
UV-12: 2-hydroxy-4-methoxy-5-sulfobenzophenone
UV-13: Bis(2-methoxy-4-hydroxy-5-benzoylphenyl methane)

In addition, a disk-shaped compound mentioned later may be used preferably as a ultraviolet absorber.

As a UV absorber for an optical film relating to the present invention, a compound having a 1,3,5-triazine ring can be preferably employed.

Among compounds having the 1,3,5-triazine ring, compounds represented by the following Formula (C) are preferable.

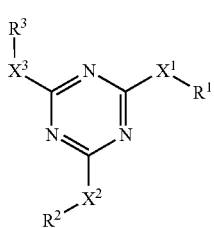

Formula (C)

In Formula (C), $X^1$ is a single bond, an —$NR_4$— group, an —O— atom or an —S— atom; $X^2$ is a single bond, an —$NR_5$— group, an —O— atom or an —S— atom; $X^3$ is a single bond, an —$NR_6$— group, an —O— atom or an —S— atom; $R^1$, $R^2$ and $R^3$ are each an alkyl group, an alkenyl group, an aryl group or a heterocyclic group; and $R_4$, $R_5$ and $R_6$ are each a hydrogen atom, an alkyl group, an alkenyl group, an aryl group or a heterocyclic group. The compound represented by Formula (C) is particularly preferably a melamine compound.

In the melamine compound of Formula (C), it is preferable that the $X^1$, $X^2$ and $X^3$ are each the —$NR_4$—, —$NR_5$— and —$HR_6$—, respectively, or the $X^1$, $X^2$ and $X^3$ are each a single bond and the $R^1$, $R^2$ and $R^3$ are each a heterocyclic group having a free valency at the nitrogen atom thereof. The —$X^1$—$R^1$, —$X^2$—$R^2$ and —$X^3$—$R^3$ are preferably the same substituting group. The $R^1$, $R^2$ and $R^3$ are particularly preferably an aryl group. The $R_4$, $R_5$ and $R_6$ are each particularly preferably a hydrogen atom.

The above alkyl group is more preferably a chain alkyl group than a cyclic alkyl group. A straight-chain alkyl group is more preferably to a branched-chain alkyl group.

The number of carbon atom of the alkyl group is preferably 1-30, more preferably 1-20, further preferably 1-10, further more preferably 1-8, and most preferably 1-6. The alkyl group may have a substituent.

Concrete examples of the substituent include a halogen atom, an alkoxy group such as a methoxy group, an ethoxy group and an epoxyethyloxy group, and a acyloxy group such as an acryloyl group and a methacryloyl group. The alkenyl group is more preferably a chain alkenyl group than a cyclic alkenyl group. A straight-chain alkenyl group is preferably to a branched-chain alkenyl group. The number of carbon atom of the alkenyl group is preferably 2-30, more preferably 2-20, further preferably 2-10, further more preferably 2-8, and most preferably 2-6. The alkyl group may have a substituent.

Concrete examples of the substituent include a halogen atom, an alkoxy group such as a methoxy group, an ethoxy group and an epoxyethyloxy group, and an acyloxy group such as an acryloyl group and a methacryloyl group.

The aryl group is preferably a phenyl group or a naphthyl group, and the phenyl group is particularly preferable. The aryl group may have a substituent.

Concrete examples of the substituent include a halogen atom, a hydroxyl group, a cyano group, a nitro group, a carboxyl group, an alkyl group, an alkenyl group, an aryl group, an alkoxy group, an alkenyloxy group, an aryloxy group, an acyloxy group, an alkoxycarbonyl group, an aryloxycarbonyl group, a sulfamoyl group, an alkyl-substituted sulfamoyl group, an alkenyl-substituted sulfamoyl group, an aryl-substituted sulfamoyl group, a sulfonamido group, a carbamoyl group, an alkyl-substituted carbamoyl group, an alkenyl-substituted carbamoyl group, an aryl-substituted carbamoyl group, an amido group, an alkylthio group, an alkenylthio group, an arylthio group and an acyl group. The above alkyl group is the same as the foregoing alkyl group.

The alkyl moiety of the alkoxyl group, acyloxy group, alkoxycarbonyl group, alkyl-substituted sulfamoyl group, sulfonamide group, alkyl-substituted carbamoyl group, amido group, alkylthio group and acyl group is the same as the foregoing alkyl group.

The above alkenyl group is the same as the forgoing alkenyl group.

The alkenyl moiety of the alkenyloxy group, acyloxy group, alkenyloxycarbonyl group, alkenyl-substituted sulfamoyl group, sulfonamide group, alkenyl-substituted carbamoyl group, amido group, alkenylthio group and acyl group is the same as the foregoing alkenyl group.

Concrete examples of the aryl group include a phenyl group, an α-naphthyl group, a β-naphthyl group, a 4-methoxyphenyl group, a 3,4-diethoxyphenyl group, a 4-octyloxyphenyl group and a 4-dodecyloxyphenyl group.

The aryl moiety of the aryloxy group, acyloxy group, aryloxycarbonyl group, aryl-substituted sulfamoyl group, sulfonamide group, arylsubstituted carbamoyl group, amido group, arylthio group and acyl group is the same as the foregoing aryl group.

The heterocyclic group is preferably has aromaticity, when the $X^1$, $X^2$ and $X^3$ are an —NR— group, an —O— atom or an —S— group.

The heterocycle in the heterocyclic group having aromaticity is usually an unsaturated heterocycle, preferably a heterocycle having highest number of double bond. The heterocycle is preferably a 5-, 6- or 7-member ring, more preferably the 5- or 6-member ring and most preferably the 6-member ring.

The heteroatom in the heterocycle is preferably a nitrogen atom, a sulfur atom or an oxygen atom, and the nitrogen atom is particularly preferable.

As the heterocycle having aromaticity, a pyridine ring such as a 2-pyridyl group and a 4-pyridyl group is particularly preferable. The heterocyclic group may have a substituent. Examples of the substituent are the same as the substituent of the foregoing aryl moiety.

When $X^1$, $X^2$ and $X^3$ are each the single bond, the heterocyclic group preferably has a free valency at the nitrogen atom. The heterocyclic group having the free valency at the nitrogen atom is preferably 5-, 6- or 7-member ring, more preferably the 5- or 6-member ring, and most preferably the 5-member ring. The heterocyclic group may have plural nitrogen atoms.

The heterocyclic group may have a hetero-atom other than the nitrogen atom such as an oxygen atom and a sulfur atom. The heterocyclic group may have a substituent. Concrete examples of the heterocyclic group are the same as those of the aryl moiety.

Examples of the heterocyclic group having the free valency at the nitrogen atom are listed below.

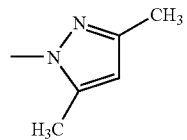

(Hc-1)

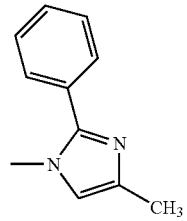

(Hc-2)

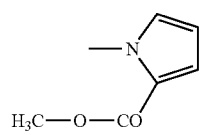

(Hc-3)

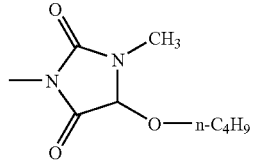

(Hc-4)

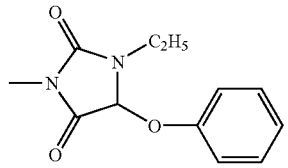

(Hc-5)

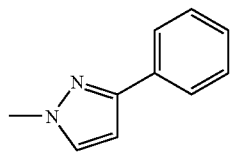

(Hc-6)

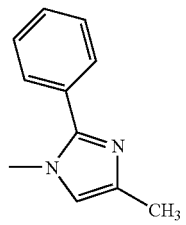

(Hc-7)

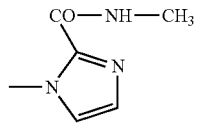

(Hc-8)

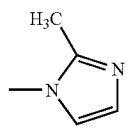

(Hc-9)

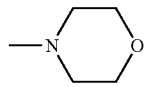

(Hc-10)

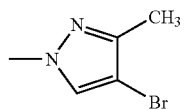

(Hc-11)

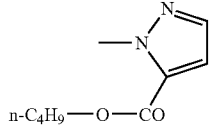

(Hc-12)

The molecular weight of the compound having a 1.3.5-triazine ring is preferably 300-2,000. The boiling point of these compounds is preferably not less than 260° C. The boiling point can be measured by a measuring apparatus available on the market such as TG/DTA100, manufactured by Seiko Denshi Kogyo Co., Ltd.

Concrete examples of the compound having the 1,3,5-triazine ring are shown below.

In the following, plural Rs each represent the same group.

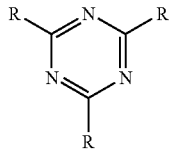
(1)~(12)

(1) Butyl
(2) 2-methoxy-2-ethoxyethyl
(3) Undecenyl
(4) Phenyl
(5) 4-ethoxycarbonylphenyl
(6) 4-butozyphenyl
(7) p-biphenylyl
(8) 4-pyridyl
(9) 2-naphthyl
(10) 2-methylphenyl
(11) 3,4-dimethoxyphenyl
(12) 2-furyl

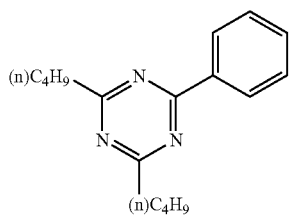
(13)

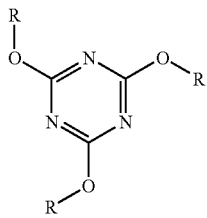
(14)~(79)

(14) phenyl
(15) 3-ethoxycarbonylphenyl
(16) 3-butoxyphenyl
(17) m-biphenyryl
(18) 3-phenylthiophenyl
(19) 3-chlorophenyl
(20) 3-benzoylphenyl
(21) 3-acetoxyphenyl
(22) 3-benzoyloxyphenyl
(23) 3-phenoxycarbonylphenol
(24) 3-methoxyphenyl
(25) 3-anilinophenyl
(26) 3-isobutyrylaminophenyl
(27) 3-phenoxycarbonylaminophenyl
(28) 3-(3-ethylureido)phenyl
(29) 3-(3,3-diethylureido)phenyl
(30) 3-methylphenyl
(31) 3-phenoxyphenyl
(32) 3-hydroxyphenyl
(33) 4-ethoxycarbonylphenyl
(34) 4-butoxyphenyl
(35) p-biphenyryl
(36) 4-phenylthiophenyl
(37) 4-chlorophenyl
(38) 4-benzoylphenyl
(39) 4-actoxyphenyl
(40) 4-benzoyloxyphenyl
(41) 4-phenoxycarbonylphenyl
(42) 4-methoxyphenyl
(43) 4-anilinophenyl
(44) 4-isobutyrylaminophenyl
(45) 4-phenoxycarbonylaminophenyl
(46) 4-(3-ethylureido)phenyl
(47) 4-(3,3-diethylureido)phenyl
(48) 4-methylphenyl
(49) 4-phenoxyphenyl
(50) 4-hydroxyphenyl
(51) 3,4-diethoxycarbonylphenyl
(52) 3,4-dibutoxyphenyl
(53) 3,4-diphenylphenyl
(54) 3,4-diphenylthiophenyl
(55) 3,4-dichlorophenyl
(56) 3,4-dibenzoylphenyl
(57) 3,4-diactoxyphenyl
(58) 3,4-dibenzoyloxyphenyl
(59) 3,4-diphenoxycarbonylphenyl
(60) 3,4-dimethoxyphenyl
(61) 3,4-dianilinophenyl
(62) 3,4-dimethylphenyl
(63) 3,4-diphenoxyphenyl
(64) 3,4-dihydroxyphenyl
(65) 2-naphthyl
(66) 3,4,5-triethoxycarbonylphenyl
(67) 3,4,5-tributoxyphenyl
(68) 3,4,5-triphenylpenyl
(69) 3,4,5-triphenylthiophenyl
(70) 3,4,5-trichlorophenyl
(71) 3,4,5-tribenzoylphenyl
(72) 3,4,5-triacetoxyphenyl
(73) 3,4,5-tribenzoyloxyphenyl
(74) 3,4,5-triphenoxycarbonylphenyl
(75) 3,4,5-trimethoxyphenyl
(76) 3,4,5-trianilinophenyl
(77) 3,4,5-trimethylphenyl
(78) 3,4,5-triphenoxyphenyl
(79) 3,4,5-trihydroxyphenyl

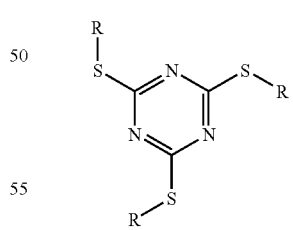
(80)~(145)

(80) phenyl
(81) 3-ethoxycarbonylphenyl
(82) 3-butoxyphenyl
(83) m-biphenyryl
(84) 3-phenylthiophenyl
(85) 3-chlorophenyl
(86) 3-benzoylphenyl
(87) 3-acetoxyphenyl
(88) 3-benzoyloxyphenyl

(89) 3-phenoxycarbonylphenol
(90) 3-methoxyphenyl
(91) 3-anilinophenyl
(92) 3-isobutyrylaminophenyl
(93) 3-phenoxycarbonylaminophenyl
(94) 3-(3-ethylureido)phenyl
(95) 3-(3,3-diethylureido)phenyl
(96) 3-methylphenyl
(97) 3-phenoxyphenyl
(98) 3-hydroxyphenyl
(99) 4-ethoxycarbonylphenyl
(100) 4-butoxyphenyl
(101) p-biphenyryl
(102) 4-phenylthiophenyl
(103) 4-chlorophenyl
(104) 4-benzoylphenyl
(105) 4-actoxyphenyl
(106) 4-benzoyloxyphenyl
(107) 4-phenoxycarbonylphenyl
(108) 4-methoxyphenyl
(109) 4-anilinophenyl
(110) 4-isobutyrylaminophenyl
(111) 4-phenoxycarbonylaminophenyl
(112) 4-(3-ethylureido)phenyl
(113) 4-(3,3-diethylureido)phenyl
(114) 4-methylphenyl
(115) 4-phenoxyphenyl
(116) 4-hydroxyphenyl
(117) 3,4-diethoxycarbonylphenyl
(118) 3,4-dibutoxyphenyl
(119) 3,4-diphenylphenyl
(120) 3,4-diphenylthiophenyl
(121) 3,4-dichlorophenyl
(122) 3,4-dibenzoylphenyl
(123) 3,4-diactoxyphenyl
(124) 3,4-dibenzoyloxyphenyl
(125) 3,4-diphenoxycarbonylphenyl
(126) 3,4-dimethoxyphenyl
(127) 3,4-dianilinophenyl
(128) 3,4-dimethylphenyl
(129) 3,4-diphenoxyphenyl
(130) 3,41-dihydroxyphenyl
(131) 2-naphthyl
(132) 3,4,5-triethoxycarbonylphenyl
(133) 3,4,5-tributoxyphenyl
(134) 3,4,5-triphenylpenyl
(135) 3,4,5-triphenylthiophenyl
(136) 3,4,5-trichlorophenyl
(137) 3,4,5-tribenzoylphenyl
(138) 3,4,5-triacetoxyphenyl
(139) 3,4,5-tribenzoyloxyphenyl
(140) 3,4,5-triphenoxycarbonylphenyl
(141) 3,4,5-trimethoxyphenyl
(142) 3,4,5-trianilinophenyl
(143) 3,4,5-trimethylphenyl
(144) 3,4,5-triphenoxyphenyl
(145) 3,4,5-trihydroxyphenyl (146)~(164)

(146) phenyl
(147) 4-ethoxycarbonylphenyl
(148) 4-butoxyphenyl
(149) p-biphenyryl
(150) 4-phenylthiophenyl
(151) 4-chlorophenyl
(152) 4-benzoylphenyl
(153) 4-acetoxyphenyl
(154) 4-benzoyloxyphenyl
(155) 4-phenoxycarbonylphenol
(156) 4-methoxyphenyl
(157) 4-anilinophenyl
(158) 4-isobutyrylaminophenyl
(159) 4-phenoxycarbonylaminophenyl
(160) 4-(3-ethylureido)phenyl
(161) 4-(3,3-diethylureido)phenyl
(162) 4-methylphenyl
(163) 4-phenoxyphenyl
(164) 4-hydroxyphenyl (165)~(183)

(165) phenyl
(166) 4-ethoxycarbonylphenyl
(167) 4-butoxyphenyl
(168) p-biphenyryl
(169) 4-phenylthiophenyl
(170) 4-chlorophenyl
(171) 4-benzoylphenyl
(172) 4-acetoxyphenyl
(173) 4-benzoyloxyphenyl
(174) 4-phenoxycarbonylphenol
(175) 4-methoxyphenyl
(176) 4-anilinophenyl
(177) 4-isobutyrylaminophenyl
(178) 4-phenoxycarbonylaminophenyl
(179) 4-(3-ethylureido)phenyl
(180) 4-(3,3-diethylureido)phenyl
(181) 4-methylphenyl
(182) 4-phenoxyphenyl
(183) 4-hydroxyphenyl

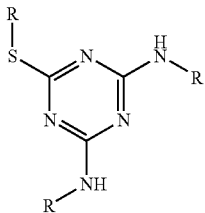

(184) phenyl
(185) 4-ethoxycarbonylphenyl
(186) 4-butoxyphenyl
(187) p-biphenyryl
(188) 4-phenylthiophenyl
(189) 4-chlorophenyl
(190) 4-benzoylphenyl
(191) 4-acetoxyphenyl
(192) 4-benzoyloxyphenyl
(193) 4-phenoxycarbonylphenol
(194) 4-methoxyphenyl
(195) 4-anilinophenyl
(196) 4-isobutyrylaminophenyl
(197) 4-phenoxycarbonylaminophenyl
(198) 4-(3-ethylureido)phenyl
(199) 4-(3,3-diethylureido)phenyl
(200) 4-methylphenyl
(201) 4-phenoxyphenyl
(202) 4-hydroxyphenyl

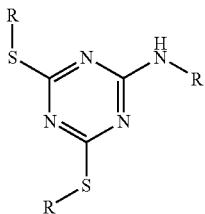

(203) phenyl
(204) 4-ethoxycarbonylphenyl
(205) 4-butoxyphenyl
(206) p-biphenyryl
(207) 4-phenylthiophenyl
(208) 4-chlorophenyl
(209) 4-benzoylphenyl
(210) 4-acetoxyphenyl
(211) 4-benzoyloxyphenyl
(212) 4-phenoxycarbonylphenol
(213) 4-methoxyphenyl
(214) 4-anilinophenyl
(215) 4-isobutyrylaminophenyl
(216) 4-phenoxycarbonylaminophenyl
(217) 4-(3-ethylureido)phenyl
(218) 4-(3,3-diethylureido)phenyl
(219) 4-methylphenyl
(220) 4-phenoxyphenyl
(221) 4-hydroxyphenyl

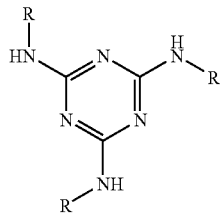

(222) phenyl
(223) 4-butylphenyl
(224) 4-2-methoxy-2-ethoxyethyl)phenyl
(225) 4-(5-nenenyl)phenyl
(226) p-biphenyryl
(227) 4-ethoxycarbonylphenyl
(228) 4-butoxyphenyl
(229) 4-methylphenyl
(230) 4-chlorophenyl
(231) 4-phenylthiophenyl
(232) 4-benzoylphenyl
(233) 4-aceoxyphenyl
(234) 4-benzoyloxyphenyl
(235) 4-phenoxycarbonylphenyl
(236) 4-methoxyphenyl
(237) 4-anilinophenyl
(238) 4-isobutyrylaminophenyl
(239) 4-phenoxycarbonylaminophenyl
(240) 4-(3-ethylureido)phenyl
(241) 4-(3,3-diethylureido)phenyl
(242) 4-phenoxyphenyl
(243) 4-hydroxyphenyl
(244) 3-butylphenyl
(245) 3-(2-methoxy-2-ethoxyethyl)phenyl
(246) 3-(5-nonenyl)phenyl
(247) m-biphenyryl
(248) 3-ethoxycarbonylphenyl
(249) 3-butoxyphenyl
(250) 3-methylphenyl
(251) 3-chlorophenyl
(252) 3-phenylthiophenyl
(253) 3-benzoylphenyl
(254) 3-actoxyphenyl
(255) 3-benzoyloxyphenyl
(256) 3-phenoxycarbonylphenyl
(257) 3-methoxyphenyl
(258) 3-anilinophenyl
(259) 3-isobutyrylaminophenyl
(260) 3-phenoxycarbonylaminophenyl
(261) 3-(3-ethylureido)phenyl
(262) 3-(3,3-diethylureido)phenyl
(263) 3-phenoxyphenyl
(264) 3-hydroxyphenyl
(265) 2-butylphenyl
(266) 2-(2-methoxy-2-ethoxyethyl)phenyl
(267) 2-(5-nonenyl)phenyl
(268) o-biphenyryl
(269) 2-ethoxycarbonylphenyl
(270) 2-butoxyphenyl
(271) 2-methylphenyl
(272) 2-chlorophenyl
(273) 2-phenylthiophenyl
(274) 2-benzoylphenyl
(275) 2-aceoxyphenyl (276) 2-benzoyloxyphenyl
(277) 4-phenoxycarbonylphenyl
(278) 2-methoxyphenyl
(279) 2-anilinophenyl
(280) 2-isobutyrylaminophenyl
(281) 2-phenoxycarbonyl aminophenyl
(282) 2-(3-ethylureido)phenyl
(283) 2-(3,3-dimethylureido)phenyl
(284) 2-phenoxyphenyl
(285) 2-hydroxyphenyl
(286) 3,4-dibutylphenyl
(287) 3,4-di(2-methoxy-2-ethoxyethyl)phenyl
(288) 3,4-diphenylphenyl
(289) 3,4-diethoxycarbonylphenyl
(290) 3,4-didodecyloxyphenyl
(291) 3,4-dimethylphenyl
(292) 3,4-dichlorophenyl
(293) 3,4-dibenzoylphenyl
(294) 3,4-diacetoxyphenyl
(295) 3,4-dimethoxyphenyl
(296) 3,4-di-N-methylaminophenyl
(297) 3,4-diisobutyrylaminophenyl
(298) 3,4-diphenoxyphenyl
(299) 3,4-dihydroxyphenyl
(300) 3,5-dibutylphenyl
(301) 3,5-di(2-methoxy-2-ethoxyethyl)phenyl
(302) 3,5-diphenylphenyl
(303) 3,5-diethoxycarbonylphenyl
(304) 3,5-didodecyloxyphenyl
(305) 3,5-dimethylphenyl
(306) 3,5-dichlorophenyl
(307) 3,5-dibenzoylphenyl
(308) 3,5-diacetoxyphenyl
(309) 3,5-dimethoxyphenyl
(310) 3,5-di-N-methylaminophenyl
(311) 3,5-diisobutyrylaminophenyl
(312) 3,5-diphenoxyphenyl
(313) 3,5-dihydroxyphenyl
(314) 2,4-dibutylphenyl
(315) 2,4-di(2-methoxy-2-ethoxyethyl)phenyl
(316) 2,4-diphenylphenyl
(317) 2,4-diethoxycarbonylphenyl
(318) 2,4-didodecyloxyphenyl
(319) 2,4-dimethylphenyl
(320) 2,4-dichlorophenyl
(321) 2,4-dibenzoylphenyl
(322) 2,4-diacetoxyphenyl
(323) 2,4-dimethoxyphenyl
(324) 2,4-di-N-methylaminophenyl
(325) 2,4-diisobutyrylaminophenyl
(326) 2,4-diphenoxyphenyl
(327) 2,4-dihydroxyphenyl
(328) 2,3-dibutylphenyl
(301) 3,5-di(2-methoxy-2-ethoxyethyl)phenyl
(302) 3,5-diphenylphenyl
(303) 3,5-diethoxycarbonylphenyl
(304) 3,5-didodecyloxyphenyl
(305) 3,5-dimethylphenyl
(306) 3,5-dichlorophenyl
(307) 3,5-dibenzoylphenyl
(308) 3,5-diacetoxyphenyl
(309) 3,5-dimethoxyphenyl
(310) 3,5-di-N-methylaminophenyl
(311) 3,5-diisobutyrylaminophenyl
(312) 3,5-diphenoxyphenyl
(313) 3,5-dihydroxyphenyl
(314) 2,4-dibutylphenyl
(315) 2,4-di(2-methoxy-2-ethoxyethyl)phenyl
(316) 2,4-diphenylphenyl
(317) 2,4-diethoxycarbonylphenyl
(318) 2,4-didodecyloxyphenyl
(319) 2,4-dimethylphenyl
(320) 2,4-dichlorophenyl
(321) 2,4-dibenzoylphenyl
(322) 2,4-diacetoxyphenyl
(323) 2,4-dimethoxyphenyl
(324) 2,4-di-N-methylaminophenyl
(325) 2,4-diisobutyrylaminophenyl
(326) 2,4-diphenoxyphenyl
(327) 2,4-dihydroxyphenyl
(328) 2,3-dibutylphenyl
(329) 2,3-di(2-methoxy-2-ethoxyethyl)phenyl
(330) 2,3-diphenylphenyl
(331) 2,3-diethoxycarbonylphenyl
(332) 2,3-didodecyloxyphenyl
(333) 2,3-dimethylphenyl
(334) 2,3-dichlorophenyl
(335) 2,3-dibenzoylphenyl
(336) 2,3-diacetoxyphenyl
(337) 2,3-dimethoxyphenyl
(338) 2,3-di-N-methylaminophenyl
(339) 2,3-diisobutyrylaminophenyl
(340) 2,3-diphenoxyphenyl
(341) 2,3-dihydroxyphenyl
(342) 2,6-dibutylphenyl
(343) 2,6-di(2-methoxy-2-ethoxyethyl)phenyl
(344) 2,6-diphenylphenyl
(345) 2,6-diethoxycarbonylphenyl
(346) 2,6-didodecyloxyphenyl
(347) 2,6-dimethylphenyl
(348) 2,6-dichlorophenyl
(349) 2,6-dibenzoylphenyl
(350) 2,6-diacetoxyphenyl
(351) 2,6-dimethoxyphenyl
(352) 2,6-di-N-methylaminophenyl
(353) 2,6-diisobutyrylaminophenyl
(354) 2,6-diphenoxyphenyl
(355) 2,6-dihydroxyphenyl
(356) 3,4,5-tributylphenyl
(357) 3,4,5-tri(2-methoxy-2-ethoxyethyl)phenyl
(358) 3,4,5-triphenylphenyl
(359) 3,4,5-triethoxycarbonylphenyl
(360) 3,4,5-tridodecyloxyphenyl
(361) 3,4,5-trimethylphenyl
(362) 3,4,5-trichlorophenyl
(363) 3,4,5-tribenzoylphenyl
(364) 3,4,5-triacetoxyphenyl
(365) 3,4,5-trimethoxyphenyl
(366) 3,4,5-tri-N-methylaminophenyl
(367) 3,4,5-triisobutyrylaminophenyl
(368) 3,4,5-triphenoxyphenyl
(369) 3,4,5-trihydoxyphenyl
(370) 2,4,6-tributylphenyl
(371) 2,4,6-tri(2-methoxy-2-ethoxyethyl)phenyl
(372) 2,4,6-triphenylphenyl
(373) 2,4,6-triethoxycarbonylphenyl
(374) 2,4,6-tridodecyloxyphenyl
(375) 2,4,6-trimethylphenyl
(376) 2,4,6-trichlorophenyl
(377) 2,4,6-tribenzoylphenyl
(378) 2,4,6-triacetoxyphenyl
(379) 2,4,6-trimethoxyphenyl
(380) 2,4,6-tri-N-methylaminophenyl
(381) 2,4,6-triisobutyrylaminophenyl (382) 2,4,6-triphenoxyphenyl
(383) 2,4,6-trihydoxyphenyl
(384) pentafluorophenyl
(385) pentachlorophenyl
(386) pentamethoxyphenyl
(387) 6-N-methylsulfamoyl-8-methoxy-2-naphthyl
(388) 5-N-methylsulfamoyl-2-naphthyl
(389) 6-N-phenylsulfamoyl-2-naphtyl
(390) 5-ethoxy-7-N-methylsulfamoyl-2-naphthyl
(391) 3-methoxy-2-naphthyl
(392) 1-ethoxy-2-naphthyl
(393) 6-N-phenylsulfamoyl-8-methoxy-2-naphthyl
(394) 5-methoxy-7-N-phenylsulfamoyl-2-naphthyl
(395) 1-(4-methylphenyl)-2-naphthyl
(396) 6,8-di-N-methylsufamoyl-2-naphthyl
(397) 6-N-2-acetoxyethylsulfamoyl-8-methoxy-2-naphthyl
(398) 5-acetoxy-7-N-phenylsulfamoyl-2-naphthyl
(399) 3-benzoyloxy-2-naphthyl
(400) 5-acetylamino-1-naphthyl
(401) 2-methoxy-1-naphthyl
(402) 4-phenoxy-1-naphthyl
(403) 5-N-methylsulfamoyl-1-naphthyl
(404) 3-N-methylcarbamoyl-4-hydroxy-1-naphthyl
(405) 5-methoxy-6-N-ethylsulfamoyl-1-naphthyl
(406) 7-tetradecyloxy-1-naphthyl
(407) 4-(4-methylphenoxy)-1-naphthyl
(408) 6-N-methylsulfamoyl-1-naphthyl
(409) 3-N,N-dimethylcarbamoyl-4-methoxy-1-naphthyl
(410) 5-methoxy-6-N-benzylsulfamoyl-1-naphthyl
(411) 3,6-di-N-phenylsulfamoyl-1-naphthyl
(412) methyl
(413) ethyl
(414) butyl
(415) octyl
(416) dodecyl
(417) 2-butoxy-2-ethoxyethyl
(418) benzyl
(419) 4-methoxybenzyl -continued

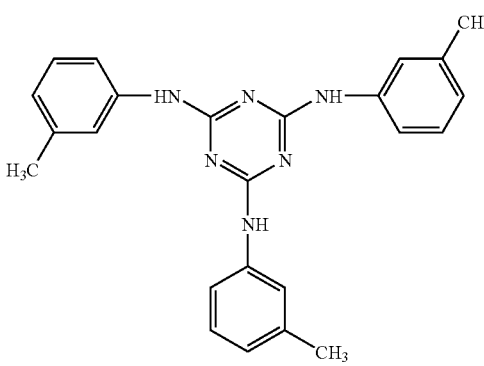
(420')

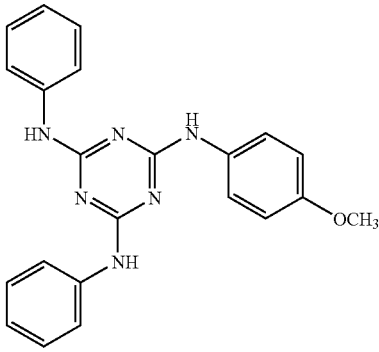
(421)

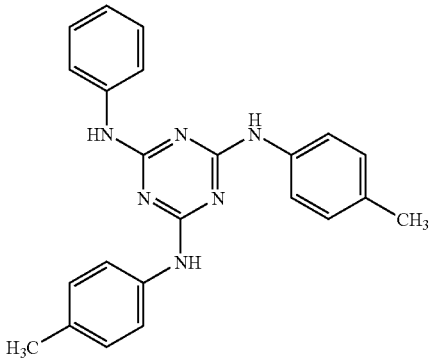
(422)

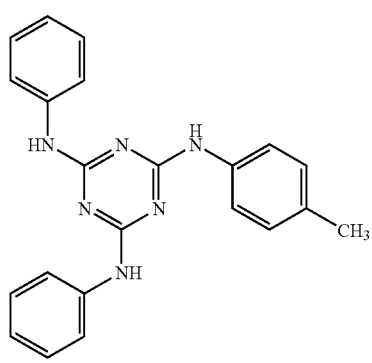
(420)

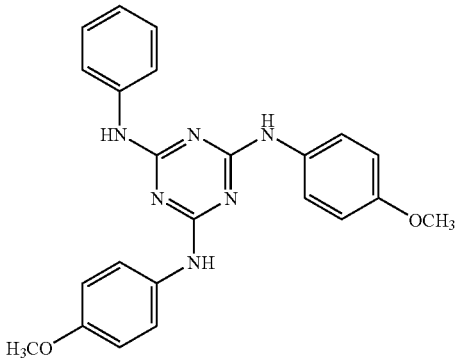
(423)

-continued
(424)~(426)
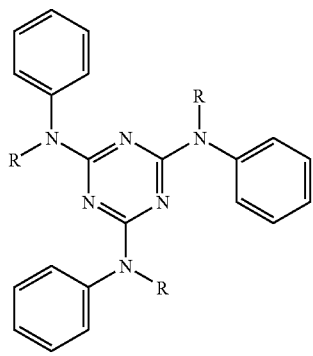
(424) methyl
(425) phenyl
(426) butyl
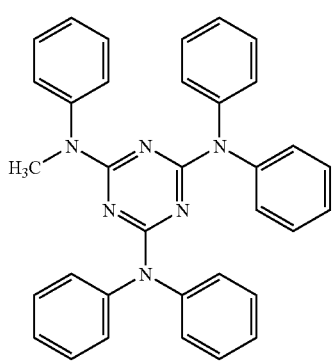
(427)
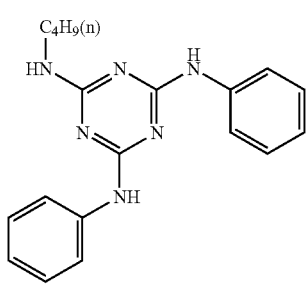
(428)
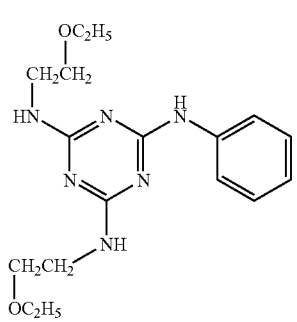
(429)
-continued
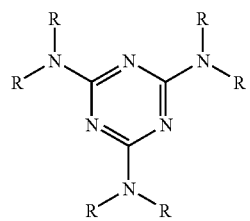
(430)~(437)
(430) methyl
(431) ethyl
(432) butyl
(433) octyl
(434) dodecyl
(435) 2-butoxy-2-ethoxyethyl
(436) benzyl
(437) 4-methoxybenzyl
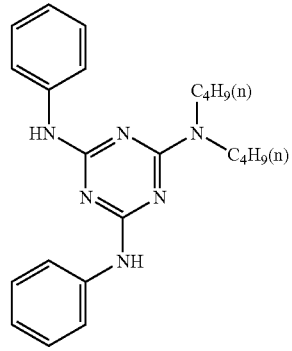
(438)
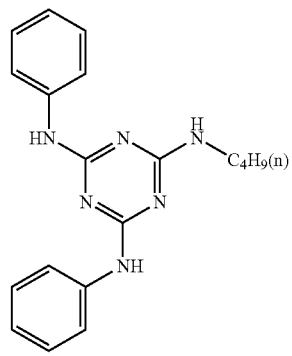
(439)

-continued (440)

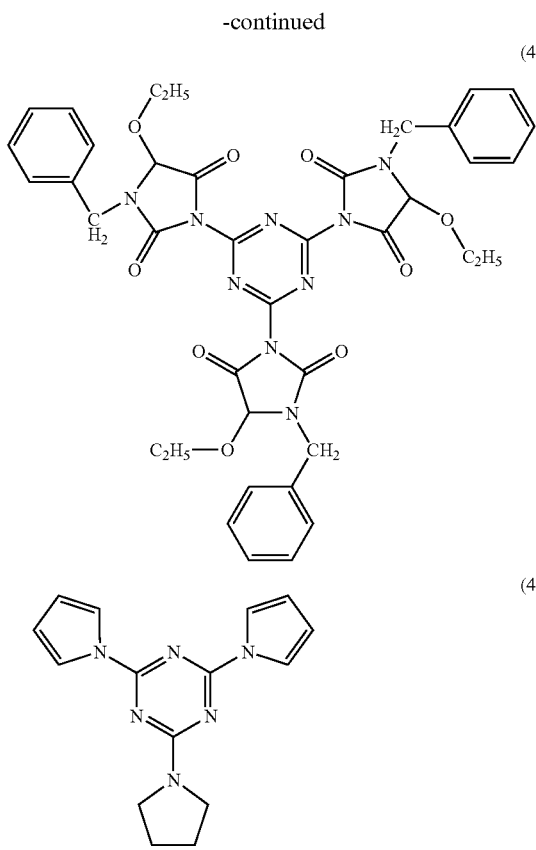

(441)

(442)

(443)

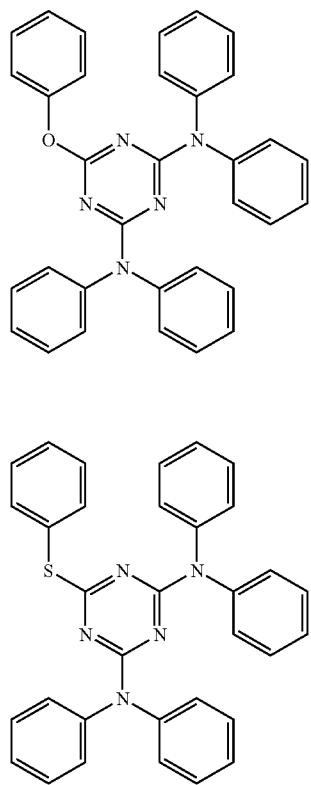

-continued (444)

(445)

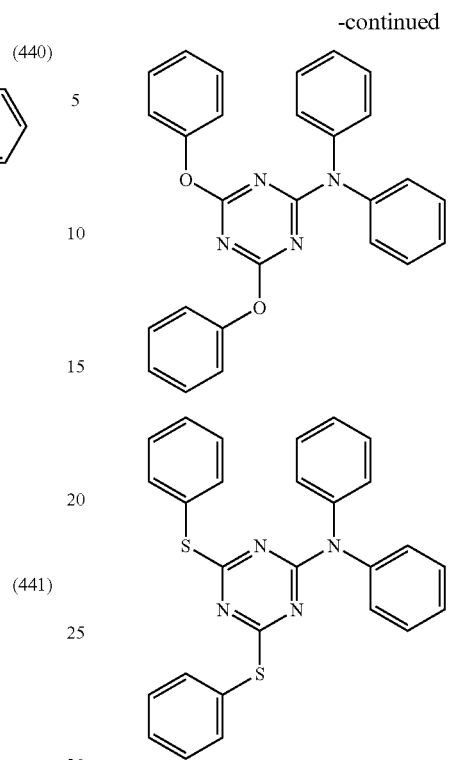

In the present invention, employed as a compound having a 1,3,5-triazine ring may be melamine polymers. It is preferable that the above melamine polymers are synthesized employing a polymerization reaction of the melamine compounds represented by Formula (D) below with carbonyl compounds.

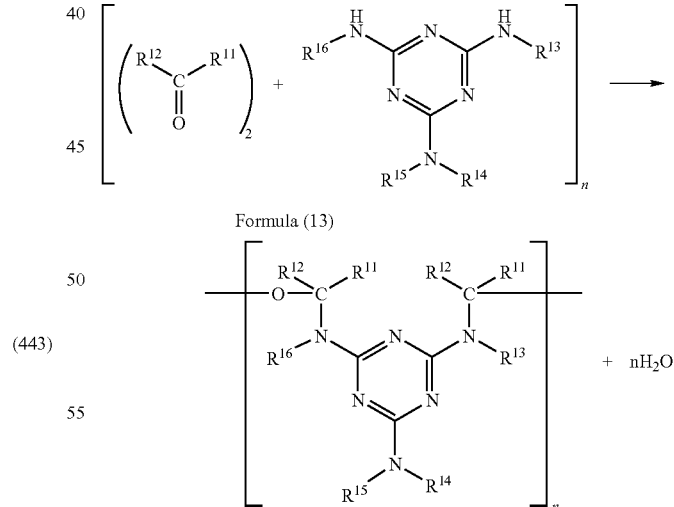

In the above synthesis reaction scheme, $R^{11}$, $R^{12}$, $R^{13}$, $R^{14}$, $R^{15}$, and $R^{16}$ each represent a hydrogen atom, an alkyl group, an alkenyl group, an aryl group or a heterocyclyl group.

The above alkyl group, alkenyl group, aryl group, and heterocyclyl group, as well as those substituents are as defined for each group and also the substituents described in above Formula (C).

The polymerization reaction of melamine compounds with carbonyl compounds is performed employing the same synthesis method as for common melamine resins (for example, a melamine-formaldehyde resin). Further, employed may be commercially available melamine polymers (being melamine resins).

The molecular weight of melamine polymers is preferably 2,000-400,000. Specific examples of repeating units of melamine polymers are shown below.

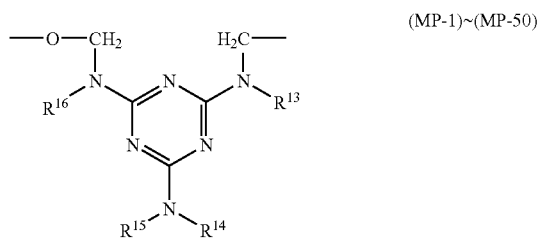

(MP-1)~(MP-50)

MP-1: $R^{13}$, $R^{14}$, $R^{15}$, $R^{16}$: $CH_2OH$
MP-2: $R^{13}$, $R^{14}$, $R^{15}$, $R^{16}$: $CH_2OCH_3$
MP-3: $R^{13}$, $R^{14}$, $R^{15}$, $R^{16}$: $CH_2O$-i-$C_4H_9$
MP-4: $R^{13}$, $R^{14}$, $R^{15}$, $R^{16}$: $CH_2O$-n-$C_4H_9$
MP-5: $R^{13}$, $R^{14}$, $R^{15}$, $R^{16}$: $CH_2NHCOCH=CH_2$
MP-6: $R^{13}$, $R^{14}$, $R^{15}$, $R^{16}$: $CH_2NHCO(CH_2)_7CH=CH(CH_2)_7CH_3$
MP-7: $R^{13}$, $R^{14}$, $R^{15}$: $CH_2OH$; $R^{16}$: $CH_2OCH_3$
MP-8: $R^{13}$, $R^{14}$, $R^{16}$: $CH_2OH$; $R^{15}$: $CH_2OCH_3$,
MP-9: $R^{13}$, $R^{14}$: $CH_2OH$; $R^{15}$, $R^{16}$: $CH_2OCH_3$
MP-10: $R^{13}$, $R^{16}$: $CH_2OH$; $R^{14}$, $R^{15}$: $CH_2OCH_3$
MP-11: $R^{13}$: $CH_2OH$; $R^{14}$ $R^{15}$, $R^{16}$: $CH_2OCH_3$
MP-12: $R^{13}$, $R^{14}$, $R^{16}$: $CH_2OCH_3$; $R^{15}$: $CH_2OH$
MP-13: $R^{13}$, $R^{16}$: $CH_2OCH_3$; $R^{14}$, $R^{15}$: $CH_2OH$
MP-14: $R^{13}$, $R^{14}$, $R^{15}$: $CH_2OH$; $R^{16}$: $CH_2O$-i-$C_4H_9$
MP-15: $R^{13}$, $R^{14}$, $R^{16}$: $CH_2OCH_3$; $R^{15}$: $CH_2O$-i-$C_4H_9$
MP-16: $R^{13}$, $R^{14}$: $CH_2OH$; $R^{15}$, $R^{16}$: $CH_2O$-i-$C_4H_9$
MP-17: $R^{13}$, $R^{16}$: $CH_2OH$; $R^{14}$, $R^{15}$: $CH_2O$-i-$C_4H_9$
MP-18: $R^{13}$: $CH_2OH$; $R^{14}$ $R^{15}$, $R^{16}$: $CH_2O$-i-$C_4H_9$
MP-19: $R^{13}$, $R^{14}$, $R^{16}$: $CH_2O$-i-$C_4H_9$; $R^{15}$: $CH_2OH$
MP-20: $R^{13}$, $R^{16}$: $CH_2O$-i-$C_4H_9$; $R^{14}$, $R^{15}$: $CH_2OH$
MP-21: $R^{13}$, $R^{14}$, $R^{15}$: $CH_2OH$; $R^{16}$: $CH_2O$-n-$C_4H_9$
MP-22: $R^{13}$, $R^{14}$, $R^{16}$: $CH_2H$; $R^{15}$, $R^{16}$: $CH_2O$-n-$C_4H_9$
MP-23: $R^{13}$, $R^{14}$: $CH_2OH$; $R^{15}$, $R^{16}$: $CH_2O$-n-$C_4H_9$
MP-24: $R^{13}$, $R^{16}$: $CH_2OH$; $R^{14}$, $R^{15}$: $CH_2O$-n-$C_4H_9$
MP-25: $R^{13}$: $CH_2OH$; $R^{14}$ $R^{15}$, $R^{16}$: $CH_2O$-n-$C_4H_9$
MP-26: $R^{13}$, $R^{14}$, $R^{16}$: $CH_2O$-n-$C_4H_9$; $R^{15}$: $CH_2OH$
MP-27: $R^{13}$, $R^{16}$: $CH_2O$-n-$C_4H_9$; $R^{14}$, $R^{15}$: $CH_2OH$
MP-28: $R^{13}$, $R^{14}$: $CH_2OH$; $R^{15}$: $CH_2OCH_3$; $R^{16}$: $CH_2O$-n-$C_4H_9$
MP-29: $R^{13}$, $R^{14}$: $CH_2OH$; $R^{15}$: $CH_2$-n-$C_4H_9$; $R^{16}$: $CH_2OCH_3$
MP-30: $R^{13}$, $R^{16}$: $CH_2OH$; $R^{14}$: $CH_2OCH_3$; $R^{15}$: $CH_2O$-n-$C_4H_9$
MP-31: $R^{13}$: $CH_2OH$; $R^{14}$, $R^{15}$: $CH_2OCH_3$; $R^{16}$: $CH_2O$-n-$C_4H_9$
MP-32: $R^{13}$: $CH_2OH$; $R^{14}$, $R^{16}$: $CH_2OCH_3$; $R^{15}$: $CH_2O$-n-$C_4H$
MP-33: $R^{13}$: $CH_2OH$; $R^{14}$: $CH_2OCH_3$; $R^{15}$, $R^{16}$: $CH_2O$-n-$C_4H_9$
MP-34: $R^{13}$: $CH_2OH$; $R^{14}$, $R^{15}$: $CH_2O$-n-$C_4H_9$; $R^{16}$: $CH_2OCH_3$
MP-35: $R^{13}$, $R^{14}$: $CH_2OCH_3$; $R^{15}$: $CH_2OH$; $R^{16}$: $CH_2O$-n-$C_4H_9$
MP-36: $R^{13}$, $R^{16}$: $CH_2OCH_3$; $R^{14}$: $CH_2OH$; $R^{15}$: $CH_2O$-n-$C_4H_9$
MP-37: $R^{13}$: $CH_2OCH_3$; $R^{14}$, $R^{15}$: $CH_2OCH$; $R^{16}$: $CH_2O$-n-$C_4H_9$
MP-38: $R^{13}$, $R^{16}$: $CH_2O$-n-$C_4H_9$; $R^{15}$: $CH_2OCH_3$; $R^{15}$: $CH_2OH$
MP-39: $R^{13}$: $CH_2OH$; $R^{14}$: $CH_2OCH_3$; $R^{15}$: $CH_2O$-n-$C_4H_9$; $R^{16}$: $CH_2NHCOCH=CH_2$
MP-40: $R^{13}$: $CH_2OH$; $R^{14}$: $CH_2OCH_3$; $R^{15}$: $CH_2NHCOCH=CH_2$; $R^{16}$ $CH_2O$-n-$C_4H_9$
MP-41: $R^{13}$: $CH_2OH$; $R^{14}$: $CH_2O$-n-$C_4H_9$; $R^{15}$: $CH_2NHCOCH=CH_2$; $R^{16}$: $CH_2OCH_3$
MP-42: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$
MP-43: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$
MP-44: $R^{13}$: $CH_2O$-n-$C_4H_9$; $R^{14}$: $CH_2OCH_3$; $R^{15}$: $CH_2OH$; $R^{16}$: $CH_2NHCOCH=CH_2$
MP-45: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-46: $R^{13}$: $CH_2OH$; $R^{14}$: $CH_2OCH_3$; $R^{15}$: $CH_2NHCO=CH_2$; $R_6$: $CH_2NHCO(CH_2)_7CH=CH(CH_2)_7CH_3$
MP-47: $R^{13}$: $CH_2OH$; $R^{14}$: $CH_2NHCO(CH_2)_7CH=CH(CH_2)_7CH_3$; $R^{15}$: $CH_2NHCOCH=CH_2$; $R^{16}$: $CH_2OCH_3$
MP-48: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$
MP-49: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_2$
MP-50: $R^{13}$: $CH_2NHCO(CH_2)_7CH=CH(CH_2)_7CH_3$; $R^{14}$: $CH_2OCH_3$; $R^{15}$ $CH_2OH$; $R^{16}$: $CH_2NHCOCH=CH_2$ (MP-51)~(MP-100)

MP-51: $R^{13}$, $R^{14}$, $R^{15}$, $R^{16}$: $CH_2OH$
MP-52: $R^{13}$, $R^{14}$, $R^{15}$, $R^{16}$: $CH_2OCH_3$
MP-53: $R^{13}$, $R^{14}$, $R^{15}$, $R^{16}$: $CH_2O$-i-$C_4H_9$
MP-54: $R^{13}$, $R^{14}$, $R^{15}$, $R^{16}$: $CH_2O$-n-$C_4H_9$
MP-55: $R^{13}$. $R^{14}$, $R^{15}$, $R^{16}$: $CH_2NHCOCH=CH_2$
MP-56: $R^{13}$, $R^{14}$, $R^{15}$, $R^{16}$: $CH_2NHCO(CH_2)_7CH=CH(CH_2)_7CH_3$
MP-57: $R^{13}$, $R^{14}$, $R^{15}$: $CH_2OH$; $R^{16}$: $CH_2OCH_3$
MP-58: $R^{13}$, $R^{14}$, $R^{16}$: $CH_2OH$; $R^{15}$: $CH_2OCH_3$,
MP-59: $R^{13}$, $R^{14}$: $CH_2OH$; $R^{15}$, $R^{16}$: $CH_2OCH_3$
MP-60: $R^{13}$, $R^{16}$: $CH_2OH$; $R^{14}$, $R^{15}$: $CH_2OCH_3$
MP-61: $R^{13}$: $CH_2OH$; $R^{14}$, $R^{15}$: $CH_2OCH_3$
MP-62: $R^{13}$, $R^{14}$, $R^{16}$: $CH_2OCH_3$; $R^{15}$: $CH_2OH$
MP-63: $R^{13}$, $R^{16}$: $CH_2OCH_3$; $R^{14}$, $R^{15}$: $CH_2OH$
MP-64: $R^{13}$, $R^{14}$, $R^{15}$: $CH_2OH$; $R^{16}$: $CH_2O$-i-$C_4H_9$
MP-65: $R^{13}$, $R^{14}$, $R^{16}$: $CH_2OCH_3$; $R^{15}$: $CH_2O$-i-$C_4H_9$
MP-66: $R^{13}$, $R^{14}$: $CH_2OH$; $R^{15}$, $R^{16}$: $CH_2O$-i-$C_4H_9$

MP-67: $R^{13}$, $R^{16}$: $CH_2OH$; $R^{14}$, $R^{15}$: $CH_2O$-i-$C_4H_9$
MP-68: $R^{13}$, $CH_2OH$; $R^{14}$ $R^{15}$, $R^{16}$: $CH_2O$-i-$C_4H_9$
MP-69: $R^{13}$, $R^{14}$, $R^{16}$: $CH_2O$-i-$C_4H_9$; $R^{15}$: $CH_2OH$
MP-70: $R^{13}$, $R^{16}$: $CH_2O$-i-$C_4H_9$; $R^{14}$, $R^{15}$: $CH_2OH$
MP-71: $R^{13}$, $R^{14}$, $R^{15}$: $CH_2O$-n-$C_4H_9$
MP-72: $R^{13}$, $R^{14}$, $R^{16}$: $CH_2OH$; $R^{15}$: $CH_2O$-n-$C_4H_9$
MP-73: $R^{13}$, $R^{14}$: $CH_2OH$; $R^{15}$, $R^{16}$: $CH_2O$-n-$C_4N_9$
MP-74: $R^{13}$, $R^{16}$: $CH_2OH$; $R^{14}$, $R^{15}$: $CH_2O$-n-$C_4H_9$
MP-75: $R^{13}$: $CH_2OH$; $R^{14}$, $R^{15}$, $R^{16}$: $CH_2O$-n-$C_4H_9$
MP-76: $R^{13}$, $R^{14}$, $R^{16}$: $CH_2O$-n-$C_4H_9$; $R^{15}$: $CH_2OH$
MP-77: $R^{13}$, $R^{16}$: $CH_2O$-n-$C_4H_9$; $R^{14}$, $R^{15}$: $C_4H_9$
MP-78: $R^{13}$, $R^{14}$: $CH_2OH$; $R^{15}$: $CH_2OCH_3$; $R^{16}$: $CH$-n-$C_4H_9$
MP-79: $R^{13}$, $R^{14}$: $CH_2OH$; $R^{15}$: $CH_2$-n-$C_4H_9$; $R^{16}$: $CH_2OCH_3$
MP-80: $R^{13}$, $R^{16}$: $CH_2OH$; $R^{14}$: $CH_2OCH_3$; $R^{15}$: $CH_2O$-n-$C_4H_9$
MP-81: $R^{13}$: $CH_2OH$; $R^{14}$, $R^{15}$: $CH_2OH$; $R^{16}$: $CH_2O$-n-$C_4H_9$
MP-82: $R^{13}$: $CH_2OH$; $R^{14}$, $R^{15}$: $CH_2OCH_3$; $R^{15}$: $CH_2O$-n-$C_4H_9$
MP-83: $R^{13}$; $CH_2OH$; $R^{14}$: $CH_2OCH_3$; $R^{15}$, $R^{16}$: $CH_2O$-n-$C_4H_9$
MP-85: $R^{13}$, $R^{14}$: $CH_2OCH_3$; $R^{15}$: $CH_2OH$; $R^{16}$: $CH_2O$-n-$C_4H_9$
MP-86: $R^{13}$, $R^{16}$: $CH_2OCH_3$; $R^{14}$: $CH_2OH$; $R^{15}$: $CH_2O$-n-$C_4H_9$
MP-87: $R^{13}$: $CH_2OCH_3$; $R^{14}$, $R^{15}$: $CH_2OH$; $R^{16}$: $CH_2O$-n-$C_4H_9$
MP-88: $R^{13}$, $R^{16}$: $CH_2O$-n-$C_4H_9$; $R^{14}$: $CH_2OCH_3$; $R^{15}$: $CH_2OH$
MP-89: $R^{13}$: $CH_2OH$; $R^{14}$: $CH_2OCH_3$; $R^{15}$: $CH_2O$-n-$C_4H_9$; $R^{16}$; $CH_2NHCOCH=CH_2$
MP-90: $R^{13}$: $CH_2OH$; $R^{14}$: $CH_2OCH_3$; $R^{15}$: $CH_2NHCOCH=CH_2$; $R^{16}$: $CH_2O$-n-$C_4H_9$
MP-91: $R^{13}$: $CH_2OH$; $R^{14}$: $CH_2O$-n-$C_4H_9$; $R^{15}$: $CH_2NHCOCH=CH_2$; $R^{16}$: $CH_2OCH_3$
MP-92: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$
MP-93: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$
MP-94: $R^{13}$: $CH_2O$-n-$C_4H_9$; $R^{14}$: $CH_2OCH_3$; $R^{15}$: $CH_2OH$; $R^{16}$: $CH_2NHCOCH=CH_2$
MP-95: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-96: $R^{13}$: $CH_2OH$; $R^{14}$: $CH_2OCH_3$; $R^{15}$: $CH_2NHCO=CH_2$; $R^{16}$: $CH_2NHCO(CH_2)_7CH=CH(CH_2)_7CH_3$
MP-97: $R^{13}$: $CH_2OH$; $R^{14}$: $CH_2NHCO(CH_2)_7CH=CH(CH_2)_7CH_3$; $R^{15}$ $CH_2NHCOCH=CH_2$; $R^{16}$: $CH_2OCH_3$
MP-98: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$
MP-99: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$
MP-100: $R^{13}$: $CH_2NHCO(CH_2)_7CH=CH(CH_2)_7CH$; $R^{14}$: $CH_2OCH_3$; $R^{15}$: $CH_2OH$; $R^{16}$: $CH_2NHCOCH=CH_2$ (MP-101)~(MP-150)

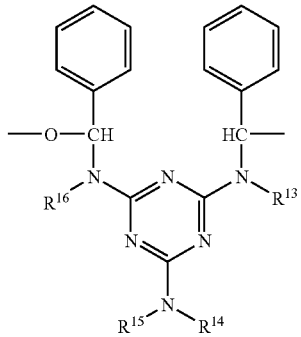

MP-101: $R^{13}$, $R^{14}$, $R^{15}$, $R^{16}$: $CH_2OH$
MP-102: $R^{13}$, $R^{14}$, $R^{15}$, $R^{16}$: $CH_2OCH_3$
MP-103: $R^{13}$, $R^{14}$, $R^{15}$, $R^{16}$: $CH_2O$-i-$C_4H_9$
MP-104: $R^{13}$, $R^{14}$, $R^{15}$, $R^{16}$: $CH_2O$-n-$C_4H_9$
MP-105: $R^{13}$, $R^{14}$, $R^{15}$, $R^{16}$: $CH_2NHCOCH=CH_2$
MP-106: $R^{13}$, $R^{14}$, $R^{15}$, $R^{16}$: $CH_2NHCO(CH_2)_7CH=CH(CH_2)_7CH_3$
MP-107: $R^{13}$, $R^{14}$, $R^{15}$: $CH_2OH$; $R^{16}$: $CH_2OCH_3$
MP-108: $R^{13}$, $R^{14}$, $R^{16}$, $CH_2OCH$; $R^{15}$: $CH_2OCH_3$,
MP-109: $R^{13}$, $R^{14}$: $CH_2OH$; $R^5$, $R^{16}$: $CH_2OCH_3$
MP-110: $R^{13}$, $R^{16}$: $CH_2OH$; $R^5$, $R^{16}$: $CH_2OCH_3$
MP-111: $R^{13}$: $CH_2OH$; $R^{14}$ $R^{15}$, $R^{16}$: $CH_2OCH_3$
MP-112: $R^{13}$, $R^{14}$, $R^{16}$: $CH_2OCH_3$; $R^{15}$: $CH_2OH$
MP-113: $R^{13}$, $R^{16}$: $CH_2OCH_3$; $R^{14}$, $R^{15}$: $CH_2OH$
MP-114: $R^{13}$, $R^{14}$, $R^{15}$: $CH_2OH$; $R^{16}$: $CH_2O$-n-$C_4H_9$
MP-115: $R^{13}$, $R^{14}$, $R^{16}$: $CH_2OH$; $R^{15}$: $CH_2O$-n-$C_4H_9$
MP-116: $R^{13}$, $R^{14}$: $CH_2OH$; $R^{14}$, $R^{15}$: $CH_2O$-n-$C_4H_9$
MP-117: $R^{13}$, $R^{16}$: $CH_2OH$; $R^{14}$, $R^{15}$: $CH_2O$-i-$C_4H_9$
MP-118: $R^{13}$: $CH_2OH$; $R^{14}$, $R^{15}$, $R^{16}$: $CH_2O$-i-$C_4H_9$
MP-119: $R^{13}$, $R^{14}$, $R^{16}$: $CH_2O$-i-$C_4H_9$; $R^{15}$: $CH_2OH$
MP-120: $R^{13}$, $R^{16}$: $CH_2O$-i-$C_4H_9$; $R^{14}$, $R^{15}$: $CH_2OH$
MP-121: $R^{13}$, $R^{14}$, $R^{15}$: $CH_2OH$; $R^{16}$: $CH_2O$-n-$CH_2$
MP-122: $R^{13}$, $R^{14}$, $R^{16}$: $CH_2OH$; $R^{15}$: $CH_2O$-n-$C_4H_9$
MP-123: $R^{13}$, $R^{14}$: $CH_2OH$; $R^{15}$, $R^{16}$: $CH_2O$-n-$C_4H_9$
MP-124: $R^{13}$, $R^{16}$: $CH_2OH$; $R^{14}$, $R^{15}$: $CH_2O$-n-$C_4H_9$
MP-125: $R^{13}$: $CH_2OH$; $R^{14}$, $R^{15}$, $R^{16}$: $CH_2O$-n-$C_4H_9$
MP-126: $R^{13}$, $R^{14}$, $R^{16}$: $CH_2O$-n-$C_4H_9$; $R^{15}$: $CH_2OH$
MP-127: $R^{13}$, $R^{16}$: $CH_2O$-n-$C_4H_9$; $R^{14}$, $R^{15}$: $CH_2OH$
MP-128: $R^{13}$, $R^{14}$: $CH_2OH$; $R^{15}$: $CH_2OCH$; $R^{16}$: $CH_2O$-n-$C_4H_9$
MP-129: $R^{13}$, $R^{14}$: $CH_2OH$; $R^{15}$: $CH_2$-n-$C_4H_9$; $R^{16}$: $CH_2OCH_3$
MP-130: $R^{13}$, $R^{16}$: $CH_2OH$; $R^{14}$: $CH_2OCH_3$; $R^{15}$: $CH_2O$-n-$C_4H_9$
MP-131: $R^{13}$: $CH_2OH$; $R^{14}$, $R^{15}$: $CH_2OCH_3$; $R^{16}$: $CH_2O$-n-$C_4H_9$
MP-132: $R^{13}$: $CH_2OH$; $R^{14}$, $R^{16}$: $CH_2OCH_3$; $R^{15}$: $CH_2O$-n-$C_4H_9$
MP-133: $R^{13}$: $CH_2OH$; $R^{14}$ $CH_2OCH_3$; $R^{15}$, $R^{16}$: $CH_2$-n-$C_4H_9$
MP-134: $R^{13}$: $CH_2OH$; $R^{14}$, $R^{15}$: $CH_2O$-n-$C_4H_9$; $R^{16}$: $CH_2OCH_3$
MP-135: $R^{13}$, $R^{14}$: $CH_2OCH_3$; $R^{15}$: $CH_2OH$; $R^{16}$: $CH_2O$-n-$C_4H_9$
MP-136: $R^{13}$, $R^{16}$: $CH_2OCH_3$; $R^{14}$: $CH_2OH$; $R^{15}$: $CH_2O$-n-$C_4H_9$
MP-137: $R^{13}$: $CH_2OCH_3$; $R^{14}$, $R^{15}$: $CH_2OH$; $R^{16}$: $CH_2O$-n-$C_4H_9$
MP-138: $R^{13}$, $R^{16}$: $CH_2O$-n-$C_4H_9$; $R^{14}$: $CH_2OCH_3$; $R^{15}$: $CH_2OH$

MP-139: $R^{13}$: $CH_2OH$; $R^{14}$: $CH_2OCH_3$; $R^{15}$: $CH_2O$-n-$C_4H_9$; $R^{16}$: $CH_2NHCOCH=CH_2$
MP-140: $R^{13}$: $CH_2OH$; $R^{14}$: $CH_2OCH_3$; $R^{15}$: $CH_2NHCOCH=CH_2$; $R^{16}$ $CH_2O$-n-$C_4H_9$
MP-141: $R^{13}$: $CH_2OH$; $R^{14}$: $CH_2O$-n-$C_4H_9$; $R^{15}$: $CH_2NHCOCH=CH$; $R^{16}$: $CH_2OCH_3$
MP-142: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$
MP-143: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$
MP-144: $R^{16}$: $CH_2O$-n-$C_4H_9$; $R^{14}$: $CH_2OCH_3$; $R^{15}$: $CH_2OH$; $R^{16}$: $CH_2NHCOCH=CH_2$
MP-145: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-146: $R^{13}$: $CH_2OH$; $R^{14}$: $CH_2OCH_3$; $R^{15}$: $CH_2NHCO=CH_2$; $R^{16}$ $CH_2NHCO(CH_2)_7CH=CH(CH_2)_7CH_3$
MP-147: $R^{13}$: $CH_2OH$; $R^{14}$: $CH_2NHCO(CH_2)_7CH=CH(CH_2)_7CH_3$; $R^{15}$: $CH_2NHCOCH=CH_2$; $R^{16}$: $CH_2OCH_3$
MP-148: $R^{16}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$
MP-149: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$
MP-150: $R^{13}$: $CH_2NHCO(CH_2)_7CH=CH(CH_2)_7CH_3$; $R^{14}$: $CH_2OCH_3$; $R^{15}$: $CH_2OH$; $R^{16}$: $CH_2NHCOCH=CH_2$

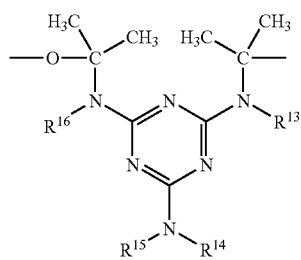

(MP-151)~(MP-200)

MP-151: $R^{13}$, $R^{14}$, $R^{15}$, $R^{16}$ $CH_2OH$
MP-152: $R^{13}$, $R^{14}$, $R^{15}$, $R^{16}$: $CH_2OCH_3$
MP-153: $R^{13}$, $R^{14}$, $R^{15}$, $R^{16}$: $CH_2O$-i-$C_4H_9$
MP-154: $R^{13}$, $R^{14}$, $R^{15}$, $R^{16}$: $CH_2O$-n-$C_4H_9$
MP-155: $R^{13}$, $R^{14}$, $R^{15}$, $R^{16}$: $CH_2NHCOCH=CH_2$
MP-156: $R^{13}$, $R^{14}$, $R^{15}$, $R^{16}$ $CH_2NHCO(CH_2)_7CH=CH(CH_2)_7CH_3$
MP-157: $R^{13}$, $R^{14}$, $R^{15}$: $CH_2OH$; $R^{16}$ $CH_2OCH_3$
MP-158: $R^{13}$, $R^{14}$, $R^{16}$: $CH_2OH$; $R^{15}$: $CH_2OCH_3$,
MP-159: $R^{13}$, $R^{14}$: $CH_2OH$; $R^{15}$, $R^{16}$: $CH_2OCH_3$
MP-160: $R^{13}$, $R^{16}$: $CH_2OH$; $R^{14}$, $R^{15}$: $CH_2OCH_3$
MP-161: $R^{13}$: $CH_2OH$; $R^{14}$ $R^{15}$, $R^{16}$: $CH_2OCH_3$
MP-162: $R^{13}$, $R^{14}$, $R^{16}$: $CH_2OCH_3$; $R^{15}$: $CH_2OH$
MP-163: $R^{13}$, $R^{16}$: $CH_2OCH_3$; $R^{14}$, $R^{15}$: $CH_2OH$
MP-164: $R^{13}$, $R^{14}$, $R^{15}$: $CH_2H$; $R^{16}$: $CH_2O$-i-$C_4H_9$
MP-165: $R^{13}$, $R^{14}$, $R^{16}$: $CH_2OH$; $R^{15}$: $CH_2O$-i-$C_4H_9$
MP-166: $R^{13}$, $R^{14}$: $CH_2OH$; $R^{15}$, $R^{16}$: $CH_2O$-i-$C_4H_9$
MP-167: $R^{13}$, $R^{16}$: $CH_2OH$; $R^{14}$, $R^{15}$: $CH_2O$—$C_4H_9$
MP-168: $R^{13}$: $CH_2OH$; $R^{14}$, $R^{15}$, $R^{16}$: $CH_2O$-i-$C_4H_9$
MP-169: $R^{13}$, $R^{14}$, $R^{16}$: $CH_2O$-i-$C_4H_9$; $R^{15}$: $CH_2OH$
MP-170: $R^{13}$, $R^{16}$: $CH_2O$-i-$C_4H_9$; $R^{14}$, $R^{15}$: $CH_2OH$
MP-171: $R^{13}$, $R^{14}$, $R^{15}$: $CH_2OH$; $R^{16}$: $CH_2O$-n-$C_4H_9$
MP-172: $R^{13}$, $R^{14}$, $R^{16}$: $CH_2OH$; $R^{15}$: $CH_2O$-n-$C_4H_9$
MP-173: $R^{13}$, $R^{14}$: $CH_2OH$; $R^{15}$, $R^{15}$: $CH_2O$-n-$C_4H_9$
MP-174: $R^{13}$, $R^{16}$: $CH_2OH$; $R^{14}$, $R^{15}$: $CH_2O$-n-$C_4H_9$
MP-175: $R^{13}CH_2OH$; $R^{14}$ $R^{15}$, $R^{16}$: $CH_2O$-n-$C_4H_9$
MP-176: $R^{13}$, $R^{14}$, $R^{16}$: $CH_2O$-n-$C_4H_9$; $R^{15}$: $CH_2OH$
MP-177: $R^{13}$, $R^{16}$: $CH_2O$-n-$C_4H_9$; $R^{14}$, $R^{15}$: $CH_2OH$
MP-178: $R^{13}$, $R^{14}$: $CH_2OH$; $R^{15}$: $CH_2OCH_3$; $R^{16}$: $CH_2O$-n-$C_4H_9$
MP-179: $R^{13}$, $R^{14}$: $CH_2OH$; $R^{15}$: $CH_2$-n-$C_4H_9$; $R^{16}$: $CH_2OCH_3$
MP-180: $R^{13}$, $R^{16}$: $CH_2OH$; $R^{14}$: $CH_2OCH_3$; $R^{15}$: $CH_2O$-n-$C_4H_9$
MP-181: $R^{13}$: $CH_2OH$; $R^{14}$, $R^{15}$: $CH_2OCH_3$; $R^{16}$: $CH_2O$-n-$C_4H_9$
MP-182: $R^{13}$: $CH_2OH$; $R^{14}$, $R^{16}$: $CH_2OCH_3$; $R^{15}$: $CH_2O$-n-$C_4H_9$
MP-183: $R^{13}$: $CH_2OH$; $R^{14}$: $CH_2OCH_3$; $R^{15}$, $R^{16}$: $CH_2O$-n-$C_4H_9$
MP-184: $R^{13}$: $CH_2OH$; $R^{14}$, $R^{15}$: $CH_2O$-n-$C_4H_9$; $R^{16}$: $CH_2OCH_3$
MP-185: $R^{13}$, $R^{14}$: $CH_2OCH_3$; $R^{15}$: $CH_2OH$; $R^{16}$: $CH_2O$-n-$C_4H_9$
MP-186: $R^{13}$, $R^{16}$: $CH_2OCH_3$; $R^{14}$: $CH_2OH$; $R^{15}$: $CH_2O$-n-$C_4H_9$
MP-187: $R^{13}$: $CH_2OCH_3$; $R^{14}$, $R^{15}$: $CH_2OH$; $R^{16}$: $CH_2O$-n-$C_4H_1$
MP-188: $R^{13}$, $R^{16}$: $CH_2$-n-$C_4H_9$; $R^{14}$: $CH_2OCH$; $R^{15}$: $CH_2OH$
MP-189: $R^{13}$: $CH_2OH$; $R^{14}$: $CH_2OCH_3$; $R^{15}$: $CH_2O$-n-$C_4H_9$: $CH_2NHCOCH=CH_2$
MP-190: $R^{13}$: $CH_2OH$; $R^{14}$: $CH_2OCH_3$; $R^{15}$: $CH_2NHCOCH=CH_2$; $R^{16}$ $CH_2O$-n-$C_4H_9$
MP-191: $R^{13}$: $CH_2OH$; $R^{14}$: $CH_2O$-n-$C_4H_9$; $R^{16}$: $CH_2NHCOCH=CH_2$; $R^{16}$: $CH_2OCH_3$
MP-192: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$
MP-193: $R^{13}$: $CH_2OCH_3$; $R^{14}$: $CH_2OH$; $R^{10}$: $CH_2NHCOCH=CH_2$; $R^{16}$: $CH_2O$-n-$C_4H_9$
MP-194: $R^{13}$: $CH_2O$-n-$C_4H_9$; $R^{14}$: $CH_2OCH_3$, $R^{15}$: $CH_2OH$; $R^{16}$: $CH_2NHCOCH=CH_2$
MP-195: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-196: $R^{13}$: $CH_2OH$; $R^{14}$: $CH_2OCH_3$; $R^{15}$: $CH_2NHCO=CH$—; $R^{16}$: $CH_2NHCO(CH_2)_7CH=CH(CH_2)_7CH_3$
MP-197: $R^{13}$: $CH_2OH$; $R^{14}$: $CH_2NHCO(CH_2)_7CH=CH(CH_2)_7CH_3$; $R^{15}$ $CH_2NHCOCH=CH_2$; $R^{16}$: $CH_2OCH_3$
MP-198: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$
MP-199: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_2$
MP-200: $R^{16}$: $CH_2NHCO(CH_2)_7CH=CH(CH_2)_7CH_3$; $R^{14}$: $CH_2OCH_3$; $R^{15}$: $CH_2OH$; $R^{16}$: $CH_2NHCOCH=CH_2$

In the present invention, employed may be copolymers in which at least two types of the above repeating units are combined.

Further, simultaneously employed may be at least two types of compounds having a 1,3,5-triazine ring. Also simultaneously employed may be at least two types of disk shaped compounds (for example, compounds having a 1,3,5-triazine ring and compounds having a porphyrin skeleton).

The amount of these additives is preferably 0.2-30% by weight with respect to a cellulose ester film, is particularly preferably 1-20% by weight.

Moreover, a triazine type compound shown in general formula (I) of Japanese Patent O.P.I. Publication No. 2001-235621 is also preferably used for a cellulose ester film according to the present invention.

A cellulose ester film according to the present invention desirably contains two or more kinds of UV absorbers.

Moreover, as a UV absorber, a macromolecule UV absorber can also be used preferably, especially a polymer type UV absorber described in Japanese Patent O.P.I. Publication No. 6-148430 can be used preferably.

A cellulose ester film according to the present invention desirably contains a ultraviolet-ray absorptivity copolymerization polymer synthesized from a ultraviolet-ray absorptivity monomer represented by the following general formula (21).

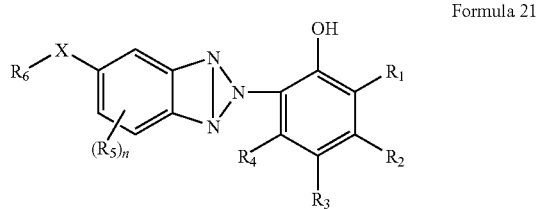

Formula 21

In the above formula, n is an integer of from 0 to 3, $R_1$ through $R_5$ are each a hydrogen atom, a halogen tom or a substituent, X is a —COO— group, a $CONR_7$— group or an —$NR_7$CO— group, $R_6$, is a hydrogen atom, an alkyl group or an aryl group, and $R_7$ is a hydrogen atom, an alkyl group or an aryl group, provided that the group represented by $R_6$ has a polymerizable group as a partial structure.

In the present invention, it is more desirable to make a cellulose ester film contain with a polymer used for the present invention a macromolecule UV absorber with which a deposit etc. does not occur as easily as the above low molecule UV absorber, whereby ultraviolet rays can fully be omitted in a stable state that dimensional stability, permanence properties, water-vapor permeability, etc are not spoiled and phase separation is not caused in a film. As the macromolecule UV absorber, a macromolecule UV absorber disclosed in Japanese Patent O.P.I. Publication No. 6-148430 or a polymer containing a UV absorber monomer can be used without restriction.

Especially, in the present invention, it may be preferable to contain a ultraviolet-ray absorptivity copolymerization polymer (macromolecule UV absorber) synthesized from a ultraviolet-ray absorptivity monomer represented by the above general formula (21).

In Formula (21), n is an integer of from 0 to 3, and plural groups represented by $R_5$ may be the same as or different from each other and may be bonded together with to form a 5- through 7-member ring.

$R_1$ through $R_5$ are each a hydrogen atom, a halogen atom or a substituent. Examples of the halogen atom include a fluorine atom, a chlorine atom, a bromine atom and an iodine atom, and preferably the fluorine atom and the chlorine atom. Examples of the substituent include an alkyl group such as a methyl group, an ethyl group, an isopropyl group, a hydroxyethyl group, a methoxymethyl group, a trifluoromethyl group and a t-butyl group, an alkenyl group such as a vinyl group, an allyl group and a 3-butene-1-yl group, an aryl group such as a phenyl group, a naphthyl group, a p-tolyl group and a p-chlorophenyl group, a heterocyclic group such as a pyridyl group, a benzimidazolyl group, a benzothiazolyl group and a benzoxazolyl group, an alkoxy group such as a methoxy group, an ethoxy group, an isopropoxy group and an n-butoxy group, an aryloxy group such as a phenoxy group, a heteocycloxy group such as a 1-phenyltetrazole-5-oxy group, a 2-tetrahydropyranyloxy group, an acyloxy group such as an acetoxy group, pivaloyloxy group and a benzoyloxy group, an acyl group such as an acetyl group, an isopropanoyl group and a butyloyl group, an alkoxycarbonyl group such as a methoxycarbonyl group and an ethoxycarbonyl group, an aryloxycarbonyl group such as a phenoxycarbonyl group, a carbamoyl group such as a methylcarbamoyl group, an ethylcarbamoyl group and a dimethylcarbamoyl group, an amino group, an alkylamino group such as a methylamino group, an ethylamino group and a diethylamino group, an aniline group such as an aniline group and an N-methylanilino group, an acylamino group such as an acetylamino group and a propionylamino group, a hydroxyl group, a cyano group, a nitro group, a sulfonamide group such as a methanesulfonamido group and a benzenesulfonamido group, a sulfamoylamino group such as a dimethylsulfamoylamino group, a sulfonyl group such as a methanesulfonyl group, a butanesulfonyl group and a phenylsulfonyl group, a sulfamoyl group such as an ethylsulfamoyl group and dimethylsulfamoyl group, a sulfonylamino group such as a methanesulfonylamino group and a benzenesulfonylamino group, a ureido group such as a 3-methylureido group, a 3,3-dimethylureido group and a 1,3-dimethylureido, an imido group such as a phthalimido group, a silyl group such as a trimethylsilyl group, a triethylsilyl group and t-butyldimethylsilyl group, an alkylthio group such as a methylthio group, an ethylthio group and an n-butylthio group, an arylthio group such as a phenylthio group, and the alkyl group and aryl group are preferable.

In Formula (21), the groups represented by $R_1$ through $R_5$ each may have a substituent when the group can be substituted, and adjacent $R_1$ through $R_4$ may be bonded to for a 5- to 7-member ring.

$R_6$ is a hydrogen atom, an alkyl group, an alkenyl group, an alkynyl group, an aryl group or a heterocyclic group. The alkyl group is, for example, a methyl group, an ethyl group, a propyl group, an isopropyl group, an n-butyl group, an isobutyl group, a t-butyl group, an amyl group, an isoamyl group and a hexyl group. The alkyl group may further have a halogen atom or a substituent. The halogen atom is, for example, a fluorine atom, a chlorine atom, a bromine atom and an iodine atom. Examples of the substituent include an aryl group such as a phenyl group, a naphthyl group, a p-tolyl group and a p-chlorophenyl group, an acyl group such as an acetyl group, a propanoyl group and butyloyl group, an alkoxy group such as a methoxy group, an ethoxy group, an isopropoxy group and an n-butoxy group, an aryloxy group such as a phenoxy group, an amino group, an alkylamino group such as a methylamino group, an ethylamino group and a diethylamino group, an anilino group such as an anilino group and an N-methylanilino group, an acylamino group such as an acetylamino group and a propionylamino group, a hydroxyl group, a cyano group, a carbamoyl group such as a methylcarbamoyl group, an ethylcarbamoyl group and a dimethylcarbamoyl group, an acyloxy group such as an acetoxy group, a pivaloyloxy group and a benzoyloxy group, an alkoxycarbonyl group such as a methoxycarbamoyl group and ethoxycarbonyl group, and an aryloxycarbonyl group such as phenoxycarbonyl group.

As the cycloalkyl group, a saturated cyclic hydrocarbon group such as a cyclopentyl group, a cyclohexyl group, a norbornyl group and adamantyl group can be exemplified. Such the groups may be unsubstituted or substituted.

Examples of the alkenyl group include a vinyl group, an allyl group, a 1-methyl-2-propenyl group, a 3-butenyl group, a 2-butenyl group, a 3-methyl-2-butenyl group and an oreyl group, and the vinyl group, and the 1-methyl-2-propenyl group is preferable.

Examples of the alkynyl group include an ethynyl group, a butynyl group, a phenylethynyl group, a propalgyl group, a 1-methyl-2-propynyl group, a 2-butynyl group and a 1,1-dimethyl-2-propynyl group, and the ethynyl group and the propalgyl group are preferable.

Examples of the aryl group include a phenyl group, a naphthyl group and an anthranyl group. The aryl group may have a halogen atom or a substituent. As the halogen atom, a fluorine atom, a chlorine atom, a bromine atom and an iodine atom can be exemplified. Examples of the substituent include an alkyl group such as a methyl group, an ethyl group, an isopropyl group, a hydroxyethyl group, a methoxymethyl group, a trifluoromethyl group and a t-butyl group, an acyl group such as an acetyl group, a propanoyl group and a butyloyl group, an alkoxy group such as a methoxy group, an ethoxy group, an isopropoxy group and an n-butoxy group, an aryloxy group such as a phenoxy group, an amino group, an alkylamino group such as a methylamino group, an ethylamino group and a diethylamino group, an anilino group such as an anilino group and an N-methylamino group, an acylamino group such as an acetylamino group and a propionyl amino group, a hydroxyl group, a cyano group, a carbamoyl group such as a methylcarbamoyl group, an ethylcarbamoyl group and a dimethylcarbamoyl group, an acyloxy group such as an acetoxy group, a pivaloyloxy group and a benzoyloxy group, an alkoxycarbonyl group such as a methoxycarbonyl group and an ethoxycarbonyl group, and an aryloxycarbonyl group such as a phenoxycarbonyl group.

As the heterocyclic group, a pyridyl group, a benzimidazolyl group, a benzothiazolyl group and a benzoxazolyl group can be exemplified. $R_6$ is preferably the alkyl group.

In Formula (21), X is a —COO— group, a —CONR$_7$— group, a —OCO— group or an —NR$_7$CO— group.

$R_7$ is a hydrogen atom, an alkyl group, a cycloalkyl group an aryl group or a heterocyclic group. The alkyl group is, for example, a methyl group, an ethyl group, a propyl group, an isopropyl group, an n-butyl group, an isobutyl group, a t-butyl group, an amyl group, an isoamyl group or a hexyl group. The alkyl group may further have a halogen atom or a substituent. The halogen atom is, for example, a fluorine atom, a chlorine atom, a bromine atom or an iodine atom. Examples of the substituent include an aryl group such as a phenyl group, a naphthyl group, a p-tolyl group and a p-chlorophenyl group, an acyl group such as an acetyl group, a propanoyl group and butyloyl group, an alkoxy group such as a methoxy group, an ethoxy group, an isopropoxy group and an n-butoxy group, an aryloxy group such as a phenoxy group, an amino group, an alkylamino group such as a methylamino group, an ethylamino group and a diethylamino group, an anilino group such as an anilino group and an N-methylanilino group, an acylamino group such as an acetylamino group and a propionylamino group, a hydroxyl group, a cyano group, a carbamoyl group such as a methylcarbamoyl group, an ethylcarbamoyl group and a dimethylcarbamoyl group, an acyloxy group such as an acetoxy group, a pivaloyloxy group and a benzoyloxy group, an alkoxycarbonyl group such as a methoxycarbamoyl group and ethoxycarbonyl group, and an aryloxycarbonyl group such as phenoxycarbonyl group.

As the cycloalkyl group, a saturated cyclic hydrocarbon group such as a cyclopentyl group, a cyclohexyl group, a norbornyl group and adamantyl group can be exemplified. Such the groups may be unsubstituted or substituted.

Examples of the aryl group include a phenyl group, a naphthyl group and an anthranyl group. The aryl group may further have a halogen atom or a substituent. As the halogen atom, a fluorine atom, a chlorine atom, a bromine atom and an iodine atom can be exemplified. Examples of the substituent include an alkyl group such as a methyl group, an ethyl group, an isopropyl group, a hydroxyethyl group, a methoxymethyl group, a trifluoromethyl group and a t-butyl group, an acyl group such as an acetyl group, a propanoyl group and a butyloyl group, an alkoxy group such as a methoxy group, an ethoxy group, an isopropoxy group and an n-butoxy group, an aryloxy group such as a phenoxy group, an amino group, an alkylamino group such as a methylamino group, an ethylamino group and a diethylamino group, an anilino group such as an anilino group and an N-methylamino group, an acylamino group such as an acetylamino group and a propionylamino group, a hydroxyl group, a cyano group, a carbamoyl group such as a methylcarbamoyl group, an ethylcarbamoyl group and a dimethylcarbamoyl group, an acyloxy group such as an acetoxy group, a pivaloyloxy group and a benzoyloxy group, an alkoxycarbonyl group such as a methoxycarbonyl group and an ethoxycarbonyl group, and an aryloxycarbonyl group such as a phenoxycarbonyl group.

As the heterocyclic group, a pyridyl group, a benzimidazolyl group, a benzothiazolyl group and a benzoxazolyl group can be exemplified. $R_7$ is preferably the hydrogen atom.

In the invention, the polymerizable group is a unsaturated ethylenic polymerizable group or a di-functional condensation-polymerizable group, and preferably the unsaturated ethylenic polymerizable group. Concrete examples of the unsaturated ethylenic polymerizable group include a vinyl group, an allyl group, an acryloyl group, a methacryloyl group, a styryl group, an acrylamido group, a methacrylamido group, a vinyl cyanide group, a 2-cyanoacryloxy group, a 1,2-epoxy group, a vinylbenzyl group and a vinyl ether group and preferably the vinyl group, the acryloyl group, the methacryloyl group, the acrylamido group and the methacrylamido group. The UV absorbing monomer having the polymerizable group as the partial structure thereof is the monomer in which the polymerizable group is bonded directly or through two or more bonding groups to the UV absorbent, for example an alkylene group such as a methylene group, a 1,2-ethylene group, a 1,3-propylene group, a 1,4-butylene group and a cyclohexane-1,4-diyl group, an alkenylene group such as an ethane-1,2-diyl group and a butadiene-1,4-diyl group, an alkynylene group such as a etyne-1,2-diyl group, a butane-1,3-diine-1,4-diyl, a bonding group derived from a compound including an aromatic group such as a substituted or unsubstituted benzene, a condensed polycyclic hydrocarbon, an aromatic heterocyclic rings, a combination of aromatic hydrocarbon rings and a combination of aromatic heterocyclic rings, and bonding by a hetero atom such as an oxygen atom, a sulfur atom, a nitrogen atom, a silicon atom and a phosphor atom. The bonding group is preferably the alkylene group and the bonding by the hetero atom. These bonding groups may be combined for forming a composite bonding group. The weight average molecular weight of the polymer derived from the UV absorbing monomer is from 2,000 to 30,000, and preferably from 5,000 to 20,000.

The weight average molecular weight of the UV absorbing copolymer can be controlled by known molecular weight controlling methods. For controlling the molecular weight, for example, a method can be applied in which a chain transferring agent such as carbon terachloride, laurylmercptane and octyl thioglycolate is employed. The polymerization is usually performed at a temperature of from a room temperature to 130° C., and preferably from 50 to 100° C.

The UV absorbing polymer to be employed in the invention is preferably a copolymer of the UV absorbing monomer and another polymerizable monomer. Examples of the other monomer capable of polymerizing include a unsaturated compound, for example, a styrene derivative such as styrene, α-methylstyrene, o-methylstyrene, m-methylstyrene, p-methylstyrene and vinylnephthalene, an acrylate derivative such as methyl acrylate, ethyl acrylate, propyl acrylate, butyl acrylate, i-butyl acrylate, t-butyl acrylate, octyl acrylate, cyclohexyl acrylate and benzyl acrylate, a methacrylate derivative such as methyl methacrylate, ethyl methacrylate, propyl methacrylate, butyl methacrylate, i-butyl methacrylate, t-butyl methacrylate, octyl methacrylate, cyclohexyl methacrylate and benzyl methacrylate, an alkyl vinyl ether such as methyl vinyl ether, ethyl vinyl ether and butyl vinyl ether, an alkyl vinyl ester such as vinyl formate, vinyl acetate, vinyl butylate, vinyl capronate and vinyl stearate, crotonic acid, maleic acid, fumaric acid, itaconic acid, acrylonitrile, methacrylonitrile, vinyl chloride, vinylidene chloride, acrylamide and methacrylamide. Methyl acrylate, methyl methacrylate and vinyl acetate are preferred.

It is also preferable that the component other than the UV absorbing monomer in the polymer derived from the UV absorbing monomer contains a hydrophilic ethylenic unsaturated monomer.

As the hydrophilic ethylenic unsaturated monomer, a hydrophilic compound having a polymerizable unsaturated double bond in the molecular thereof is employable without any limitation. For example, a unsaturated carboxylic acid such as acrylic acid and methacrylic acid, an acrylate and methacrylate each having a hydroxyl group or an ether bond such as 2-hydroxyethyl methaceylate, 2-hydroxypropyl methacrylate, tetrahydrofurfuryl methacrylate, 2-hydroxyethyl acrylate, 2-hydroxypropyl acrylate, 2,3-dihydroxy-2-methylpropyl methacrylate, tetrahydrofurfuryl acrylate, 2-ethoxyethyl acrylate, diethylene glycol ethoxylate acrylate and 3-methoxybutylbutyl acrylate, acrylamide, an N-substituted (meth)acrylamido such as N,N-dimethyl(meth)acrylate, N-vinylpyrrolidone and N-vinyloxazolidone are employable.

As the hydrophilic ethylenic unsaturated monomer, a (meth)acrylate having a hydroxyl group or a carboxyl group in the molecule thereof is preferable, and 2-hydroxyethyl methacrylate, 20hydroxypropyl methacrylate, 2-hydroxyethyl acrylate and 2-hydroxypropyl acrylate are particularly preferable.

These polymerizable monomers can be copolymerized solely or in combination of two or more kinds together with the UV absorbing monomer.

In the invention, the method for polymerizing the UV absorbing copolymer is not specifically limited and known methods such as radical polymerization, anion polymerization and cation polymerization can be widely applied. As the initiator for the radical polymerization, an azo compound and a peroxide compound such as azobisisobutylnitrile (ABIN), a diester of azobisisobutylic acid, benzoyl peroxide and hydrogen peroxide are employable. The solvent for polymerization is not specifically limited, and examples of usable solvent include an aromatic hydrocarbon type solvent such as toluene and chlorobenzene, a halogenized hydrocarbon type solvent such as dichloroethane and chloroform, a an ether type solvent such as tetrahydrofuran and dioxane, an amide type solvent such as dimethylformamide, an alcohol type solvent such as methanol, an ester type solvent such as methyl acetate and ethyl acetate, a ketone type solvent such as acetone, cyclohexanone and methyl ethyl ketone, and an aqueous solvent. Solution polymerization in which the polymerization is carried out in a uniform system, precipitation polymerization in which the formed polymer is precipitated, emulsion polymerization in which the polymerization is carried out in a micelle state and suspension polymerization carried out in a suspended state can be performed according to selection of the solvent. However, a ultraviolet-ray absorptivity latex obtained by emulsion polymerization may not be suitable as an optical film application.

The using ratio of the UV absorbing monomer, the polymerizable monomer capable of polymerizing with the UV absorbing monomer and the hydrophilic unsaturated monomer is suitably decided considering the compatibility of the obtained UV absorbing copolymer with the other transparent polymer and the influence on the transparency and the mechanical strength of the optical film.

The content of the UV absorbing monomer in the polymer derived from the UV absorbing monomer is preferably from 1 to 70%, and more preferably from 5 to 60%, by weight. When the content of the UV absorbent monomer in the UV absorbing polymer is less than 1%, addition of a large amount of the UV absorbing polymer is necessary for satisfying the desired UV absorbing ability so that increasing in the haze or lowering in the transparency and the mechanical strength by the precipitation is caused. On the other hand, when the content of the UV absorbing monomer in the UV absorbing polymer exceeds 70% by weight, the transparent optical film is difficulty obtained sometimes since the compatibility of the polymer with another polymer is lowered. Moreover, the solubility to a solvent becomes lower and the working ability in the case of film production and manufacturing efficiency become inferior.

The hydrophilic ethylenic unsaturated monomer is preferably contained in the UV absorbing copolymer in a ratio of from 0.1 to 50% by weight. When the content is less than 0.1%, the improvement effect on the compatibility of the hydrophilic ethylenic unsaturated monomer cannot be obtained and when the content is more than 50% by weight, the isolation and purification of the copolymer becomes impossible. More preferable content of the hydrophilic ethylenic unsaturated monomer is from 0.5 to 20% by weight. When the hydrophilic group is substituted to the UV absorbing monomer itself, it is preferable that the total content of the hydrophilic UV absorbing monomer and the hydrophilic ethylenic unsaturated monomer is within the above-mentioned range.

For satisfying the content of the UV absorbing monomer and the hydrophilic monomer, it is preferable that the an ethylenic unsaturated monomer having no hydrophilicity is further copolymerized additionally to the above two monomers.

Two or more kinds of each of the UV absorbing monomer and hydrophilic or non-hydrophilic ethylenic unsaturated monomer may be mixed and copolymerized.

Typical examples of the UV absorbing monomer to be preferably employed in the invention are listed below, but the monomer is not limited to these samples.

MUV-1

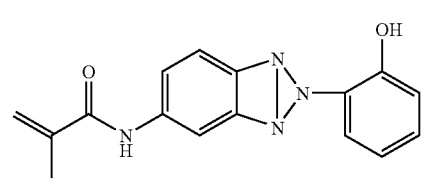

-continued
MUV-2
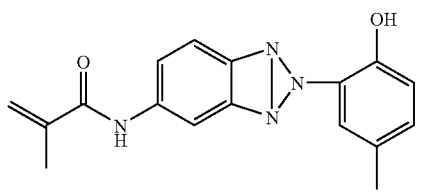
MUV-3
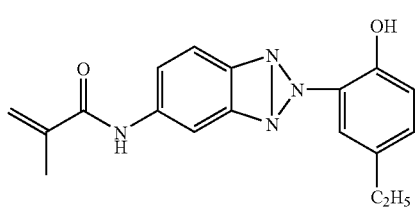
MUV-4
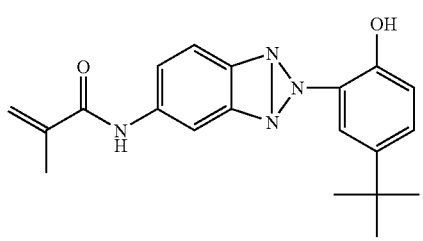
MUV-5
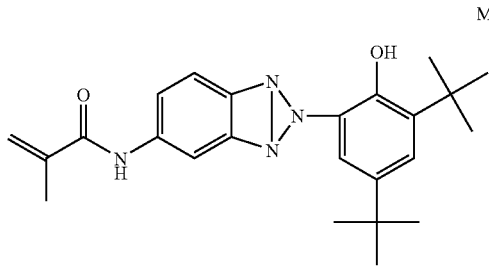
MUV-6
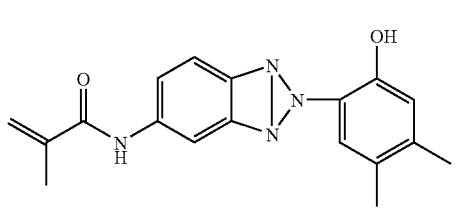
MUV-7
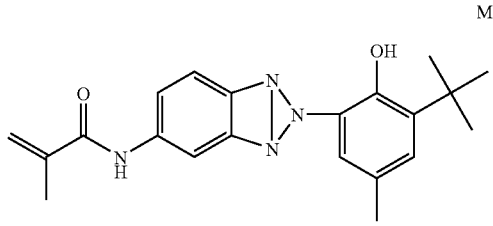
MUV-8
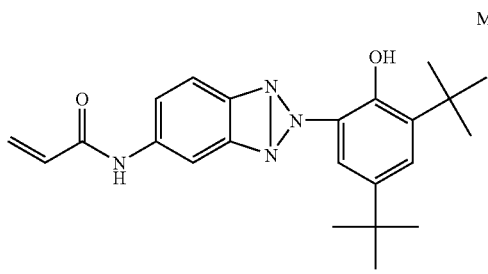
-continued
MUV-9
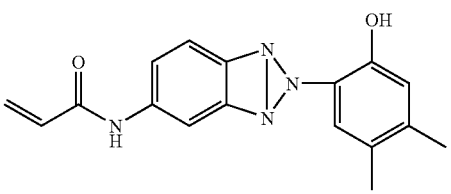
MUV-10
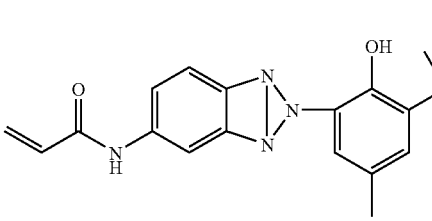
MUV-11
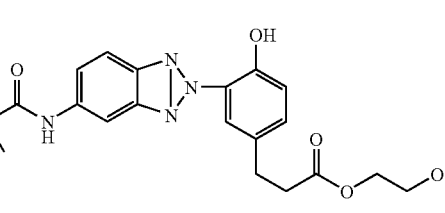
MUV-12
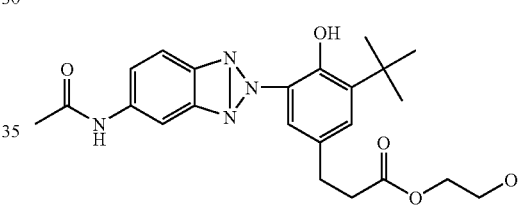
MUV-13
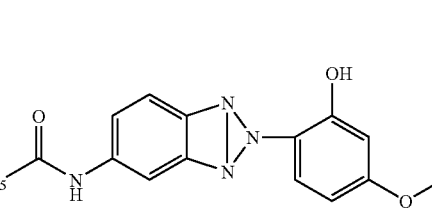
MUV-14
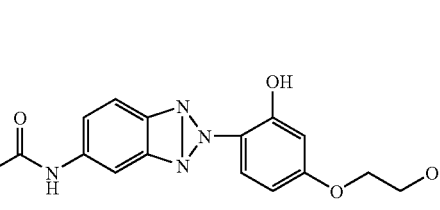
MUV-15
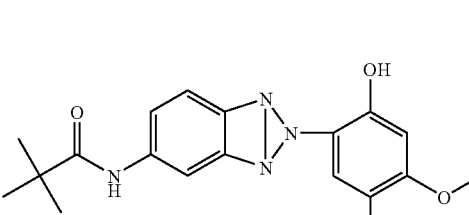

MUV-16
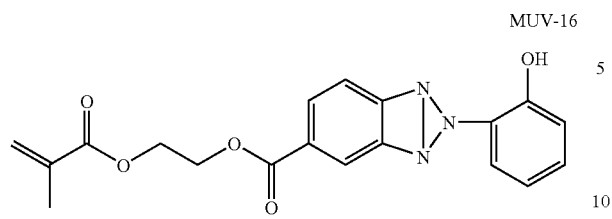
MUV-17
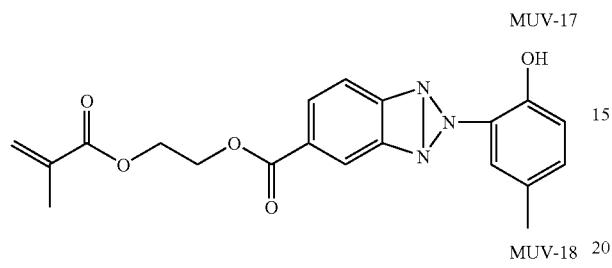
MUV-18
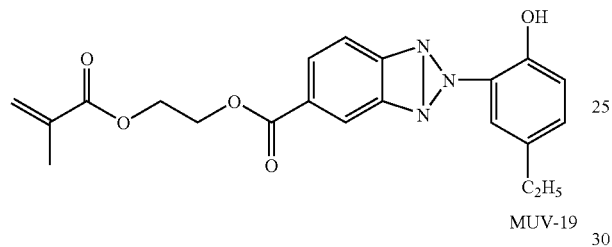
MUV-19
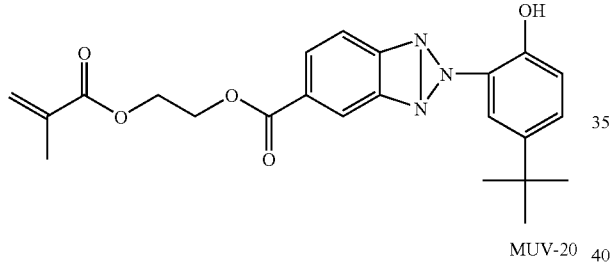
MUV-20
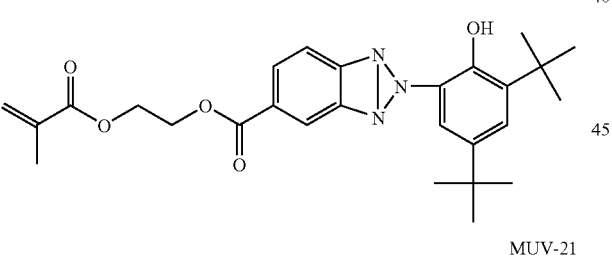
MUV-21
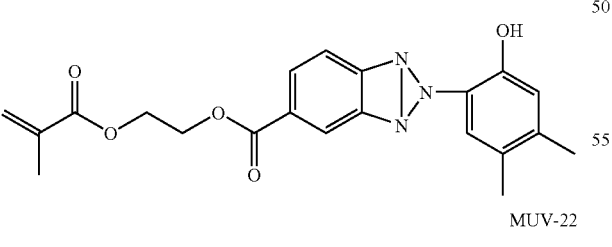
MUV-22
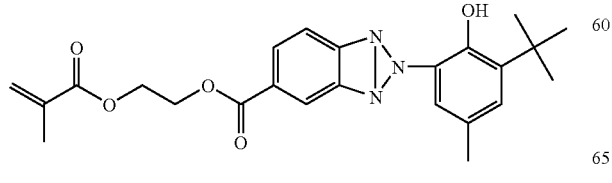
MUV-23
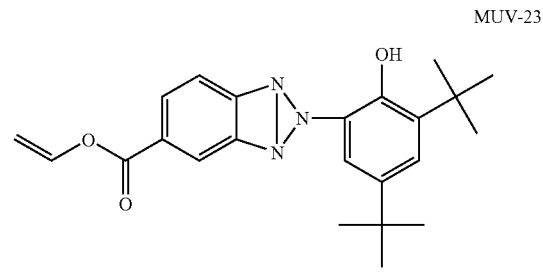
MUV-24
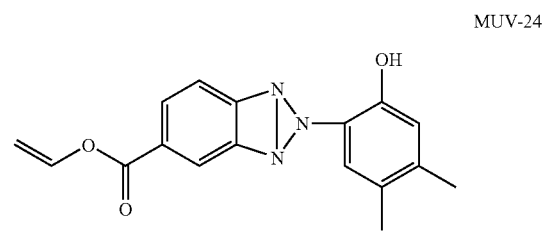
MUV-25
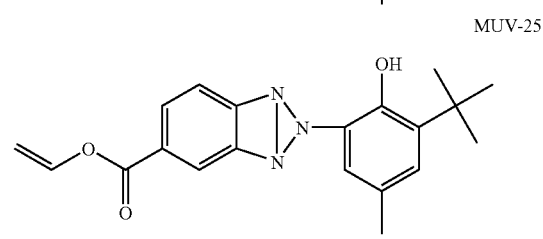
MUV-26
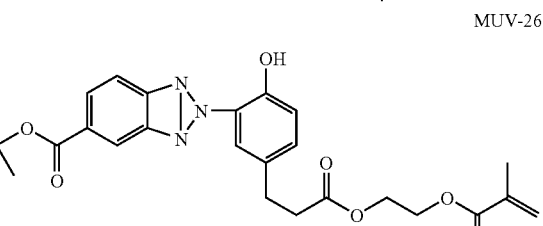
MUV-27
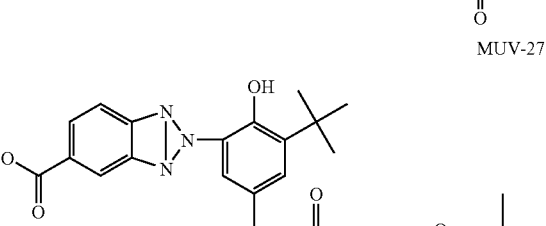
MUV-28
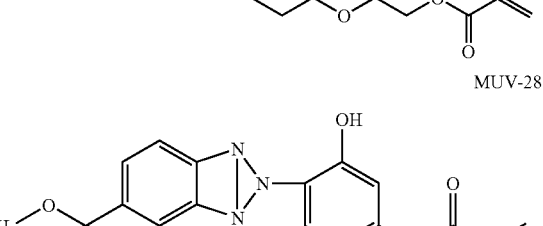
MUV-29
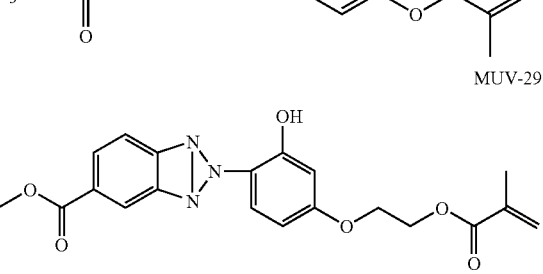

-continued
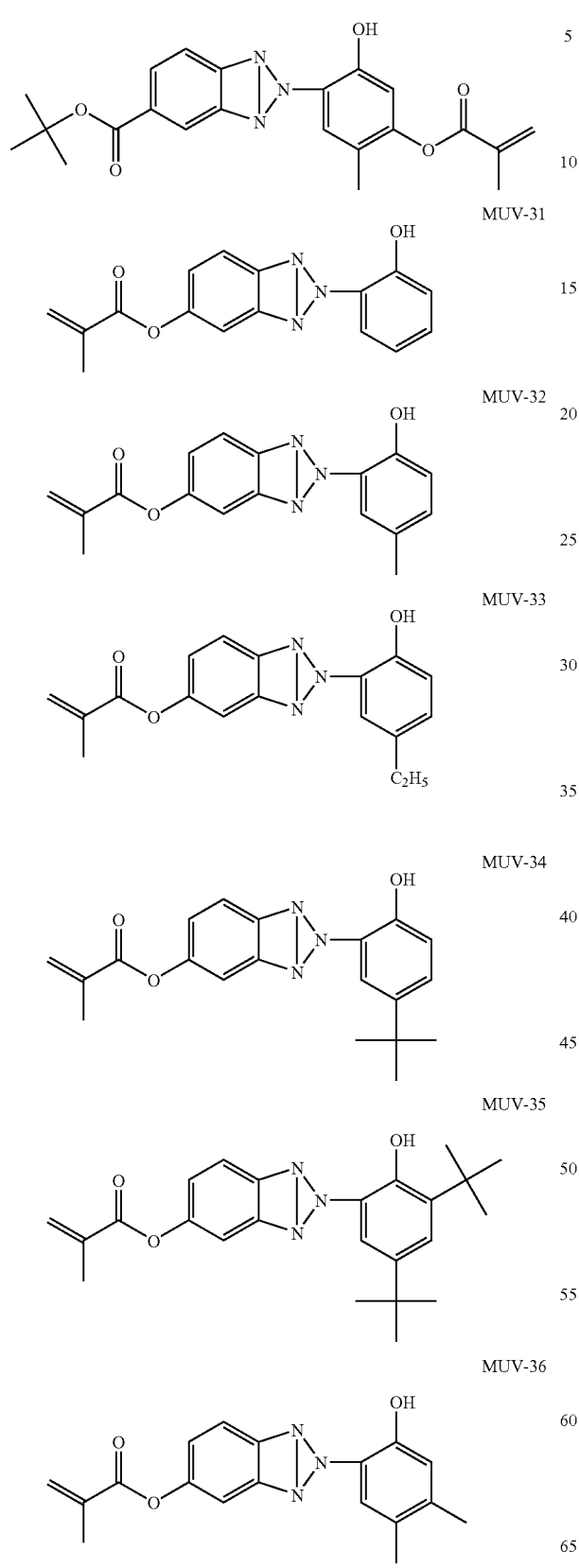
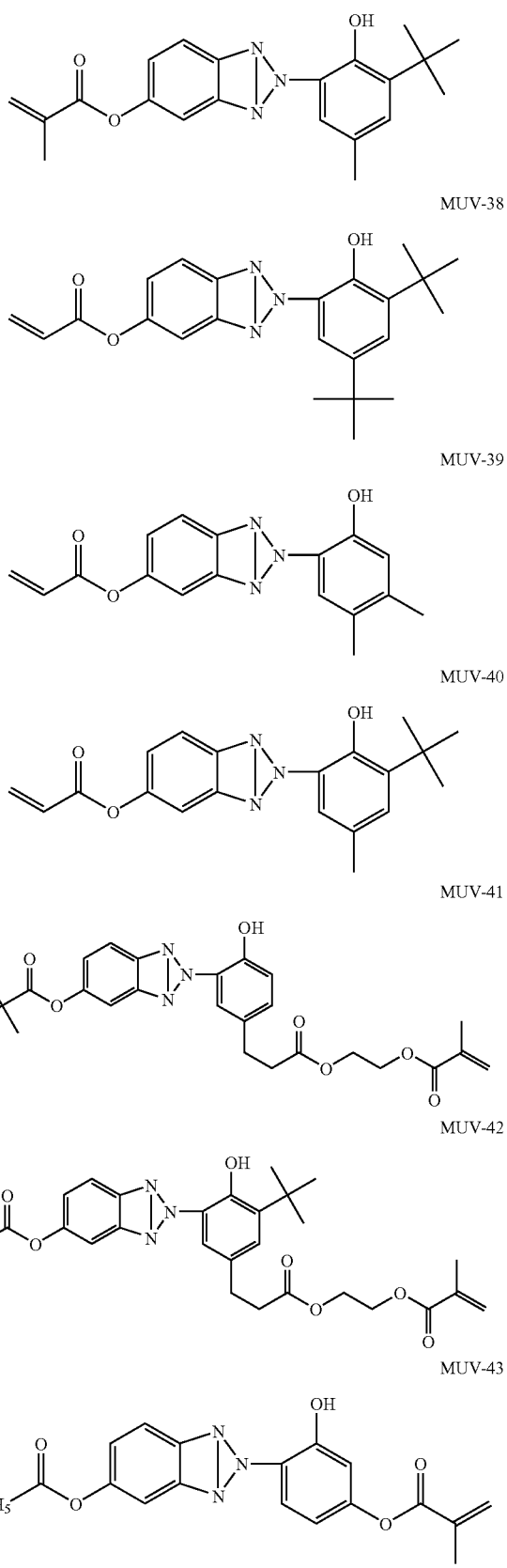

-continued

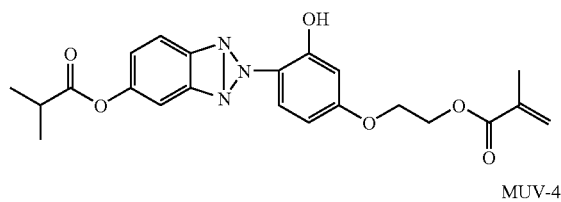
MUV-44

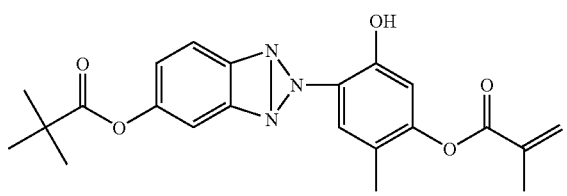
MUV-45

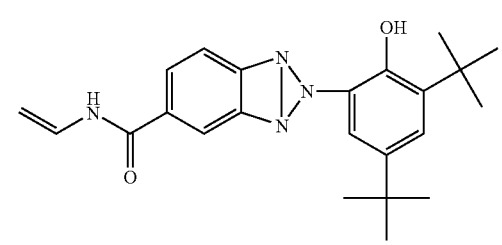
MUV-46

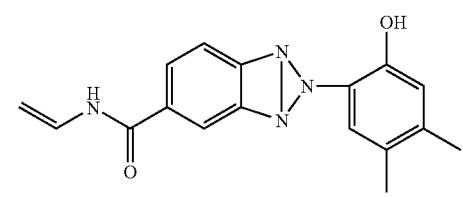
MUV-47

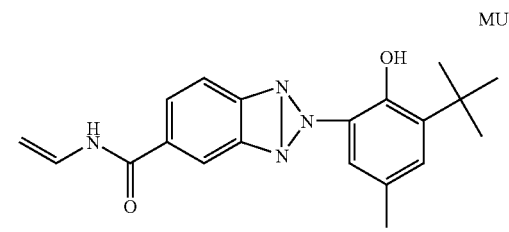
MUV-48

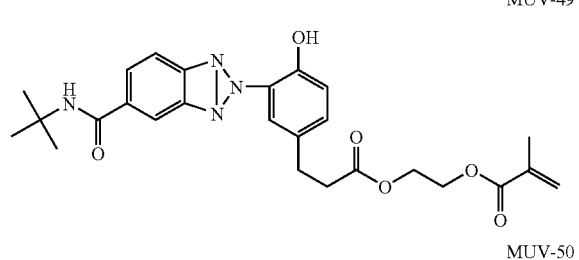
MUV-49

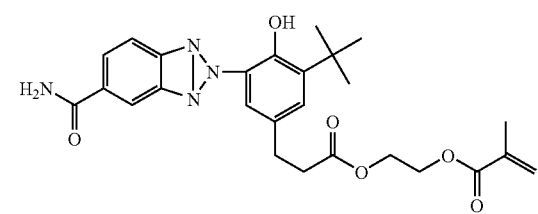
MUV-50

-continued

MUV-51

MUV-52

MUV-53

The UV absorbents, UV absorbing monomers and their intermediates to be employed in the invention can be synthesized by referring published documents. For example U.S. Pat. Nos. 3,072,585, 3,159,646, 3,399,173, 3,761,373, 4,028,331 and 5,683,861, European Patent No. 86,300,416, Tokkai She 63-227575 and 63-185969, "Polymer Bulletin" V. 20 (2), 169-176, and "Chemical Abstracts V. 109, No. 191389 can be referred for synthesizing.

The UV absorbent and the UV absorbing polymer to be used in the invention can be employed together with a low or high molecular weight compound or an inorganic compound according to necessity on the occasion of mixing with the other transparent polymer. For example, it is one of preferable embodiments that the UV absorbent polymer and another relatively low molecular weight UV absorbent are simultaneously mixed with the other transparent polymer. Moreover, simultaneously mixing of an additive such as an antioxidant, a plasticizer and a flame retardant is also one of preferable embodiments.

An adding method of a UV absorber and an ultraviolet-rays absorptivity polymer used for the present invention into an optical film may make them contain in an optical film, or may coat then on an optical film. In the case of making them contain in an optical film, they may be added directly, but preferably they may be added through an in-line addition which is excellent in manufacturing efficiency. The in-line addition is a method of adding them into a dope solution composition by an inline mixer etc. after making them dissolve in organic solvents (for example, methanol, ethanol, methylene chloride, etc.) beforehand.

Though the using amount of the UV absorbent and the UV absorbing polymer is varied depending on the kind of compound and the employing conditions, the amount of the UV absorbent is preferably from 0.1 to 5.0 g, more preferably from 0.4 to 2.0 g, and particularly preferably from 0.5 to 1.5 g, per square meter of the optical film. In the case of the UV polymer, the adding amount is preferably from 0.1 to 10 g, more preferably from 0.6 to 9.0 g, further preferably from 1.2 to 6.0 g, and particularly preferably from 1.5 to 3.0 g, per square meter of the optical film.

As described above, ones are preferable, which have superior absorbing ability to UV rays of not more than 380 nm for preventing degradation of the liquid crystal and low absorbing ability to visible light of not less than 400 nm for displaying ability of the liquid crystal display. In the invention, the transparency at a wavelength of 380 nm is preferably not more than 8%, more preferably not more than 4%, and particularly preferably not more than 1%.

As UV absorbent monomers available on the market, 1-(2-benzotriazole)-2-hydroxy-5-(vinyloxycarbonylethyl)-benzene UVM-1 and a reactive type UV absorbent 1-(2-benzotriazole)-2-hydroxy-5-(2-methacryloyloxyethyl)-benzene UVA 93, each manufactured by Ootsuka Kagaku Co., Ltd., and similar compounds are employable in the invention. They are preferably employed solely or in a state of polymer or copolymer but not limited to them. For example, a polymer UV absorbent available on the market PUVA-30M, manufactured by Ootsuka Kagaku Co., Ltd., is preferably employed. The UV absorbent may be used in combination of two or more kinds thereof. As a method of adding a UV absorber into a dope solution, the UV absorber may be added after being dissolved in an alcohol or an organic solvent such as methylene chloride, dioxolane, and methyl acetate, or it may be added directly into the dope solution.

As a method of adding a UV absorber, the UV absorber may be added in a dope solution after being dissolved in an alcohol such as methanol, ethanol, and butanol, or in an organic solvent such as methylene chloride and methyl acetate, acetone and dioxolane, or in a mixed solvent of these, it may added directly into a dope solution composition. What is not dissolved in the organic solvent like an inorganic powder may be added after being dispersed in an organic solvent and a cellulose ester by using a dessolver or a sand-mill.

Although the used amount of a UV absorber is not one pattern depending on the type of UV absorber and a using condition, etc., when a dried layer thickness of a cellulose ester film is 30 to 200 micrometers, the used amount of the UV absorber may be desirably 0.5 to 4.0 weight % to a cellulose ester film, and more desirably 0.6 to 2.0 weight %.

<Microparticles>

The cellulose ester film of the present invention preferably contains microparticles.

Microparticles may be inorganic, for example: silicon dioxide, titanium dioxide, aluminum oxide, zirconium oxide, calcium carbonate, talk, clay, calcined kaolin, calcined calcium silicate, hydrated calcium silicate, aluminum silicate, magnesium silicate or calcium phosphate. Microparticles containing silicon are preferable in respect to decreasing turbidity, and silicon dioxide is specifically preferable.

The mean diameter of primary particles is preferably from 5 to 50 nm, and more preferably from 7 to 20 nm. The particle should preferably exist as an aggregated secondary particle of a diameter from 0.05 to 0.3 μm. The content of the particle in a cellulose ester film is preferably from 0.05 to 1 percent by weight, and is more preferably from 0.1 to 0.5 percent. In a multi-layered cellulose ester film prepared by a co-casting method, a major part of the particles should preferably exist near the surface.

Microparticle of silicon dioxide available on the market include, for example: AEROSIL R972, R927V, R974, R812, 200, 200V, 300, R202, OX50, TT600 which are manufacture by Nippon Aerosil Co., Ltd.

Microparticles of zirconium oxide available on the market include, for example: AEROSIL R976 and R811 manufacture by Nippon Aerosil Co., Ltd.

Microparticles of polymer available on the market include, for example: silicone resin, fluorine-contained resin and acryl resin. Among these, silicone resin, especially three dimensionally networked silicone resin is preferably used. Examples of silicone resins include: TOSPERL 103, 105, 108, 145, 3120 and 240, which are manufactured by Toshiba Silicone Co., Ltd.

Among the microparticles listed above, AEROSIL 200V and AEROSIL R972V are particularly preferable with respect to exhibiting a lower friction coefficient while the low turbidity is maintained. Kinetic friction coefficient of the rear side of a hard coat layer in the present invention is preferably not more than 1.0.

<Dyes>

In order to optimize color of the cellulose ester film, dyes may preferably be added. For example, a blue dye may be added to reduce a yellow hue of the film. Preferable are anthraquinone type dyes.

The anthraquinone type dye may have any of several kinds of substituents in any of the 8 positions of anthraquinone. Preferable substituents are an aniline group, a hydroxyl group, an amino group, a nitro group and a hydrogen atom. Blue dyes disclosed in JP-A 2001-154017, particularly anthraquinone type dyes, are preferably added to the film.

Additives described above may be added to a dope containing cellulose ester via batch mixing, or, alternatively, they may be added via in-line mixing using a dissolving solvent of the additives. Specifically, microparticles are preferably added, partially or entirely via an in-line mixing, in order to reduce a load to a filter.

In an in-line mixing process of additive solutions, a smaller amount of cellulose ester is preferably dissolved in the dope in order to obtain a sufficiently mixed dope. The amount of cellulose ester is preferably from 1 to 10 weight parts in 100 weight parts of solvent, and more preferably from 3 to 5 weight parts.

As a mixer for in-line addition and mixing, for example, a static mixer manufactured by Toray Engineering Co., Ltd. or a static type in-line mixer High-Mixer SWJ manufactured by Toray Industries, Inc., is preferably used.

(Peeling Accelerator)

A peeling accelerator may be added in a dope to decrease a load at the time of peeling. They are preferably surfactants and include a phosphoric acid type, a sulfonic acid type, a carboxylic acid type, a nonionic type and a cationic type, however, are not limited thereto. These peeling accelerators are described in such as JP-A 61-243837. Polyethoxylated phosphoric ester is disclosed as a peeling accelerator in JP-A 57-500833. In JP-A 61-69845, it is disclosed that rapid peeling is possible by addition of mono- or di-phosphoric alkylester, a free acid form of which is a non-esterified hydroxyl group. Further, in JP-A 1-299847, it is disclosed that a peeling load can be reduced by addition of a phosphoric ester compound containing a non-esterified hydroxyl group and a propyleneoxide chain in addition to inorganic particles.

Further, a compound represented by following formula (1) or (2) is preferably incorporated.

$$(R_1—B_1—O)_{n1}—P(=O)—(OM_1)_{n2} \qquad \text{Formula (1)}$$

$$R_2—B_2—X \qquad \text{Formula (2)}$$

wherein, $R_1$ and $R_2$ each are an alkyl group, an alkenyl group, an aralkyl group or an aryl group which is substituted or unsubstituted and has a carbon number of 4-40, respectively; $M_1$ is alkali metal, ammonia or lower alkylamine; $B_1$ and $B_2$ each are a divalent connecting group; X is carboxylic acid or salt thereof, sulfonic acid or salt thereof, or sulfuric ester or salt thereof; n1 is 1 or 2; and n2 is 3-n1.

The present invention is characterized by that cellulose acylate film contains at least one type of a peeling agent represented by formula (2) or (3). In the following, these peeling agents will be described. Preferable examples of $R_1$ and $R_2$ are a substituted or unsubstituted alkyl group having a carbon number of 4-40 (such as butyl, hexyl, octyl, 2-ethylhexyl, nonyl, dodecyl, hexadecyl, octadecyl, eichosanyl, docosanyl and myricyl), a substituted or unsubstituted alkenyl group having a carbon number of 4-40 (such as 2-hexenyl, 9-decenyl and oleyl), a substituted or unsubstituted aryl group having a carbon number of 4-40 (such as phenyl, naphthyl, methylphenyl, dimethylphenyl, trimethylphenyl, ethylphenyl, propylphenyl, diisopropylphenyl, triisopropylphenyl, t-butylphenyl, di-t-butylphenyl, tri-t-butylphenyl, isopentylphenyl, octylphenyl, isooctylphenyl, isononylphenyl, diisononylphenyl, dodecylphenyl and isopentadecylphenyl).

Among them, preferable are hexyl, octyl, 2-ethylhexyl, nonyl, dodecyl, hexadecyl and octadecyl as an alkyl group; oleyl as alkenyl; phenyl, naphthyl, trimetylphenyl, diisopropylphenyl, triisopropylphenyl, di-t-butylphenyl, tri-t-butylphenyl, isooctylphenyl, isononylphenyl, diisononylphenyl, dodecylisopentadecylphenyl as an aryl group.

Next, a divalent connecting group represented by $B_1$ and $B_2$ will be described. The connecting group is alkylene having a carbon number of 1-10, polyoxyethylene (polymerization degree of 1-50), polyoxypropylene (polymerization degree of 1-50), polyoxyglycerin (polymerization degree of 1-50) and may be mixtures thereof. Among them, preferable connecting groups are methylene, ethylene, propylene, butylenes, polyoxyethylene (polymerization degree of 1-25), polyoxypropylene (polymerization degree of 1-25) and polyoxyglycerin (polymerization degree of 1-15).

Next, X is carboxylic acid (or salt thereof), sulfonic acid (or salt thereof) or sulfuric ester (or salt thereof), and is specifically preferably sulfonic acid (or salt thereof) and sulfuric ester (or salt thereof). Preferable salt is Na, K, ammonium, trimethylamine and triethanol amine. In the following, specific examples of preferable compounds of the present invention will be described.

RZ-1 $C_8H_{17}O—(P=O)—(OH)_2$
RZ-2 $C_{12}H_{25}O—(P=O)—(OK)_2$
RZ-3 $C_{12}H_{25}OCH_2CH_2O—(P=O)—(OK)_2$
RZ-4 $C_{15}H_{31}(OCH_2CH_2O)_5O—(P=O)—(OK)_2$
RZ-5 $\{C_{12}H_{25}O(CH_2CH_2O)_5\}_2—(P=O)—OH$
RZ-6 $\{C_{18}H_{35}O(OCH_2CH_2O)_8O\}_2—(P=O)—ONH_4$
RZ-7 $(t-C_4H_9)_3—C_6H_2—OCH_2CH_2O—(P=O)—(OK)_2$
RZ-8 $(iso-C_9H_{19}O—C_6H_4—O—(CH_2CH_2O)_5P(=O)—(OK)(OH)$
RZ-9 $C_{12}H_{25}SO_3Na$
RZ-10 $C_{12}H_{25}OS_3Na$
RZ-11 $C_{17}H_{33}COOH$
RZ-12 $C_{17}H_{33}COOH.N(CH_2CH_2OH)_3$
RZ-13 $iso-C_8H_{17}—C_6H_4—O—(CH_2CH_2O)_3—(CH_2)_2SO_3Na$
RZ-14 $(iso-C_9H_{10})_2—C_6H_4—O—(CH_2CH_2O)_3—(CH_2)_4SO_3Na$
RZ-15 sodium triisopropylnaphthalene sulufonate
RZ-16 sodium t-butylnaphthalene sulufonate
RZ-17 $C_{17}H_{33}CON(CH_3)CH_2CH_2SO_3Na$
RZ-18 $C_{12}H_{25}C—C_6H_4SO_3.NH_4$ The using amount of these compound is preferably 0.002-2 weight %, more preferably 0.005-1 weight % and furthermore preferably 0.01-0.5 weight %, in a dope. The addition method is not specifically limited, however, the compound may be added as liquid or solid as it is, as a solution in which the compound is added together with other material before dissolution, or may be added later into a cellulose acylate solution having been prepared in advance. Orientation of particles can be easily made uniform by incorporation of these compounds.

<Manufacturing Method of Cellulose Ester Film>

The manufacturing method of the cellulose ester film of the present invention will now be explained.

The manufacturing method of the cellulose ester film of the present invention contains the processes of: a dope preparing process in which cellulose ester and an additive, for example, above mentioned plasticizer, are dissolved in a solvent; a casting process in which a dope is cast on an endless metal support infinitively running; a drying process in which a cast dope is dried to form a web; a peeling process in which a dried web is peeled from the metal support; a stretching process or a width keeping process; a further drying process; and a winding process of the completed film.

The dope preparation process will now be explained. In the dope preparation process, a higher content of cellulose ester in the dope is preferable since duration of the drying process following the casting process is shortened, however, a too high content may result in loss of filtration accuracy due to an increased filtration load. Preferable content of cellulose ester is from 10-35% by weight and more preferably from 15-25% by weight.

A solvent may be used alone, however, two or more solvents may also be used together. A mixture of a good solvent and a poor solvent is more preferably used to increase manufacturing efficiency. A mixed solvent being rich in a good solvent is preferable to increase solubility of cellulose ester. The preferable mixing ratios are from 60 to 98 percent by weight of a good solvent, and from 2 to 40 percent of a poor solvent. Herein, a good solvent is described as being capable of dissolving cellulose ester with a single use, and a poor solvent as being incapable of dissolving nor swelling cellulose ester alone. Sometimes, a solvent works as a good solvent of a cellulose ester, and sometimes as a poor solvent depending on the average acetylation degree (degree of acetyl substitution) of the cellulose ester. For example, acetone is a good solvent for an acetic ester of cellulose of which the acetylation degree is 2.4, as well as for cellulose acetatepropionate, however, it is a poor solvent for cellulose acetate of which acetylation degree is 2.8.

Example of good solvents used in the present invention include: an organic halide (such as methylene chloride), dioxolane, acetone, methyl acetate and methyl acetoacetate, of these, methylene chloride and methyl acetate are specifically preferable. However, the present invention is not specifically limited thereto.

Examples of poor solvents used in the present invention include: methanol, ethanol, n-butanol, cyclohexane and cyclohexanone, however, the present invention is not specifically limited thereto. In the dope, water is preferably contained in an amount of 0.01 to 2% by weight.

In the process of preparing a dope, cellulose ester is dissolved using a common method. Dissolving cellulose ester at a higher temperature is possible when the heating is carried out under a higher pressure. Formation of a gel or an insoluble agglomerate (known as "Mamako" in Japanese which represents insoluble residue when powder is dissolved in a solvent)

may be avoided when the dissolving temperature is higher than the ambient pressure boiling point of the mixed solvents, and simultaneously the temperature is in the range where the mixed solvents do not boil under the applied higher pressure. The following dissolving method is also preferable, in which cellulose ester is swollen in a mixture of good and poor solvents followed by adding good solvents to dissolve the swollen cellulose ester.

Pressure may be applied by injecting an inert gas such as nitrogen or by increasing the vapor pressure of the solvents by heating. Heating is preferably carried out from the outside of the container. A jacket type heater is preferable because the temperature is easily controlled.

A higher dissolving temperature is preferable with respect to the solubility of the cellulose ester, however, too high a temperature may lower the productivity because the pressure also becomes very high. The dissolving temperature is preferably 45-120° C., more preferably 60-110° C. and still more preferably 70-105° C. The pressure should be controlled not to allow boiling at the set temperature.

A low temperature dissolution method is also preferably utilized, by which cellulose ester is successfully dissolved in a solvent such as methyl acetate.

In the next process, the cellulose ester solution thus prepared is filtered using an appropriate filter material. A filter material with a smaller absolute filtration accuracy is more preferable for removing insoluble materials, however, too small a filtration accuracy easily cause clogging up of the filter. The absolute filtration accuracy of the filter is preferably not larger than 0.008 mm, more preferably 0.001-0.008 mm and still more preferably 0.003-0.006 mm.

The filter material used in the present invention is not specifically limited, and plastic filters (such as polypropylene and Teflon®) as well as metal (alloy) filters (such as stainless steel) are preferable, since these materials are free from peeling of a fiber, which may occur when fibrous material is used. Impurities and, specifically, luminescent foreign materials contained in the cellulose ester are preferably diminished or entirely removed by filtering.

"Luminescent foreign materials" denote impurities which are observed as bright spots when a cellulose ester film is placed between two polarizing plates arranged in a crossed Nicols state, illuminated with a light from one side and observed from the other side. The number of luminescent foreign materials of larger than 0.01 mm in diameter is preferably less than 200 per $cm^2$, more preferably less than 100 per $cm^2$ and still more preferably from 0 to 10 per $cm^2$. The number of luminescent foreign materials of less than 0.01 mm in diameter is preferably minimal.

The dope may be filtered by any common method. One of these preferable filtering methods is to filter the dope at temperatures which are higher than the ambient pressure boiling point of the mixed solvents, and simultaneously in the range where the mixed solvents do not boil under a higher pressure. This method is preferable because the pressure difference between before and after filtering (also referred to as a pressure difference) is reduced. The filtering temperature is preferably from 45 to 120° C., more preferably from 45 to 70° C. and still more preferably from 45 to 55° C.

The pressure applied during filtering is preferably low, being preferably not more than 1.6 Mpa, more preferably not more than 1.2 MPa and still more preferably not more than 1.0 MPa.

Casting of a dope will be explained below:

A metal support polished to a mirror finished surface is used in the flow-casting process. A polished stainless steel belt or a plated cast drum is used as a metal support. The width of the support is preferably from 1 to 4 m. The surface temperature of the metal support is preferably from −50° C. to a temperature just below the boiling point of the solvent. A relatively high temperature of the support is more preferable because the web is more quickly dried, however, too high a temperature may cause foaming or loss of flatness of the web. The temperature of the support depends on the solvent, however, is preferably in the range of 0-40° C., and more preferably 5-30° C. Another preferable method is that a web is gelated by cooling the drum followed by peeling the web from the drum while the web still contains much solvent. The method to control the temperature of the support is not specifically limited and a method of blowing warm or cool air onto the support or to apply warm water on the rear side of the support is acceptable. The warm water method is more preferable because the temperature of the metal support becomes stable in a shorter time due to more efficient thermal conduction. In the case when warm air is used, an air temperature higher than the desired temperature is sometimes used.

In order to obtain a cellulose ester film with a sufficient flatness, the residual solvent content of the web when it is peeled from a metal support is preferably 10-150% by weight, however, it is more preferably 20-40% by weight or 60-130% by weight. The residual solvent content is specifically more preferably 20-30% by weight or 70-120% by weight.

The residual solvent content of the web is defined by the following formula:

Residual solvent content (% by weight)=$\{(M-N)/N\} \times 100$ where M represents the weight of a sample of the web collected in the manufacturing process or after manufacturing, and N represents the weight of the same sample after it was dried at 115° C. for 1 hour.

In the drying process of a cellulose ester film, the film is peeled from the support and further dried until the residual solvent decreases below not more than 1 weight %, more preferably not more than 0.1 weight %, specifically preferably 0-0.01 weight %.

In the film drying process, usually a roll drying method in which a cellulose ester film is passed through many rollers placed alternatively up and down in a staggered manner or a drying process to dry while conveying a film with a tentar method may be employed.

It is specifically preferable that a cellulose ester film is peeled from a metal support and is immediately stretched in the transport (longitudinal) direction while the film still contains much residual solvent. The stretching magnifications in both the longitudinal and the lateral directions are preferably in the range from 1.05 to 1.3 and more preferably from 1.05 to 1.15. The area of the film is preferably from 1.12 to 1.44 times larger and more preferably from 1.15 to 1.32 times larger, after the film is stretched in both the longitudinal and the lateral directions. The magnification of the stretched film area is a product of the stretch magnifications in both the longitudinal and the lateral directions. When one of the two stretching magnifications is lower than 1.05, the flatness of the film may be reduced by the irradiation of the UV rays in the hard coat layer forming step. A stretching magnification of higher than 1.3 is also unfavorable because of a greater loss in flatness and an increase in haze of the film.

A film is preferably peeled from the support with a tension of larger than 210 N/m and more preferably with a tension from 220 to 300 N/m in order to stretch the film in the longitudinal direction just after peeling.

The method to dry the web is not specifically limited, however, generally, hot air, IR ray, heated rollers or microwave irradiation is used. Hot air is preferably used with respect to ease of cure and low cost.

The preferable drying temperature of a web to obtain stable film dimensions is from 40 to 150° C. and more preferably from 50 to 140° C. The temperature is preferably increased stepwise.

The thickness of a cellulose ester is not specifically limited, however, a thickness from 1 to 200 μm is preferable, more preferably from 5 to 100 μm, and most preferably from 10 to 80 μm.

A cellulose ester film having a width of from 1 to 4 m may be preferably used for the present invention.

Especially, a film having a width of 1.4 to 4 m is more preferably used, and a film having a width of 1.4 to 2 m is still more preferably used. If the width exceeds 4, the coveyance may be difficult.

Moreover, as for a retardation film of the present invention, it is desirable that the free volume radius obtained by a positron annihilation lifetime spectroscopy is 0.250-0.35 nm, more preferably 0.250-0.320 nm and a peak width at half height is 0.04 to 0.1 nm.

The free volume in the present invention represents vacant area which is not occupied by the cellulose ester chain. This free volume can be measured using positron annihilation lifetime spectroscopy. More specifically, by measuring the time from injection of positrons into a cellulose ester film to the annihilation of the positrons, namely annihilation lifetime of positrons, size and numerical concentration of free volume holes are nondestructively estimated from the annihilation lifetime of positrons.

(Measurement of Free Volume Radius by Positron Annihilation Lifetime Spectroscopy, and Free Volume Parameter)

A positron annihilation lifetime and relative intensity were measured under the following measurement condition.

(Measurement Condition)
Positron source: 22NaCl (intensity: 1.85 MBq)
Gamma-ray detector: Plastic scintillator+
Photomultiplier tube
Apparatus time resolution: 290 ps
Measurement temperature: 23° C.
Total number of counts: 1 million counts
Specimen size: 20 mm×15 mm×2 mm 20 pieces of 20 mm×15 mm sized films were piled to prepare an about 2 mm thick sample. The sample was dried under vacuum 24 hours.

Irradiation area: A circle of about 10 mm in diameter

Time per channel: 23.3 ps/ch

According to the above measurement condition, positron annihilation lifetime spectroscopy was carried out. A three component analysis using a nonlinear least-square method was carried out for the obtained results. When the annihilation times were referred to as, in small order, $\tau 1$, $\tau 2$ and $\tau 3$ and the corresponding intensities were referred to as I1, I2 and I3 (I1+I2+I3=100%), respectively, using the largest annihilation time $\tau 3$, a free volume radius R3 (nm) was determined using the following formula. The larger the $\tau 3$ value is, the larger the estimated free volume is.

$$\tau 3 = (\tfrac{1}{2}) [1 - \{R3/(R3+0.166)\} + (\tfrac{1}{2}\pi)\sin\{2\pi R3/(R3+0.166)\}]^{-1}$$

where, 0.166 (nm) represents the thickness of the electronic layer which is exuding from the wall of a hole.

The above measurements were repeated twice and, from a peak and a peak shape obtained from a relative intensity and a void radius, the mean values and the peak width at half height were calculated.

Evaluation of a free volume in polymer by positron annihilation spectroscopy is explained in, for example, MATERIAL STAGE vol. 4, No. 5, 2004, pp. 21-25, The TRC News, No. 80 (July, 2002) PP. 20-22 (published by Toray Research Center), and "BUNSEKI (Analysis)", 1988, pp. 11-20".

The free volume radius of a cellulose ester film used in the present invention is preferably a peak value of 0.250-0.35 nm and the free volume radius preferably distributes within a range of 0.2 nm to 0.4 nm. The peak width at half height preferably is from 0.04 to 0.095 nm, more preferably from 0.045 to 0.090 nm, still more preferably 0.050 to 0.085 nm.

The method of controlling the free volume radius of a cellulose ester film in a prescribed range is not specifically limited, however, these may be controlled by the following method.

A cellulose ester film having a free volume radius of 0.250-0.35 nm determined by positron annihilation lifetime spectroscopy may be obtained, for example, by the following method: casting a dope containing a cellulose ester and a plasticizer to form a web; stretching the web while the web contains residual solvent; drying the web until the amount of residual solvent decreases to 0.3% or less to obtain a cellulose ester film; further conveying the cellulose ester film at 105-170° C. under a circumstance in which the rate of atmosphere replacement of not less than 12 times/h, or more preferably 12-45 times/h, thereby a cellulose ester film having a free volume radius of 0.25 to 0.31 nm can be obtained. By making the rate of atmosphere replacement less than 12 times/h, or by making the temperature less than 105° C., a cellulose ester film having a free volume radius exceeding from 0.31 nm may be obtained.

The rate of atmosphere replacement is the number of times replacing the atmosphere of a heat treatment chamber by fresh-air per unit time, provided that the volume of the heat treatment chamber is expressed as V (m$^3$) and the amount of fresh-air sent to the heat treatment chamber is expressed as FA (m$^3$/h). Fresh-air does not include the air which is recycled and circulating, among the air sent to the heat treatment chamber but includes the air containing no evaporated solvent nor evaporated plasticizer, or the air from which evaporated solvent or evaporated plasticizer are removed.

Rate of atmosphere replacement=$FA/V$(times/$h$)

When the treatment temperature is from 105 to 155° C., especially from 120 to 160° C., a cellulose ester film having a free volume radius of from 0.25 to 0.31 nm can be obtained.

Further, it may be preferable to treat under an atmosphere that the rate of atmosphere replacement is maintained to be 12 times/h or more in the processing section.

When the rate of atmosphere replacement is 12 times/h or more, the concentration of the plasticizer evaporated from a film in the atmosphere is thoroughly reduced, accordingly, re-deposition of the plasticizer to the retardation film is also reduced. Usually, the drying process is conducted with the Rate of atmosphere replacement of 10 times/hours. When the rate of atmosphere replacement is increased more than necessary, the production cost increases and due to the fluttering of the web, retardation patch increases. Accordingly, it is not recommended that the rate of atmosphere replacement is increased more than necessary when a cellulose ester film used in the present invention is produced, however, after the web was thoroughly dried and the amount of residual solvent is considerably decreased, it can be increased. However, the rate of atmosphere replacement of 45 times/h or more is not practical since the production cost drastically increases. The heat treatment under the rate of atmosphere replacement of 12 times/h or more is preferably carries out within 1 minute-1 hour. If the treatment time is less than 1 minute, the free volume radius within a prescribed range may be difficult to obtain, while, when it is not more than 1 hour, the change of retardation value is allowable.

Further, in this process, a pressurizing treatment of the retardation film in the thickness direction may also be effectively carried out to control the free energy volume radius and the free volume parameter within more preferable range. The pressure is preferably 0.5-10 kPa. The amount of residual solvent at the stage when the pressurizing treatment is carried out is preferably less than 0.3%.

Furthermore, a cellulose ester film used in the present invention may be produced by a melt casting method mentioned later on.

Hereinafter, it will be explained in detail.

When producing a cellulose ester film used in the present invention by the melt casting method, the following various kinds of additives may be preferably used in addition to the above additives.

<<Compositions Represented by Formula (R)>>

A cellulose ester film used in the present invention preferably contains compositions represented by the following formula (R).

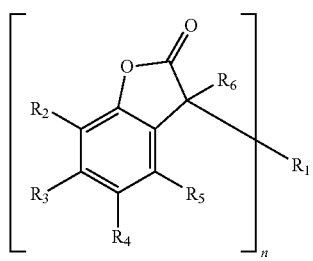

Formula (R)

In above-described general formula (R), $R_2$-$R_5$ each independently is a hydrogen atom or a substituent. $R_6$ is a hydrogen atom or a substituent, n is 1 or 2, and $R_1$ is a substituents when n is 1, while $R_1$ is a divalent connecting group when n is 2.

Next, general formula (R) will be detailed from another view point.

In the formula (R), n is preferably 1 or 2; when n is 1, $R_1$ is a naphthyl group, a phenanthryl group, an anthryl group, a 5,6,7,8-tetrahydro-2-naphthyl group, a 5,6,7,8-tetrahydro-1-naphthyl group, a thienyl group, a benzo[b]thienyl group, a naphtho[2,3-b]thienyl group, a thianthrenyl group, a dibenzofuryl, a chromenyl group, a xanthenyl group, a phenoxanthinyl group, a pyrrolyl group, an imidazolyl group, a pyrazolyl group, a pyradinyl group, a pyrimidinyl group, a pyridazinyl group, an indolizinyl group, an isoindolyl group, an indolyl group, an indazolyl group, a purinyl group, a quinolizinyl group, an isoquinolyl group, a quinolyl group, a phthalazinyl group, a naphthylizinyl group, a quinoxalinyl group, a quinazolinyl group, a cinnolyl group, a pteridinyl group, a carbazolyl group, a β-carbonylyl group, a phenanthiridinyl group, an acridinyl group, a perimidinyl group, a phenanthrolinyl group, a phenazinyl group, an isothiazolyl group, a phenothiazinyl group, an isoxazolyl group, a furazanyl group, a biphenyl group, a teruphenyl group, a fluorenyl group or a phenoxazinyl group, which are unsubstituted or substituted by an alkyl group having a carbon number of 1-4, an alkoxy group having a carbon number of 1-4, an alkylthio group having a carbon number of 1-4, a hydroxyl group, a halogen atom, an amino group, an alkylamino group having a carbon number of 1-4, a phenylamino group or di(alkyl having a carbon number of 1-4)-amino group, or $R_1$ is a group represented by formula (II) described below;

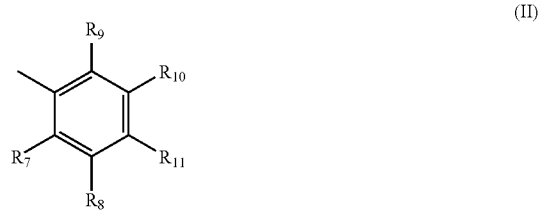

(II)

and; when n is 2 $R_1$ is a phenylene group or a naphthylene group, which is unsubstituted or substituted by an alkyl group having a carbon number of 1-4 or a hydroxyl group; or —$R_{12}$—$XR_{13}$— (wherein, X is a direct bond, an oxygen atom, a sulfur atom or —$NR_{31}$—). $R_2$, $R_3$, $R_4$ and $R_5$) each independently are a hydrogen atom, a chlorine atom, a hydroxyl group, an alkyl group having a carbon number of 1-25, a phenylalkyl group having a carbon number of 7-9, an unsubstituted or an (alkyl having a carbon number of 1-4)-substituted phenyl group, an unsubstituted or an (alkyl having a carbon number of 1-4)-substituted cycloalkyl group having a carbon number of 5-8, an alkoxy group having a carbon number of 1-18, an alkylthio group having a carbon number of 1-18, an alkylamino group having a carbon number of 1-4, a di(alkyl having a carbon number of 1-4)amino group, an alkanoyloxy group having a carbon number of 1-25, an alkanoylamino group having a carbon number of 1-25, an alkenoyloxy group having a carbon number of 3-25, an alkanoyloxy group having a carbon number of 3-25 which is disconnected by an oxygen atom, a sulfur atom or

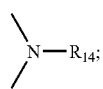

a cycloalkylcarbonyloxy group having a carbon number of 6-9, a benzoyloxy group, or an (alkyl having a carbon number of 1-12)-substituted benzoyloxy group (in this regard, when $R_9$ is a hydrogen atom or a methyl group, R7 or R9 in a formula (II) mentioned later does not represent a hydroxy group or an alkanoiloxi group having a carbon number of 1-25); or each pair of substituents $R_2$ and $R_3$, $R_3$ and $R_4$, or $R_4$ and $R_5$ may form a benzene ring together with bonded carbon atoms. $R_4$ further represents —$(CH_2)_p$—$COR_{15}$ or —$(CH_2)_q$OH (wherein, p is 0, 1 or 2, q is 1, 2, 3, 4, 5 or 6); or when $R_3$, $R_5$ and $R_6$ is a hydrogen atom, $R_4$ further is a group represented by following formula (III)

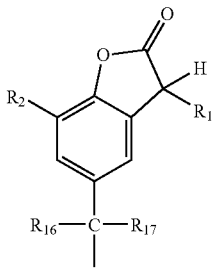

(III)

(wherein, $R_1$ is identical to those defined above in the case of n=1). $R_6$ is a hydrogen atom or a group represented by following formula (IV)

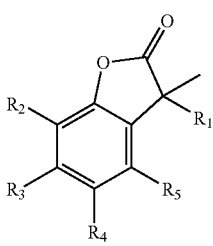

(IV)

(wherein, $R_4$ is not a group of formula (III) but is identical to those defined above in the case of n=1). $R_7$, $R_8$, $R_9$, $R_9$, $R_{10}$ and $R_{11}$ each independently are a hydrogen atom, a halogen atom, a hydroxyl group, an alkyl group having a carbon number of 1-25; an alkyl group having a carbon number of 2-25 which is disconnected by an oxygen atom, a sulfur atom or

an alkoxy group having a carbon number of 2-25 which is disconnected by an oxygen atoms, a sulfur atom or

an alkylthio group having a carbon number of 1-25, an alkenyl group having a carbon number of 3-25, an alkenyloxy group having a carbon number of 3-25, an alkynyl group having a carbon number of 3-25, an alkynyloxy group having a carbon number of 3-25, a phenylalkyl group having a carbon number of 7-9, a phenylalkoxy group having a carbon number of 7-9; an unsubstituted or an (alkyl having a carbon number of 1-4)-substituted phenyl group; an unsubstituted or an (alkyl having a carbon number of 1-4)-substituted phenoxy group; an unsubstituted or an (alkyl having a carbon number of 1-4)-substituted cycloalkyl group having a carbon number of 5-8, an unsubstituted or an (alkyl having a carbon number of 1-4)-substituted cycloalkoxy group having a carbon number of 5-8; an alkylamino group having a carbon number of 1-4, a di(alkyl having a carbon number of 1-4)amino group, an alkanoyl group having a carbon number of 1-25; an alkanoyl group having a carbon number of 3-25 which is disconnected by an oxygen atom, a sulfur atom or

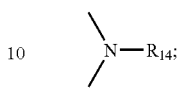

an alkanoyloxy group having a carbon number of 1-25; an alkanoyloxy group having a carbon number of 3-25 which is disconnected by an oxygen atom, a sulfur atom or

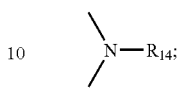

an alkanoylamino group having a carbon number of 1-25, an alkenoyl group having a carbon number of 3-25, an alkenoyl group having a carbon number of 3-25 which is disconnected by an oxygen atom, a sulfur atom or

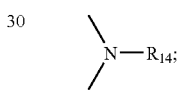

an alkenoyloxy group having a carbon number of 3-25; an alkenoyloxy group having a carbon number of 3-25 which is disconnected by an oxygen atom, a sulfur atom or

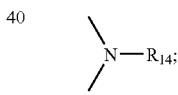

a cycloalkylcarbonyl group having a carbon number of 6-9, a cycloalkylcarbonyloxy group having a carbon number of 6-9, a benzoyl group or an (alkyl having a carbon number of 1-12)-substituted benzoyl group; a benzoyloxy group or an (alkyl having a carbon number of 1-12)-substituted benzoyloxy group;

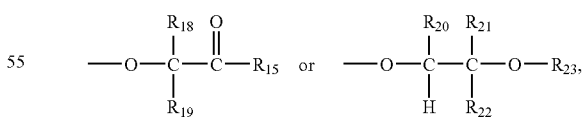

and further, in formula (II), each pair of substituents $R_7$ and $R_8$, or $R_8$ and $R_{11}$ may form a benzene ring together with the bonded carbon atoms. $R_{11}$ is a hydrogen atom, an alkyl group having a carbon number of 1-25, an alkylthio group having a carbon number of 1-25, an alkenyl group having a carbon number of 3-25, an alkynyl group having a carbon number of 3-25, a phenyl alkyl group having a carbon number of 7-9, an unsubstituted or an (alkyl having a carbon number of 1-4)- substituted phenyl group, an unsubstituted or an (alkyl having a carbon number of 1-4)-substituted cycloalkyl group having a carbon number of 5-8, an alkylamino group having a carbon number of 1-4, a di(alkyl having a carbon number of 1-4) amino group, an alkanoyl group having a carbon number of 1-25, an alkanoyl group having a carbon number of 1-25 which is disconnected by an oxygen atom, a sulfur atom, or

an alkanoylamino group having a carbon number of 1-25, an alkenoyl group having a carbon number of 3-25, an alkenoyl group having a carbon number of 3-25 which is disconnected by an oxygen atom, a sulfur atom, or

a cycloalkyl carbonyl group having a carbon number of 6-9, a benzoyl group or an (alkyl having a carbon number of 1-12)-substituted benzoyl group; In this regard, at least one of $R_7$, $R_8$, $R_9$, $R_{10}$, and $R_{11}$ is not a hydrogen atom. $R_{12}$ and $R_{13}$ each independently are an unsubstituted or an (alkyl having a carbon number of 1-4)-substituted phenylene group or naphthalene group; $R_{14}$, is a hydrogen atom or an alkyl group having a carbon number of 1-8; $R_{15}$ is a hydroxyl group, the following group $$\left[-O^-\frac{1}{r}M^{r+}\right]$$

(wherein, M is r-valent metal cation and r is 1, 2 or 3.), an alkoxy group having a carbon number of 1-18 or

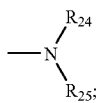

$R_{16}$ and $R_{17}$ each independently are a hydrogen atom, $CF_3$, an alkyl group having a carbon number of 1-12 or a phenyl group, or $R_{16}$ and $R_{17}$ form a cycloalkylidene ring having a carbon number of 5-8, which is unsubstituted or substituted by 1-3 alkyl groups having a carbon number of 1-4, together with the bonded carbon atoms; $R_{18}$ and $R_{19}$ each independently are a hydrogen atom, an alkyl group having a carbon number of 1-4, or a phenyl group; $R_{20}$ is a hydrogen atom, an alkyl group having a carbon number of 1-4, $R_{21}$ is a hydrogen atom, an unsubstituted or an (alkyl having a carbon number of 1-4)-substituted phenyl group, an alkyl group having a carbon number of 1-25 which is disconnected by an oxygen atom, a sulfur atom or

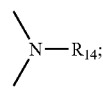

a phenylalkyl group having a carbon number of 7-9 which is unsubstituted or substituted by 1-3 alkyl groups having a carbon number of 1-4 at the phenyl portion; a phenylalkyl group having a carbon number of 7-25 which is disconnected by an oxygen atom, a sulfur atom or

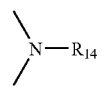

and is unsubstituted or substituted by 1-3 alkyl groups having a carbon number of 1-4 at the phenyl portion; or $R_{20}$ and $R_{21}$ form a cycloalkylene ring having a carbon number of 5-12, which is unsubstituted or substituted by 1-3 alkyl groups having a carbon number of 1-4 together with the bonded carbon atoms; $R_{22}$ is a hydrogen atom or an alkyl group having a carbon number of 1-4; $R_{23}$ is an alkanoyl group having a carbon number of 1-25, an alkenoyl group having a carbon number of 3-25, an alkanoyl group having a carbon number of 3-25 which is disconnected by an oxygen atom, a sulfur atom or

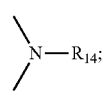

an alkanoyl group having a carbon number of 2-25 which is substituted by di(alkyl having a carbon number of 1-6)-phosphonate group; a cycloalkylcarbonyl group having a carbon number of 6-9, a thenoyl group, a furoyl group, a benzoyl group or an (alkyl having a carbon number of 1-12)-substituted benzoyl group;

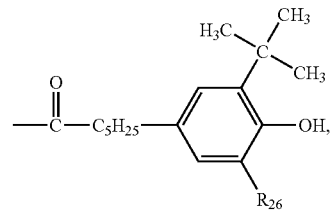

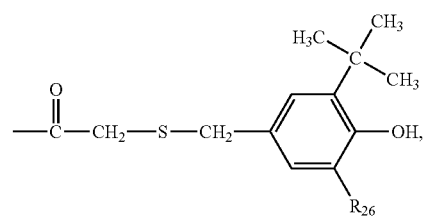

-continued

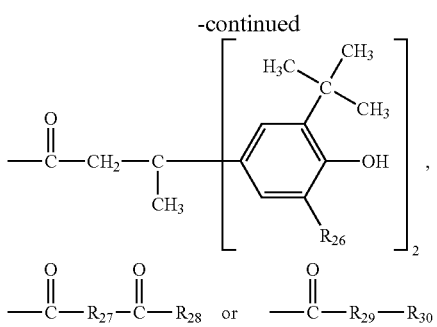

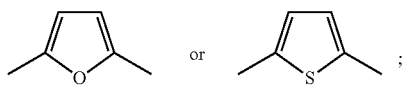

(wherein, s is 1 or 2); $R_{24}$ and $R_{25}$ each independently are a hydrogen atom or an alkyl group having a carbon number of 1-18; R26 is a hydrogen atom or an alkyl group having a carbon number of 1-8; $R_{27}$ is a direct bond or an alkylene group having a carbon number of 1-18; an alkylene group having a carbon number of 2-18 which is disconnected by an oxygen atom, a sulfur atom or

an alkenylene group having a carbon number of 2-18, an alkylidene group having a carbon number of 2-20, a phenylalkylidene group having a carbon number of 7-20, a cycloalkylene group having a carbon number of 5-8, a bicycloalkylene group having a carbon number of 7-8, an unsubstituted or an (alkyl having a carbon number of 1-4)-substituted phenylene group,

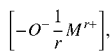

$R_{28}$ is a hydroxyl group, $$\left[-O^- \frac{1}{r} M^{r+}\right],$$

an alkoxy group having a carbon number of 1-18 or

$R_{29}$ is an oxygen atom, —NH— or

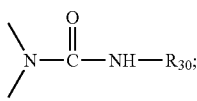

$R_{30}$ is an alkyl group having a carbon number of 1-18 or a phenyl group; $R_{31}$ is a hydrogen atom or an alkyl group having a carbon number of 1-18.

When n is 1, $R_1$ is preferably a group represented by aforesaid formula (II); a naphthyl group, a phenanthryl group, an anthoryl group, a 5,6,7,8-tetrahydro-2-naphthyl group, a 5,6,7,8-tetrahydro-1-naphthyl group, a thienyl group, a benzo[b]thienyl group, a naphtho[2,3-b]thienyl group, a thianthrenyl group, a dibenzofuryl group, a chromenyl group, a xanthenyl group, a phenoxanthinyl group, a pyrrolyl group, an imidazolyl group, a pyrazolyl group, a pyradinyl group, a pyridinyl group, a pyridazinyl group, an indolydinyl group, an isoindolyl group, an indolyl group, an indazolyl group, a purinyl group, a quinolizinyl group, an isoquinolyl group, a quinolyl group, a phthalazinyl group, a naphthylizinyl group, a quinoxalinyl group, a quinazolinyl group, a cinnolyl group, a butedinyl group, a carbazolyl group, a β-carbolinyl group, a phenanthyridinyl group, an acridinyl group, a perimidinyl group, a phenanthrolinyl group, a phenaziyl group, an isothiazolyl group, a phenothiazinyl, an isoxazolyl group, a furazanyl group, a biphenyl group, a terphenyl group, a fluorenyl group or a phenoxazinyl group; each of which is unsubstituted or substituted by an alkyl group having a carbon number of 1-4, an alkoxy group having a carbon number of 1-4, an alkylthio group having a carbon number of 1-4, a hydroxyl group, a halogen atom, an amino group, an alkylamino group having a carbon number of 1-4 or di(alkyl having a carbon number of 1-4)-amino group; typically, a 1-naphtyl group, a 2-naphthyl group, a 1-phenylamino-4-naphthyl group, a 1-methylnaphthyl group, a 2-methylnaphthyl group, a 1-methoxy-2-naphthyl group, a 2-methoxy-1-naphthyl group, a 1-dimethylamino-2-naphthyl group, a 1,2-dimethyl-4-naphthyl group, a 1,2-dimethyl-6-naphthiyl group, a 1,2-dimethyl-7-naphthiyl group, a 1,3-dimethyl-6-naphthiyl group, a 1,4-dimethyl-6-naphthiyl group, a 1,5-dimethyl-2-naphthiyl group, a 1,6-dimethyl-2-naphthiyl group, a 1-hydroxy-2-naphthyl group, a 2-hydroxy-1-naphthyl group, a 1,4-dihydroxy-2-naphthyl group, a 7-phenanthryl group, a 1-anthryl group, a 2-anthryl group, a 9-anthryl group, a 3-benzo[b]thienyl group, a 5-benzo[b]thienyl group, a 2-benzo[b]thienyl group, a 4-dibenzofuryl group, a 4,7-dibenzofuryl group, a 4-methyl-7-benzofuryl group, a 2-xanthenyl group, a 8-methyl-2-xanthenyl group, a 3-xanthenyl group, a 2-phenoxanthinyl group, a 2,7-phenoxanthinyl group, a 2-pyrrolyl group, a 3-pyrrolyl group, a 5-methyl-3-pyrrolyl group, a 2-imidazolyl group, a 4-imidazolyl group, a 5-imidazolyl group, a 2-methyl-4-imidazolyl group, a 2-ethyl-4-imidazolyl group, a 2-ethyl-5-imidazolyl group, a 3-pyrazolyl group, a 1-methyl-3-pyrazolyl group, a 1-propyl-4-pyrazolyl group, a 2-pyrazinyl group, a 5,6-dimethyl-2-pyrazinyl, a 2-indolizinyl group, a 2-methyl-3-isoindolyl group, a 2-methyl-1-isoindolyl group, a 1-methyl-2-indolyl group, a 1-methyl-3-indolyl group, a 1,5-dimethyl-2-indolyl group, a 1-methyl-3-indazolyl group, a 2,7-dimethyl-8-purinyl group, a 2-methoxy-7-methyl-8-purinyl group, a 2-quinolizinyl group, a 3-isoquinolyl group, a 6-isoquinolyl group, a 7-isoquinolyl group, an isoquinolyl group, a 3-methoxy-6-isoquinolyl group, a 2-quinolyl group, a 6-quinolyl group, a 7-quinolyl group, a 2-methoxy-3-quinolyl group, a 2-methoxy-6-quinolyl group, a 6-phthalazinyl, a 7-phthalazinyl group, a 1-methoxy-6-phthalazinyl group, a 1,4-dimethoxy-6-phthalazinyl group, 1,8-naphthylizini-2-yl group, a 2-quinoxalinyl group, a 6-quinoxalinyl group, a 2,3-dimethyl-6-quinoxalinyl group, a 2,3-dimethoxy-6-quinoxalinyl group, a 2-quinazolinyl group, a 7-quinazolinyl group, a 2-dimethylamino-6-quinazolinyl group, a 3-cinnolinyl group, a 6-cinnolinyl group, a 7-cinnolinyl group, a 3-methoxy-7-cinnolinyl group, a 2-pteridinyl group, a 6-pteridinyl group, a 7-pteridinyl group, a 6,7-dimethoxy-2-pteridinyl group, a 2-carbazolyl group, a 9-methyl-2-carbazolyl group, a 9-methyl-3-carbazolyl group, a β-carbolini-3-yl group, a 1-methyl-β-carbolini-3-yl group, a 1-methyl-β-carbolini-6-yl group, a 3-phenyanthrizinyl group, a 2-acridinyl group, a 3-acridinyl group, a 2-perimidinyl group, a 1-methyl-5-perimidinyl group, a 5-phenanthrolinyl group, a 6-phenanthrolinyl group, a 1-phenazinyl group, a 2-phenazinyl group, a 3-isothiazolyl group, a 4-isothiazolyl group, a 5-isothiazolyl group, a 2-phenothiazinyl group, a 3-phenothiazinyl group, a 10-methyl-3-phenothiazinyl group, a 3-isoxazolyl group, a 4-isoxazolyl group, a 5-isoxazolyl group, a 4-methyl-3-furazanyl group, a 2-phenoxazinyl group or a 10-methyl-2-phenoxazinyl group.

Specifically preferable as the above-described substituents are, a group represented by aforesaid formula (II); a naphthyl group, a phenanthryl group, an anthryl group, a 5,6,7,8-tetrahydro-2-naphthyl group, a 5,6,7,8-tetrahydro-1-naphthyl group, a thienyl group, a benzo[b]thienyl group, a naphtho[2,3-b]thienyl group, a thianthrenyl group, a dibenzofuryl group, a chromenyl group, a xanthenyl group, a phenoxanthinyl group, a pyrrolyl group, an isoindolyl group, an indolyl group, a phenothiazinyl, a biphenyl group, a terphenyl group, a fluorenyl group or a phenoxazinyl group, each of which is unsubstituted or substituted by an alkyl group having a carbon number of 1-4, an alkoxy group having a carbon number of 1-4, an alkylthio group having a carbon number of 1-4, a hydroxyl group, a phenylamino group or di(alkyl having a carbon number of 1-4)amino group; typically, a 1-naphtyl group, a 2-naphthyl group, a 1-phenylamino-4-naphthyl group, a 1-methylnaphthyl group, a 2-methylnaphthyl group, a 1-methoxy-2-naphthyl group, a 2-methoxy-1-naphthyl group, a 1-dimethylamino-2-naphthyl group, a 1,2-dimethyl-4-naphthyl group, a 1,2-dimethyl-6-naphthiyl group, a 1,2-dimethyl-7-naphthiyl group, a 1,3-dimethyl-6-naphthiyl group, a 1,4-dimethyl-6-naphthyl group, a 1,5-dimethyl-2-naphthyl group, a 1,6-dimethyl-2-naphthyl group, a 1-hydroxy-2-naphthyl group, a 2-hydroxy-1-naphthyl group, a 1,4-dihydroxy-2-naphthyl group, a 7-phenanthryl group, a 1-anthryl group, a 2-anthryl group, a 9-anthryl group, a 3-benzo[b]thienyl group, a 5-benzo[b]thienyl group, a 2-benzo[b]thienyl group, a 4-dibenzofuryl group, a 4,7-dibenzofuryl group, a 4-methyl-7-dibenzofuryl group, a 2-xanthenyl group, a 8-methyl-2-xanthenyl group, a 3-xanthenyl group, a 2-phenoxanthinyl group, a 2,7-phenoxanthinyl group, a 2-pyrrolyl group, a 3-pyrrolyl group, a 2-phenothiazinyl group, a 3-phenothiazinyl group and a 10-methyl-3-phenothiazinyl group.

A halogen substituent is preferably a chlorine substituent, a bromine substituent or an iodine substituent, and more preferably a chlorine substituent.

An alkanoyl group having a carbon number of up to 25 is a branched or un-branched group, and is, for example, a formyl group, an acetyl group, a propionyl group, a butanoyl group, a pentanoyl group, a hexanoyl group, a heptanoyl group, an octanoyl group, a nonanoyl group, a decanoyl group, an undecanoyl group, a dodecanoyl group, a tridecanoyl group, a tetradecanoyl group, a pentadecanoyl group, a hexadecanoyl group, a heptadecanoyl group, an octadecanoyl group, an eicosanoyl group or a docosanoyl group. Preferable is an alkanoyl group having a carbon number of 2-18, more preferably of 2-12 and specifically preferably of 2-6. An acetyl group is specifically preferable.

An alkanoyl group having a carbon number of 2-25, which is substituted by di(alkyl having a carbon number of 1-6) phosphonate group, is typically $(CH_3CH_2O)_2POCH_2CO—$, $(CH_3O)_2POCH_2CO—$, $(CH_3CH_2CH_2CH_2O)_2POCH_2CO—$, $(CH_3CH_2O)_2POCH_2CH_2CO—$, $(CH_3O)_2POCH_2CH_2CO—$, $(CH_3CH_2CH_2CH_2O)_2POCH_2CH_2CO—$, $(CH_3CH_2O)_2PO(CH_2)_4CO—$, $(CH_3CH_2O)_2PO(CH_2)_8CO—$ or $(CH_3CH_2O)_2PO(CH_2)_{17}O—$.

An alkanoyloxy group having a carbon number of up to 25 is a branched or un-branched group, and is, for example, a formyloxy group, an acetoxy group, a propionyloxy group, a butanoyloxy group, a pentanoyloxy group, a hexanoyloxy group, a heptanoyloxy group, an octanoyloxy group, a nonanoyloxy group, a decanoyloxy group, an undecanoyloxy group, a dodecanoyloxy group, a tridecanoyloxy group, a tetradecanoyloxy group, a pentadecanoyloxy group, a hexadecanoyloxy group, a heptadecanoyloxy group, an octadecanoyloxy group, an eicosanoyloxy group or a docosanoyloxy group. Preferable is an alkanoyloxy group having a carbon number of 2-18, more preferably of 2-12 and for example of 2-6. An acetoxy group is specifically preferred.

An alkenoyl group having a carbon number of 3-25 is a branched or un-branched group, and, for example, includes a propenoyl group, a 2-butenoyl group, a 3-butenoyl group, an isobutenoyl group, an n-2,4-pentadienoyl group, a 3-methyl-2-butenoyl group, an n-2-octenoyl group, an n-2-dodecenoyl group, an iso-dodecenoyl group, an oleoyl group, an n-2-octadecanoyl group or an n-4-octadecanoyl group. Preferable is an alkenoyl group having a carbon number of 3-18, more preferably of 3-12, for example of 3-6 and specifically preferably of 3-4.

An alkenoyl group having a carbon number of 3-25, which is disconnected by an oxygen atom, a sulfur atom or

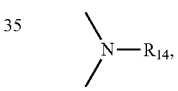

is typically $CH_3OCH_2CH_2CH=CHCO—$ or $CH_3OCH_2CH_2OCH=CHCO—$.

An alkenoyloxy group having a carbon number of 3-25 is a branched or un-branched group, and, for example, includes a propenoyloxy group, a 2-butenoyloxy group, a 3-butenoyloxy group, an isobutenoyloxy group, an n-2,4-pentadiennoyloxy group, a 3-methyl-2-butenoyloxy group, an n-2-octenoyloxy group, an n-2-dodecenoyloxy group, an iso-dodecenoyloxy group, an oleoyloxy group, a n-2-octadecenoyloxy group or an n-4-octadecenoyloxy group. Preferable is an alkenoyloxy group having a carbon number of 3-18, more preferably 3-12, typically 3-6 and most preferably 3-4.

An alkenoyloxy group having a carbon number of 3-25, which is disconnected by an oxygen atom, a sulfur atom or

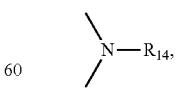

is typically $CH_3OCH_2CH_2CH=CHCOO—$ or $CH_3OCH_2CH_2OCH=CHCOO—$.

An alkanoyl group having a carbon number of 3-25, which is disconnected by an oxygen atom, a sulfur atom or

is typically CH$_3$—O—CH$_2$CO—, CH$_3$—S—CH$_2$CO—, CH$_3$—NH—CH$_2$CO—, CH$_3$—N(CH$_3$)—CH$_2$CO—, CH$_3$—O—CH$_2$CH$_2$—OCH$_2$CO—, CH$_3$—(O—CH$_2$CH$_2$)$_2$O—CH$_2$CO—, CH$_3$—(O—CH$_2$CH$_2$)$_3$O—CH$_2$CO— or CH$_3$—(O—CH$_2$CH$_2$)$_4$O—CH$_2$CO—.

An alkanoyloxy group having a carbon number of 3-25 which is disconnected by an oxygen atom, a sulfur atom or

is typically CH$_3$—O—CH$_2$COO—, CH$_3$—S—CH$_2$COO—, CH$_3$—NH—CH$_2$COO—, CH$_3$—N(CH$_3$)—CH$_2$COO—, CH$_3$—O—CH$_2$CH$_2$—OCH$_2$COO—, CH$_3$—(O—CH$_2$CH$_2$)$_2$ O—CH$_2$COO—, CH$_3$—(O—CH$_2$CH$_2$)$_3$O—CH$_2$COO— or CH$_3$—(O—CH$_2$CH$_2$)$_4$O—CH$_2$COO—.

Examples of a cycloalkylcarbonyl group having a carbon number of 6-9 are preferably a cyclopentylcarbonyl group, a cyclohexylcarbonyl group, a cycloheptylcarbonyl group and a cyclooctylcarbonyl group. And a cyclohexylcarbonyl group is preferred.

Examples of a cycloalkylcarbonyloxy group having a carbon number of 6-9 are preferably a cyclopentylcarbonyloxy group, a cyclohexylcarbonyloxy group, a cycloheptylcarbonyloxy group and a cyclooctylcarbonyloxy group. And a cyclohexylcarbonyloxy group is preferred.

An (alkyl having a carbon number of 1-12)-substituted benzoyl group, which is provided with preferably 1-3 and most preferably 1-2 alkyl groups, is a o-, m- or p-methylbenzoyl group, a 2,3-dimethylbenzoyl group, a 2,4-dimethylbenzoyl group, a 2,5-dimethylbenzoyl group, a 2,6-dimethylbenzoyl group, a 3,4-dimethylbenzoyl group, a 3,5-dimethylbenzoyl group, a 2-methyl-6-ethylbenzoyl group, a 4-tert-butylbenzoyl group, a 2-ethylbenzoyl group, a 2,4,6-trimethylbenzoyl group, a 2,6-dimethyl-4-tert-butylbenzoyl group or a 3,5-di(tert-butyl)benzoyl group. The preferable substituents are alkyl groups provided with a carbon number of 1-8 and most preferably of 1-4.

An alkyl having a carbon number of 1-12 substituted benzoyloxy group, which is provided with preferably 1-3 and most preferably 1-2 alkyl groups, is a o-, m- or p-methylbenzoyloxy group, a 2,3-dimethylbenzoyloxy group, a 2,4-dimethylbenzoyloxy group, a 2,5-dimethylbenzoyloxy group, a 2,6-dimethylbenzoyloxy group, a 3,4-dimethylbenzoyloxy group, a 3,5-dimethylbenzoyloxy group, a 2-methyl-6-ethylbenzoyloxy group, a 4-tert-butylbenzoyloxy group, a 2-ethylbenzoyloxy group, a 2,4,6-trimethylbenzoyloxy group, a 2,6-dimethyl-4-tert-butylbenzoyloxy group or a 3,5-di(tert-butyl)benzoyloxy group. The preferable substituents are alkyl groups provided with a carbon number of 1-8 and most preferably of 1-4.

An alkyl group having a carbon number of up to 25 is a branched or un-branched group, and, for example, a methyl group, an ethyl group, a propyl group, an isopropyl group, a n-butyl group, a secondary butyl group, an isobutyl group, a tertiary butyl group, a 2-ethylbutyl group, a n-pentyl group, an isopentyl group, a 1-methylpentyl group, a 1,3-dimethylbutyl group, a n-hexyl group, a 1-methylhexyl group, a n-heptyl group, an isoheptyl group, a 1,1,3,3-tetramethylbutyl group, a 1-methylheptyl group, a 3-methylheptyl group, an n-octyl group, a 2-ethylhexyl group, a 1,1,3-trimethylhexyl group, a 1,1,3,3-tetramethylpentyl group, a nonyl group, a decyl group, an undecyl group, a 1-methylundecyl group, a dodecyl group, a 1,1,3,3,5,5-hexamethylhexyl group, a tridecyl group, a tetradecyl group, a pentadecyl group, a hexadecyl group, a heptadecyl group, an octadecyl group, an eicosyl group or a docosyl group. Preferable R$_2$ and R$_4$ are typically an alkyl group having a carbon number of 1-18. Specifically preferable R$_4$ is an alkyl group having a carbon number of 1-4.

An alkenyl group having a carbon number of 3-25 is a branched or un-branched group, and, for example, includes a propenyl group, a 2-butenyl group, a 3-butenyl group, an isobutenyl group, an n-2,4-pentadienyl group, a 3-methyl-2-butenyl group, an n-2-octenyl group, an n-2-dodecenyl group, an iso-dodecenyl group, an oleyl group, an n-2-octadecanyl group or an n-4-octadecanyl group. Preferable is an alkenyl group having a carbon number of 3-18, more preferably of 3-12, typically of 3-6 and most preferably of 3-4.

An alkenyloxy group having a carbon number of 3-25 is a branched or un-branched group, and, for example, includes a propenyloxy group, a 2-butenyloxy group, a 3-butenyloxy group, an isobutenyloxy group, an n-2,4-pentadienyloxy group, a 3-methyl-2-butenyloxy group, an n-2-octenyloxy group, an n-2-dodecenyloxy group, an iso-dodecenyloxy group, an oleyloxy group, an n-2-octadecanyloxy group or an n-4-octadecanyloxy group. Preferable is an alkenyloxy group having a carbon number of 3-18, more preferably of 3-12, typically of 3-6 and most preferably of 3-4.

An alkynyl group having a carbon number of 3-25 is an branched or un-branched group, and, for example, includes a propynyl group (—CH$_2$—C≡CH), a 2-butynyl group, a 3-butynyl group, an n-2-octynyl group and an n-2-dodecynyl group. Preferable is an alkynyl group having a carbon number of 3-18, more preferably of 3-12, typically of 3-6 and most preferably of 3-4.

An alkynyloxy group having a carbon number of 3-25 is a branched or un-branched group, and, for example, includes a propynyloxy group (—OCH$_2$—C≡CH), a 2-butynyloxy group, a 3-butynyloxy group, an n-2-octynyloxy group and an n-2-dodecynyloxy group. Preferable is an alkynyloxy group having a carbon number of 3-18, more preferably of 3-12, typically of 3-6 and most preferably of 3-4.

An alkyl group having a carbon number of 2-25, which is disconnected by an oxygen atom, a sulfur atom or

is typically CH$_3$—O—CH)$_2$—, CH$_3$—S—CH$_2$—, CH$_3$—NH—CH$_2$—, CH$_3$—N(CH$_3$)—CH$_2$—, CH$_3$—O—CH$_2$CH$_2$—OCH$_2$—, CH$_3$—(O—CH$_2$CH$_2$)$_2$O—CH$_2$—, CH$_3$—(O—CH$_2$CH$_2$)$_3$O—CH$_2$— or CH$_3$—(O—CH$_2$CH$_2$)$_4$O—CH$_2$—.

A phenylalkyl group having a carbon number of 7-9 is typically a benzyl group, a α-methylbenzyl group, a α,α-dimethylbenzyl group and 2-phenylethyl group. A benzyl group and a α,α-dimethylbenzyl group are preferred.

A phenylalkyl group having a carbon number of 7-9, which is unsubstituted or substituted by 1-3 alkyl groups having a carbon number of 1-4 at the phenyl portion, is typically a benzyl group, a α-methylbenzyl group, a α,α-dimethylbenzyl group and 2-phenylethyl group, a 2-methylbenzyl group, a 3-methylbenzyl group, a 4-methylbenzyl group, a 2,4-dimethylbenzyl group, a 2,6-dimethylbenzyl group or a 4-tert-butylbenzyl group. A benzyl group is preferred.

A phenylalkyl group having a carbon number of 7-9, which is disconnected by an oxygen atom, a sulfur atom or

and is unsubstituted or substituted by 1-3 alkyl groups having a carbon number of 1-4 at the phenyl portion, is, for example, a branched or un-branched group such as a phenoxymethyl group, a 2-methylphenoxymethyl group, a 3-methylphenoxymethyl group, a 4-methylphenoxymethyl group, a 2,4-methylphenoxymethyl group, a 2,3-methylphenoxymethyl group, a phenylthiomethyl group, a N-methyl-N-phenyl-methyl group, a N-ethyl-N-phenyl-methyl group, a 4-tert-butyl-phenoxymethyl group, a 4-tert-butyl-phenylethoxymethyl group, a 2,4-di-tert-butyl-phenoxymethyl group, a 2,4-di-tert-butyl-phenoxyethoxymethyl group, a phenoxyethoxyethoxymethyl group, a benzyloxymethyl group, a benzyloxyethoxymethyl group, a N-benzyl-N-ethylmethyl group or an N-benzyl-N-isopropylmethyl group.

A phenylalkoxy group having a carbon number of 7-9 is typically a benzyloxy group, a α-methylbenzyloxy group, a α,α-dimethylbenzyloxy group and 2-phenylethoxy group. A benzyloxy group is preferred.

Examples of a phenyl group, which is substituted by an alkyl group having a carbon number of 1-4 and contains preferably 1-3 and specifically preferably 1 or 2 alkyl groups, are an o-, m- or p-methylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 2-methyl-6-ethylphenyl group, a 4-tert-butylphenyl group, a 2-ethylphenyl group and a 2,6-diethylphenyl group.

Examples of a phenoxy group, which is substituted by preferably 1-3 and specifically preferably 1 or 2 alkyl groups having a carbon number of 1-4, are an o-, m- or p-methylphenoxy group, a 2,3-dimethylphenoxy group, a 2,4-dimethylphenoxy group, a 2,5-dimethylphenoxy group, a 2,6-dimethylphenoxyl group, a 3,4-dimethylphenoxy group, a 3,5-dimethylphenoxy group, a 2-methyl-6-ethylphenoxy group, a 4-tert-butyl-phenoxy group, a 2-ethylphenoxy group and a 2,6-diethylphenoxy group.

Examples of a cycloalkyl group having a carbon number of 5-8, which is unsubstituted or substituted by an alkyl group having a carbon number of 1-4, are a cyclopentyl group, a methylcyclopentyl group, a dimethylcyclopentyl group, a cyclohexyl group, a methylcyclohexyl group, a dimethylcyclohexyl group, a trimethylcyclohexyl group, a tert-butylcyclohexyl group, a cycloheptyl group and a cyclooctyl group. A cyclohexyl group and a tert-butyl-cyclohexyl group are preferred.

Examples of a cycloalkoxy group having a carbon number of 5-8, which is unsubstituted or substituted by an alkyl group having a carbon number of 1-4, are a cyclopentoxy group, a methylcyclopentoxy group, a dimethylcyclopentoxy group, a cyclohexoxy group, a methylcyclohexoxy group, a dimethyl-cyclohexoxy group, a trimethylcyclohexoxy group, a tert-butyl-cyclohexoxy group, a cycloheptoxy group and a cyclooctoxy group. A cyclohexoxy group and a tert-butyl-cyclohexoxy group are preferred.

An alkoxy group having a carbon number of up to 25 is a branched or un-branched group, and for example, is a methoxy group, an ethoxy group, a propoxy group, an isopropoxy group, a n-butoxy group, an isobutoxy group, a pentoxy group, an isopentoxy group, a hexoxy group, a heptoxy group, an octoxy group, a decyloxy group, a tetradecyloxy group, a hexadecyloxy group or an octadecyloxy group. An alkoxy group having a carbon number of 1-12, preferably of 1-8 and for example of 1-6 is preferred.

An alkoxy group having a carbon number of 2-25, which is disconnected by an oxygen atom, a sulfur atom or

is typically $CH_3-O-CH_2CH_2O-$, $CH_3SS-CH_2CH_2O-$, $CH_3-NH-CH_2CH_2O-$, $CH_3-N(CH_3)-CH_2CH_2O-$, $CH_3-O-CH_2CH_2-OCH_2CH_2O-$, $CH_3-(O-CH_2CH_2)_2O-CH_2CH_2O-$, $CH_3-(O-CH_2CH_2)_3O-CH_2CH_2-$ or $CH_3-(O-CH_2CH_2)_4O-CH_2CH_2O-$.

An alkylthio group having a carbon number of up to 25 is a branched or un-branched group, and for example, is a methylthio group, an ethylthio group, a propylthio group, an isopropylthio group, an n-butylthio group, an isobutylthio group, a pentylthio group, an isopentylthio group, a hexylthio group, a heptylthio group, an octylthio group, a decylthioy group, a tetradecylthio group, a hexadecylthio group or an octadecylthio group. An alkythio group having a carbon number of 1-12, preferably of 1-8 and for example of 1-6 is preferred.

An alkylamino group having a carbon number of up to 4 is a branched or unbranched group, and, for example, is a methylamino group, an ethylamino group, a propylamino group, an isopropylamino group, an n-butylamino group, an isobutylamino group or a tert-butylamino group.

A di(alkylamino group having a carbon number of 1-4) group is also a group in which each two portions independent from the other are branched or unbranched, and typically is a dimethylamino group, a metylethylamino group, a diethylamino group, a methyl-n-propylamino group, a methylisopropylamino group, a methyl-n-butylamino group, a methylisobutylamino group, an ethylisopropylamino group, an ethyl-n-butylamino group, an ethylisobutylamino group, an ethyl-tert-butylamino group, a diethylamino group, a diisopropylamino group, an isopropyl-n-butylamino group, an isopropylisobutylamino group, a di-n-butylamino group or a diisobutylamino group.

An alkanoylamino group having a carbon number of up to 25 is a branched or unbranched group, and for example, is a formylamino group, an acetylamino group, a propionylamino group, a butanoylamino group, a pentanoylamino group, a hexanoylamino group, a heptanoylamino group, an octanoylamino group, a nonanoylamino group, a decanoylamino group, an undecanoylamino group, a dodecanoylamino group, a tridecanoylamino group, a tetradecanoylamino group, a pentadecanoylamino group, a hexadecanoylamino group, a heptadecanoylamino group, an octadecanoylamino group, an eicosanoylamino group or a docosanoylamino group. An alkanoylamino group having a carbon number of 2-18, preferably 2-12 and for example 2-6 is preferred.

An alkylene group having a carbon number of 1-18 is a branched or unbranched group, and for example, is a methylene group, an ethylene group, a propylene group, a trimethylene group, a tetramethylene group, a pentamethylene group, a hexamethylene group, a heptamethylene group, an octamethylene group, a decamethylene group, a dodecamethylene group or an octadecamethylene group. An alkylene group having a carbon number of 1-12 and specifically of 1-8 is preferable.

An example of a cycloalkylene ring having a carbon number of 5-12, which contains 1 or 2 branched or unbranched groups and is substituted by an alkyl having a carbon number of 1-4, is a cyclopentylene, methylcyclopentylene, dimethylcyclopentylene, cyclohexylene, methylcyclohexylene, dimethylcyclohexylene, trimethylcyclohexylene, tert-butyl-cyclohexylene, cycloheptylene, cyclooctylene or cyclodecylene ring. Cyclohexylene and tert-butyl-cyclohexylene rings are preferred.

Examples of an alkylene group having a carbon number of 2-18, which is disconnected by an oxygen atom, a sulfur atom or

are —$CH_2$—O—$CH_2$—, $CH_2$—S—$CH_2$—, —$CH_2$—NH—$CH_2$—, —$CH_2$—N($CH_3$)—$CH_2$—, —$CH_2CH_2$—O—$CH_2$—, —$CH_2$—(O—$CH_2CH_2$—)$_2$O—$CH_2$—, —$CH_2$—(O—$CH_2CH_2$—)$_3$O—$CH_2$—, —$CH_2$—(O—$CH_2CH_2$—)$_4$O—$CH_2$— and —$CH_2CH_2$—S—$CH_2CH_2$—.

An alkenylene group having a carbon number of 1-18 is typically a vinylene group, a methylvinylene group, an octenylethylene group or a dodecenylethylene group. An alkenylene group having a carbon number of 2-8 is preferred.

Alkylidene groups having a carbon number of 2-20 are typically an ethylidene group, a propylidene group, a butylidene group, a pentylidene group, a 4-methylpentylidene group, a heptylidene group, a nonylidene group, a tridecylidene group, a nonadecylidene group, a 1-methylethylidene group, a 1-ethylpropylidene group and a 1-ethylpentylidene group. An alkylidene group having a carbon number of 2-8 is preferred.

Examples of a phenylalkylidene group having a carbon number of 7-20 are a benzylidene group, a 2-phenylethylidene group and a 1-phenyl-2-hexylidene group. A phenylalkylidene group having a carbon number of 7-9 is preferred.

A cycloalkylene group having a carbon number of 5-8 is an unsaturated hydrocarbon group, which is provided with two free electrons and at least one ring unit, and for example, is a cyclopentylene group, a cyclohexylene group, a cycloheptylene group or a cyclooctylene group. A cyclohexylene group is preferred.

Bicycloalkylene groups having a carbon number of 7-8 are bicycloheptylene group and a bicyclooctylene group.

An example of an unsubstituted or an (alkyl having a carbon number of 1-4)-substituted phenylene group or naphthylene group is a 1,2-, 1,3- or 1,4-phenylene group; a 1,2-, 1,3-, 1,4-, 1,6-, 1,7-, 2,6- or 2,7-naphthylene group. A 1,4-phenylene group is preferred.

Examples of an (alkyl group having a carbon number of 1-4)-substituted cycloalkylidene ring having a carbon number of 5-8, which contains preferably 1-3 and most preferably 1 or 2 branched or unbranched alkyl groups, are cyclopentylidene, methylcyclopentylidene, dimethylcyclopentylidene, cyclohexylidene, methylcyclohexylidene, dimethylcyclohexylidene, trimethylcyclohexylidene, tertiary-butylcyclohexylidene, cycloheptylidene and cyclooctylidene rings. Cyclohexylidene and tertiary-butylcyclohexylidene rings are preferred.

A mono-, di- or tri-valent metal cation is preferably an alkali metal cation, an alkali earth metal cation or an aluminum cation, and for example, is $Na^+$, $K^+$, $Mg^{++}$, $Ca^{++}$ or $Al^{+++}$.

A preferable compound represented by general formula (I) is a compound in which, when n is 1, $R_1$ is a phenyl group each of which is unsubstituted or substituted at the para-position by an alkoxy group having a carbon number of 1-18, an alkylthio group having a carbon number of 1-18 or a di(alkyl having a carbon number of 1-4)-amino group; an alkylphenyl group which is substituted by 1-5 alkyl groups simultaneously containing carbon atoms of up to 18 in the alkyl groups; a naphthyl group, a biphenyl group, a terphenyl group, a phenanthryl group, an anthryl, a fluorenyl group, a carbazolyl group, a thienyl group, a pyrrolyl group, a phenothiazinyl group or a 5,6,7,8-tetrahydronaphthyl group, each of which is unsubstituted or substituted by an alkyl group having a carbon number of 1-4, an alkoxy group an alkylthio group having a carbon number of 1-4, a hydroxyl group or an amino group.

Another preferable compound represented by general formula (I) is, a compound in which, when n is 2, $R_1$ is —$R_{12}$—X—$R_{13}$—; $R_{12}$ and $R_{13}$ is a phenylen group; X is an oxygen atom or —$NR_{31}$—; and $R_{31}$ is an alkyl group having a carbon number of 1-4.

A further preferable compound represented by general formula (I) is a compound, in which, when n is 1, $R_1$ each is a naphthyl group, a phenanthryl group, a thienyl group, a dibenzofuryl group, a carbazolyl group, a fluorenyl group, or a group represented by formula (II)

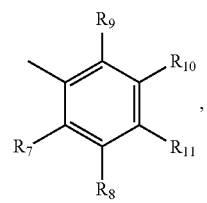

(II)

each of which is unsubstituted or substituted by an alkyl group having a carbon number of 1-4, an alkoxy group having a carbon number of 1-4, an alkylthio group having a carbon number of 1-4, a hydroxyl group, a halogen atom, an amino group, an alkylamino group having a carbon number of 1-4 or a di(alkyl having a carbon number of 1-4)-amino group; $R_7$, $R_8$, $R_9$, $R_{10}$, and $R_{11}$ are a hydrogen atom, a chlorine atom, a bromine atom, a hydroxyl group, an alkyl group having a carbon number of 1-18; an alkyl group having a carbon number of 2-18, which is disconnected by an oxygen atom or a sulfur atom; an alkoxy group having a carbon number of 1-18; an alkoxy group having a carbon number of 2-18, which is disconnected by an oxygen atom or a sulfur atom; an alkylthio group having a carbon number of 1-18, an alkenyloxy group having a carbon number of 3-12, an alkynyloxy group having a carbon number of 3-12, a phenylalkyl group having a carbon number of 7-9, a phenylalkoxy group having a carbon number of 7-9, an unsubstituted or an (alkyl having a carbon number of 1-4)-substituted phenyl group, a phenoxy group, a cyclohexyl group, a cycloalkoxy group having a carbon number of 5-8, an alkylamino group having a carbon number of 1-4, a di(alkyl having a carbon number of 1-4)amino group, an alkanoyl group having a carbon number of 1-12; an alkanoyl group having a carbon number of 3-12, which is disconnected by an oxygen atom or a sulfur atom; an alkanoyloxy group having a carbon number of 3-12; an alkanoyloxy group having a carbon number of 3-12, which is disconnected by an oxygen atom or a sulfur atom; an alkanoylamino group having a carbon number of 1-12, an alkenoyl group having a carbon number of 3-12, an alkenoyloxy group having a carbon number of 3-12, a cyclohexylcarbonyl group, a cyclohexylcarbonyloxy group, a benzoyl group or an (alkyl having a carbon number of 1-4)-substituted benzoyl group; a benzoyloxy group or an (alkyl having a carbon number of 1-4)-substituted benzoyloxy group;

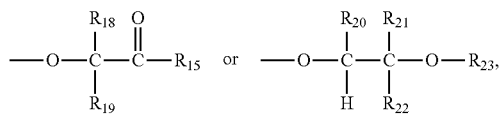

or in formula (II), each pair of substituents $R_7$ and $R_8$ or $R_8$ and $R^{11}$ may form a benzene ring together with the bonded carbon atoms. $R_{11}$ is a hydrogen atom, an alkyl group having a carbon number of 1-18, an alkyltio group having a carbon number of 1-18, a phenyl alkyl group having a carbon number of 1-18, an unsubstituted or an (alkyl having a carbon number of 1-4)-substituted phenyl group, a cyclohexyl group, an alkylamino group having a carbon number of 1-4, a di(alkyl having a carbon number of 1-4)amino group, an alkanoyl group having a carbon number of 1-12, an alkanoyl group having a carbon number of 3-12 which is disconnected by an oxygen atom, a sulfur atom, an alkanoyl amino group having a carbon number of 1-12, an alkenoyl group having a carbon number of 3-12, a cyclohexylcarbonyl group, a benzoyl group or an (alkyl having a carbon number of 1-4)-substituted benzoyl group; a benzoyloxy group or an (alkyl having a carbon number of 1-4)-substituted benzoyloxy group; in this regard, at least one of $R_7$, $R_8$, $R_9$, $R_{10}$ and $R_{11}$ is not a hydrogen atom; $R_{16}$ is a hydroxyl group, an alkoxy group having a carbon number of 1-12 or

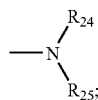

$R_{18}$ and $R_{19}$ each independently are a hydrogen atom or an alkyl group having a carbon number of 1-4; $R_{20}$ is a hydrogen atom; $R_{21}$ is a hydrogen atom, a phenyl group, an alkyl group having a carbon number of 1-18, an alkyl group having a carbon number of 2-18 which is disconnected by an oxygen atom or a sulfur atom, a phenylalkyl group having a carbon number of 7-9, an phenylalkyl group having a carbon number of 7-18 which is disconnected by an oxygen atom or a sulfur atom and is substituted by 1-3 alkyl groups having a carbon number of 1-4 at the phenyl portion; or $R_{20}$ and $R_{21}$ form a cyclohexylene ring, which is unsubstituted or substituted by an alkyl group having a carbon number of 1-4 together with the bonded carbon atoms; $R_{22}$ is a hydrogen atom or an alkyl group having a carbon number of 1-4; $R_{23}$ is a hydrogen atom or an alkanoyl group having a carbon number of 1-18, or an alkenoyl group having a carbon number of 3-12; an alkanoyl group having a carbon number of 3-12 which is disconnected by an oxygen atom or a sulfur atom; an alkanoyl group having a carbon number of 2-12 which is substituted by a di(alkyl having a carbon number of 1-6)-phosphonate group; a cycloalkylcarbonyl group having a carbon number of 6-9, a benzoyl group;

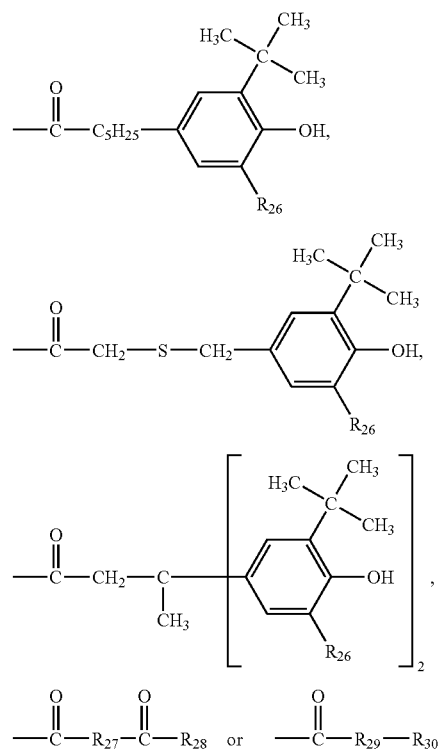

(where, s is 1 or 2); $R_{24}$ and $R_{25}$ each independently are a hydrogen atom or an alkyl group having a carbon number of 1-12; $R_{26}$ is a hydrogen atom or an alkyl group having a carbon number of 1-4; $R_{27}$ is a hydrogen atom or an alkylene group having a carbon number of 1-12, an alkenylene group having a carbon number of 2-8, an alkylidene group having a carbon number of 2-8, a phenylalkylene group having a carbon number of 7-12, an cycloalkenylene group having a carbon number of 5-8, or a phenylene group; $R_{28}$ is a hydroxyl group or an alkoxy group having a carbon number of 1-12 or

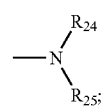

$R_{28}$ is an oxygen atom or —NH—; $R_{30}$ is a carbon atom, an alkyl group having a carbon number of 1-18 or a phenyl group.

Further, preferable is a compound represented by general formula (I), in which, when n is 1, $R_1$ is a phenanthryl group, a thienyl group, a dibenzofuryl group; an unsubstituted or (alkyl having a carbon number of 1-4)-substituted carbazolyl group; or a fluorenyl group, or a group represented by formula (II)

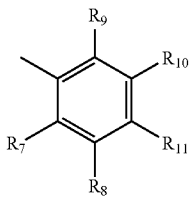

(II)

non-woven fabric sheet $R_7$, $R_8$, $R_9$, $R_{10}$ and $R_{11}$ each independently are a hydrogen atom, a chlorine atom, a hydroxyl group, an alkyl group having a carbon number of 1-18, an alkoxy group having a carbon number of 1-18, an alkylthio group having a carbon number of 1-18, an alkenyloxy group having a carbon number of 3-4, an alkynyloxy group having a carbon number of 3-4, a phenyl group, a benzoyl group, a benzoyloxy group or

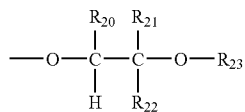

$R_{11}$ is a hydrogen atom, an alkyl group having a carbon number of 1-18, an alkylthio group having a carbon number of 1-18, a phenyl group or a cyclohexyl group; in this regard, at least one of $R_7$, $R_8$, $R_9$, $R_{10}$ and $R_{11}$ is not a hydrogen atom; $R_{20}$ is a hydrogen atom; $R_{21}$ is a hydrogen atom, a phenyl group, an alkyl group having a carbon number of 1-18; or $R_{20}$ and $R_{21}$ form cyclohexylene ring which is unsubstituted or substituted by 1-3 alkyl groups having a carbon number of 1-4 together with the bonded carbon atoms; $R_{22}$ is a hydrogen atom or an alkyl group having a carbon number of 1-4; $R_{23}$ is a hydrogen atom or an alkanoyl group having a carbon number of 1-12 or a benzoyl group.

A compound represented by general formula (I), in which $R_7$, $R_8$, $R_9$, $R_{10}$ and $R_{11}$ each independently are a hydrogen atom, an alkyl group having a carbon number of 1-4, or an alkoxy group having a carbon number of 1-8, is specifically preferable.

A specifically preferable compound represented by general formula (I) is a compound, in which $R_2$, $R_3$, $R_4$ and $R_5$ each independently are a hydrogen atom, a chlorine atom, a hydroxyl group, an alkyl group having a carbon number of 1-18, a benzyl group, a phenyl group, a cycloalkyl group having a carbon number of 5-8, an alkoxy group having a carbon number of 1-18, an alkylthio group having a carbon number of 1-18, an alkanoyloxy group having a carbon number of 1-18, an alkanoylamino group having a carbon number of 1-18, an alkenoyloxy group having a carbon number of 3-18 or a benzoyloxy group; or substituents $R_2$ and $R_3$, $R_3$ and $R_4$, or $R_4$ and $R_5$ form a benzene ring together with the bonded carbon atoms; $R_4$ further is —$(CH_2)_p$—$COR_{15}$ or —$(CH_2)_q$—OH (wherein, p is 1 or 2; q is 2, 3, 4, 5 or 6); or $R_4$ is a group represented by formula (III) when $R_3$, $R_5$ and $R_6$ are a hydrogen atom; $R_{16}$ is a hydroxyl group, an alkoxy group having a carbon number of 1-12 or

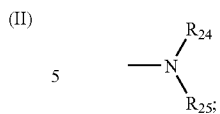

$R_{16}$ and $R_{17}$ are a methyl group or form a cycloalkylidene ring having a carbon number of 5-8, which is unsubstituted or substituted by 1-3 alkyl groups having a carbon number of 1-4, together with the bonded carbon atoms; $R_{24}$ and $R_{25}$ each independently are a hydrogen atom or an alkyl group having a carbon number of 1-12.

A specifically preferable compound represented by general formula (R) further is a compound, in which at least two of $R_2$, $R_3$, $R_4$ and $R_5$ are a hydrogen atom.

A specifically interested compound represented by general formula (R) is a compound in which $R_3$ and $R_5$ are a hydrogen atom.

A very specifically preferable compound represented by general formula (I) is also a compound, in which $R_2$ is an alkyl group having a carbon number of 1-4; $R_3$ is a hydrogen atom; $R_4$ is an alkyl group having a carbon number of 1-4; or when $R_6$ is a hydrogen atom, $R_4$ further is a group represented by formula (III); $R_6$ is a hydrogen atom.

A compound represented by general formula (R) according to the present invention can produced by a well-known method.

Concrete examples of the compound represented by general formula (R) are shown below, however the present invention is not limited to these examples.

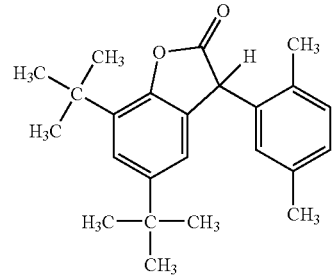

101

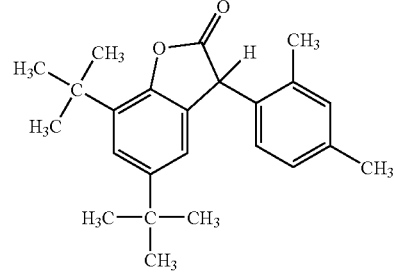

102

-continued
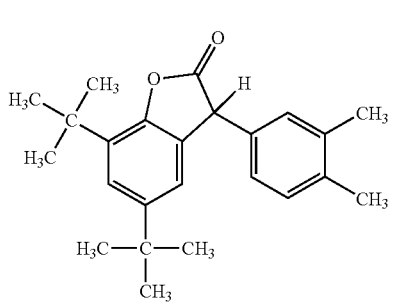
103
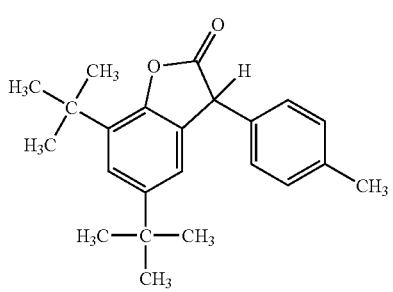
104
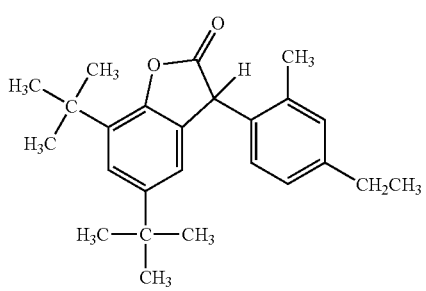
105
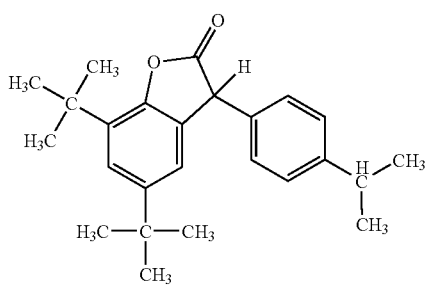
106
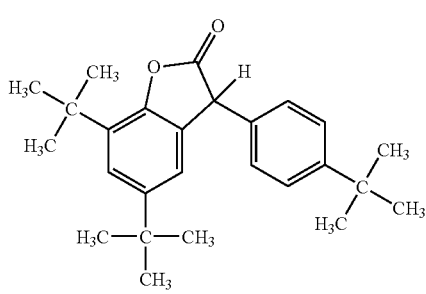
107
-continued
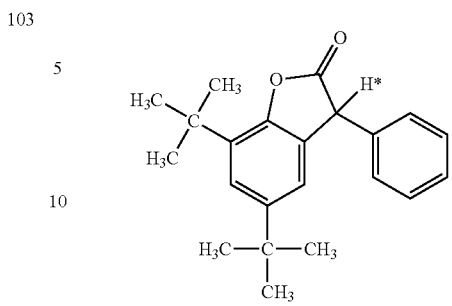
108
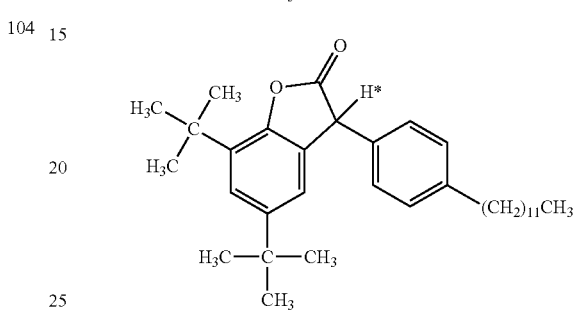
109
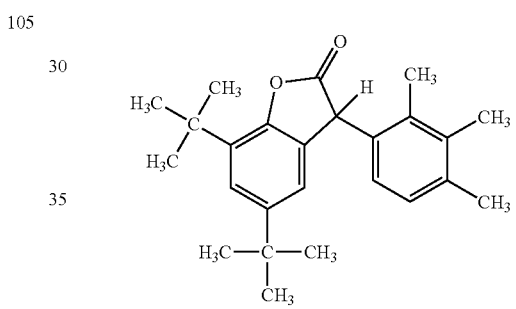
110
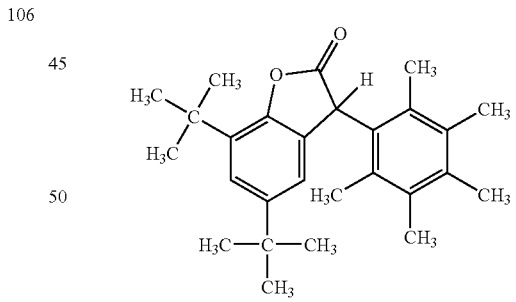
111
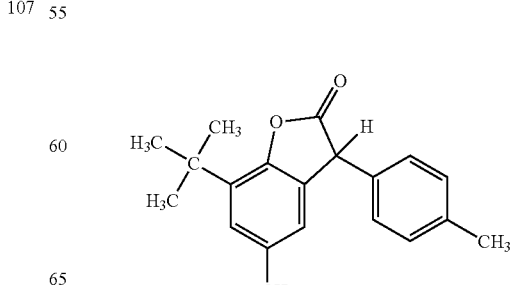
112

-continued

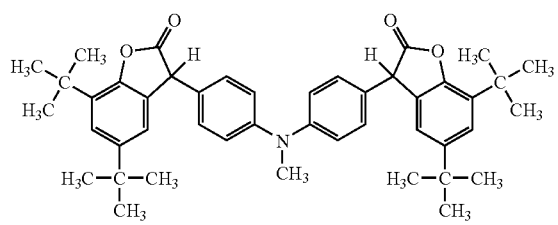
113

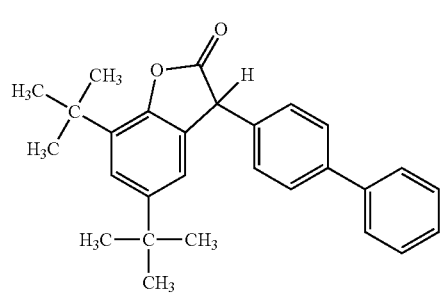
114

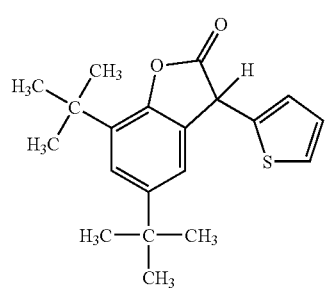
115

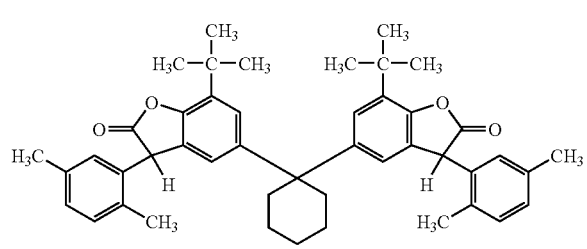
116

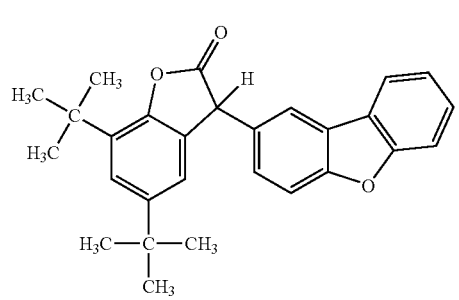
117

-continued

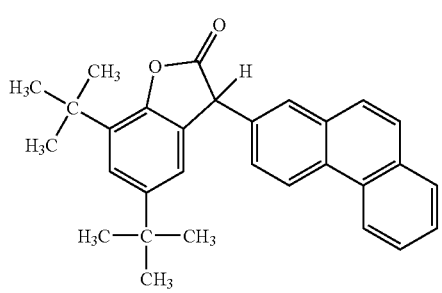
118

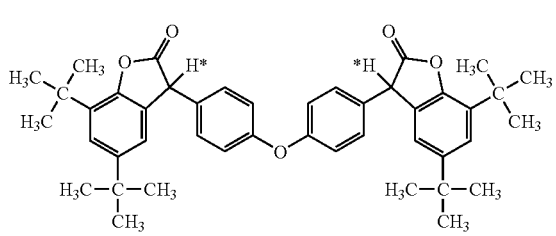
119

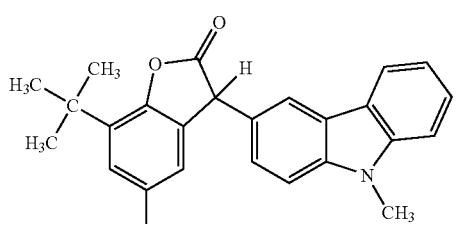
120

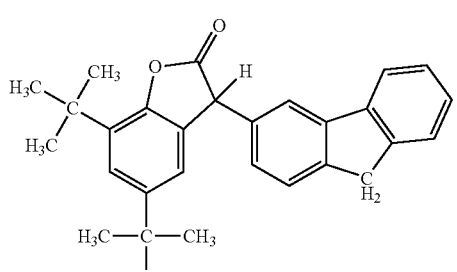
121

<<Compound Having a Furanose Structure or a Pyranose Structure to be Used in the Invention>>

The cellulose ester film preferably to be used in the invention preferably contains a cellulose derivative and an esterified compound (referred to as sugar ester compound sometimes) in which all or a part of OH groups in a compound (A) having one of a furanose structure and a pyranose structure or in a compound (B) in which two to twelve of at least one type of a furanose structure and a pyranose structure are bonded, are esterified.

As referable examples of the compound (A) and the compound (B), for example, the following compounds can be listed, however, the present invention is not limited to those compounds.

As referable examples of the compound (A), glucose, galactose, mannose, fructose, xylose, and arabinose can be usable.

As referable examples of the compound (B), lactose, sucrose, cellobiose, maltose, cellotriose, maltotriose, raffinose and kestose can be usable.

Among the compound (A) and the compound (B), a compound having both of the furanose structure and the pyranose structure is preferable. As the compound having both of the furanose structure and the pyranose structure, sucrose can be usable.

Monocarboxylic acid to be used to esterify all or a part of OH groups of the compound (A) and the compound (B), is not specifically limited and known an aliphatic monocarboxylic acid, an alicyclic monocarboxylic acid and an aromatic monocarboxylic acid can be used. The monocarboxylic acid may be used singly or in combination of two or more kinds thereof.

Examples of preferable aliphatic monocarboxylic acid include a saturated fatty acid such as acetic acid, propionic acid, butylic acid, isobutylic acid, valerianic acid, capronic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanic acid, arachidic acid, behenic acid, lignoceric acid, cerotic acid, heptacosanoic acid, montanic acid and melissic acid, and a unsaturated fatty acid such as undecylic acid, oleic acid, sorbic acid, linolic acid, linolenic acid, arachidonic acid and octenic acid.

As examples of preferable aliphatic carboxylic acid, cyclopentene carboxylic acid, cyclohexane carboxylic acid, cycloctane carboxylic acid and derivatives thereof can be cited.

Examples of the aromatic monocarboxylic acid include benzoic acid, an aromatic monocarboxylic acid formed by introducing one to five alkyl or alkoxy groups into the benzene ring of benzoic acid such as toluic acid, an aromatic monocarboxylic acid having two or more benzene rings such as cinnamic acid, benzilic acid, biphenyl carboxylic acid, naphthalene carboxylic acid, tetralin carboxylic acid and derivatives thereof. Benzoic acid is particularly preferable.

Among the esterified compound of the compound (A) and the compound (B), an acetylated compound in which acetyl groups are introduced by esterification, is preferable.

Details of the production method of the above acetylated compounds are described in Tokkai Hei 8-245678.

In addition to the esterified compound of the compound (A) and the compound (B), an esterified compound of oligosaccharide can be employed as an esterified compound of a compound in which three to twelve of at least one type of a furanose structure and a pyranose structure are bonded.

The oligosaccharide can be produced by acting a ferment such as amylase to starch, cane sugar and so on. As a oligosaccharide usable for the invention, marthe oligosaccharide, isomarthe oligosaccharide, fructo oligosaccharide, galact oligosaccharide, and xylo oligosaccharide may be listed.

The oligosaccharide can be acetylated with the same method as that for the above compositions (A) and (B).

Next, a production example of an esterified compound is described.

Two hundreds ml of acetic anhydride was dropped into a solution in which 100 ml of pyridine was added into 29.8 g, 166 mmol of glucose and a reaction among them was conducted for 24 hours. Subsequently, the resultant solution was condensed with an evaporator and the condensed solution was put in iced water. After leaving it alone for one hour, the solution was filtered with a glass filter so as to separate a solid and water, and then the solid on the glass filter was dissolved with chloroform, and the solution is separated with chilled water until the solution became neutrality. After separating an organic layer, it was dried with anhydrous sodium sulfate. Further, after removing the anhydrous sodium sulfate by filtration, chloroform was removed with an evaporator, and then conducting drying under reduced pressure, whereby glucose penta acetate (58.8 g, 150 mmol, 90.9%) was obtained.

Incidentally, the above monocarboxylic acid can be used instead of the above-mentioned acetic anhydride.

Concrete examples of the esterified compound of the present invention are listed below but the invention is not limited to them.

Compound 1

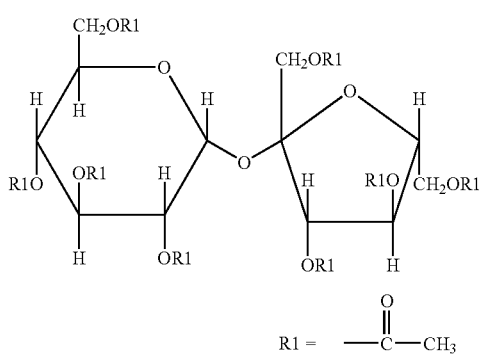

Compound 2

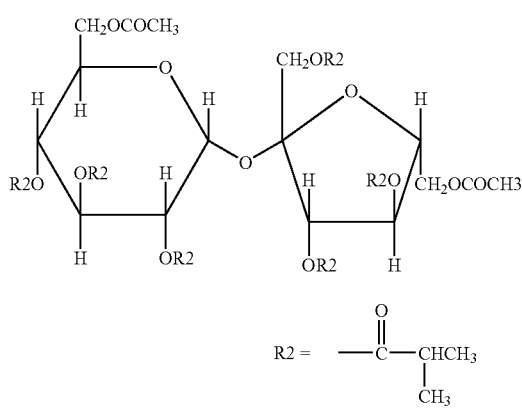

-continued
Compound 3
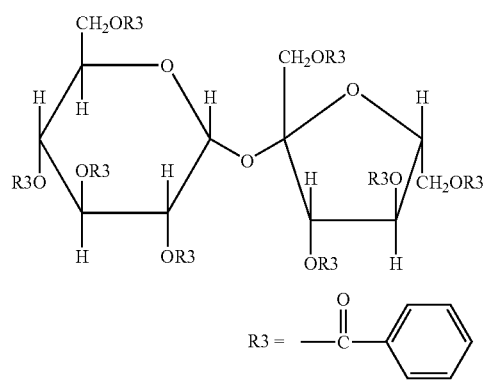
Compound 4
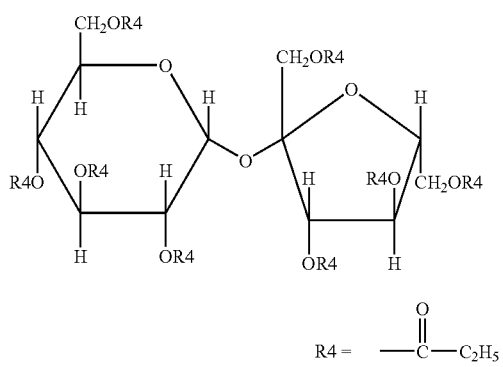
Compound 5
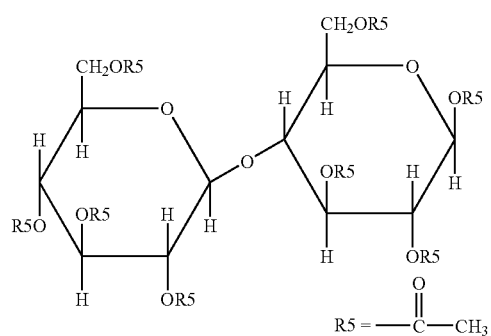
Compound 6
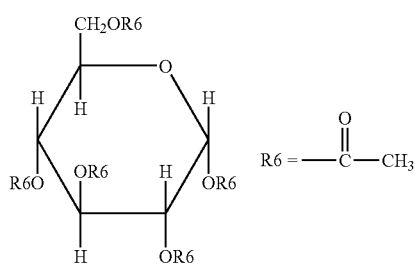
Compound 7
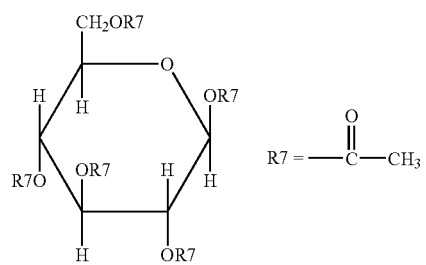
Compound 8
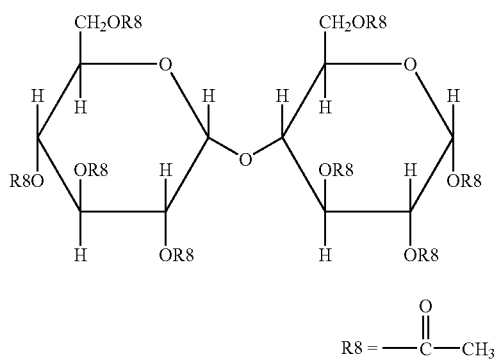
Compound 9
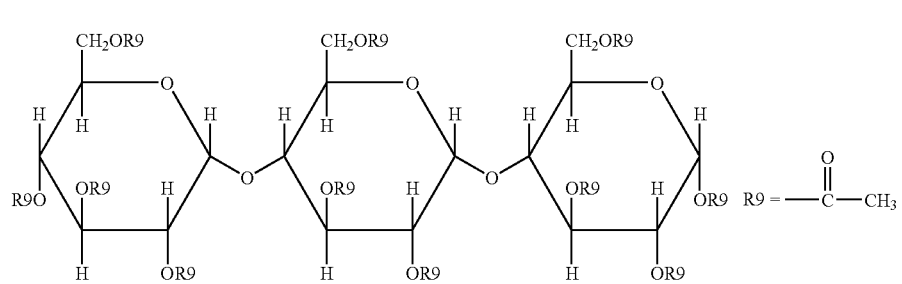

Compound 10
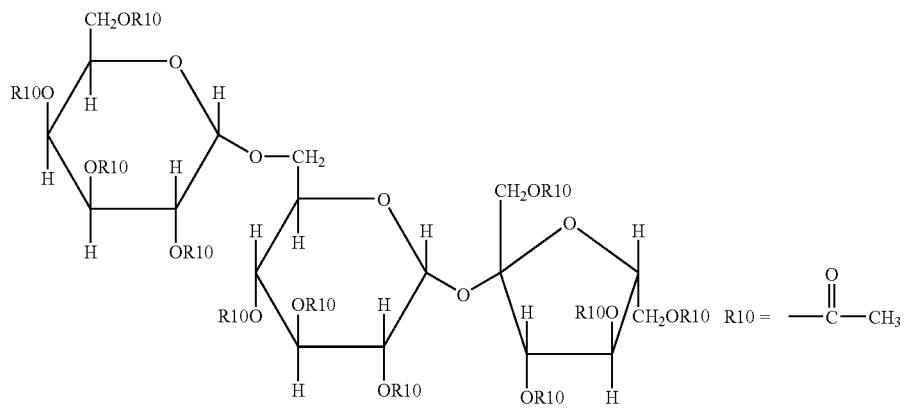
Compound 11
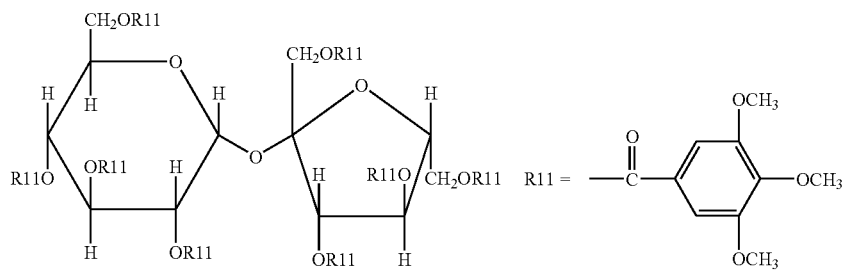
Compound 12
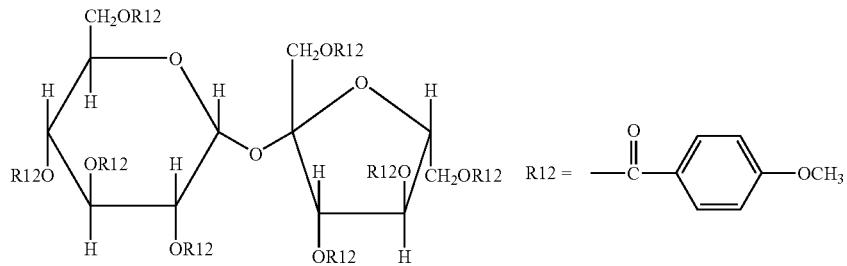
Compound 13
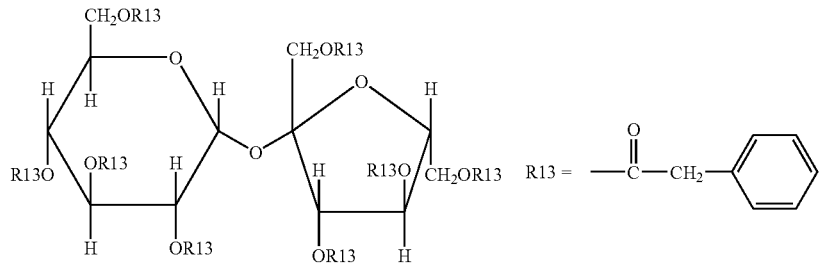
Compound 14
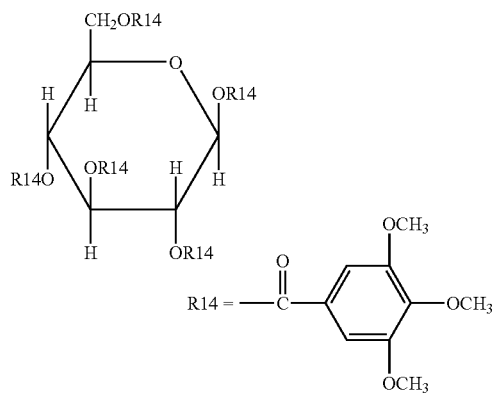
Compound 15
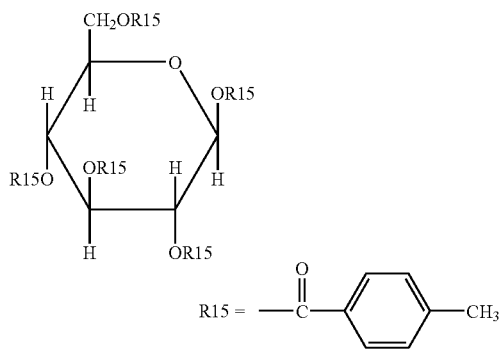

-continued
Compound 16
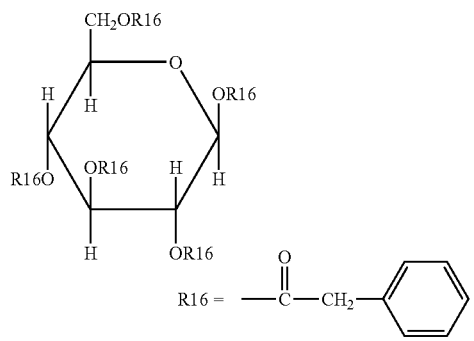
Compound 17
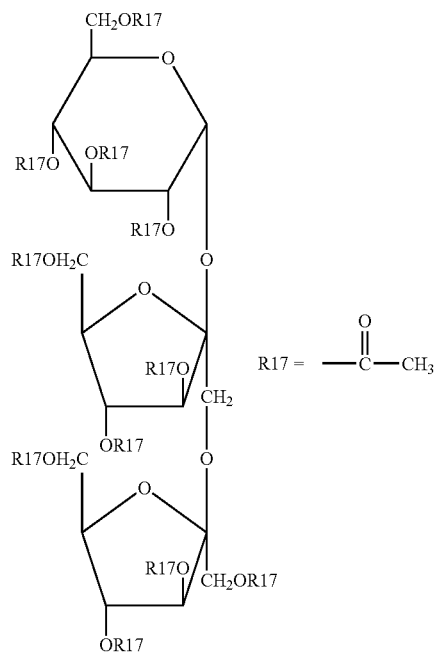
Compound 18
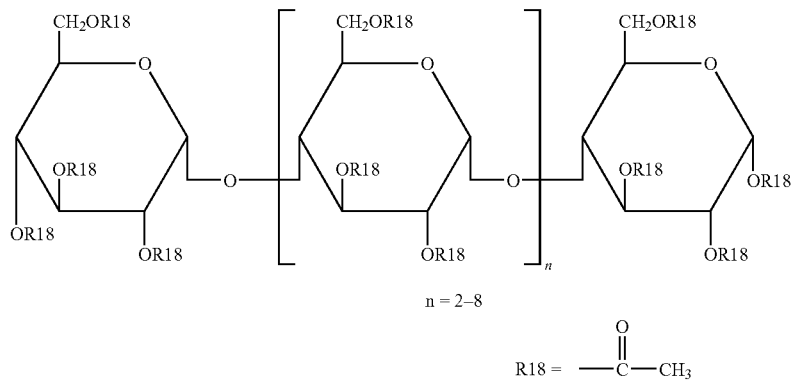
n = 2–8
Compound 19
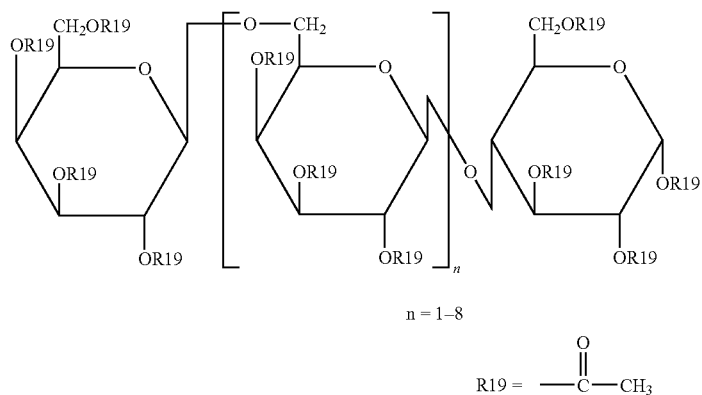
n = 1–8

Compound 20
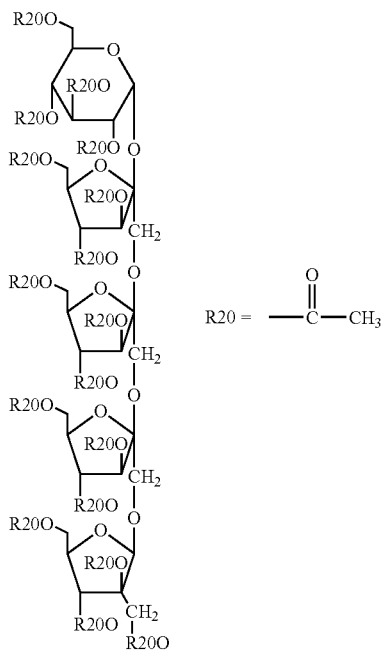
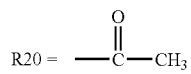
Compound 21
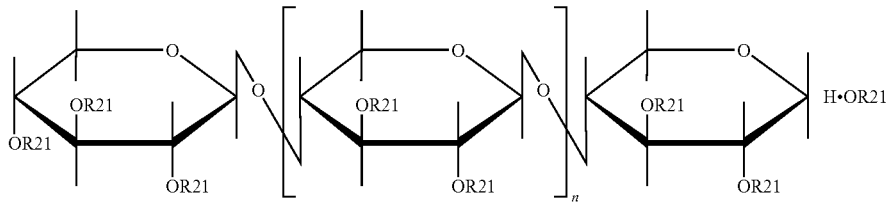
n = 1–8
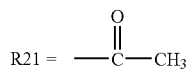
Compound 22
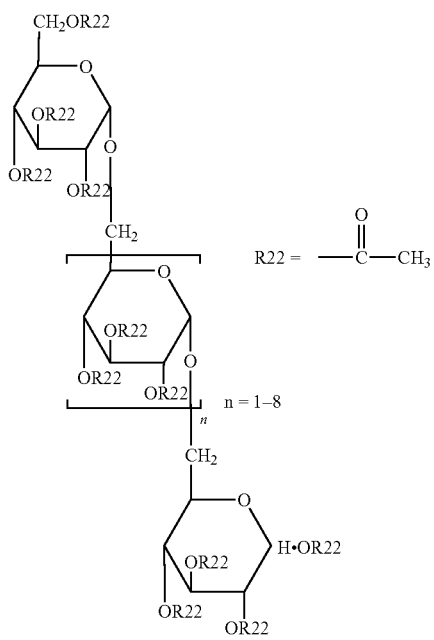
n = 1–8

In order to stabilize a display appearance quality, the cellulose ester of the invention preferably contains an esterified compound in which all or a part of OH groups in a compound (A) consisting of one of a furanose structure or in a compound (B) consisting of two to twelve of at least one type of a furanose structure and a pyranose structure which are bonded are esterified, in an amount of from 5 to 30% by weight. By containing the esterified compound within the above range, the superior effects of the present invention can be expressed, and also bleed-out can be avoided.

<Cellulose Ester>

The following describes the details of the cellulose ester used in the present invention:

The melt casting method permits a substantial reduction in the amount of the organic solvent used to produce the film. As compared with the solution casting method requiring use of a great amount of conventional organic solvent, the melt casting method provides a film characterized by a substantial improvement in environmental adaptability. Thus, the cellulose ester film is preferably manufactured by the melt casting method.

The melt casting method of the present invention is a method of producing a film by heating and melting a cellulose ester up to the temperature wherein it becomes fluid, virtually without using a solvent. It is exemplified by the method of producing a film by pushing fluid cellulose ester through a die. The solvent may be used in part of the process of preparing the molten cellulose ester. In the melt film formation process for molding a film-like product, molding operation is performed virtually without using solvent.

There is no restriction to the cellulose ester constituting an optical film if it is a cellulose ester that can be molten to form a film. It is used for aromatic carboxylic acid ester and others. When the film properties obtained such as optical properties are taken into account, the lower fatty acid ester of cellulose is preferably used. In the present invention, the lower fatty acid in lower fatty acid ester cellulose is defined as a fatty acid containing 5 or less carbon atoms. Cellulose acetate, cellulose propionate, cellulose butylate and cellulose pivalate can be mentioned as preferable lower fatty acid esters of cellulose. Although the cellulose ester replaced by the fatty acid containing six or more carbon atoms has a good melt film formation property, the cellulose ester film having been obtained therefrom has poor dynamic characteristics. This cellulose ester can hardly be used as an optical film. To ensure compatibility between the dynamic characteristics and melt film formation property, it is preferred to use a mixed fatty acid ester such as cellulose acetate propionate and cellulose acetate butylate, namely, a cellulose ester having an acyl group other than the acetyl group.

In the present invention, the cellulose ester constituting the cellulose ester film is a cellulose ester having an aliphatic acyl group having 2 or more carbon atoms, and is preferably a cellulose ester in which the total number of the carbon atoms contained in the acyl group of the cellulose ester is 6.2 to 7.5. The total number of the carbon atoms contained in the acyl group of the cellulose ester is preferably 6.5 to 7.2, more preferably 6.7 to 7.1. It should be noted, however, that the total number of carbon atoms contained in the acyl group is the total sum of the product between the substitution degree and the number of carbons in the acyl group of the cellulose ester. Further, the number of carbon atoms contained in the aliphatic acyl group is preferably 2 through 6 from the viewpoint of productivity and cost in cellulose synthesis. The portion not substituted with acyl group is normally present as a hydroxyl group. These can be synthesized by the method known in the conventional art.

The acyl group is exemplified by acetyl group, propionyl group, butyryl group, pentanate group and hexanate group. The cellulose ester is exemplified by cellulose propionate, cellulose butylate and cellulose pentanate. So long as the aforementioned number of carbon atoms of the side chain is satisfied, it is also possible to use a mixed fatty acid ester such as cellulose acetate propionate, cellulose acetate butylate, cellulose acetate pentanate. Of these substances, cellulose acetate propionate and cellulose acetate butylate are preferably employed.

Generally, the mechanical property and saponifiability of the cellulose ester film and melt film formation property of the cellulose ester are kept in a trade-off relationship with respect to the total substitution degree in the acyl group of cellulose ester. For example, in the cellulose acetate propionate, an increase in the overall substitution degree of the acyl group denotes a decrease in the mechanical property and improvement in melt film formation property. Thus, compatibility is difficult to achieve. In the present invention, the total number of carbon atoms contained in the acyl group of the cellulose ester is 6.2 through 7.2, whereby compatibility among the film mechanical property, saponifiability and melt film formation property can be ensured, according to the findings by the present inventors. Although the details of this arrangement are not very clear, it is considered that there are differences in the degree of impact upon the film mechanical property, saponifiability and melt film formation property, depending on the number of carbon atoms contained in the acyl group. To be more specific, if the substitution degree remains the same, a long-chained acyl group such as propionyl group butyryl group rather than acetyl group provides a higher degree of hydrophobicity, and hence more enhanced melt film formation property. Thus, to achieve the same level of melt film formation property, the substitution degree of the propionyl group, butyryl group can be lower than that of the acetyl group. This retards reduction in the mechanical property and saponifiability.

A cellulose ester preferable for a melt casting method comprises an acyl group f having a carbon number of 2-4 as a substituents, and when a substitution degree of an acetyl group is set to X and a substitution degree of a propionyl group or a butyryl group is set to Y, the cellulose ester satisfies the following formulas (I) and (II) simultaneously.

$2.0 \leq X+Y \leq 2.8$            Formula (I)

$0 \leq X \leq 2.7$,            Formula (II)

Especially, cellulose acetate propionate with a condition of $1.0 \leq X \leq 2.5, 0.1 \leq Y \leq 2.0$ (the total substitution degree of an acyl group=X+Y) is preferable. In disregard, a portion not substituted with an acyl group usually exists as a hydroxyl group. These can be synthesized by a well-known method.

The substitution degree of acyl group such as acetyl group, propionyl group and butyl group can be measured according to the ASTM-D817-96.

In the cellulose ester preferably used in the present invention, the ratio of the weight average molecular weight Mw to number average molecular weight Mn is 1.0 through 5.5. This ratio is more preferably 1.4 through 5.0, still more preferably 2.0 through 3.0. Further, the Mw is preferably 50,000 through 500,000, more preferably 100,000 through 300,000.

From the industrial viewpoint, cellulose ester is synthesized by sulfuric acid used as a catalyst. This sulfuric acid is not completely removed, and the remaining sulfuric acid causes various forms of decomposition reaction at the time of melt film formation. This will affect the quality of the cellulose ester film to be obtained. Thus, the amount of the residual sulfuric acid contained in the cellulose ester used in the present invention is 0.1 through 40 ppm in terms of the sulfur element. They are considered to be included as salts. When the amount of the residual sulfuric acid contained therein exceeds 40 ppm, the deposition on the die lip at the time of heat-melting will increase, and therefore, such an amount is not preferred. Further, at the time of thermal stretching or slitting subsequent to thermal stretching, the material will be easily damaged, and therefore, such an amount is not preferred. The amount of the residual sulfuric acid contained therein should be reduced as much as possible, but when it is to be reduced below 0.1, the load on the cellulose ester washing process will be excessive and the material tends to be damaged easily. This should be avoided. This may be because an increase in the frequency of washing affects the resin, but the details are not yet clarified. Further, the preferred amount is in the range of 0.1 through 30 ppm. The amount of the residual sulfuric acid can be measured according to the ASTM-D817-96 in the similar manner.

The total amount of the residual amount of acid (e.g., acetic acid) is preferably 1000 ppm or less, more preferably 500 ppm or less, still more preferably 100 ppm or less.

The amount of the residual acid can be kept within the aforementioned range if the synthesized cellulose ester is washed more carefully than in the case of the solution casting method. Then, when a film is manufactured by the melt casting, the amount of depositions on the lip portion will be reduced so that a film characterized by a high degree of flatness is produced. Such a film will be further characterized by excellent resistance to dimensional changes, mechanical strength, transparency, resistance to moisture permeation, Rt value (to be described later) and Ro value. Further, the cellulose ester can be washed using water as well as a poor solvent such as methanol or ethanol. It is also possible to use a mixture between a poor solvent and a good solvent if it is a poor solvent as a result. This will remove the inorganic substance other than residual acid, and low-molecular organic impurities. The cellulose ester is washed preferably in the presence of an antioxidant such as a hindered amine and phosphorous acid ester. This will improve the heat resistance and film formation stability of the cellulose ester.

To improve the heat resistance, mechanical property and optical property of the cellulose ester, the cellulose ester is settled again in the poor solvent, subsequent to dissolution of the good solvent of the cellulose ester. This will remove the low molecular weight component and other impurities of the cellulose ester. In this case, similarly to the aforementioned case of washing the cellulose ester, washing is preferably carried out in the presence of an antioxidant.

Subsequent to re-settling of the cellulose ester, another polymer or low molecular compound may be added.

The cellulose ester used in the present invention is preferred to be such that there are few bright defects when formed into a film. The bright defect can be defined as follows: Two polarizing plates are arranged perpendicular to each other (crossed-Nicols), and a cellulose ester film is inserted between them. Light of the light source is applied from one of the surfaces, and the cellulose ester film is observed from the other surface. In this case, a spot formed by the leakage of light from the light source. This spot is referred to as a bright detect. The polarizing plate employed for evaluation in this case is preferably made of the protective film free of a bright defect. A glass plate used to protect the polarizer is preferably used for this purpose. The bright defect may be caused by non-acetified cellulose or cellulose with a low degree of acetification contained in the cellulose ester. It is necessary to use the cellulose ester containing few bright defects (use the cellulose ester with few distributions of substitution degree), or to filter the molten cellulose ester. Alternatively, the material in a state of solution is passed through a similar filtering step in either the later process of synthesizing the cellulose ester or in the process of obtaining the precipitate, whereby the bright defect can be removed. The molten resin has a high degree of viscosity, and therefore, the latter method can be used more efficiently.

The smaller the film thickness, the fewer the number of bright defects per unit area and the fewer the number of the cellulose esters contained in the film. The number of the bright defects having a bright spot diameter of 0.01 mm or more is preferably 200 pieces/cm$^2$ or less, more preferably 100 pieces/cm$^2$ or less, still more preferably 50 pieces/cm$^2$ or less, further more preferably 30 pieces/cm$^2$ or less, still further more preferably 10 pieces/cm$^2$ or less. The most desirable case is that there is no bright defect at all. The number of the bright defects having a bright spot diameter of 0.005 through 0.01 mm is preferably 200 pieces/cm$^2$ or less, more preferably 100 pieces/cm$^2$ or less, still more preferably 50 pieces/cm$^2$ or less, further more preferably 30 pieces/cm$^2$ or less, still further more preferably 10 pieces/cm$^2$ or less. The most desirable case is that there is no bright defect at all.

When the bright defect is to be removed by melt filtration, the bright defect is more effectively removed by filtering the cellulose ester composition mixed with a plasticizer, anti-deterioration agent and antioxidant, rather than filtering the cellulose ester melted independently. It goes without saying that, at the time of synthesizing the cellulose ester, the cellulose ester can be dissolved in a solvent, and the bright defect can be reduced by filtering. Alternatively, the cellulose ester mixed with an appropriate amount of ultraviolet absorber and other additive can be filtered. At the time of filtering, the viscosity of the melt including the cellulose ester is preferably 10000 P or less, more preferably 5000 P or less, still more preferably 1000 P or less, further more preferably 500 P or less. A conventionally known medium including a fluoride resin such as a glass fiber, cellulose fiber, filter paper and tetrafluoroethylene resin is preferably used as a filter medium. Particularly, ceramics and metal can be used in preference. The absolute filtration accuracy is preferably 50 μm or less, more preferably 30 μm or less, still more 10 μm or less, further more preferably 5 μm or less. They can be appropriately combined for use. Either a surface type or depth type filter medium can be used. The depth type is more preferably used since it has a greater resistance to clogging.

In another embodiment, it is also possible that the cellulose ester as a material is dissolved in a solvent at least once, and is dried and used. In this case, the cellulose ester is dissolved in the solvent together with one or more of the plasticizer, ultraviolet absorber, anti-deterioration agent, antioxidant and matting agent, and is dried and used. Such a good solvent as methylene chloride, methyl acetate or dioxolane that is used in the solution casting method can be used as the solvent. At the same time, the poor solvent such as methanol, ethanol or butanol can also be used. In the process of dissolution, it can be cooled down to −20° C. or less or heated up to 80° C. or more. Use of such a cellulose ester allows uniform additives to be formed in the molten state, and the uniform optical property is ensured in some cases.

The polarizing plate protective film of the present invention can be made of an adequate mixture of high polymer components other than the cellulose ester. The high polymer components to be mixed are preferably characterized by excellent compatibility with the cellulose ester compatibility. When formed into a film, the transmittance is preferably 80% or more, more preferably 90% or more, still more preferably 92% or more.

(Antioxidant)

Since decomposition of cellulose ester is accelerated not only by heat but also by oxygen, it is preferable to incorporate an antioxidant as a stabilizer in a polarizing plate protective film of the present invention.

Specifically, under a high temperature environment such as in a melt casting process, decomposition of the material for forming a cellulose ester film is accelerated by heat and oxygen, accordingly, an antioxidant is preferably incorporated in the film forming material.

In the present invention, it is also preferable to use an antioxidant in a suspension-washing process of cellulose ester using a poor solvent. Any antioxidant are employable without limitation, as far as the antioxidant contained in a poor solvent inactivates radicals generated in cellulose ester, or the antioxidant restrains deterioration of cellulose ester due to oxygen added to the generated radicals.

An antioxidant utilized in the suspension-washing of cellulose ester may remain in cellulose ester after washing. The remaining amount is preferably 0.01-2,000 ppm, more preferably 0.05-1,000 ppm and furthermore preferably 0.1-100 ppm.

As a useful antioxidant in the present invention, a compound which restrains deterioration of the material for forming a cellulose ester film due to oxygen can be utilized without limitation, however, examples of a useful compound include: phenol, hindered amine, a phosphorus-containing compound, a sulfur-containing compound, a heat resistant processing stabilizer and an oxygen scavenger. Specifically preferable among them are phenol, hindered amine and a phosphorus-containing compound. By blending such a compound, it is possible to prevent coloring and strength decrease of a cellulose ester film while keeping the transparency or heat resistance of the film. These antioxidants each can be utilized alone or in combination of at least two types.

(Phenol Type Compound)

A phenol type compound is a compound well known in the art and is described, for example, in columns 12-14 of U.S. Pat. No. 4,839,405 including 2,6-dialkylphenol derivative compounds. Among these compounds, examples of a preferable compound include those represented by Formula (E).

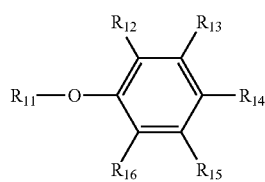

Formula (E)

In Formula (E), $R_{11}$-$R_{16}$ each represent a substituent. Examples of the substituent include: a hydrogen atom, a halogen atom (for example, a fluorine atom and a chlorine atom), an alkyl group (for example, a methyl group, an ethyl group, an isopropyl group, a hydroxyethyl group, a methoxy methyl group, a trifluoro methyl group and a t-butyl group), a cycloalkyl group (for example, a cyclopentyl group and a cyclohexyl group), an aralkyl group (for example, a benzyl group and a 2-phenethyl group), an aryl group (for example, a phenyl group, a naphthyl group, p-tolyl group and a p-chlorophenyl group), an alkoxy group (for example, a methoxy group, an ethoxy group, an isopropoxy group and a butoxy group), an aryloxy groups (for example, a phenoxy group), a cyano group, an acylamino group (for example, an acetylamino group and a propionylamino group), an alkylthio group (for example, a methylthio group, an ethylthio group and a butylthio group), an arylthio group (for example, a phenylthio group), a sulfonylamino group (for example, a methanesulfonylamino group and a benzene sulfonyl amino group), an ureido group (for example, a 3-methylureido group, a 3,3-dimethylureido group and a 1,3-dimethylureido group), a sulfamoylamino group (for example, a dimethylsulfamoyl amino group), a carbamoyl group (for example, a methylcarbamoyl group, an ethylcarbamoyl group and a dimethylcarbamoyl group), a sulfamoyl group (for example, an ethylsulfamoyl group and a dimethylsulfamoyl group), an alkoxycarbonyl group (for example, a methoxycarbonyl group and an ethoxycarbonyl group), an aryloxycarbonyl group, (for example, a phenoxycarbonyl group), a sulfonyl group (for example, a methanesulfonyl group, a butane sulfonyl group and a phenylsulfonyl group), an acyl group (for example, an acetyl group, a propanoyl group and a butyroyl group), an amino group (for example, a methylamino group, an ethylamino group and a dimethylamino group), a cyano group, a hydroxy group, a nitro group, a nitroso group, an amineoxide group (for example, a pyridine oxide group), an imide group (for example, a phthalimide group), disulfide group (for example, a benzene disulfide group and a benzothiazolyl-2-disulfide group), a carboxyl group, a sulfo group and a heterocycle group (for example, a pyrrole group, a pyrrolidyl group, a pyrazolyl group, an imidazolyl group, a pyridyl group, a benzimidazolyl group, a benzthiazolyl group and a benzoxazolyl group). These substituents may be further substituted.

Further, $R_{11}$ is preferably a hydrogen atom, and $R_{12}$ and R16 each are preferably a t-butyl group which is a phenol compound. Examples of the phenol compound include: n-octadecyl-3-(3,5-di-t-butyl-4-hydroxyphenyl)propionate, n-octadecyl-3-(3,5-di-t-butyl-4-hydroxyphenyl)acetate, n-octadecyl-3,5-di-t-butyl-4-hydroxybenzoate, n-hexyl-3,5-di-t-butyl-4-hydroxyphenylbenzoate, n-dodecyl-3,5-di-t-butyl-4-hydroxyphenylbenzoate, neo-dodecyl-3-(3,5-di-t-butyl-4-hydroxyphenyl)propionate, dodecyl-β-(3,5-di-t-butyl-4-hydroxyphenyl)propionate, ethyl-α-(4-hydroxy-3,5-di-t-butylphenyl)isobutyrate, octadecyl-α-(4-hydroxy-3,5-di-t-butylphenyl)isobutyrate, octadecyl-α-(4-hydroxy-3,5-di-t-butyl-4-hydroxyphenyl)propionate, 2-(n-octylthio)ethyl-3,5-di-t-butyl-4-hydroxy-benzoate, 2-(n-octylthio)ethyl-3,5-di-t-butyl-4-hydroxyphenylacetate, 2-(n-octadecylthio)ethyl-3,5-di-t-butyl-4-hydroxyphenylacetate, 2-(n-octadecylthio)ethyl-3,5-di-t-butyl-4-hydroxybenzoate, 2-(2-hydroxyethylthio)-ethyl-3,5-di-t-butyl-4-hydroxybenzoate, diethylglycol-bis-(3,5-di-t-butyl-4-hydroxyphenyl)propionate, 2-(n-octadecylthio)ethyl-3,5-di-t-butyl-4-hydroxyphenyl)-propionate, stearamide-N,N-bis-[ethylene-3-(3,5-di-t-butyl-4-hydroxyphenyl)propionate], N-butylimino-N,N-bis-[ethylene-3-(3,5-di-t-butyl-4-hydroxyphenyl) propionate], 2-(2-stearoyloxyethylthio)ethyl-3,5-di-t-butyl-4-hydroxybenzoate, 2-(2-stearoyloxyethylthio)ethyl-7-(3-methyl-5-t-butyl-4-hydroxyphenyl)heptanoate, 1,2-propyleneglycol-bis-[3-(3,5-di-t-butyl-4-hydroxyphenyl) propionate], ethyleneglycol-bis-[3-(3,5-di-t-butyl-4-hydroxyphenyl)propionate], neopentylglycol-bis-[3-(3,5-di-t-butyl-4-hydroxyphenyl)propionate], ethyleneglycol-bis-(3,5-di-t-butyl-4-hydroxyphenylacetate), glycerol-1-n-octadecanoate-2,3-bis-(3,5-di-t-butyl-4-hydroxyphenylacetate), pentaerythritoltetrakis[3-(3',5'-di-t-butyl-4'-hydroxyphenyl)propionate], 1,1,1- trimethylolethane-tris-[3-(3,5-di-t-butyl-4-hydroxyphenyl) propionate], sorbitol-hexa-[3-(3,5-di-t-butyl-4-hydroxyphenyl)propionate], 2-hydroxyethyl-7-(3-methyl-5-t-butyl-4-hydroxyphenyl)propionate, 2-stearoyloxyethyl-7-(3-methyl-5-t-butyl-4-hydroxyphenyl)heptanoate, 1,6-n-hexanediol-bis-[(3',5'-di-butyl-4-hydroxyphenyl)propionate] and pentaerythritoltetrakis(3,5-di-t-butyl-4-hydroxyhydrocinnamate). Above phenol compounds have been commercialized, for example, as "Irganox1076" and "Irganox1010" from Ciba Specialty Chemicals, Inc.

(Hindered Amine Compound)

In the present invention, a hindered amine compound represented by Formula (F) is preferably used as one of the useful antioxidants.

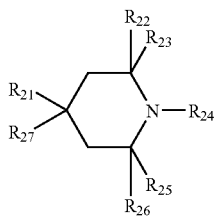

Formula (F)

In Formula (F), $R_{21}$-$R_{27}$ each represent a substituent. Examples of the substituent are common to the substituents $R_{11}$-$R_{16}$ described for Formula (A). $R_{24}$ is preferably a hydrogen atom or a methyl group, $R_{27}$ is preferably a hydrogen atom and $R_{22}$, $R_{23}$, $R_{25}$ and $R_{26}$ each are preferably a methyl group.

Examples of a hindered amine compound include: bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(N-octoxy-2,2,6,6-tetramethyl-4-piperidyl)sebacate, bis(N-benzyloxy2,2,6,6-tetramethyl-4-piperidyl)sebacate, bis(N-cyclohexyloxy-2,2,6,6-tetramethyl-4-piperidyl)sebacate, bis(1,2,2,6,6-pentamethyl-4-piperidyl)-2-(3,5-di-t-butyl-4-hydroxybenzyl)-2-butylmalonate, bis(1-acroyl-2,2,6,6-tetramethyl-4-piperidyl)-2,2-bis(3,5-di-t-butyl-4-hydroxybenzyl)-2-butylmalonate, bis(1,2,2,6,6-pentamethyl-4-piperidyl)decanedioate, 2,2,6,6-tetramethyl-4-piperidylmethacrylate, 4-[3-(3,5-di-t-butyl-4-hydroxyphenyl) propionyloxy]-1-[2-(3-(3,5-di-t-butyl-4-hydroxyphenyl) propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl) propioneamide, tetrakis(2,2,6,6-tetramethyl-4-piperidyl)-1,2,3,4-butanetetracarboxylate and tetrakis(1,2,2,6,6-pentamethyl-4-piperidyl)-1,2,3,4-butanetetracarboxylate.

Also, a polymer compound is preferable, examples of which include: N,N',N'',N'''-tetrakis[4,6-bis-[butyl(N-methyl-2,2,6,6-tetramethylpiperidine-4-yl)amino]-triazine-2-yl]-4,7-diazadecane-1,10-diamine; a polycondensation compound of dibutylamine, 1,3,5-triazine N,N'-bis(2,2,6,6-tetramethyl-4-piperidyl)-1,6-hexamethylenediamine and N-(2,2,6,6-tetramethyl-4-piperidyl) butylamine; a polycondensation compound of dibutylamine, 1,3,5-triazine and N,N'-bis(2,2,6,6-tetramethyl-4-piperidyl) butylamine; poly[{(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]; a polycondensation compound of 1,6-hexanediamine-N,N'-bis(2,2,6,6-tetramethyl-4-piperidyl) and morpholine-2,4,6-trichloro-1,3,5-triazine; a high molecular weight HALS in which plurality of piperidine rings are combined via a triazine moiety, such as poly[(6-morpholino-s-triazine-2,4-diyl)[(2,2,6,6-tetramethyl-4-piperidyl)imino]-hexamethylene [(2,2,6,6-tetramethyl-4-piperidyl)imino]]; a polymer of dimethyl succinate and 4-hydroxy-2,2,6,6-tetramethyl-1-piperidineethanol; and a compound in which a piperizine ring is combined via a ester bond, such as a mixed ester compound of 1,2,3,4-butanetetracarboxylic acid, 1,2,2,6,6-pentamethyl-4-piperizinol and 3,9-bis(2-hydroxy-1,1-dimethylethyl)-2,4,8,10-tetraoxaspiro[5,5]undecane, however, the present invention is not limited thereto.

Among these compounds, preferable are, for example, a polycondensation compound of dibutylamine, 1,3,5-triazine and N,N'-bis(2,2,6,6-tetramethyl-4-piperidyl)butylamine; poly[{(1,1,3,3-tetramethylbutyl)amino-1,3,5-triazine-2,4-diyl}{(2,2,6,6-tetramethyl-4-piperidyl) imino}hexamethylene{(2,2,6,6-tetramethyl-4-piperidyl) imino}]; and a polymer of dimethyl succinate and 4-hydroxy-2,2,6,6-tetramethyl-1-piperidine ethanol, which have a number average molecular weight (Mn) of 2,000-5,000.

Above hindered-phenol compounds have been commercialized, for example, as "Tinuvin144" and "Tinuvin770" from Ciba Specialty Chemicals, Inc.; and as "ADK STAB LA-52" from ADEKA Corp.

(Phosphorus-Containing Compound)

A compound having a substructure represented by Formula (G-1), (G-2), (G-3), (G-4) or (G-5) is preferably used as one of the preferable antioxidants in the present invention.

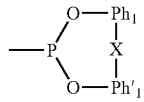

Formula (G-1)

In Formula (G-1), $Ph_1$ and $Ph'_1$ each represent a substituent. As a substituent, it means the same as the substituents represented by $R_{11}$-$R_{25}$ in Formula (E). More preferably, $Ph_1$ and $Ph'^1$ each represent a phenylene group, and the hydrogen atom of the phenylene group may be replaced with a phenyl group, an alkyl group having 1 to 8 carbon atoms, a cycloalkyl group having 5 to 8 carbon atoms, an alkylcycloalkyl group having 6 to 12 carbon atoms, or an aralkyl group having 7 to 12 carbon atoms. $Ph_1$ and $Ph'_1$ may be mutually the same, or may be different. X represents a single bond, a sulfur atom, or a —CHR6-group. R6 represents a hydrogen atom, an alkyl group having 1 to 8 carbon atoms, or a cycloalkyl group having 5 to 8 carbon atoms. Further, these groups may be substituted with one of the substituents which are common to the substituents $R_{11}$-$R_{15}$ described in Formula (A).

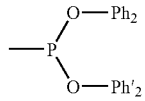

Formula (G-2)

$Ph_2$ and $Ph'_2$ each represent one of the substituents which are common to the substituents $R_{11}$-$R_{15}$ described in Formula (E). $Ph_2$ and $Ph'_2$ may be mutually the same or may be different, and $Ph_2$ and $Ph'_2$ may further be substituted with one of the substituents which are common to the substituents $R_{11}$-$R_{15}$ described in Formula (E).

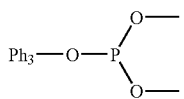

Formula (G-3)

Ph₃ represents one of the substituents which are common to the substituents $R_{11}$-$R_{15}$, described in Formula (E). More preferably, Ph₃ represents a phenyl group or a biphenyl group. The hydrogen atom of the phenyl group or the biphenyl group may be replaced with an alkyl group having 1 to 8 carbon atoms, a cycloalkyl group having 5 to 8 carbon atoms, an alkylcycloalkyl group having 6 to 12 carbon atoms, or an aralkyl group having 7 to 12 carbon atoms. Ph₃ may further be substituted with one of the substituents which are common to the substituents $R_{11}$-$R_{16}$ described in Formula (E).

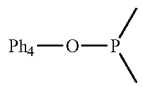

Formula (G-4)

Ph₄ represents one of the substituents which are common to the substituents $R_{11}$-$R_{15}$ described in Formula (E). More preferably, Ph₄ represents an alkyl group or a phenyl group each having 1 to 20 carbon atoms. The alkyl group or the phenyl group may further be substituted with one of the substituents which are common to the substituents $R_{11}$-$R^{15}$, described in Formula (E).

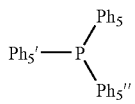

Formula (G-5)

Ph₅, Ph'₅, and Ph"₅, each represent a substituent. Example of the substitute are common to the substituents $R_{11}$-$R_{15}$ described in Formula (E). More preferably, Ph₅, Ph'₅, and Ph"₅ each represent an alkyl group or a phenyl group each having 1 to 20 carbon atoms. The alkyl group or the phenyl group may further be substituted with one of the substituents which are common to the substituents $R_{11}$-$R_{15}$ described in Formula (E).

Specific examples of a phosphorus-containing compound include: mono-phosphite compounds such as triphenyl phosphate, diphenylisodecyl phosphate, phenyldiisodecyl phosphate, tris(nonylphenyl) phosphate, tris(dinonylphenyl) phosphate, tris(2,4-di-t-butylphenyl) phosphite, 10-(3,5-di-t-butyl-4-hydroxybenzyl)-9,10-dihydro-9-oxa-10-phosphaphenanthrene-10-oxide, 6-[3-(3-t-butyl-4-hydroxy-5-methylphenyl)propoxy]-2,4,8,10-tetra-t-butyldibenz[d,f][1.3.2]dioxaphosphepin and tridecyl phosphite; diphosphite compounds such as 4,4'-butylidene-bis(3-methyl-6-t-butylphenyl-di-tridecyl phosphite) and 4,4'-isopropylidene-bis(phenyl-di-alkyl(C12-C15)phosphite); phosphonite compounds such as triphenyl phosphonite, tetrakis(2,4-di-tert-butylphenyl)[1,1-biphenyl]-4,4'-diylbisphosphonite and tetrakis(2,4-di-tert-butyl-5-methylphenyl)[1,1-biphenyl]-4,4'-diylbisphosphonite; phosphinite compounds such as triphenyl phosphinite and 2,6-dimethylphenyldiphenyl phosphinite; and phosphine compounds such as triphenyl phosphine and tris(2,6-dimethoxyphenyl) phosphine. Specifically preferable are phosphonite compounds.

Examples of above-mentioned commercially available phosphorus-containing compounds include: "Sumilizer GP" from Sumitomo Chemical Co., Ltd.; "ADK STAB PEP-24", "ADK STAB PEP-36" and "ADK STAB 3010" from ADEKA Corp.; "IRCAFOS P-EPQ" from Ciba Specialty Chemicals, Inc.; and GSY-P101 from SAKAI CHEMICAL INDUSTRY CO., LTD.

Also, the following compounds are cited.

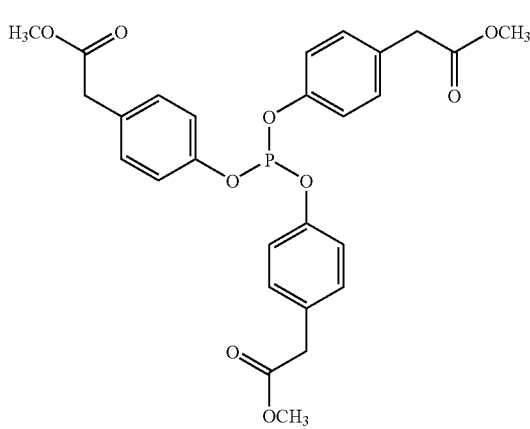

P1

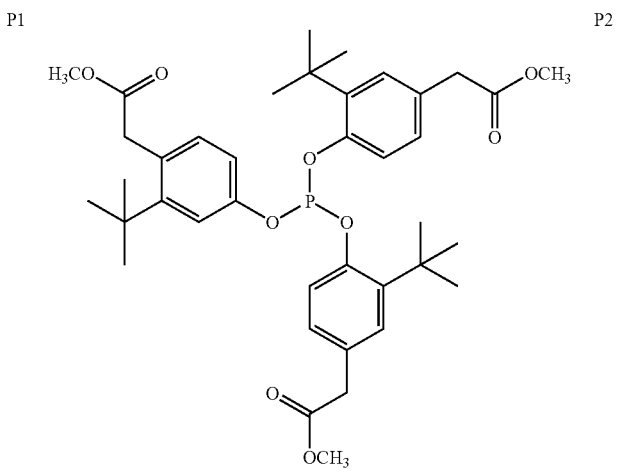

P2

-continued
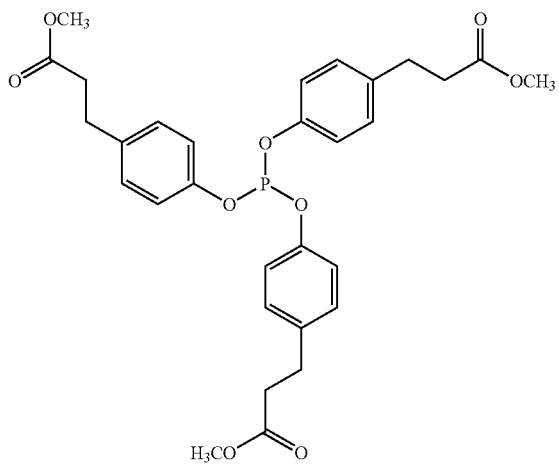
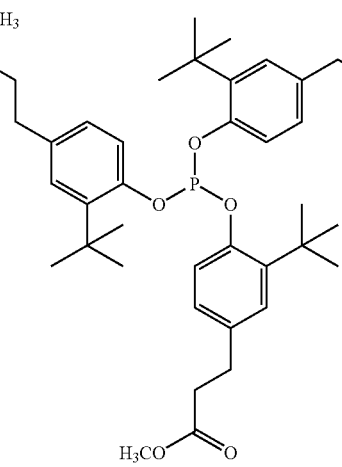
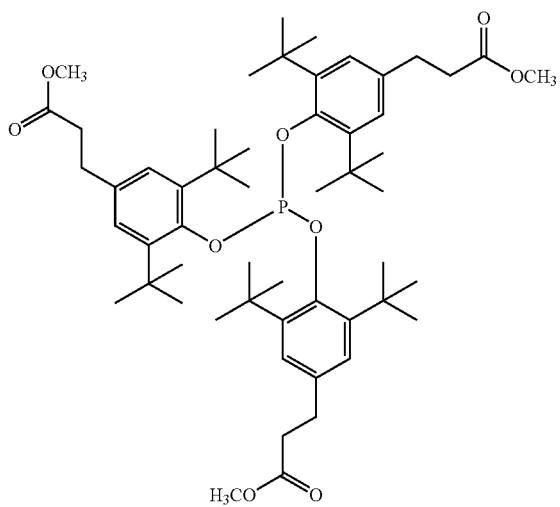
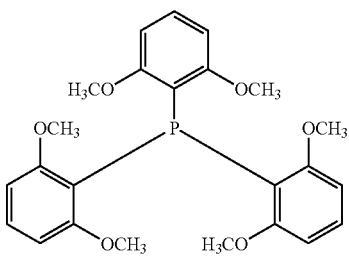
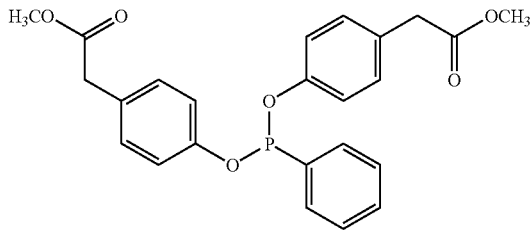
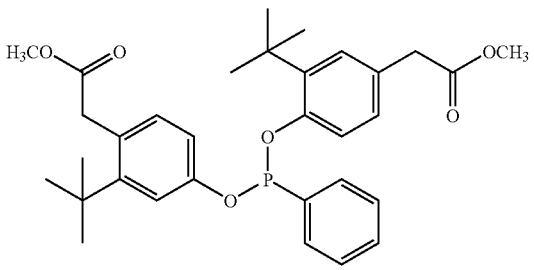
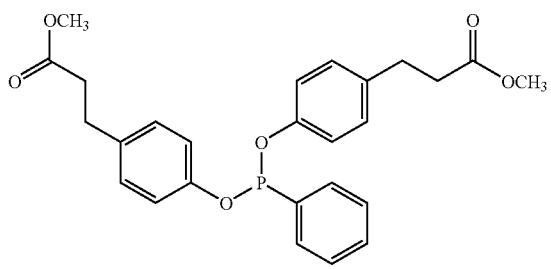
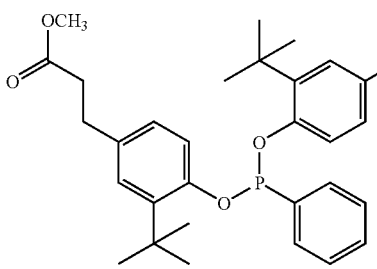

-continued
P11
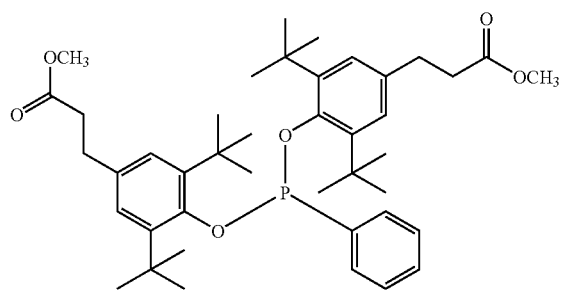
P12
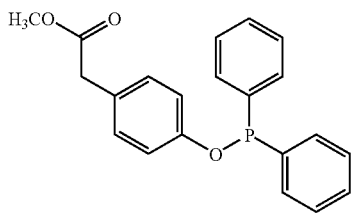
P13
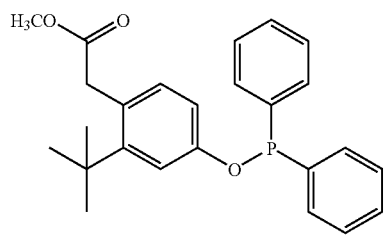
P14
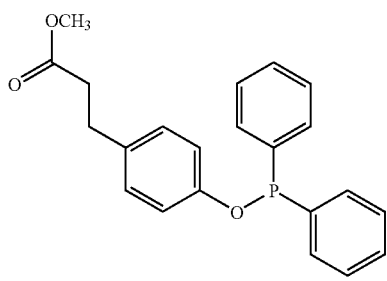
P15
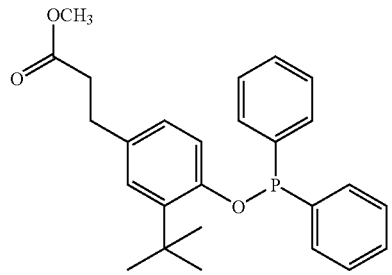
P16
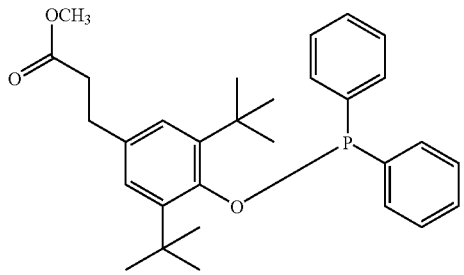
P17
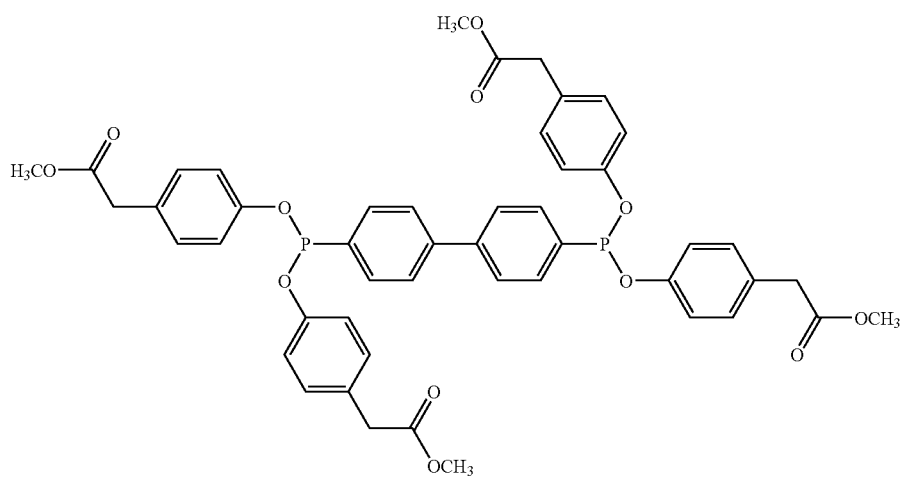

-continued
P18
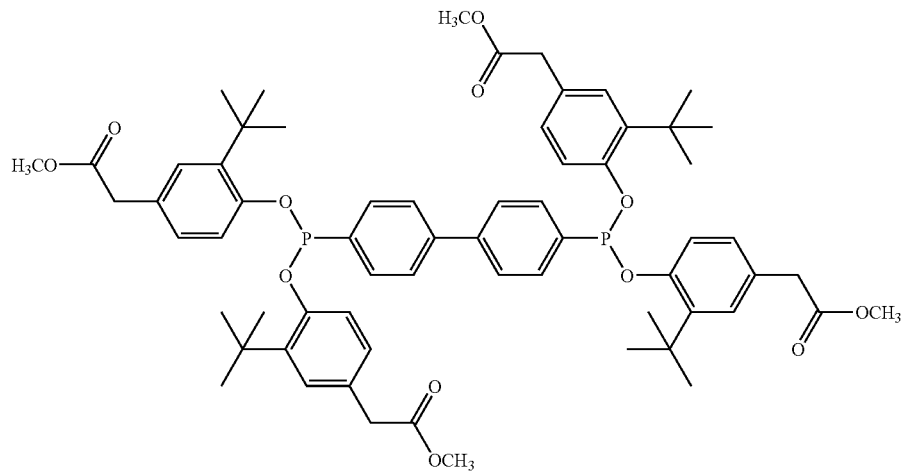
P19
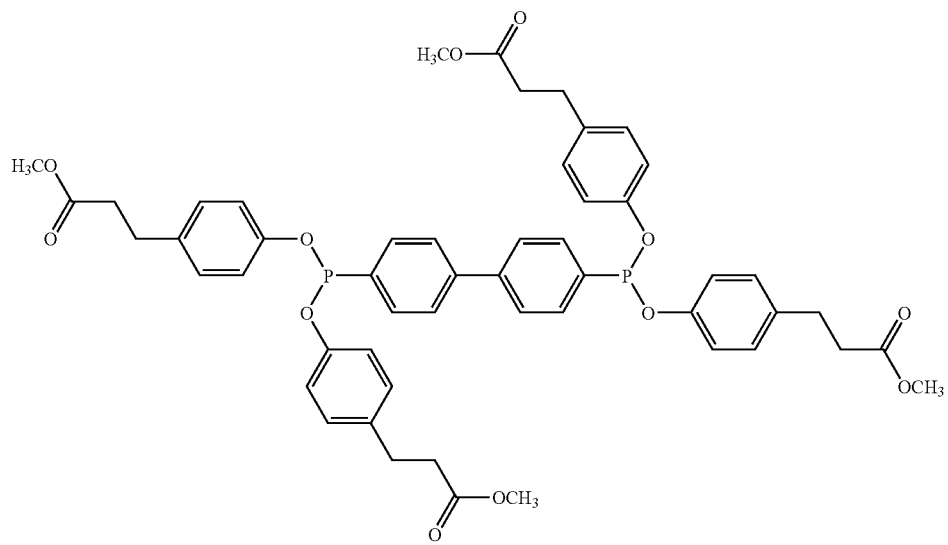
P20
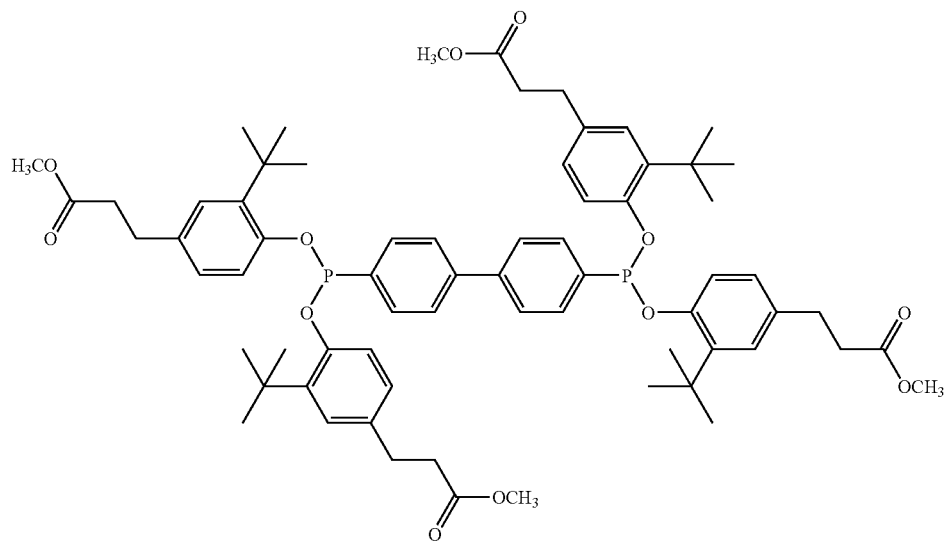

-continued

P21

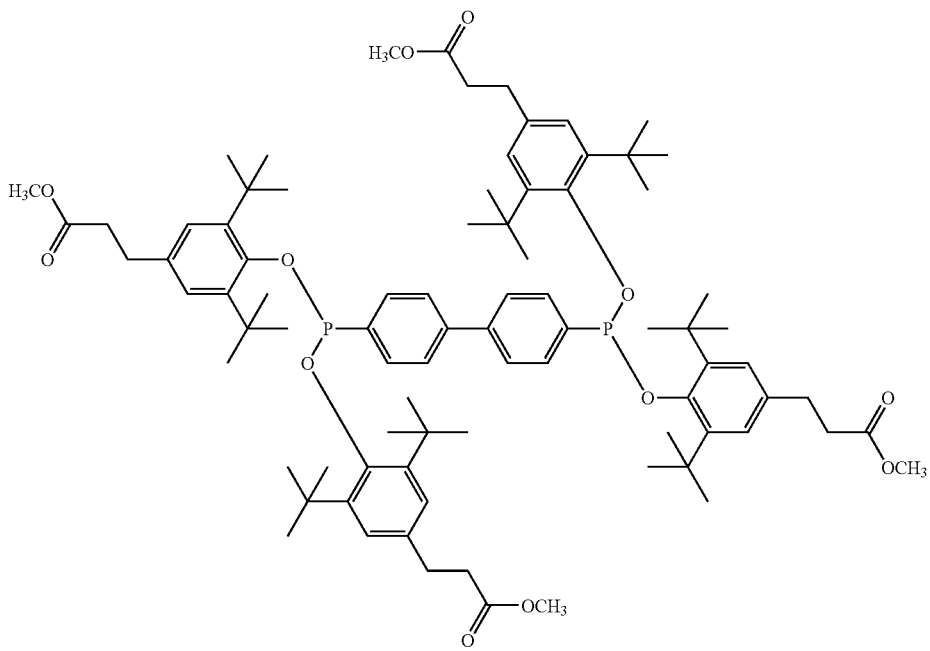

(Sulfur-Containing Compound)

In the present invention, a sulfur-containing compound represented by Formula (H) is preferably used as one of the useful antioxidants.

$$R_{31}\text{—}S\text{—}R_{32} \qquad \text{Formula (H)}$$

In Formula (D), $R_{31}$ and $R_{32}$ each represent one of the substituents which are common to the substituents $R_{11}$-$R_{15}$ described in Formula (E).

Examples of a sulfur-containing compound include: dilauryl-3,3-thio-dipropionate, dimyristyl-3,3'-thiodipropionate, distearyl-3,3-thio-dipropionate, laurylstearyl-3,3-thio-dipropionate, pentaerythritol-tetrakis (β-lauryl-thio-propionate), 3,9-bis(2-dodecylthioethyl)-2,4,8,10-tetra-oxaspiro[5,5]undecane.

The above sulfur-containing compounds have been commercialized, for example, as "Sumilezer TPL-R" and "Sumilezer TP-D" from Sumitomo Chemical Co., Ltd.

Similarly to the case of the aforementioned cellulose ester, the antioxidant is preferably treated to remove the impurities such as residual acid, inorganic salt and organic low-molecule compound that have been carried over from the process of manufacturing, or that have occurred during preservation. The antioxidant has more preferably a purity of 99% or more. The amount of residual acid and water is preferably 0.01 through 100 ppm. This reduces thermal deterioration in the melt-casting film formation of the cellulose ester, and improves the film formation stability, film optical property and mechanical property.

The adding amount of the antioxidant is preferably 0.1-10% by weight, more preferably 0.2-5% by weight, and still more preferably 0.5-2% by weight, based on the weight of cellulose ester. Two or more types of antioxidants may be used in combination.

If the amount of the antioxidant to be added is too small, expected advantages cannot be achieved due to lower stabilizing effect at the time of melting. If the amount to be added is too much, transparency of the film may be reduced from the viewpoint of compatibility with the cellulose ester, and the film may become brittle, which is not preferred.

(Acid Scavenger)

Under a high temperature condition where melt-casting film formation of cellulose ester is carried out, decomposition of cellulose ester may also be accelerated with an acid. Accordingly, an acid scavenger is preferably contained as one of the stabilizers in the film for a display of the present invention. As the acid scavenger, any compound which react with an acid to inactivate the acid can be used without limitation in the present invention. Of these, preferable is, for example, a compound having an epoxy group as disclosed in U.S. Pat. No. 4,137,201. Such epoxy compounds as the acid scavenger have been known in the field of the art, and examples thereof include glycidyl ether of various polyglycols, particularly a polyglycol driven by condensation of approximately 8 to 40 moles of ethylene glycol per mole of the polyglycol, diglycidyl ether of glycerol, an metal epoxy compound (for example, ones usually used in a vinyl chloride polymer composition, or one usually used together with a vinyl chloride polymer composition), an epoxide ether condensate, diglycidyl ether of bisphenol A (namely, 4,4'-dihydroxydiphenyldimethylmethane), an epoxide unsaturated fatty acid ester (specifically, an ester of alkyl having 2-4 carbon atoms of a fatty acid having 2-22 carbon atoms such as butyl epoxystearate), and a triglyceride of one of various epoxide long chain fatty acids (for example, an epoxide soybean oil composition. The examples further include an epoxide of plant oil or another unsaturated natural oil. The epoxide oils are sometimes called as epoxide of natural glyceride or epoxide of unsaturated fatty acid and these fatty acids are each contains 12-22 carbon atoms. As an epoxy group-containing epoxide resin compound available on the market, EPON 815C, and an epoxide ether oligomer condensation product represented by Formula (J) are preferably employed.

Formula (J)

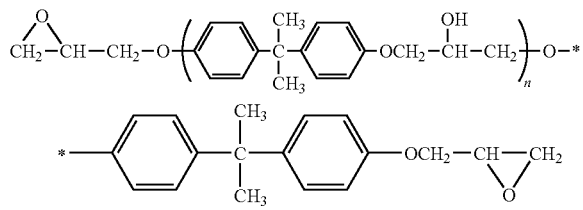

In the above formula, n represents an integer of 0-12. Further employable acid scavenger includes those disclosed in JP-A No. 5-194788, paragraphs 87 to 105.

The adding amount of the acid scavenger is preferably 0.1-10% by weight, more preferably 0.2-5% by weight, and still more preferably 0.5-2% by weight, based on the weight of cellulose ester. Two or more types of acid scavengers may be used in combination.

An acid scavenger is also referred to as an acid remover, an acid trapping agent, an acid catcher, however, in the present invention, any of these agents are usable regardless of the difference in the address term.

<<UV Absorbent>>

A UV absorbent (an ultraviolet light absorber) preferably has excellent ultraviolet light absorbance for wavelengths of 370 nm or less in view of preventing deterioration of the polarizer film or the display device due to ultraviolet light, and from the viewpoint of the liquid crystal display it is preferable that there is little absorbance of visible light having wavelengths of 400 nm or more. Examples of the UV absorbent include: oxybenzophenone compounds, benzotriazole compounds, salicylic acid ester compounds, benzophenone compounds, cyano acrylate compounds nickel complex compounds, and triazine compounds. Of these, preferable are benzophenone compounds, benzotriazole compounds which exhibit little coloration and triazine compounds. In addition, UV absorbents disclosed in JP-A Nos. 10-182621 and 8-337574, and polymer UV absorbents disclosed in JP-A Nos. 6-148430 and 20003-113317 are also applicable.

Specific examples of the benzotriazole UV absorbents include 2-(2'-hydroxy-5'-methylphenyl)benzotriazole, 2-(2'-hydroxy 3',5'-di-tert-butylphenyl)benzotriazole, 2-(2'-hydroxy-3'-tert-butyl-5'-methylphenyl)benzotriazole, 2-(2'-hydroxy 3',5'-di-tert-butylphenyl)-5-chlorobenzotriazole, 2-(2'-hydroxy-3'-(3",4",5",6"-tetrahydrophthalimide methyl)-5'-methylphenyl)benzotriazole, 2,2-methylenebis(4-(1,1,3,3,-tetramethylbutyl)-6-(2H-benzotriazole-2-yl) phenyl), 2-(2'-hydroxy-3'-tert-butyl-5'-methylphenyl)-5-chlorobenzotriazole, 2-(2H-benzotriazole-2-yl)-6-(straight chain or side chain dodecyl)-4-methylphenol, 2-(2'-hydroxy-3',5'-di-(1-methyl-1-phenylethyl)-phenyl)benzotriazole, 6-(2-benzotriazole)-4-t-octyl-6'-t-butyl-4'-methyl-2,2'-methylenebisphenol, a mixture of octyl-3-[3-tert-butyl-4-hydroxy-5-(chloro-2H-benzotriazole-2-yl) phenyl]propionate and 2-ethylhexyl-3-[3-tert-butyl-4-hydroxy-5-(5-chloro-2H-benzotriazole-2-yl) phenyl]propionate and 2-(2'-hydroxy-3'-(1-methyl-1-phenylethyl)-5'-(1,1,3,3-tetramethylbutyl)-phenyl)benzotriazole. However, the present invention is not limited thereto.

As commercially available UV absorbents, TINUVIN 171, TINUVIN 234, and TINUVIN 360, TINUVIN 928 and TINUVIN 109 (all of which are manufactured by Chiba Specialty Chemical Co., Ltd.); LA31 (manufactured by ADEKA Corp.); JAST-500 (manufactured by JOHOKU CHEMICAL Co., Ltd.); and Sumisorb 250 (manufactured by Sumitomo Chemical Co., Ltd.) are cited.

Examples of the benzophenone compound include: 2,4-dihydroxy benzophenone, 2,2'-dihydroxy-4-methoxy benzophenone, 2-hydroxy-4-methoxy-5-sulfobenzophenone, bis (2-methoxy-4-hydroxy-5-benzoylphenylmethane), however, the present invention is not limited thereto.

The amount of the UV absorbent used in the present invention is preferably 0.1-5 weight %, and more preferably 0.2-3 weight %, and still more preferably 0.5-2 weight %, based on the weight of cellulose ester. Two or more UV absorbents may be used in combination.

Also, these benzotriazole structure or benzophenone structure may be partially or regularly pendant to a polymer, or may be introduced in a part of the molecular structure of an additive such as a plasticizer, an antioxidant or an acid scavenger.

<<Plasticizer>>

In the production process of the film for a display of the present invention, specifically, of the cellulose ester film, at least one plasticizer is preferably added.

A plasticizer, as described herein, commonly refers to an additive which decreases brittleness and result in enhanced flexibility upon being incorporated in polymers. In the present invention, a plasticizer is added so that the melting temperature of a cellulose ester resin is lowered, and at the same temperature, the melt viscosity of the film forming materials including a plasticizer is lower than the melt viscosity of a cellulose ester resin containing no additive. Further, addition is performed to enhance hydrophilicity of cellulose ester so that the water vapor permeability of cellulose ester films is lowered. Therefore, the plasticizers of the present invention have a property of an anti-moisture-permeation agent.

The melting temperature of a film forming material, as described herein, refers to the temperature at which the above materials are heated to exhibit a state of fluidity. In order that cellulose ester results in melt fluidity, it is necessary to heat cellulose ester to a temperature which is at least higher than the glass transition temperature. At or above the glass transition temperature, the elastic modulus or viscosity decreases due to heat absorption, whereby fluidity is observed. However, at higher temperatures, cellulose ester melts and simultaneously undergoes thermal decomposition to result in a decrease in the molecular weight of the cellulose ester, whereby the dynamical characteristics of the resulting film may be adversely affected. Consequently, it is preferable to melt cellulose ester at a temperature as low as possible. Lowering the melting temperature of the film forming materials is achieved by the addition of a plasticizer having a melting point or a glass transition temperature which is equal to or lower than the glass transition temperature of the cellulose ester.

The film for a display of the present invention preferably contains 1-25 weight % of an ester compound, as a plasticizer, having a structure obtained by condensing the organic acid represented by Formula (K) and a polyalcohol having a valence of 3 to 20. When the amount of the plasticizer is less than 1 weight %, the effect of improving the flatness of the film may not be obtained, and when the amount of the plasticizer is more than 25 weight %, bleeding out of the plasticizer tends to occur resulting in lowering the long term stability of the film, both of which are not preferable. More preferable is a cellulose ester film containing 3-20 weight % of plasticizer, based on the weight of cellulose ester, and still more preferable is a cellulose ester film containing 5-15 weight % of plasticizer.

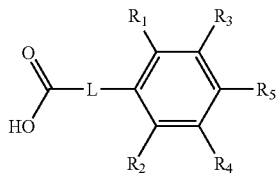

Formula (K)

In above Formula (K), $R_1$-$R_5$ each independently represent a hydrogen atom, a cycloalkyl group, an aralkyl group, an alkoxy group, a cycloalkoxy group, an aryloxy group, an aralkyloxy group, an acyl group, a carbonyloxy group, an oxycarbonyl group, or an oxycarbonyloxy group, any of which may further be substituted. L represents a linkage group, which includes a substituted or unsubstituted alkylene group, an oxygen atom or a direct bond.

Preferred as the cycloalkyl group represented by $R_1$-$R_5$ is a cycloalkyl group having 3-8 carbon atoms, and specific examples include cyproyl, cyclopentyl and cyclohexyl groups. These groups may be substituted. Examples of preferred substituents include: halogen atoms such as a chlorine atom, a bromine atom and a fluolinr atom, a hydroxyl group, an alkyl group, an alkoxy group, an aralkyl group (the phenyl group may further be substituted with an alkyl group or a halogen atom), an alkenyl group such as a vinyl group or an allyl group, a phenyl group (the phenyl group may further be substituted with an alkyl group, or a halogen atom), a phenoxy group (the phenyl group may further be substituted with an alkyl group or a halogen atom), an acyl group having 2-8 carbon atoms such as an acetyl group or a propionyl group, and a non-substituted carbonyloxy group having 2-8 carbon atoms such as an acetyloxy group and a propionyloxy group.

The aralkyl group represented by $R_1$-$R_5$ includes a benzyl group, a phenetyl group, and a γ-phenylpropyl group, which may be substituted. Listed as the preferred substituents may be those which may substitute the above cycloalkyl group.

The alkoxy group represented by $R_1$-$R_5$ include an alkoxy group having 1-8 carbon atoms. The specific examples include an methoxy group, an ethoxy group, an n-propoxy group, an n-butoxy group, an n-octyloxy group, an isopropoxy group, an isobutoxy group, a 2-ethylhexyloxy group and a t-butoxy group. The above groups may further be substituted. Examples of preferred substituents include: halogen atoms such as a chlorine atom, a bromine atom and a fluorine atom; a hydroxyl group; an alkoxy group; a cycloalkoxy group; an aralkyl group (the phenyl group may be substituted with an alkyl group or a halogen atom); an alkenyl group; a phenyl group (the phenyl group may further be substituted with an alkyl group or a halogen atom); an aryloxy group (for example, a phenoxy group (the phenyl group may further be substituted with an alkyl group or a halogen atom)); an acyl group having 2-8 carbon atoms such as an acetyl group or a propionyl group; an acyloxy group such as a propionyloxy group; and an arylcarbonyloxy group such as a benzoyloxy group.

The cycloalkoxy groups represented by $R_1$-$R_5$ include an cycloalkoxy group having 1-8 carbon atoms as an unsubstituted cycloalkoxy group. Specific examples include a cyclopropyloxy group, a cyclopentyloxy group and a cyclohexyloxy group. These groups may further be substituted. Listed as the preferred substituents may be those which may substitute the above cycloalkyl group.

The aryloxy groups represented by $R_1$-$R_5$ include a phenoxy group, the phenyl group of which may further be substituted with the substituent listed as a substituent such as an alkyl group or a halogen atom which may substitute the above cycloalkyl group.

The aralkyloxy group represented by $R_1$-$R_6$ includes a benzyloxy group and a phenethyloxy group, which may further be substituted. Listed as the preferred substituents may be those which may substitute the above cycloalkyl group.

The acyl group represented by $R_1$-$R_5$ includes an unsubstituted acyl group having 1-8 carbon atoms such as an acetyl group and a propionyl group (an alkyl, alkenyl, or alkynyl group is included as a hydrocarbon group of the acyl group), which may further be substituted. Listed as the preferred substituents may be those which may substitute the above cycloalkyl group.

The carbonyloxy group represented by $R_1$-$R_5$ includes an unsubstituted acyloxy group (an alkyl, alkenyl, or alkynyl group is included as a hydrocarbon group of the acyl group) having 2-8 carbon atoms such as an acetyloxy group or a propionyloxy group, and an arylcarbonyloxy group such as a benzoyloxy group, which may further be substituted with the group which may substitute the above cycloalkyl group.

The oxycarbonyl group represented by $R_1$-$R_5$ includes an alkoxycarbonyl group such as a methoxycarbonyl group, an ethoxycarbonyl group or a propyloxycarbonyl group, and an aryloxycarbonyl group such as a phonoxycarbonyl group, which may further be substituted. Listed as the preferred substituents may be those which may substitute the above cycloalkyl group.

The oxycarbonyloxy group represented by $R_1$-$R_5$ includes an alkoxycarbonyloxy group having 1-8 carbon atoms such as a methoxycarbonyloxy group, which may further be substituted. Listed as the preferred substituents may be those which may substitute the above cycloalkyl group.

Further, any of $R_1$-$R_5$ may be combined with each other to form a ring structure.

Further, the linkage group represented by L includes a substituted or unsubstituted alkylene group, an oxygen atom, or a direct bond. The alkylene group includes a methylene group, an ethylene group, and a propylene group, which may further be substituted with the substituent which is listed as the substituent which may substitute the groups represented by above $R_1$-$R_5$.

Of these, one which is particularly preferred as the linking group is the direct bond which forms an aromatic carboxylic acid.

As the organic acid represented by Formula (K), which constitutes an ester compound to be used as a plasticizer in the present invention, $R_1$-$R_5$ each are preferably a hydrogen atom, or at least one of $R_1$-$R_5$ is preferably the above mentioned alkoxy group, acyl group, oxycarbonyl group, carbonyloxy group or oxycarbonyloxy group. Further, the organic acids may contain a plurality of substituents.

In the present invention, the organic acids which substitute the hydroxyl groups of a polyalcohol having a valence of 3-20 may either be of a single kind or of a plurality of kinds.

In the present invention, the polyalcohol which reacts with the organic acid represented by above Formula (K) to form a polyalcohol ester is preferably an aliphatic polyalcohol having a valence of 3-20. In the present invention, preferred as a polyalcohol having a valence of 3-20 is represented by following Formula (3).

An ester of an organic acid represented by Formula (K) and a polyalcohol having a valence of 3-20 can be synthesized employing methods known in the art. Typical synthesis examples are shown in the examples. Examples of the synthetic method include: a method in which an organic acid represented by Formula (K) and a polyalcohol undergo etherification via condensation in the presence of, for example, an acid; a method in which an organic acid is converted to an acid chloride or an acid anhydride which is allowed to react with a polyalcohol; and a method in which a phenyl ester of an organic acid is allowed to react with a polyalcohol. Depending on the targeted ester compound, it is preferable to select an appropriate method which results in a high yield.

As an example of a plasticizer containing an ester of an organic acid represented by Formula (K) and a polyalcohol, the compound represented by Formula (L) is cited.

In Formula (L), $R_6$ to $R_{20}$ each independently represent a hydrogen atom, a cycloalkyl group, an aralkyl group, an alkoxy group, a cycloalkoxy group, an aryloxy group, an aralkyloxy group, an acyl group, a carbonyloxyl group, an oxycarbonyl group or an oxycarbonyloxy group, provided that $R_6$ to $R_{20}$ may further have a substituent. $R_6$ to $R_{10}$ each preferably represent a hydrogen atom or an alkoxy group. $R_{21}$ represents a hydrogen atom or an alkyl group.

As examples of the above described cycloalkyl group, aralkyl group, alkoxy group, cycloalkoxy group, aryloxy group, aralkyloxy group, acyl group, carbonyloxyl group, oxycarbonyl group and oxycarbonyloxy group represented by $R_6$ to $R_{20}$, the same groups as described for $R_1$ to $R_5$ in Formula (K) can be cited.

Formula (L)

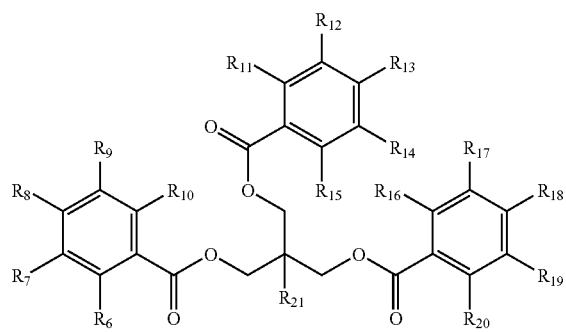

The molecular weight of the polyalcohol esters prepared as above is not particularly limited, but is preferably 300-1,500, more preferably 400-1,000. A greater molecular weight is preferred due to reduced volatility, while a smaller molecular weight is preferred in view of reducing water vapor permeability and improving the compatibility with cellulose ester.

Specific compounds of polyalcohol esters according to the present invention will be exemplified below.

1

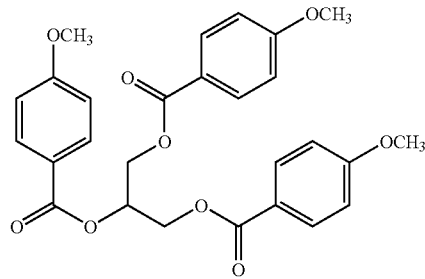

494.49

2

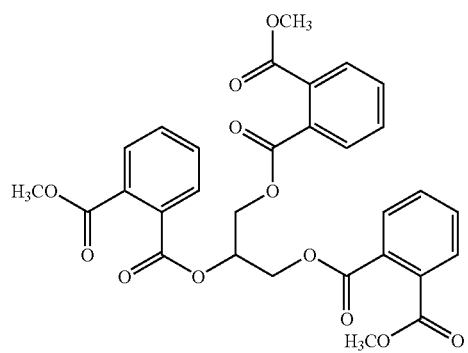

578.52

3

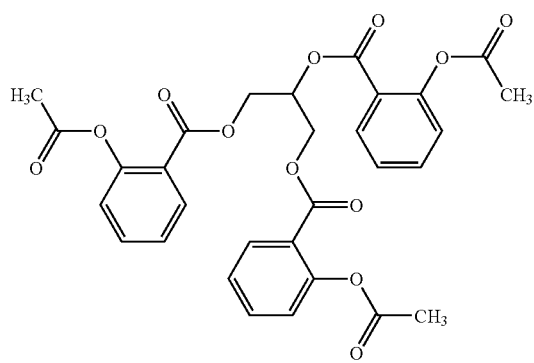

578.52

4

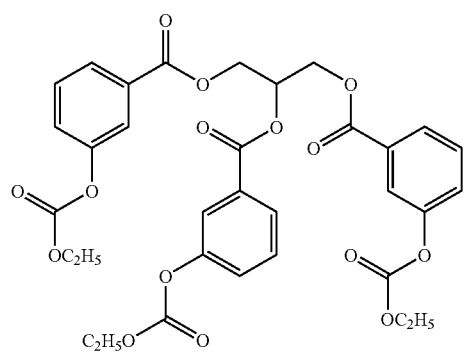

668.60

-continued
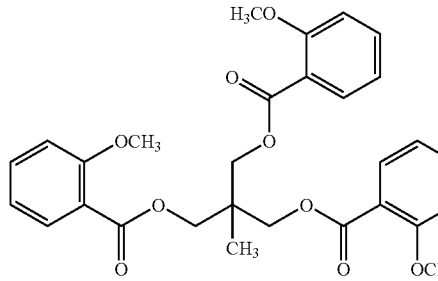
522.54
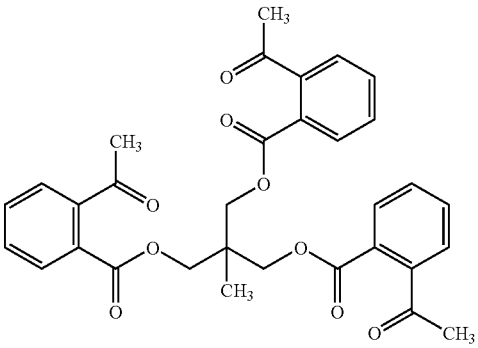
558.58
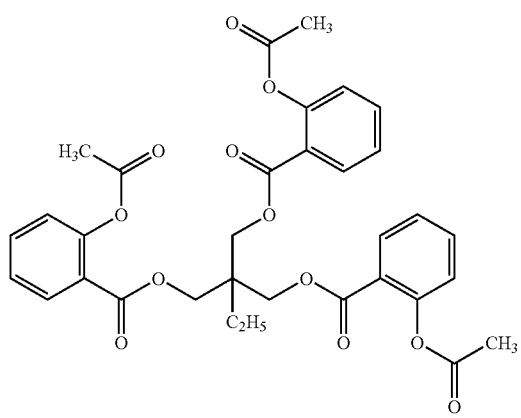
620.60
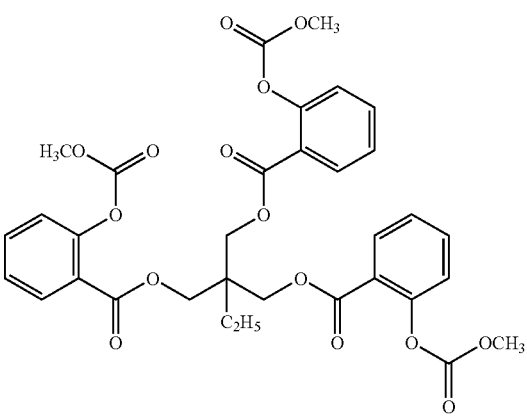
668.60
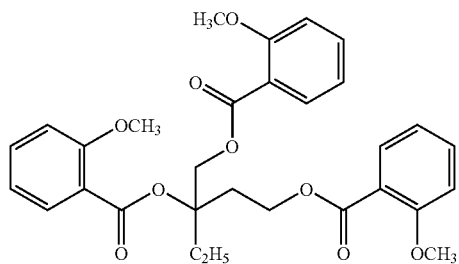
536.57
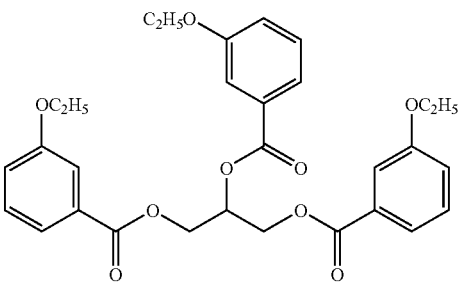
550.60
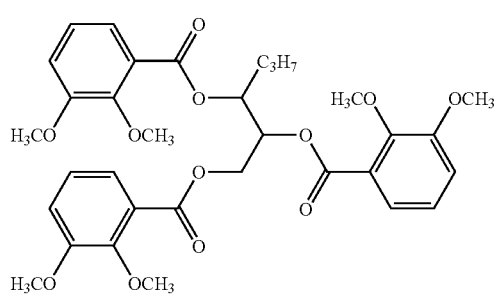
626.65
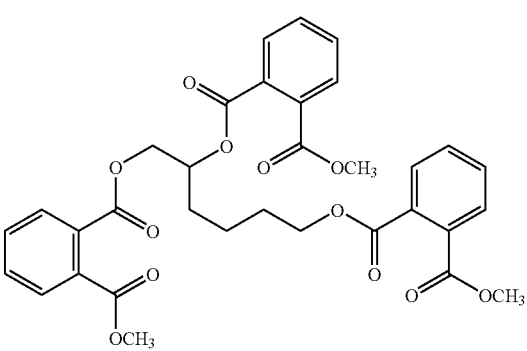
626.65

-continued
13
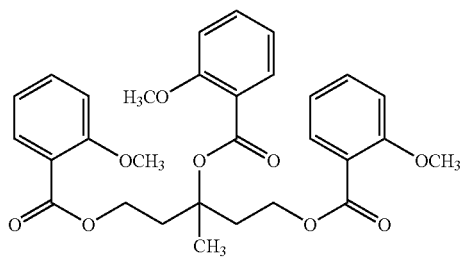
536.57
14
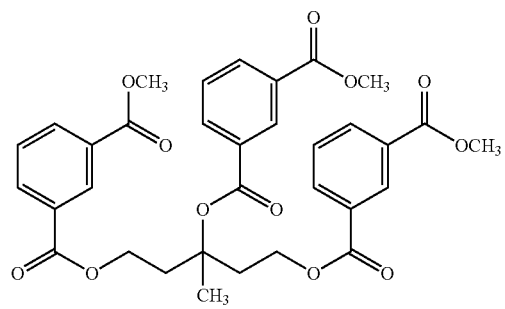
620.60
15
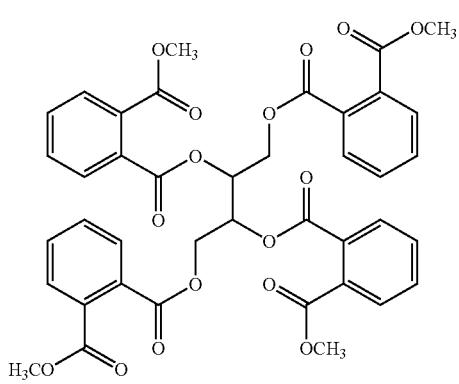
770.69
16
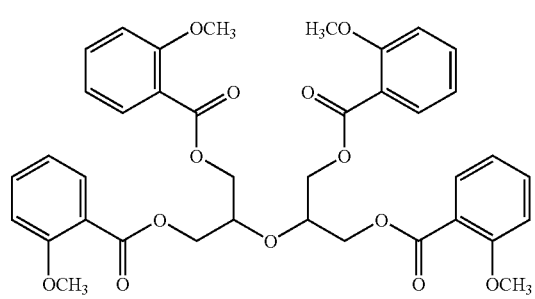
702.70
17
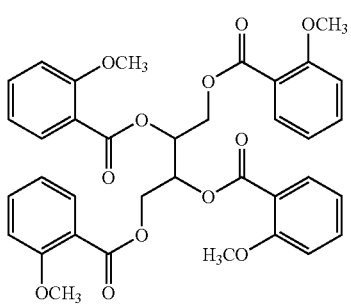
658.65
18
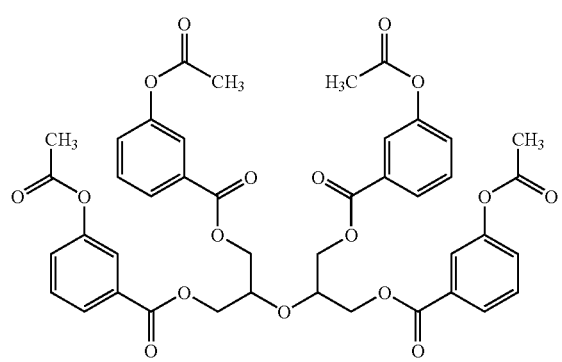
814.74

-continued
19
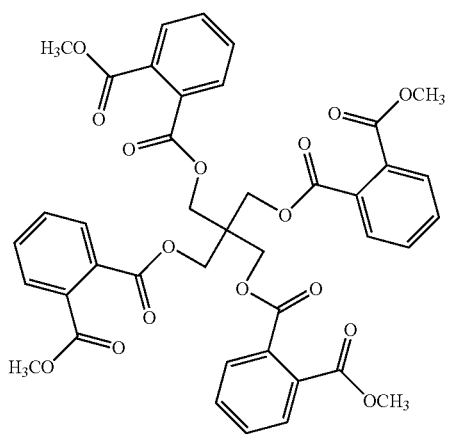
784.71
20
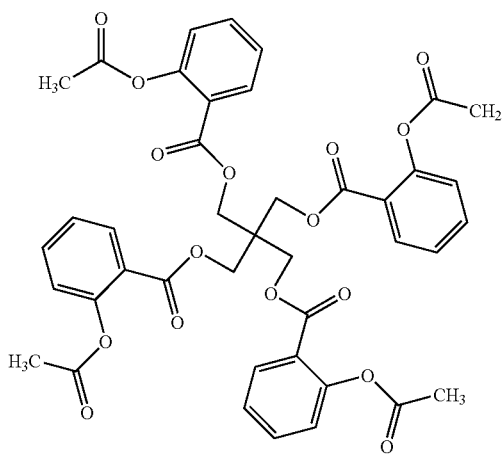
784.71
21
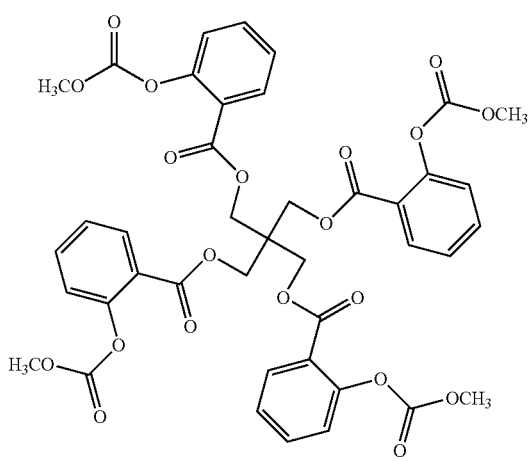
848.71
22
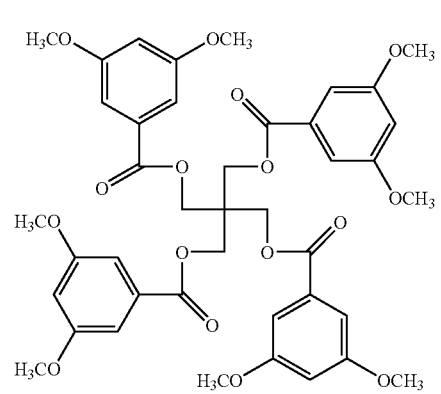
792.78
23
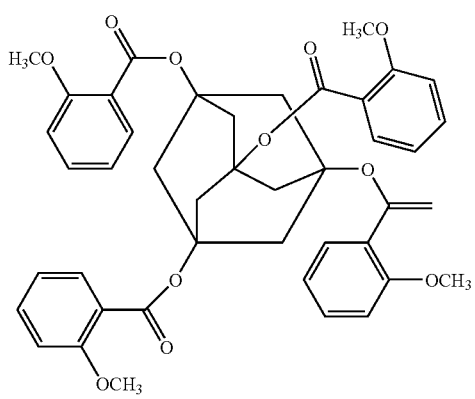
736.76
24
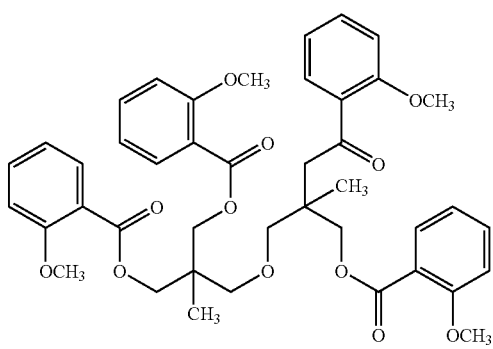
742.81

25
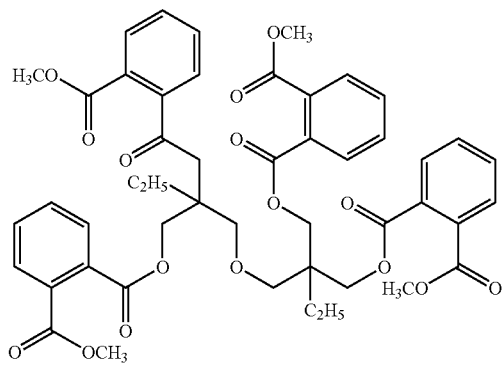
882.90
26
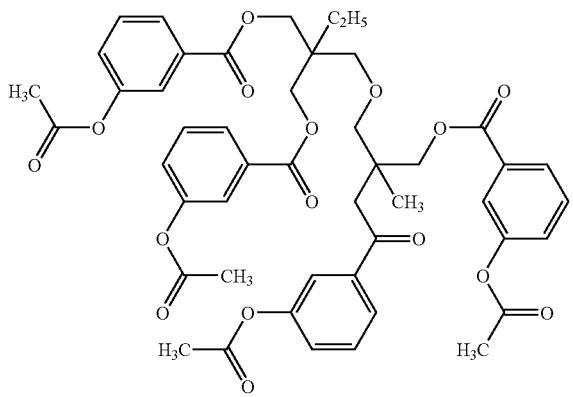
868.87
27
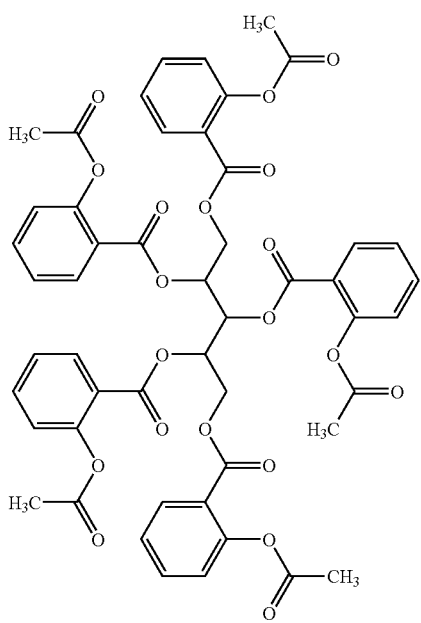
962.86
28
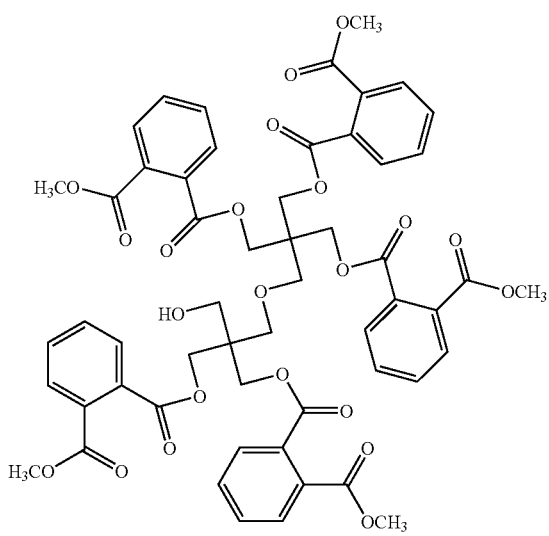
1064.99

29
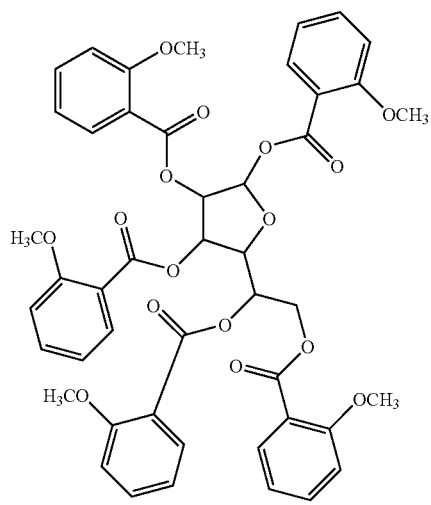
850.82
30
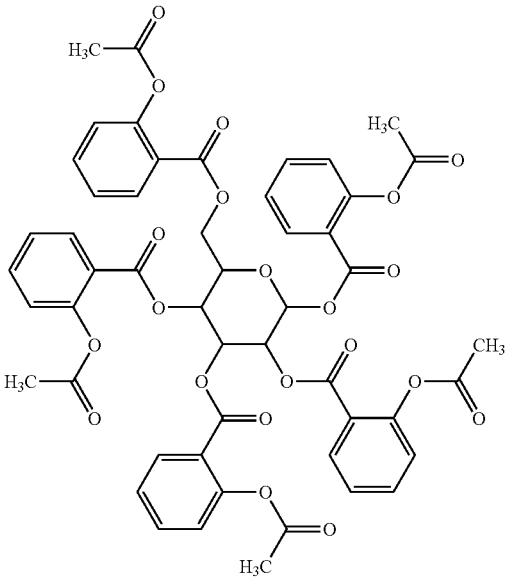
990.87
31
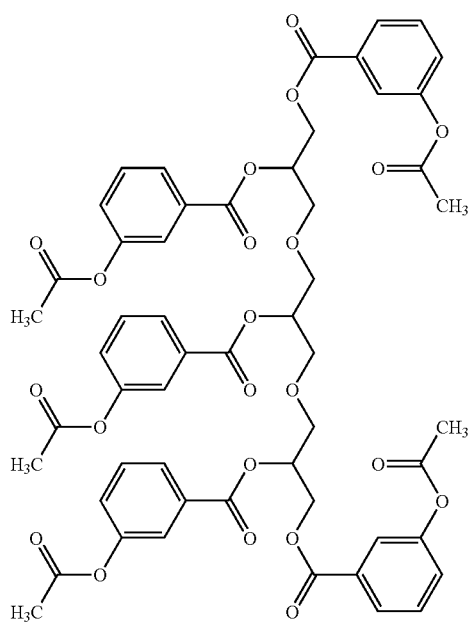
1050.96
32
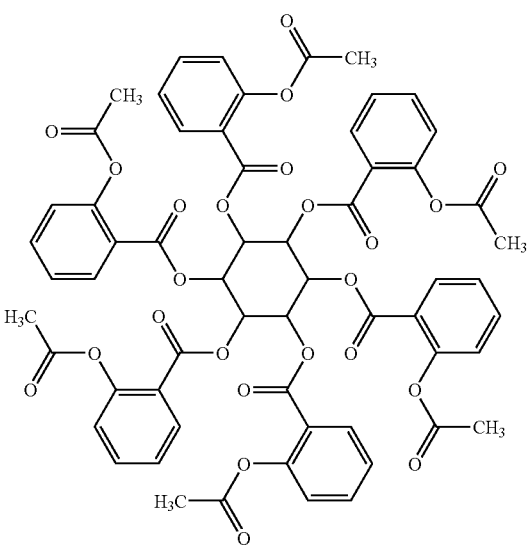
1153.01

-continued
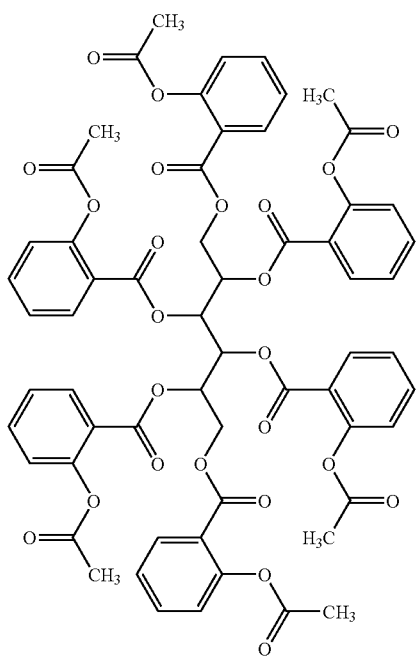
1155.02
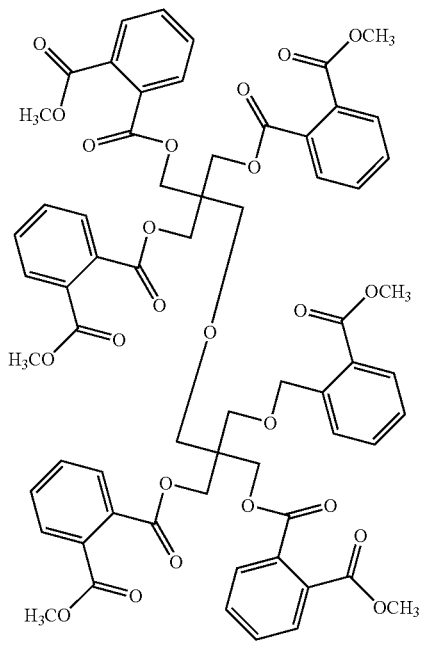
1213.15
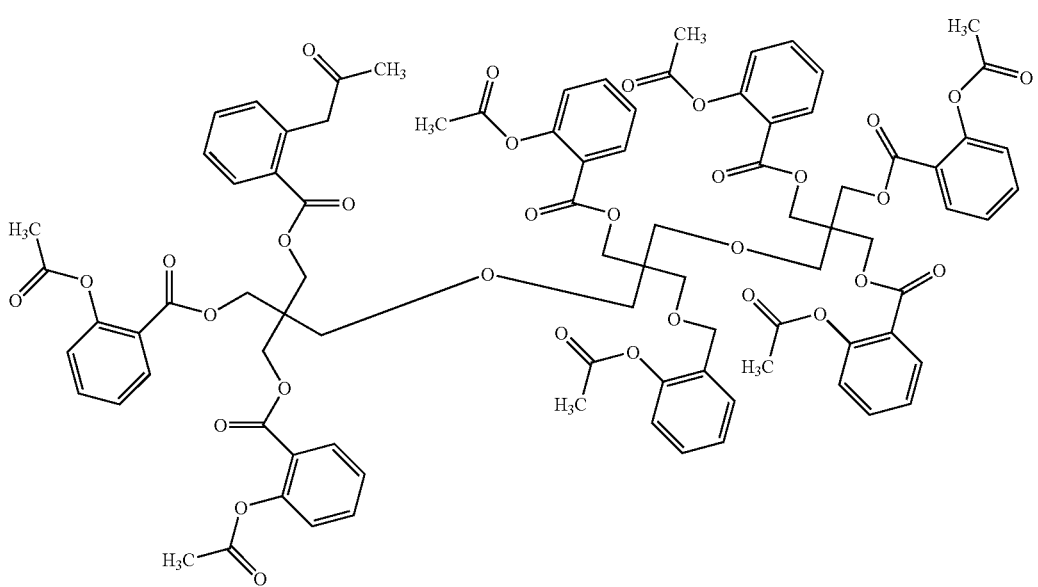
1669.59

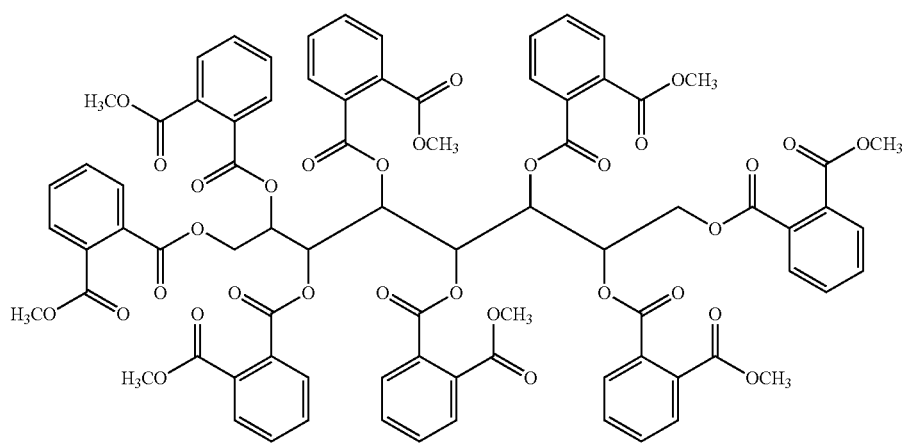
1539.36
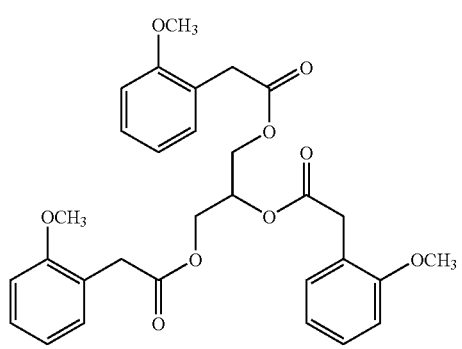
536.57
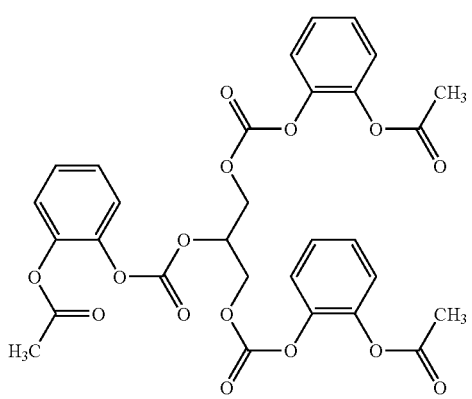
626.52
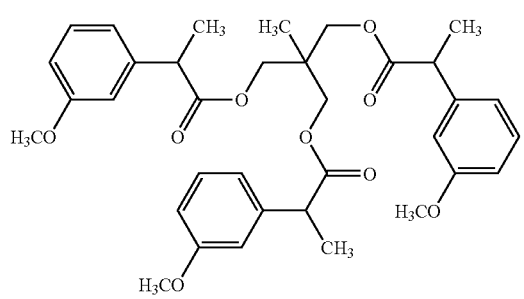
606.70
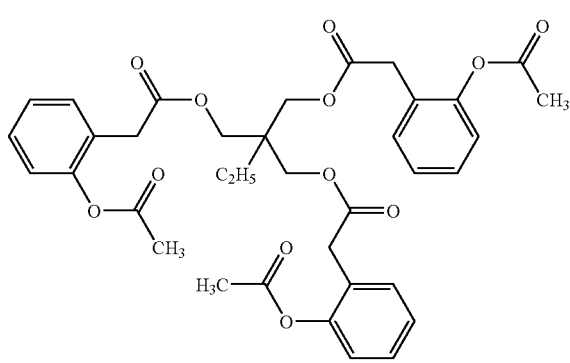
662.68

-continued
41
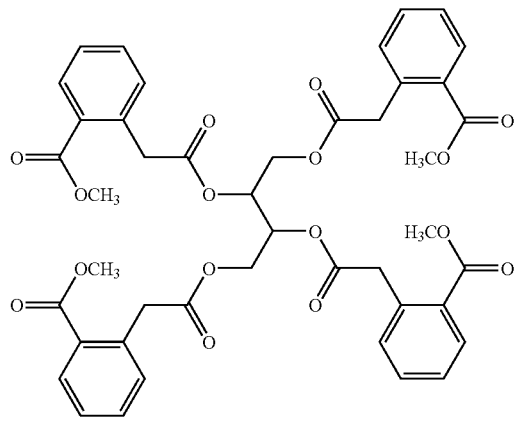
826.79
42
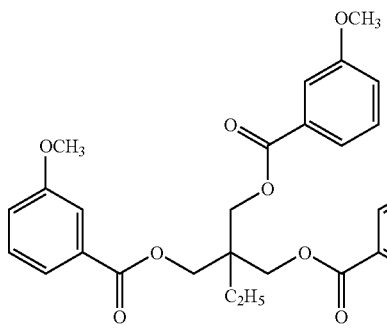
536.57
43
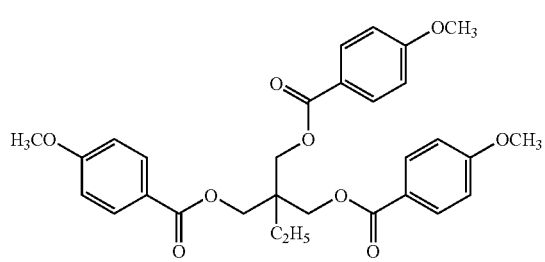
536.57
44
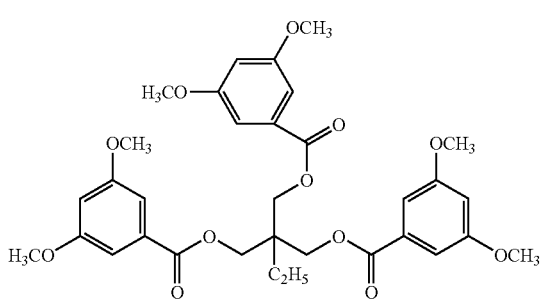
626.55
45
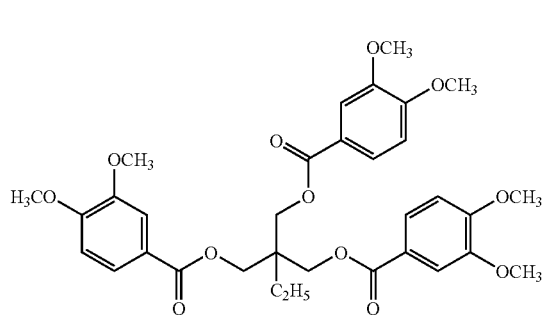
626.65
46
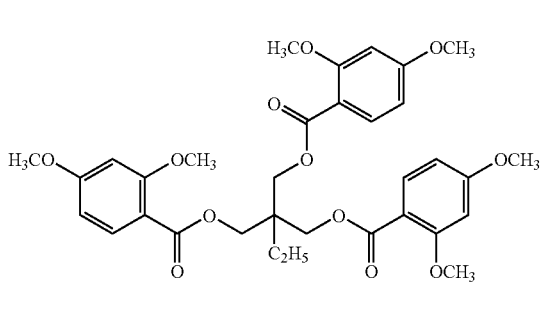
626.65
47
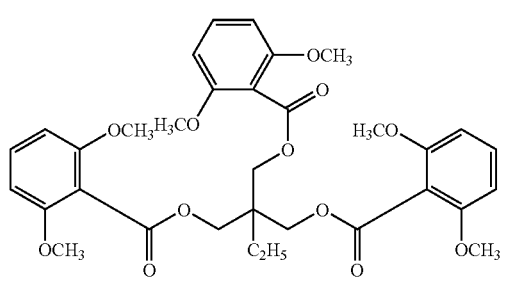
626.65
48
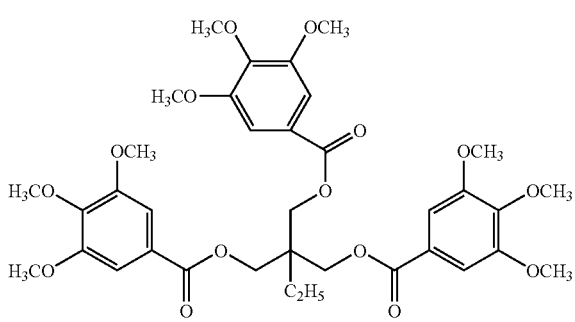
716.73

49
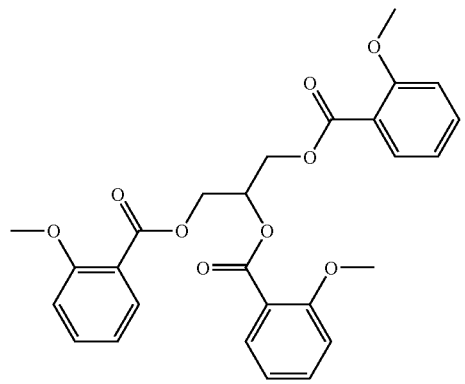
494.49
50
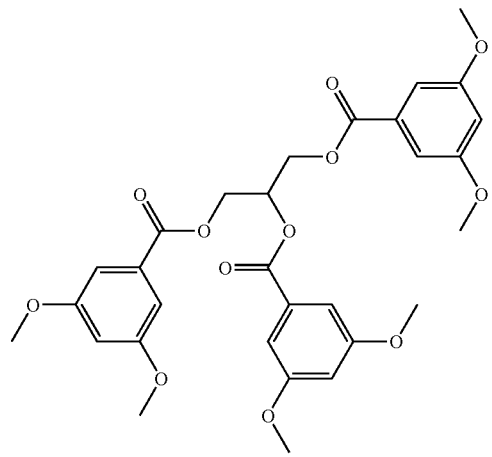
584.57
51
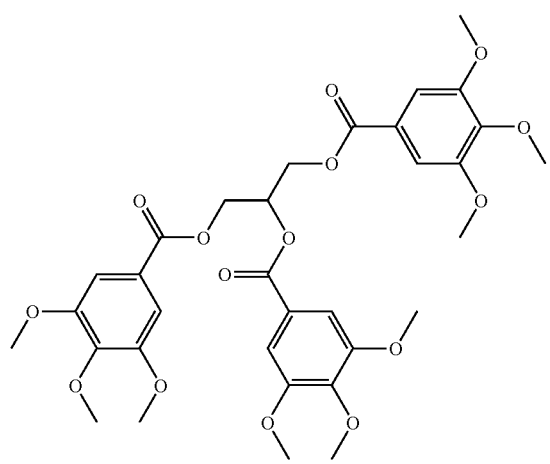
674.65
52
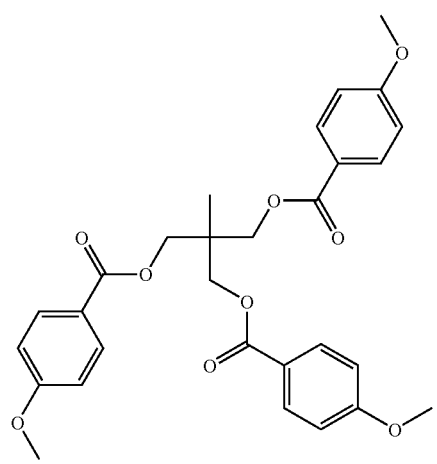
522.54
53
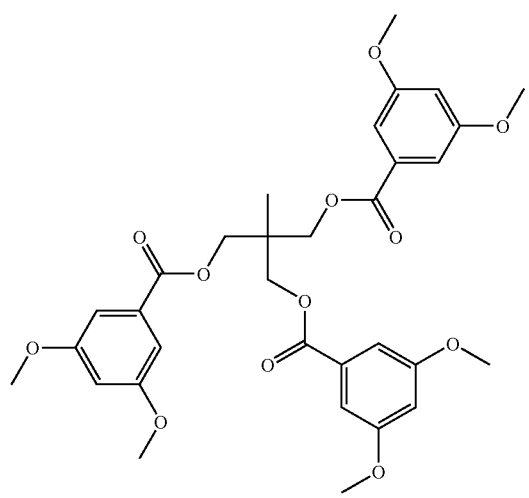
612.62
54
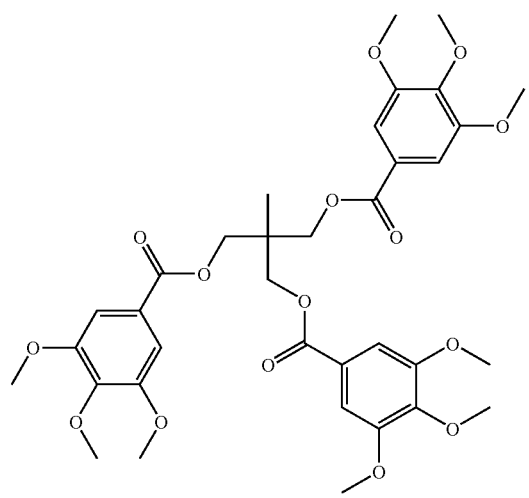
702.70

55
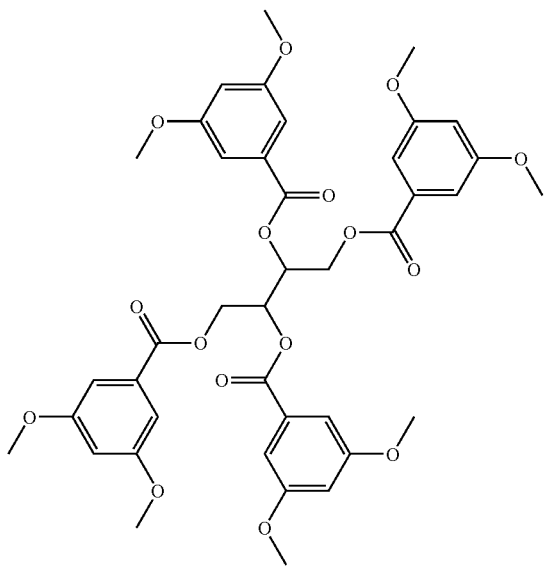
778.75
56
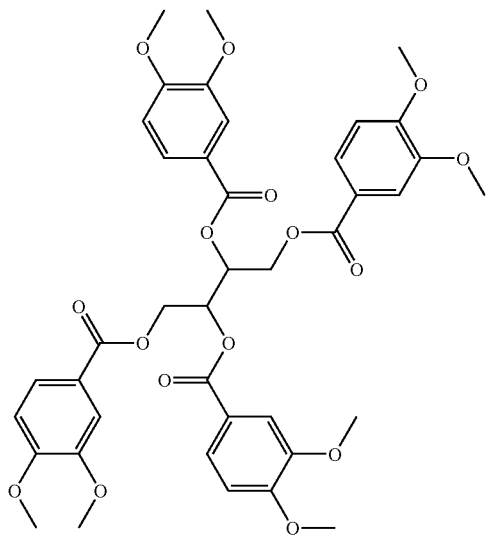
778.75
57
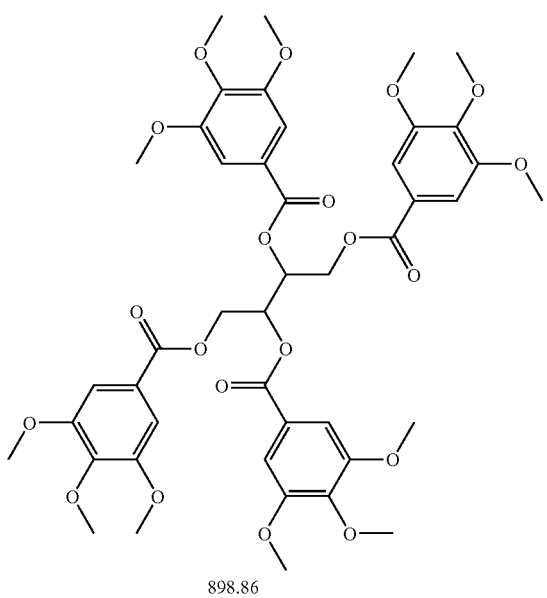
898.86
58
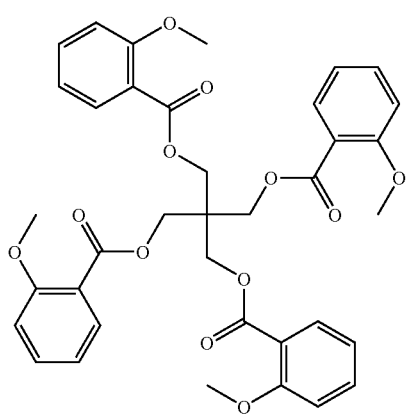
672.67

-continued
59
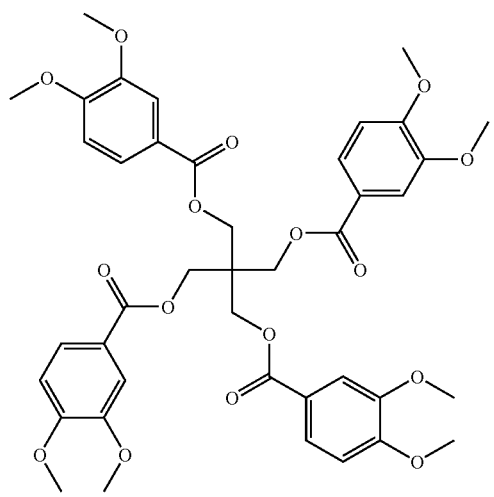
792.78
60
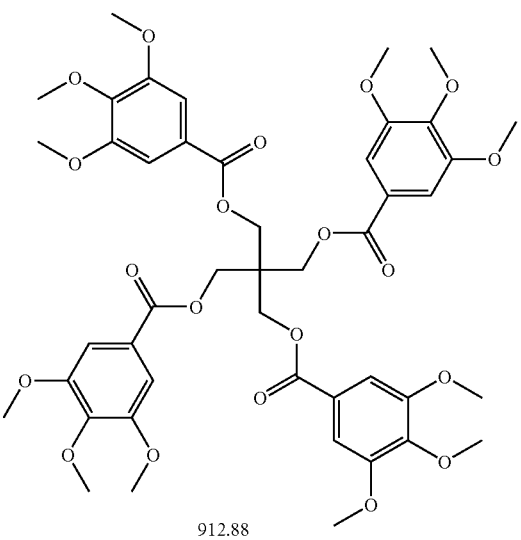
912.88
61
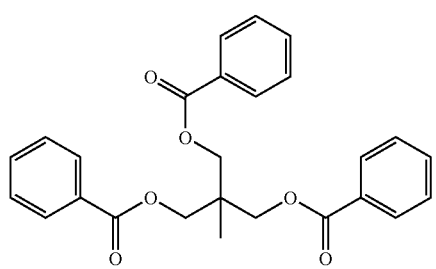
TMPTB
62
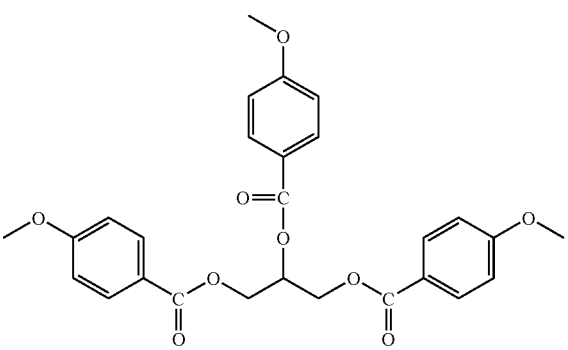
PETB
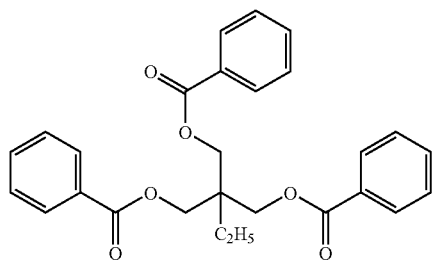
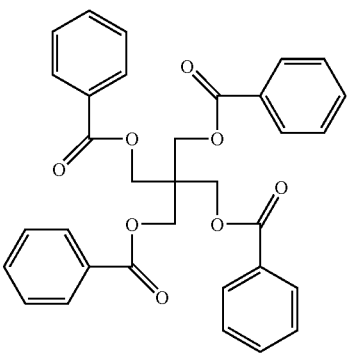
GTB
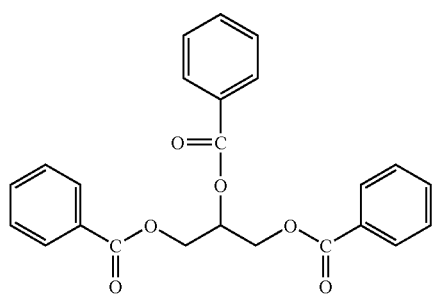

In the production of a cellulose ester film used for the present invention, an ester compound produced from at least a polyvalent alcohol more than trivalence and an organic acid expressed with the above-mentioned general formula (K) is preferably contained as a plasticizer in an amount of 1 to 25 weight %, however another plasticizer may be used together with the above.

An ester compound derived from an organic acid represented by Formula (K) and a polyalcohol exhibits high compatibility with cellulose ester and can be incorporated in the cellulose ester at a high addition content. Consequently, bleeding-out tends not to occur even when another plasticizer or additive is used together, whereby other plasticizer or additive can be easily used together, if desired.

Further, when another plasticizer is simultaneously employed, the ratio of the incorporated plasticizers of the present invention is preferably at least 50 percent by weight, more preferably at least 70 percent, but still more preferably at least 80 percent, based on the total weight of the plasticizers. When the plasticizer of the present invention is employed in the above range, it is possible to achieve a definite effect that the flatness of cellulose ester film produced by a melt-casting method is improved even under simultaneous use of other plasticizers.

Examples of other plasticizers which are simultaneously employed include: an aliphatic carboxylic acid-polyalcohol based plasticizer; an unsubstituted aromatic carboxylic acid or cycloalkylcaroboxylic acid-polyalcohol based plasticizer disclosed in paragraphs 30-33 of JP-A No. 2002-12823; dioctyl adipate; dicyclohexyl adipate; diphenyl succinate; di-2-naphthyl-1,4-cyclohexane dicarboxylate; tricyclohexyl tricarbalate; tetra-3-methylphenyltetrahydrofurane-2,3,4,5-tetracarboxylate; tetrabutyl-1,2,3,4-cyclopentane teracarboxylate; triphenyl-1,3,5-cyclohexyl tricarboxylate; triphenylbenzne-1,3,5-tetracarboxylate; multivalent carboxylates such as phthalic acid based plasticizers (for example, diethyl phthalate, dimethoxyethyl phthalate, dimethyl phthalate, dioctyl phthalate, dibutyl phthalate, di-2-ethylhexyl phthalate, dioctyl phthalate, dicyclohexyl phthalate, dicyclohexyl terephthalate, methylphthalyl methyl glycolate, ethylphthalyl ethyl glycolate, propylphthalyl propyl glycolate, and butylphthalyl butyl glycolate) and citric acid based plasticizers (acetyltrimethyl citrate, acetyltriethyl citrate and acetyltributyl citrate); phosphoric acid ester based plasticizers such as triphenyl phosphate, biphenyl diphenyl phosphate, butylenebis(diethyl phosphate), ethylenebis(diphenyl phosphate), phenylenebis(dibutyl phosphate), phenylenebis(diphenyl phosphate) (ADEKA STAB PFR, produced by ADEKA Corp.), phenylenebis(dixylenyl phosphate) (ADEKA STAB FP500, produced by ADEKA Corp.) and bisphenol A diphenyl phosphate (ADEKA STAB FP600, produced by ADEKA Corp.); carbohydrate ester based plasticizers; polymer plasticizers; polymer polyesters disclosed in paragraphs 49-56 of JP-A No. 2002-22956; and polyether based plasticizers.

However, a phosphorus-containing plasticizer generates a strong acid when it is hydrolyzed, whereby hydrolysis of the plasticizer itself and the cellulose ester is accelerated. Accordingly, a phosphorus-containing plasticizer may have problems in that it exhibits a poorer storage stability and coloration of a cellulose ester film tends to occur when the film is produced via a melt-casting method. Therefore, a phthalate ester plasticizer, a polyalcohol ester plasticizer, a citrate ester plasticizer, a polyester plasticizer and a polyether plasticizer are preferably used in the present invention.

In the film for a display of the present invention, coloration of the film affects the optical property of the film. Accordingly, the yellow index $Y_1$ of the film is preferably 3.0 or less, and more preferably 1.0 or less. The yellow index can be determined according to the method of JIS-K7103.

(Matting Agents)

In order to provide a lubricant property, as well as optical and mechanical functions, a matting agent is incorporated into to the film for a display of the present invention. Listed as such matting agents are particles of inorganic or organic compounds.

Preferably employed matting agents are spherical, rod-shaped, acicular, layered and tabular. Examples of a matting agent include: inorganic particles of metal oxides, metal phosphates, metal silicates and metal carbonates such as silicon dioxide, titanium dioxide, aluminum oxide, zirconium oxide, calcium carbonate, kaolin, talc, calcined calcium silicate, hydrated calcium silicate, aluminum silicate, magnesium silicate, or calcium phosphate; and crosslinking polymer particles. Of these, silicon dioxide is preferred due to a resulting decrease in film haze. It is preferable that these particles are subjected to a surface treatment, since it is possible to lower the film haze.

The above surface treatment is preferably carried out employing halosilane, alkoxysilane, silazane, or siloxane. As the average diameter of the particles increases, lubricant effect is enhanced, while, as the average diameter decreases, the transparency of the film increases. The average diameter of the primary particles is 0.01-1.0 μm, preferably 5-50 nm, but is more preferably 7-14 nm. These particles are preferably employed to form unevenness of 0.01-1.0 μm on the surface of the film.

Examples of silicon dioxide particles include AEROSIL 200, 200V, 300, R972, R972V, R974, R202, R812, OX50, TT600 and NAX50 (all of which are produced by Nihon Aerosil Co., Ltd); KE-P10, KE-P30, KE-P100, KE-P150 (Produced by NIPPON SHOKUBAI Co., Ltd.). Of these, preferred are AEROSIL 200V, R972, NAX50, KE-P30 and KE-P100.

When two types of the particles are employed in combination, they may be mixed at an optional ratio to use. It is possible to use particles different in the average particle diameter or in materials, for example, AEROSIL 200V and R972V can be used at a weight ratio in the range of 0.1:99.9 to 99.9:0.1.

These matting agents are preferably added by kneading. Further, as another embodiment, the matting agent is added by previously dispersing a matting agent in a solvent; further dispersing the matting agent after mixed with a cellulose ester and/or a plasticizer and/or a UV absorbent; separating the solid content by evaporating the solvent or by precipitation of the solid content; and using the product in the production process of a melt of cellulose ester. The latter method is preferable because the matting agent can be more uniformly dispersed in the cellulose ester.

The above matting agent may also be used in order to improve a mechanical property, an electric property or an optical property of the film.

The addition of more amount of matting agent into the film for a display of the present invention results in improving the lubricant property of the film, however, haze of the film also increases. Accordingly, the content of a matting agent in the film is preferably 0.001-5 weight %, more preferably 0.005-1 weight %, and still more preferably 0.01-0.5 weight %, based on the weight of cellulose ester.

The haze value of the film for a display of the present invention is preferably less than 1.0%, but is more preferably less than 0.5%, since the haze of 1% or more may affect the optical property of the film. The haze value is determined according to the method of JIS K 7136.

The film constituting material is required to generate very small amount of volatile matter or no volatile matter at all in the melting and film formation process. This is intended to ensure that the foaming occurs at the time of heating and melting to remove or avoid the defect inside the film and poor flatness on the film surface.

When the film constituting material is molten, the amount of the volatile matter contained is 1% by mass or less, preferably 0.5% by mass or less, more preferably 0.2% by mass or less, still more preferably 0.1% by mass or less. In the present invention, a differential thermogravimetric apparatus (differential weight calorimetry (TG/DTA 200 by Seiko Denshi Kogyo Co., Ltd.) is used to get a weight loss on heating from 30° C. through 250° C. The result is used as the amount of the volatile matter contained.

Before film formation or at the time of heating, the moisture and the volatile components represented the aforementioned solvent are preferably removed from the film constituting material to be used. They can be removed by the conventional known method. A heating method, depressurization method, or heating/depressurization method can be used to remove them in air or in nitrogen atmosphere as an inert gas atmosphere. When the known drying method is used, this procedure is carried out in the temperature range wherein the film constituting material is not decomposed. This is preferred to ensure good film quality.

Generation of the volatile components can be reduced by the drying step prior to film formation. It is possible to dry the resin independently, or dry the resin and film constituting materials by separating into a mixture or compatible substances made of at least one or more types other than the resin. The drying temperature is preferably 70° C. or more. If the material to be dried contains any substance having a glass-transition temperature, and is heated up to a drying temperature higher than that glass-transition temperature, the material will be fused and will become difficult to handle. To avoid this, the drying temperature is preferably kept at a level not exceeding the glass-transition temperature. If a plurality of substances has a glass-transition temperature, the glass-transition temperature of the substance having a lower glass-transition temperature should be used as a standard. This temperature is preferably 70° C. or more through (glass-transition temperature–5)° C. or less, more preferably 110° C. or more through (glass-transition temperature–20) ° C. or less. The drying time is preferably 0.5 through 24 hours, more preferably 1 through 18 hours, still more preferably 1.5 through 12 hours. If the drying temperature is too low, the rate of removing the volatile components will be reduced and much time will be required for drying. The drying process can be divided into two or more steps. For example, the drying process may includes a pre-drying step for storing the material, and a preliminary drying step for the period one week before film formation through the period immediately before film formation.

<Melt Casting Method>

The display apparatus film of the present invention is preferably formed by melt casting of the cellulose ester. The molding by melt casting wherein heating and melting are conducted without using the solvent used in the solution casting method (e.g., methylene chloride) can be divided into a melt-extrusion molding method, press molding method, inflation method, injection molding method, blow molding method, draw molding method, and others. Of these methods, melt-extrusion molding method is preferred to produce a polarizing plate protective film characterized by excellent mechanical strength and surface accuracy.

Figure 3:
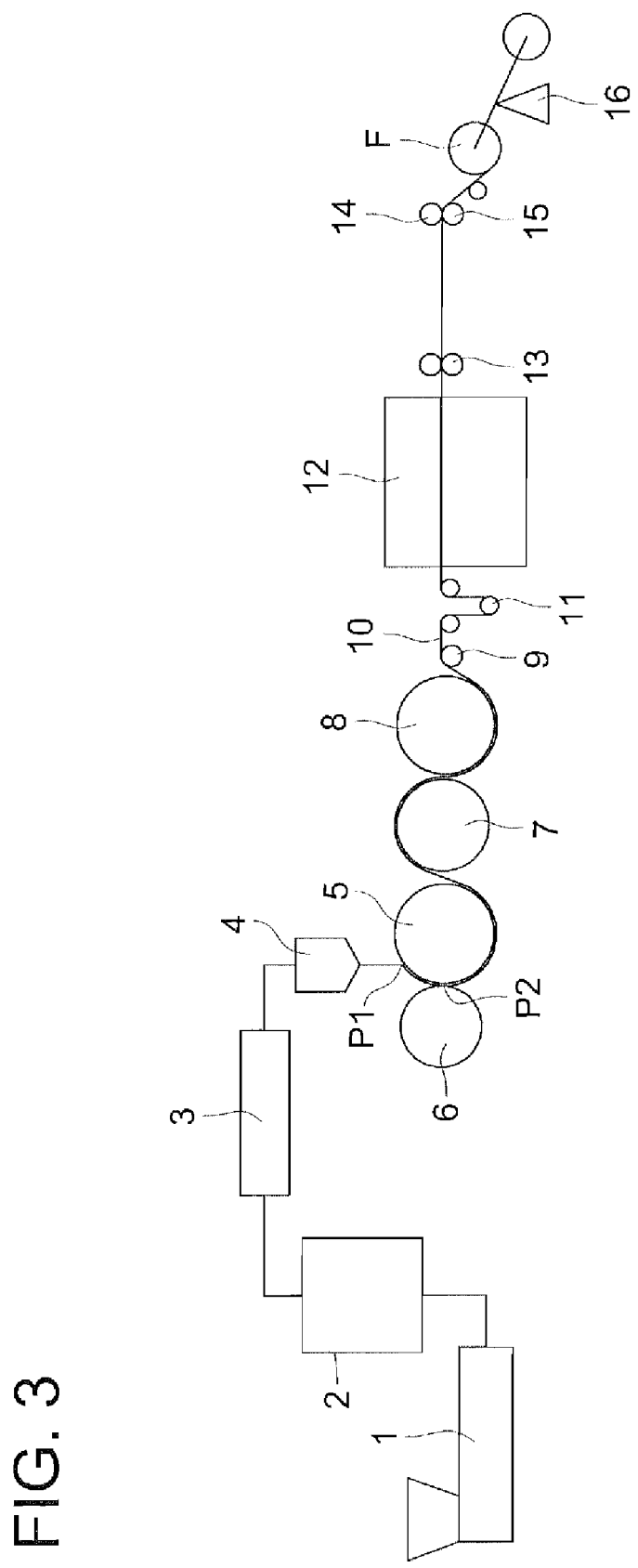
FIG. 3 shows an outline flow-sheet of an embodiment of apparatus for embodying the production method of cellulose ester film relating to the invention.
Figure 4:
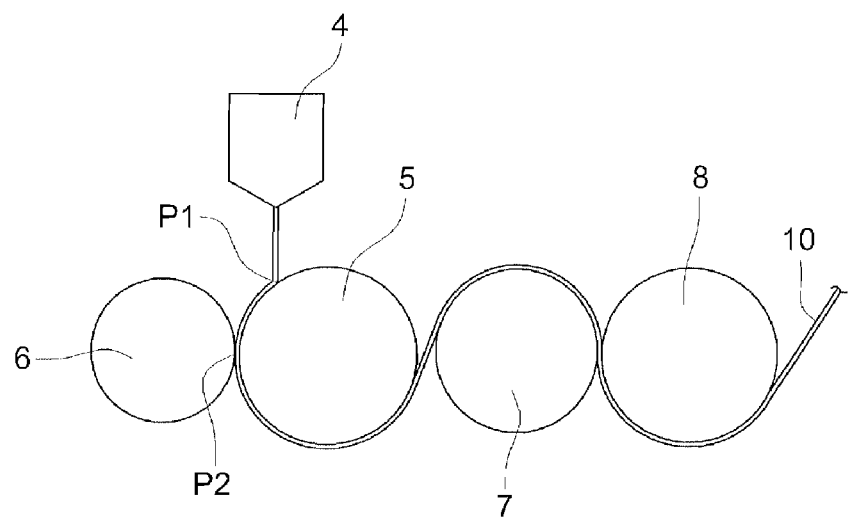
FIG. 4 shows an enlarged flow-sheet of principal part of the production apparatus of FIG. 1.

The following describes the film manufacturing method of the present invention with reference to the melt extrusion method:

FIG. 3 is a schematic flow sheet showing the overall structure of the apparatus for manufacturing the cellulose ester film preferably used in the present invention. FIG. 4 is an enlarged view of the cooling roll portion from the flow casting die.

In the cellulose ester film manufacturing method shown in FIG. 3 and FIG. 4, the film material such as cellulose resin is mixed, then melt extrusion is conducted on a first cooling roll 5 from the flow casting die 4 using the extruder 1. The material is be circumscribed on a first cooling roll 5, second cooling roll 7 and third cooling roll 8—a total of three cooling rolls—sequentially. Thus, the material is cooled, solidified and formed into a film 10. With both ends gripped by a stretching apparatus 12, the film 10 separated by a separation roll 9 is stretched across the width and is wound by a winding apparatus 16. To correct flatness, a touch roll 6 is provided. This is used to press the film against the surface of the first cooling roll 5. This touch roll 6 has an elastic surface and forms a nip with the first cooling roll 5. The details of the touch roll 6 will be described later.

The conditions for the cellulose ester film manufacturing method are the same as those for thermoplastic resins such as other polyesters. The material is preferably dried in advance. A vacuum or depressurized dryer, or dehumidified hot air dryer is used to dry the material until the moisture is reduced to 1000 ppm or less, preferably 200 ppm or less.

For example, the cellulose ester based resin having been dried under hot air, vacuum or depressurized atmosphere is extruded by the extruder 1 and is molten at a temperature of about 200 through 300° C. The leaf disk filter 2 is used to filter the material to remove foreign substances.

When the material is fed from the feed hopper (not illustrated) to the extruder 1, the material is preferably placed in the vacuum, depressurized or insert gas atmosphere to prevent oxidation and decomposition.

When additives such as plasticizer are not mixed in advance, they can be kneaded into the material during the process of extrusion. To ensure uniform mixing, a mixer such as a static mixer 3 is preferably utilized.

In the present invention, the cellulose resin and the additives such as a stabilizer to be added as required are preferably mixed before being molten. It is more preferred that the cellulose resin and stabilizer should be mixed first. A mixer may be used for mixing. Alternatively, mixing may be completed in the process of preparing the cellulose resin, as described above. It is possible to use a commonly used mixer such as a V-type mixer, conical screw type mixer, horizontal cylindrical type mixer, Henschel mixer and ribbon mixer.

As described above, subsequent to mixing of the film constituting material, the mixture can be directly molten by the extruder 1 to form a film. Alternatively, it is also possible to palletize the film constituting material, and the resultant pellets may be molten by the extruder 1, whereby a film is formed. The following arrangement can also be used: When the film constituting material contains a plurality of materials having different melting points, so-called patchy half-melts are produced at the temperature wherein only the material having a lower melting point is molten. The half-melts are put into the extruder 1, whereby a film is formed. Further, the following arrangement can also be used: If the film constituting material contains the material vulnerable thermal decomposition, a film is directly formed without producing pellets, thereby reducing the frequency of melting. Alternatively, a film is produced after patchy half-melts have been formed, as described above.

Various types of commercially available extruders can be used as the extruder 1. A melt-knead extruder is preferably utilized. Either a single-screw extruder or a twin-screw extruder can be used. When producing a film directly without pellets being formed from the film constituting material, an adequate degree of mixing is essential. In this sense, a twin-screw extruder is preferably used. A single-screw extruder can be used if the screw is changed into a kneading type screw such as a Madoc screw, Unimelt screw or Dulmage screw, because a proper degree of mixing can be obtained by this modification. When pellets or patchy half-melts are used as film constituting materials, both the single screw extruder and twin screw extruder can be used.

In the cooling process inside the extruder 1 and after extrusion, oxygen density is preferably reduced by an inert gas such as nitrogen gas or by depressurization.

The preferred conditions for the melting temperature of the film constituting material inside the extruder 1 vary according to the viscosity and discharge rate of the film constituting material as well as the thickness of the sheet to be produced. Generally, it is Tg or more through Tg+130° C. or less with respect to the glass-transition temperature Tg of the film, preferably Tg+10° C. or more through Tg+120° C. or less. The melt viscosity at the time of extrusion is 10 through 100000 poises, preferably 100 through 10000 poises. The retention time of the film constituting material inside the extruder 1 should be as short as possible. It is within five minutes, preferably within three minutes, more preferably within two minutes. The retention time varies according to the type of the extruder and the conditions for extrusion. It can be reduced by adjusting the amount of the material to be supplied, the L/D, the speed of screw and the depth of screw groove.

The shape and speed of the screw of the extruder 1 are adequately selected in response to the viscosity and discharge rate of the film constituting material. In the present invention, the shear rate of the extruder 1 is 1/sec. through 10000/sec., preferably 5/sec. through 1000/sec., more preferably 10/sec. through 100/sec.

The extruder 1 that can be used in the present invention can be obtained as a plastic molding machine generally available on the market.

The film constituting material extruded from the extruder 1 is fed to the flow casting die 4, and the slit of the flow casting die 4 is extruded as a film. There is no restriction to the flow casting die 4 if it can be used to manufacture a sheet or film. The material of the flow casting die 4 are exemplified by hard chromium, chromium carbonate, chromium nitride, titanium carbide, titanium carbonitride, titanium nitride, cemented carbide, ceramic (tungsten carbide, aluminum oxide, chromium oxide), which are sprayed or plated. Then they are subjected to surface processing, as exemplified by buffing and lapping by a grinder having a count of #1000 or later planar cutting (in the direction perpendicular to the resin flow) by a diamond wheel having a count of #1000 or more, electrolytic grinding, and electrolytic complex grinding. The preferred material of the lip of the flow casting die 4 is the same as that of the flow casting die 4. The surface accuracy of the lip is preferably 0.5 S or less, more preferably 0.2 S or less.

Figure 5:
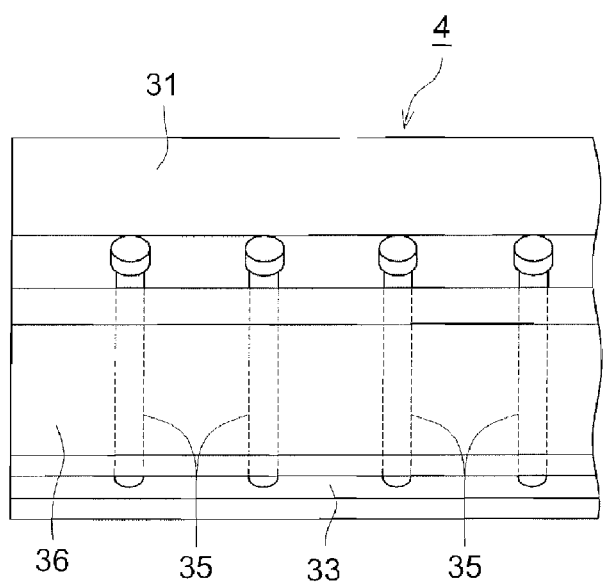
FIG. 5a shows an exterior appearance of the principal part of a casting die and FIG. 5b shows a cross section of the principal part of the casting die.
Figure 5:
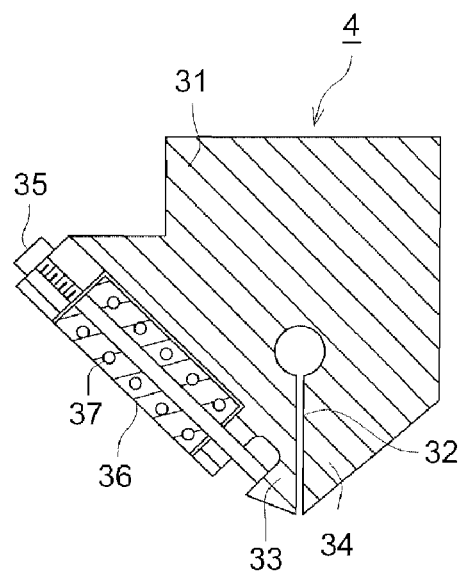

The slit of this flow casting die 4 is designed in such a way that the gap can be adjusted. This is shown in FIG. 5. Of a pair of lips forming the slit 32 of the flow casting die 4, one is the flexible lip 33 of lower rigidity easily to be deformed, and the other is a stationary lip 34. Many heat bolts 35 are arranged at a predetermined pitch across the flow casting die 4, namely, along the length of the slit 32. Each heat bolt 35 includes a block 36 containing a recessed type electric heater 37 and a cooling medium passage. Each heat bolt 35 penetrates the block 36 in the vertical direction. The base of the heat bolt 35 is fixed on the die (main body) 31, and the front end is held in engagement with the outer surface of the flexible lip 33. While the block 36 is constantly cooled, the input of the recessed type electric heater 37 is adjusted to increase or decrease the temperature of the block 36, this adjustment causes thermal extension and contraction of the heat bolt 35, and hence, displacement of the flexible lip 33, whereby the film thickness is adjusted. The following arrangement can also be used: A thickness gauge is provided at predetermined positions in the wake of the die. The web thickness information detected by this gauge is fed back to the control apparatus. This thickness information is compared with the preset thickness information of the control apparatus, whereby the power of the heat generating member of the heat bolt or the ON-rate thereof is controlled by the signal for correction control amount sent from this apparatus. The heat bolt preferably has a length of 20 through 40 cm, and a diameter of 7 through 14 mm. A plurality of heat bolts, for example, several tens of heat bolts are arranged preferably at a pitch of 20 through 40 mm. A gap adjusting member mainly made up of a bolt for adjusting the slip gap by manually movement in the axial direction can be provided, instead of a heat bolt. The slit gap adjusted by the gap adjusting member normally has a diameter of 200 through 1000 μm, preferably 300 through 800 μm, more preferably 400 through 600 μm.

The first through third cooling roll is made of a seamless steel pipe having a wall thickness of about 20 through 30 mm. The surface is mirror finished. It incorporates a tune for feeding a coolant. Heat is absorbed from the film on the roll by the coolant flowing through the tube. Of these first through third cooling rolls, the first cooling roll 5 corresponds to the rotary supporting member of the present invention.

In the meantime, the touch roll 6 held in engagement with the first cooling roll 5 has an elastic surface. It is deformed along the surface of the first cooling roll 5 by the pressure against the first cooling roll 5, and forms a nip between this roll and the first roll 5. To be more specific, the touch roll 6 corresponds to the pressure rotary member of the present invention.

Figure 6:
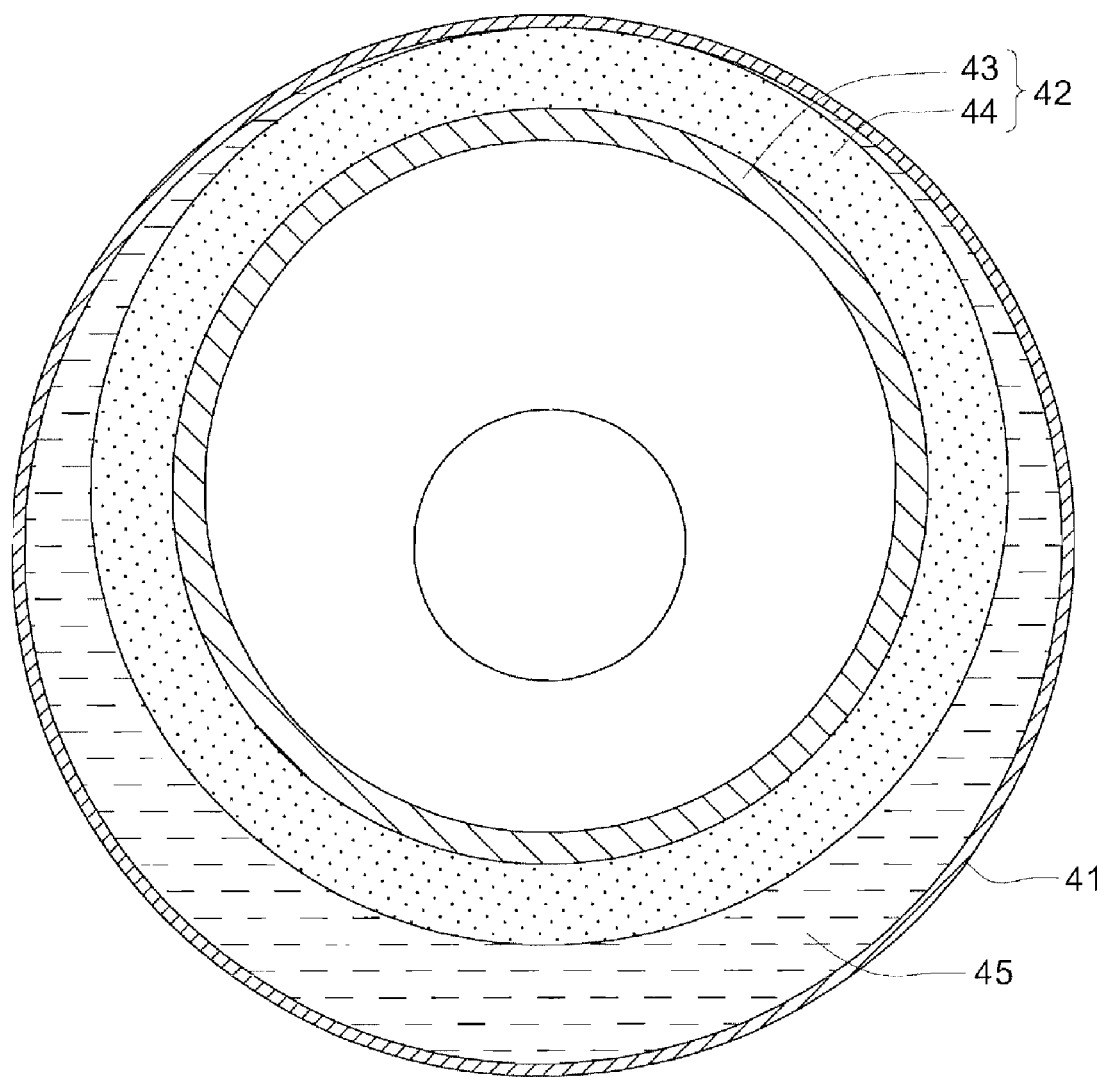
FIG. 6 shows a cross section of the first embodiment of a rotation member for nipping and pressing.

FIG. 6 is a schematic cross section of the touch roll 6 as an embodiment of the present invention (hereinafter referred to as "touch roll A"). As illustrated, the touch roll A is made up of an elastic roller 42 arranged inside the flexible metallic sleeve 41.

The metallic sleeve 41 is made of a stainless steel having a thickness of 0.3 mm, and is characterized by a high degree of flexibility. If the metallic sleeve 41 is too thin, strength will be insufficient. If it is too thick, elasticity will be insufficient. Thus, the thickness of the metallic sleeve 41 is preferably 0.1 through 1.5 mm. The elastic roller 42 is a roll formed by installing a rubber 44 on the surface of the metallic inner sleeve 43 freely rotatable through a bearing. When the touch roll A is pressed against the first cooling roll 5, the elastic roller 42 presses the metallic sleeve 41 against the first cooling roll 5, and the metallic sleeve 41 and elastic roller 42 is deformed, conforming to the shape of the first cooling roll 5, whereby a nip is formed between this roll and the first cooling roll. The cooling water 45 is fed into the space formed inside the metallic sleeve 41 with the elastic roller 42.

Figure 7:
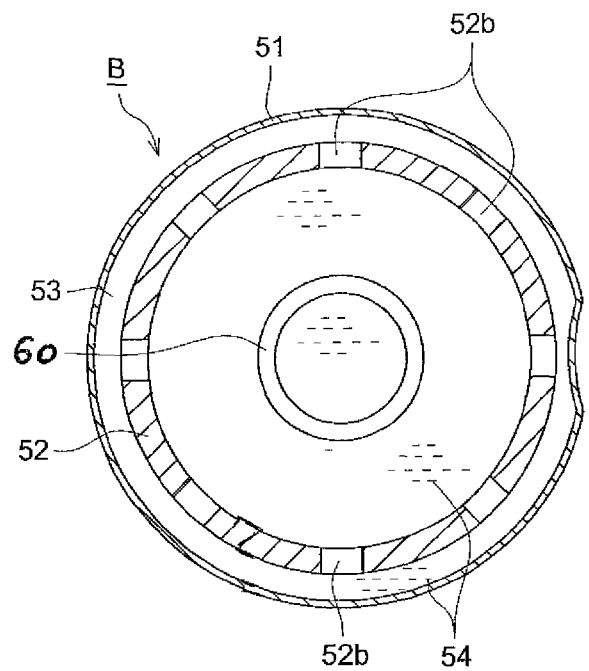
FIG. 7 shows a cross section along the plane perpendicular to the rotating axis of the second embodiment of the rotating member for nipping and pressing.
Figure 8:
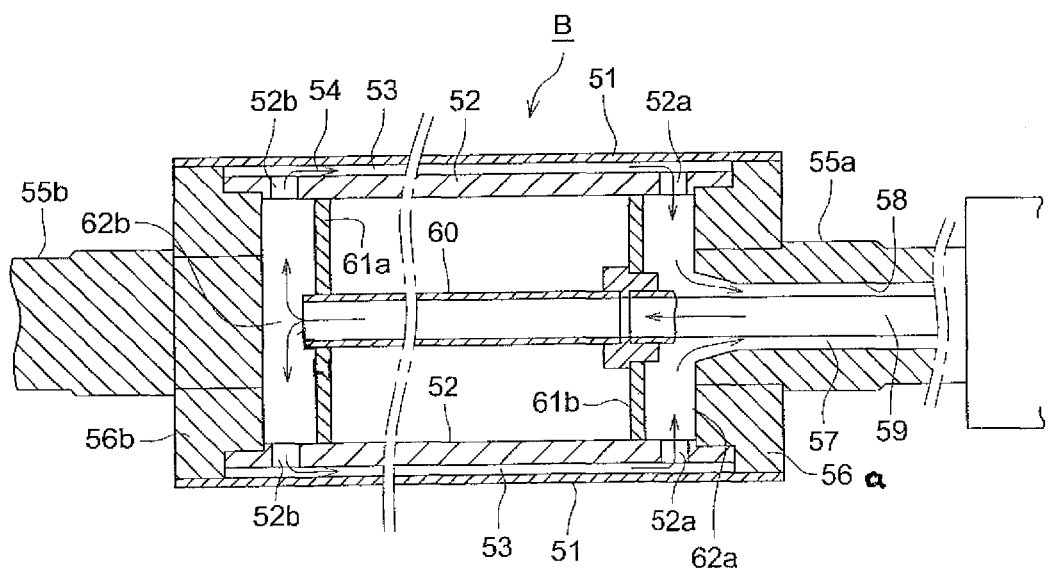
FIG. 8 shows a cross section along the plane including the rotating axis of the second embodiment of the rotating member for nipping and pressing.

FIG. 7 and FIG. 8 show a touch roll B as another embodiment of the pressure rotary member. The touch roll B is formed of an outer sleeve 51 of flexible seamless stainless steel tube (having a thickness of 4 mm), and metallic inner sleeve 52 of high rigidity arranged coaxially inside this outer sleeve 51. Coolant 54 is led into the space 53 formed between the outer sleeve 51 and inner sleeve 52. To put it in greater details, the touch roll B is formed in such a way that the outer sleeve supporting flanges 56a and 56b are mounted on the rotary shafts 55a and 55b on both ends, and a thin-walled metallic outer sleeve 51 is mounted between the outer peripheral portions of these outer sleeve supporting flanges 56a and 56b. The fluid supply tube 59 is arranged coaxially inside the fluid outlet port 58 which is formed on the shaft center of the rotary shaft 55a and constitutes a fluid return passage 57. This fluid supply tube 59 is connected and fixed to the fluid shaft sleeve 60 arranged on the shaft center which is arranged inside the thin-walled metallic outer sleeve 51. Inner sleeve supporting flanges 61a and 61b are mounted on both ends of this fluid shaft sleeve 60, respectively. A metallic inner sleeve 52 having a wall thickness of about 15 through 20 mm is mounted in the range from the position between the outer peripheral portions of these inner sleeve supporting flanges 61a and 61b to the outer sleeve supporting flange 56b on the other end. For example, a coolant flow space 53 of about 10 mm is formed between this metallic inner sleeve 52 and thin-walled metallic outer sleeve 51. An outlet 52a and an inlet 52b communicating between the flow space 53 and intermediate passages 62a and 62b outside the inner sleeve supporting flanges 61a and 61b are formed on the metallic inner sleeves 52 close to both ends, respectively.

To provide pliability, flexibility and restoring force close to those of the rubber, the outer sleeve 51 is designed thin within the range permitted by the thin cylinder theory of elastic mechanics. The flexibility evaluated by the thin cylinder theory is expressed by wall thickness t/roll radium r. The smaller the t/r, the higher the flexibility. The flexibility of this touch roll B meets the optimum condition when $t/r \leq 0.03$. Normally, the commonly used touch roll has a roll diameter R=200 through 500 mm (roll radius r=R/2), a roll effective width L=500 through 1600 mm, and an oblong shape of r/L<1. As shown in FIG. 8, for example, when roll diameter R=300 mm and the roll effective width L=1200 mm, the suitable range of wall thickness t is 150×0.03=4.5 mm or less. When pressure is applied to the molten sheet width of 1300 mm at the average linear pressure of 98 N/cm, the wall thickness of the outer sleeve 51 is 3 mm. Then the corresponding spring constant becomes the same as that of the rubber roll of the same shape. The width k of the nip between the outer sleeve 51 and cooling roll in the direction of roll rotation is about 9 mm. This gives a value approximately close to the nip width of this rubber roll is about 12 mm, showing that pressure can be applied under the similar conditions. The amount of deflection in the nip width k is about 0.05 through 0.1 mm.

Here, $t/r \leq 0.03$ is assumed. In the case of the general roll diameter R=200 through 500 mm, sufficient flexibility is obtained if $2 \text{ mm} \leq t \leq 5$ mm in particular. Thickness can be easily reduced by machining. Thus, this is very practical range. If the wall thickness is 2 mm or less, high-precision machining cannot be achieved due to elastic deformation during the step of processing.

The equivalent value of this $2 \text{ mm} \leq t \leq 5$ mm can be expressed by $0.008 \leq t/r \leq 0.05$ for the general roll diameter. In practice, under the conditions of $t/r \approx 0.03$, wall thickness is preferably increased in proportion to the roll diameter. For example, selection is made within the range of t=2 through 3 mm for the roll diameter: R=200; and t=4 through 5 mm for the roll diameter: R=500.

These touch rolls A and B are energized toward the first cooling roll by the energizing section (not illustrated). The F/W (linear pressure) obtained by dividing the energizing force F of the energizing section by the width W of the film in the nip along the rotary shaft of the first cooling roll 5 is set at 9.8 through 147 N/cm. According to the present embodiment, a nip is formed between the touch rolls A and B, and the first cooling roll 5. Flatness should be corrected while the film passes through this nip. Thus, as compared to the cases where the touch roll is made of a rigid body, and no nip is formed between the touch roll and the first cooling roll, the film is sandwiched and pressed at a smaller linear pressure for a longer time. This arrangement ensures more reliable correction of flatness. To be more specific, if the linear pressure is smaller than 9.8 N/cm, the die line cannot be removed sufficiently. Conversely, if the linear pressure is greater than 147 N/cm, the film cannot easily pass through the nip. This will cause uneven thickness of the film.

The surfaces of the touch rolls A and B are made of metal. This provides smooth surfaces of the touch rolls A and B, as compared to the case where touch rolls have rubber surfaces. The elastic body 44 of the elastic roller 42 can be made of ethylene propylene rubber, neoprene rubber, silicone rubber or the like.

To ensure that the die line is removed sufficiently by the touch roll 6, it is important that the film viscosity should lie within the appropriate range when the film is sandwiched and pressed by the touch roll 6. Further, cellulose ester is known to be affected by temperature to a comparatively high degree. Thus, to set the viscosity within an appropriate range when the cellulose ester film is sandwiched and pressed by the touch roll 6, it is important to set the film temperature within an appropriate range when the cellulose ester film is sandwiched and pressed by the touch roll 6. When the glass-transition temperature of the cellulose ester film is assumed as Tg, the temperature T of the film immediately before the film is sandwiched and pressed by the touch roll 6 is preferably set in such a way that $Tg<T<Tg+110°$ C. can be met. If the film temperature T is lower than T, the viscosity of the film will be too high to correct the die line. Conversely, if the film temperature T is higher than Tg+110° C., uniform adhesion between the film surface and roll cannot be achieved, and the die line cannot be corrected. This temperature is preferably $Tg+10°$ C.$<T<Tg+90°$ C., more preferably $Tg+20°$ C.$<T<Tg+70°$ C. To set the film temperature within the appropriate range when the cellulose ester film is sandwiched and pressed by the touch roll 6, one has only to adjust the length L of the nip between the first cooling roll 5 and touch roll 6 along the rotating direction of the first cooling roll 5, from the position P1 wherein the melt pressed out of the flow casting die 4 comes in contact with the first cooling roll 5.

In the present invention, the material preferably used for the first roll 5 and second roll 6 is exemplified by carbon steel, stainless steel and resin. The surface accuracy is preferably set at a higher level. In terms of surface roughness, it is preferably set to 0.3 S or less, more preferably 0.01 S or less.

In the present invention, the portion from the opening (lip) of the flow casting die 4 to the first roll 5 is reduced to 70 kPa or less. This procedure has been found out to correct the die line effectively. Pressure reduction is preferably 50 through 70 kPa. There is no restriction to the method of ensuring that the pressure in the portion from the opening (lip) of the flow casting die 4 to the first roll 5 is kept at 70 kPa or less. One of the methods is to reduce the pressure by using a pressure-resistant member to cover the portion from the flow casting die 4 to the periphery of the roll. In this case, the vacuum suction machine is preferably heated by a heater or the like to ensure that a sublimate will be deposited on the vacuum suction machine. In the present invention, if the suction pressure is too small, the sublimate cannot be sucked effectively. To prevent this, adequate suction pressure must be utilized.

In the present invention, the film-like cellulose ester based resin in the molten state from the T-die 4 is conveyed in contact with the first roll (the first cooling roll) 5, second cooling roll 7, and third cooling roll 8 sequentially, and is cooled and solidified, whereby an unoriented cellulose ester based resin film 10 is produced.

In the embodiment of the present invention shown in FIG. 3, the unoriented film 10 cooled, solidified and separated from the third cooling roll 8 by the separation roll 9 is passed through a dancer roll (film tension adjusting roll) 11, and is led to the stretching machine 12, wherein the film 10 is stretched in the lateral direction (across the width). This stretching operation orients the molecules in the film.

A known tender or the like can be preferably used to draw the film across the width. Especially when the film is stretched across the width, the lamination with the polarized film can be preferably realized in the form of a roll. The stretching across the width ensures that the low axis of the cellulose ester film made up of a cellulose ester based resin film is found across the width.

In the meantime, the transmission axis of the polarized film also lies across the width normally. If the polarizing plate wherein the transmission axis of the polarized film and the low axis of the optical film will be parallel to each other is incorporated in the liquid crystal display apparatus, the display contrast of the liquid crystal display apparatus can be increased and an excellent angle of view field is obtained.

The glass transition temperature Tg of the film constituting material can be controlled when the types of the materials constituting the film and the proportion of the constituent materials are made different. When the retardation film is manufactured as a cellulose film, Tg is 120° C. or more, preferably 135° C. or more. In the liquid crystal display apparatus, the film temperature environment is changed in the image display mode by the temperature rise of the apparatus per se, for example, by the temperature rise caused by a light source. In this case, if the Tg of the film is lower than the film working environment temperature, a big change will occur to the retardation value and film geometry resulting from the orientation status of the molecules fixed in the film by stretching. If the Tg of the film is too high, temperature is raised when the film constituting material is formed into a film. This will increase the amount of energy consumed for heating. Further, the material may be decomposed at the time of forming a film, and this may cause coloring. Thus, Tg is preferably kept at 250° C. or less.

The process of cooling and relaxation under a known thermal setting conditions can be applied in the stretching process. Appropriate adjustment should be made to obtain the characteristics required for the intended optical film.

The aforementioned stretching process and thermal setting process are applied as appropriate on an selective basis to provide the retardation film function for the purpose of improving the physical properties of the retardation film and to increase the angle of field in the liquid crystal display apparatus. When such a stretching process and thermal setting process are included, the heating and pressing process should be performed prior to the stretching process and thermal setting process.

When a retardation film is produced as a cellulose ester film, and the functions of the polarizing plate protective film are combined, control of the refractive index is essential. The refractive index control can be provided by the process of stretching. The process of stretching is preferred. The following describes the method for stretching:

In the retardation film stretching process, required retardations Ro and Rt can be controlled by a stretching at a magnification of 1.0 through 2.0 times in one direction of the cellulose resin, and at a magnification of 1.01 through 2.5 times in the direction perpendicular to the inner surface of the film. Here Ro denotes an in-plane retardation. It is obtained by multiplying the thickness by the difference between the refractive index in the longitudinal direction MD in the same plane and that across the width TD. Rt denotes the retardation along the thickness, and is obtained by multiplying the thickness by the difference between the refractive index (an average of the values in the longitudinal direction MD and across the width TD) in the same plane and that along the thickness.

Stretching can be performed sequentially or simultaneously, for example, in the longitudinal direction of the film and in the direction perpendicular thereto in the same plane of the film, namely, across the width. In this case, if the stretching magnification at least in one direction is insufficient, sufficient retardation cannot be obtained. If it is excessive, stretching difficulties may occur and the film may break.

Stretching in the biaxial directions perpendicular to each other is an effectively way for keeping the film refractive indexes nx, ny and nz within a predetermined range. Here nx denotes a refractive index in the longitudinal direction MD, ny indicates that across the width TD, and nz represents that along the thickness.

When the material is stretched in the melt-casting direction, the nz value will be excessive if there is excessive shrinkage across the width. This can be improved by controlling the shrinkage of the film across the width or by stretching across the width. In the case of stretching across the width, distribution may occur to the refractive index across the width. This distribution may appear when a tenter method is utilized. Stretching of the film across the width causes shrinkage force to appear at the center of the film because the ends are fixed in position. This is considered to be what is called "bowing". In this case, bowing can be controlled by stretching in the casting direction, and the distribution of the retardation across the width can be reduced.

Stretching in the biaxial directions perpendicular to each other reduces the fluctuation in the thickness of the obtained film. Excessive fluctuation in the thickness of the retardation film will cause irregularity in retardation. When used for liquid crystal display, irregularity in coloring or the like will occur.

The fluctuation in the thickness of the cellulose ester film is preferably kept within the range of ±3%, preferably ±1%. To achieve the aforementioned object, it is effective to use the method of stretching in the biaxial directions perpendicular to each other. The magnification rate of stretching in the biaxial directions perpendicular to each other is preferably 1.0 through 2.0 times in the casting direction, and 1.01 through 2.5 times across the width. Stretching in the range of 1.01 through 1.5 times in the casting direction and in the range of 1.05 through 2.0 times across the width will be more preferred to get a retardation value.

When the absorption axis of the polarizer is present in the longitudinal direction, matching of the transmission axis of the polarizer is found across the width. To get a longer polarizing plate, the retardation film is preferably stretched so as to get a low axis across the width.

When using the cellulose ester to get positive double refraction with respect to stress, stretching across the width will provide the low axis of the retardation film across the width because of the aforementioned arrangement. In this case, to improve display quality, the low axis of the retardation film is preferably located across the width. To get the target retardation value, it is necessary to meet the following condition:

(Stretching magnification across the width)>(stretching magnification in casting direction)

After stretching, the end of the film is trimmed off by a slitter 13 to a width predetermined for the product. Then both ends of the film are knurled (embossed) by a knurling apparatus made up of an emboss ring 14 and back roll 15, and the film is wound by a winder 16. This arrangement prevents sticking in the cellulose ester film F (master winding) or scratch. Knurling can be provided by heating and pressing a metallic ring having a pattern of projections and depressions on the lateral surface. The gripping portions of the clips on both ends of the film are normally deformed and cannot be used as a film product. They are therefore cut out and are recycled as a material.

In the film winding process, the film is wound on the winding roll while the shortest distance between the outer peripheral surface of the cylindrically wound film and the outer peripheral surface of the traveling type conveyance roll immediately before is kept at a minimum. Further, the front side of the winding roll is provided with a blower or the like that removes or reduces the potential on the film surface.

The winding machine to be used in the manufacture of a polarizing plate protective film of the present invention can be the one commonly employed. The film can be wound according to such a winding method as a constant tension method, constant torque method, taper tension method, and program tension control method of constant internal stress. In this case, the initial winding tension at the time of winding the polarizing plate protective film is preferably 90.2 through 300.8 N/m.

In the film winding process of the present invention, the film is wound preferably at a temperature of 20° C. through 30° C., with a relative humidity of 20% through 60% RH. When the temperature and humidity in the film winding process are controlled in this manner, the resistance of the retardation (Rt) along the length against the fluctuation in humidity can be improved.

If the temperature in the winding process is less than 20° C., wrinkles will occur and film winding quality is deteriorated so that the film cannot be put into practical use. This must be avoided. If the temperature in the film winding process has exceeded 30° C., wrinkles will also occur and film winding quality is deteriorated so that the film cannot be put into practical use. This must be avoided.

If the humidity in the film winding process is less than 20% RH, electrostatic charge will occur easily and the film winding quality is deteriorated so that the film cannot be put into practical use. If the humidity in the film winding process has exceeded 60% RH, the winding quality, sticking trouble and conveyance property will be deteriorated.

When the polarizing plate protective film is wound in a roll, any core located on the cylinder can be used as a winding core. It is preferably a hollow plastic core. Any material can be used as a plastic material, if it is a heat resistant plastic material capable of resisting the temperature at the time of heating. It can be exemplified by phenol resin, xylene resin, melamine resin, polyester resin, and epoxy resin. The thermosetting resin reinforced by such a filler as a glass fiber is preferably used, and is exemplified by a hollow plastic winding ore of FRP having an outer diameter of 6 inches (hereinafter an inch is equivalent to 2.54 cm) and an inner diameter of 5 inches.

The number of turns on such a winding core is preferably 100 or more, more preferably 500. The winding thickness is preferably 5 cm or more. The length is 500 to 10000 m, and the width of the film substrate is preferably 1 to 5 m, more preferably 105 to 4 m. Further, it is preferably conducted such that a wide width film is formed, and before winding it, the film is subjected to a slit process so as to obtain 2 or three roll films.

Hereinafter, the physical property of a cellulose ester film used for the present invention will be described.

(Retardation Value $R_0$, $R_t$)

In a cellulose ester film used for the present invention, retardation values Ro and Rt are preferably in the range of 0 nm$\leq$Ro$\leq$300 nm and −400 nm$\leq$Rt$\leq$+400 nm, but are more preferably 0 nm$\leq$Ro$\leq$100 nm and −100 nm$\leq$Rt$\leq$+200 nm. The absolute value of Rt/Ro is preferably in a range of 0 to 500.

$$Ro = (nx-ny) \times d \qquad \text{Formula (a)}$$

$$Rt = \{(nx+ny)/2 - nz\} \times d \qquad \text{Formula (b)}$$

wherein Ro represents the in-plane retardation value of the film; Rt represents the retardation value in the film thickness direction; nx represents the in-plane refractive index of the film in the advanced axis direction; nz represents the refractive index in the film thickness direction (each of the refractive indices determined at a wavelength of 590 nm); and d represents thickness (nm) of the film.

It is possible to determine retardation values Ro and Rt employing an automatic double refractometer. For example, determination is performed at 23° C. and 55% relative humidity employing KOBRA-21 ADH (produced by Oji Scientific Instruments).

Further, any variation of Ro in the lateral or longitudinal direction of film is preferably within ±5 nm, is more preferably within ±3 nm, is still more preferably within ±1 nm, but is most preferably within ±0.3 nm.

Further, the variation of Rt in the lateral or longitudinal direction of film is preferably within ±5 nm, is more preferably within ±3 nm, but is most preferably within ±1 nm.

The variation of Ro and Rt is preferably within the above range over the total length of a long-length film, and also between successive rolls.

The variation of Rt prior to and after heat treatment for 300 hours at 80° C. and 90% relative humidity is preferably within ±10 nm, is more preferably within ±5 nm, but is most preferably within ±1 nm.

(Wavelength Dispersion Characteristic of Ro)

(Wavelength Dispersion Characteristic)

By employing an automatic birefringence analyzer KOBURA-21 ADH (produced by Oji Scientific Instruments), in-plane retardation values at wavelengths of 450, 590, and 650 nm were determined at 23° C. and 55% Relative humidity. Each of the recorded values was designated as R450, R590, and R650, respectively.

Preferred ranges are: 0.7<R450/R590<1.5 and 0.7<R650/R590<1.5, while more preferred ranges are: 0.8<R450/R590<1.0, and 1.0<R650/R590<1.3.

(Stability of Rt Against Humidity)

In regard to Rt stability in humility, any variation of Rt between 20% and 80% relative humidity at 23° C. is preferably at most 30 nm, is more preferably at most 20 nm, but is most preferably at most 10 nm.

(Stability of Rt Against Temperature)

The variation of Rt between 10-60° C. is preferably ±10 nm while utilizing the value determined at 20° C. and 55% relative humidly as a standard, is more preferably ±5 nm, but is most preferably ±1 nm.

(Stability of Ro Against Temperature)

The variation of Ro between 10-60° C. is preferably ±10 nm while utilizing the value determined at 20° C. and 55% relative humidly as a standard, is more preferably ±5 nm, but is most preferably ±1 nm.

(Orientation Angle)

When Ro is at most 5 nm, particularly 0-1 nm, the orientation angle is not particularly limited. However, the orientations angle is commonly within ±10 degrees against the lateral or longitudinal direction of long-lengths of film, is preferably within 5 degrees, is more preferably within ±1 degree, but is most preferably within ±0.1 degree.

Orientation angle, as described herein, refers to the delayed phase axis direction (the angle to the traverse direction during film casting) on the plane of cellulose ester film. It is possible to determine the orientation angle employing an automatic birefringence analyzer KOBURA-21 ADH (produced by Oji Scientific Instruments).

(Photoelastic Coefficient)

The photoelastic coefficient of the cellulose ester film employed in the present invention is preferably $1 \times 10^{-14}$-$1 \times 10^{-9}$ Pa$^{-1}$, but is more preferably $5 \times 10^{-12}$-$2 \times 10^{-11}$. It is possible to determine the photoelastic coefficient under conditions of 23° C. and 55% relative humidity, employing an ELLIPSOMETER M-150 produced by JASCO Corp. Commercial TAC films exhibit a photoelastic coefficient of approximately $1 \times 10^{-11}$ Pa$^{-1}$.

(Dimensional Stability)

Dimensional variation in the longitudinal and traverse directions of long lengths of film prior to and after allowing the film to stand at 90° C. of no humidity for 100 hours is preferably within ±0.5%, is more preferably within ±0.3%, but is most preferably ±0.1%. It is preferable that the film exhibits the same variation as above even after 500 hours of the above treatment.

Dimensional variation in the longitudinal and lateral directions of a long length of film prior to and after allowing the film to stand at 60° C. and relative humidity 90% for 100 hours is preferably within ±1%, is more preferably within ±1%, is still more preferably within 0.3%, is yet more preferably within 0.3%, but is most preferably ±0.1%. It is preferable that the film exhibits the same variation ranges as above even after 500 hours of the above treatment.

The above dimensional variation ratio was determined as follows. After re-humidifying a sample film in a room maintained at temperature 23° C. and 55% relative humidity for 4 hours, markings at an interval of about 10 cm in the lateral and longitudinal directions were made employing a common cutter, and the distance (L1) between the markings was measured. Subsequently, the resulting film was allowed to stand in an incubator maintained at 60° C. and 90% relative humidity for 24 hours. After rehumidifying the film in the room maintained at 23° C. and 55% relative humidity, the distance (L2) between the markings was recorded. The dimensional variation ratio was evaluated based on the following formula.

$$\text{Dimensional variation ratio (\%)} = \{(L2-L1)/L1\} \times 100$$

The dimensional variation ratio was also determined in the same manner as above, except that the storage conditions of 60° C. and 90% relative humidity for 24 hours were changed to those of 90° C. and no humidity for 24 hours.

(Water-Vapor Permeability)

Water-vapor permeability at 40° C. and 90% relative humidity is preferably 1-1,500 g/m$^2$·24 hours, is more preferably 5-1,200 g/m$^2$·24 hour, and is still more preferably 10-1,000 g/m$^2$·24 hours. The water-Vapor Permeability can be measured in accordance with JIS Z0208.

(Light Transmittance)

The transmittance at 500 nm of the cellulose ester film of the present invention is preferably 85-100%, is more preferably 90-100%, but is most preferably 92-100%. Further, transmittance at 400 nm is preferably 40-100%, is more preferably 50-100%, but is most preferably 60-100%. (Determination of Light Transmittance) Transmittance T was determined as follows. Spectral transmittance $\tau$ ($\lambda$) in the wavelength range of 350-700 nm of each sample was recorded at an interval of 10 nm, employing a spectrophotometer U-3400 (produced by Hitachi, Ltd.), whereby the transmittance values at specific wavelengths were obtained.

(Absorbability of Ultraviolet Radiation)

Light transmittance at 380 nm of a cellulose ester film incorporating no UV absorbers is preferably at least 50%, is more preferably at least 80%, but is most preferably at least 90%. When UV absorbers are incorporated, transmittance at 380 nm is preferably less than 50%, is more preferably 0-15%, is still more preferably 0-10%, but is most preferably less than 5%. It is possible to readily control the absorbability of ultraviolet radiation by varying the type and addition amount of additives such as UV absorbers, plasticizers, resins, or minute particles.

In the same manner as above, it is also possible to determine the absorbability of ultraviolet radiation, employing a spectrophotometer, U-3400 (produced by Hitachi. Ltd.).

(Haze)

The haze of the cellulose ester film of the present invention, when determined by stacking up three sheets, is preferably at most 5%, is more preferably at most 2%, but is most preferably at most 1%.

It is possible to determine the haze value based on JIS K 6714, employing a haze meter (1001 Type DP, produced by Nippon Denshoku Industries Co., Ltd.).

(Elastic Modulus)

The elastic modulus of the cellulose ester film of the present invention is preferably 1-6 GPa, but is more preferably 2-5 GPa.

Elastic moduli in the traverse direction (TD) and manufacturing direction (MD) of long-lengths of film may be the same or different. It is preferable that 0.5≦MD elastic modulus/TD elastic modulus≦2; it is more preferable that 0.7≦MD elastic modulus/TD elastic modulus≦1.4; but is still more preferable that 0.9≦MD elastic modulus/TD elastic modulus≦1.1.

(Elongation at Break)

The elongation at break of the cellulose ester film of the present invention is preferably in the range of 10-909% at 23° C. and 55% relative humility, but is more preferably in the range of 20-80%. Further, the break stress is preferably in the range of 50-200 Mpa.

(Elastic Modulus, Elongation at Break, and Break Stress of Films) Measurement was carried out at 23° C. and 55% relative humidity according to the method described in JIS K 7127. The above values were determined as follows. A sample sheet was cut into 10 mm wide and 130 mm long strips. Subsequently, tests were carried out in such a manner that at an appropriate temperature, the distance between chucks was set at 100 mm and pulling was carried out at a rate of 100 mm/minute.

(Tear Strength)

The tear strength of the cellulose ester film of the present invention is preferably 1-50 g, is more preferably 3-30 g, but is most preferably 5-25 g. It is possible to determine the tear strength as follows. After rehumidifying a film sheet at 23° C. and 55% relative humidity for 24 hours, the resulting sheet is cut into strips of 50 mm wide×64 mm, and it is possible to measure the tear strength of the strip based on ISO 6383/2-1983.

The range is preferably $0.5 < Htd/Hmd < 2$, but is more preferably $0.7 < Htd/Hmd < 1.3$, wherein Htd represents the tear strength in the traverse direction (TD direction) and Hmd represents the tear strength in the manufacturing direction (MD direction). When cellulose ester film is stretched in the traverse direction, it is possible to control the ratio of tear strength of the film in the manufacturing direction (hereinafter referred to as the MD direction) employing the stretching direction, the stretching factor, and the stretching temperature.

(Contact Angle)

When the cellulose ester film of the present invention is employed as a polarizing plate protective film, in order to enhance adhesion properties to the polarizer, an alkali saponification treatment is occasionally carried out. It is preferable that a film which has been subjected to the alkali treatment is adhered onto a polarizer employing an aqueous polyvinyl alcohol solution as an adhesive. The contact angle of pure water on the surface of the film prior to saponification is preferably 40-80 degrees, but is more preferably 50-70 degrees. The contact angle after saponification treatment becomes preferably at most 30 degrees, but becomes more preferably 5-25 degrees. The contact angle on both surfaces of the film may be the same or slightly different. For example, it is possible that the content of additives in the surface which is brought into contact with a casting support (being a metal drum or belt) of additives is varied from the opposite side, whereby it is possible to differ the contact angle on both sides. It is possible to determine the surface which is to face the polarizer, based on the yield of the polarizing plate production, curling of the finished polarizing plates, and coatability of functional layers provided onto the cellulose ester film.

(Contact Angle after Saponification)

A sample was treated with 2.5 N NaOH at 50° C. for 2.5 minutes, and subsequently washed with pure water for 2.5 minutes. After the above treatment, the sample was rehumidified at 23° C. and 55% relative humidity for 24 hours, and the contact angle was determined employing a contact angle meter, Type CA-D, produced by Kyowa Interface Science Co., Ltd.

(Dissolution into a Saponification Solution)

When a large amount of additives in the film and their decomposition products by an alkali saponification is eluted, the saponification solution is stained and problems result due to foreign matter. Consequently, it is preferable to keep the elution as little as possible. Generally, it is possible to decrease the elution amount by reducing low molecular weight components or employing additives which exhibit excellent compatibility with cellulose ester. Additives, which hardly result in bleeding-out during high temperature processing or high temperate and high humidity processing, are preferred since they hardly elute into the saponification solution.

(Curling)

Curling of cellulose ester films in the longitudinal or traverse direction is preferably in the range of −20 to 20 l/m, is more preferably in the range of −15 to 15 l/m, but is most preferably in the range of −10 to 10 l/m.

The above curling is determined as follows. After allowing a film sheet to stand at 25° C. and 55% relative humidity for 24 hours, the resulting film sheet is cut into strips of 50 mm×2 mm. The strips are rehumidified at 23° C. and 55% relative humidity for 24 hours, and then the curling value of each of film strips is determined employing a radius of curvature. The numerical curl value is determined based on Method "A" of JIS K 7619.

The curling value is expressed by 1/R, where R represents the radius of curvature and meter is employed as the unit.

It is possible to determine adhesion of a polarizer to any of the sides of a cellulose ester film based on curling of the polarizing protective film employed on the opposite side and the entire polarizing plate including, if any, a hard coat layer, an antiglare layer, an antireflection layer, an optical anisotropic layer, a light scattering layer or a brightness enhancing film, and productivity of the polarizing plates.

(Water Absorption Ratio)

When a cellulose ester film is employed as a polarizing plate protective film, its water absorption ratio is preferably 1-5%. When the water absorption ratio is at least 1%, a polarizer adhered onto a protective film is readily dried during preparation of a polarizing plate, while when it is less than 5%, the resulting polarizing plate exhibits excellent durability.

(Measurement Method of the Water Absorption Ratio) A sample is cut to 10 cm×10 cm, and immersed into 23° C. water for 24 hours. After removal from the water, water droplets on both sides are immediately wiped off by using a filter paper and the weight is recorded and designated as W1. Subsequently, after rehumidifying the above film at 23° C. and 55% relative humidity for 24 hours, the resulting weight is recorded and designated as W0. Thus, the water absorption ratio during the immersion in water for 24 hours is calculated based on the following formula, employing each of the recorded values.

$$\text{Water absorption ratio (\%)} = \{(W1-W0)/W0\} \times 100$$

(Moisture Regain)

When a cellulose ester film is employed as a polarizing plate protective film, its moisture regain is preferably 1-4.5%. The moisture regain of at least 1% results in desired drying properties when a polarizer is adhered to a protective film and dried during preparation of a polarizing plate, while the moisture regain of less than 4.5% results in excellent durability of the polarizing plate.

(Measurement Method of Moisture Regain)

A sample is cut to 10 cm×10 cm, and rehumidified at 23° C. and 80% relative humidity for 48 hours. Thereafter, the weight is recorded and designated as W3. Subsequently, after drying the above film at 120° C. for 45 minutes, the resulting weight is recorded and designated as W2. Thus, the moisture regain is calculated based on the following formula, employing each of the recorded values.

$$\text{Moisture regain (\%)} = \{(W3-W2)/W2\} \times 100$$

(Layer Thickness)

The thickness of a cellulose ester film used in the present invention is not limited to a specific one, however the thickness of 1 to 200 μm can be used desirably, more desirably 5 to 100 μm, still more desirably 10 to 80 μm.

The variations in the thickness in the lateral direction and in the longitudinal direction are preferably ±5 μm, more preferably ±3 μm, still more preferably ±1 μm, further more preferably ±0.5 μm and specifically preferably ±0.1 μm, in an average thickness.

Layer thickness variation refers to the difference between the maximum value and the average value, or between the minimum value and the average value, wherein the average value is determined in such a manner that after rehumidifying a sample film at 23° C. and 55% RH for 24 hours, the thickness is determined at intervals of 10 mm, and then averaged.

(Surface Roughness (Ra) of Film)

(Center Line Mean Roughness (Ra) of Cellulose Ester Film)

When a cellulose ester film is employed as an LCD member, to minimize light leakage, a high degree of flatness is required. The center line mean roughness (Ra) is the value specified in JIS B 0601. Examples of the measurement methods include a needle contact method and an optical method.

Center line mean roughness (Ra) of the cellulose ester film of the present invention is preferably at most 20 nm, is more preferably at most 10 nm, but is most preferably at most 3 nm. It is possible to determine the center line mean roughness Ra employing a non-contact surface fine structure meter WYKO NT-2000.

(Image Clarity)

It is preferable that the image clarity of cellulose ester films is high. The above image clarity is defined in JIS K 7105. When determined employing a 1 mm slit, at least 90% is preferred, at least 95% is more preferred, but at least 99% is most preferred.

(Foreign Matter Bright Spots)

It is preferable that the cellulose ester film of the present invention results in minimal foreign matter bright spots.

Foreign matter bright spots, as described herein, refer to the following type of spots. A cellulose ester film is placed between two polarizing plates arranged at right angles (crossed Nicols) and light is exposed on one side while is viewed from the other side. The foreign matter bright spots are those which are seen due to leakage of light from the light source. During this operation, a polarizing plate, which is employed for evaluation, is composed of a protective film which results in no foreign matter bright spots, whereby a glass plate is preferably employed to protect the polarizers. It is assumed that one of the causes of foreign matter bright spots is the presence of cellulose, incorporated in cellulose ester, which has undergone no acetylation. It is possible to reduce foreign matter bright spots by employing cellulose ester incorporating minimal foreign matter and filtering the cellulose ester solution. Further, as the film thickness decreases, the number of foreign matter bright spots per unit area tends to decrease. As the content of cellulose ester incorporated in films decreases, foreign matter bright spots also tends to decrease.

The number of foreign matter bright spots at a diameter of at least 0.01 mm is preferably at most 200/cm$^2$, is more preferably at most 100/cm$^2$, is still more preferably at most 50/cm$^2$, is yet more preferably at most 10/cm$^2$, but is most preferably 0/cm. Further, the number of foreign matter bright spots at a dimer of 0.005-0.01 mm is preferably at most 200/cm$^2$, is more preferably at most 100/cm$^2$, is still more preferably 50/cm$^2$, is yet more preferably 30/cm$^2$, is further more preferably at most 10/cm$^2$, but is most preferably 0/cm$^2$.

(Measurement of Foreign Matter Bright Spots)

A sample was interposed between two polarizers arranged at right angles (crossed Nicols) and light was exposed onto the exterior side of a polarizing plate. Subsequently, the other side of the polarizing plate was observed via a microscope (at a factor of 30 in terms of transmission light source) and the number of visible white spots per 25 mm$^2$ was recorded. Determination was conducted for 10 areas and the number of foreign matter bright spots for a total area of 250 mm$^2$ was recorded, and then the number of foreign matter bright spots/cm$^2$ was calculated and employed for evaluation.

(Distribution of Additives in the Thickness Direction)

Additives such as plasticizers, resins, or UV absorbers may be incorporated uniformly or non-uniformly through the thickness direction of the film. For example, it is possible to decrease the content of plasticizers in the surface to 50-99.9% with respect to the average content of the plasticizers through the overall thickness, and it is also possible to increase the content of the plasticizes to 100.1-150% in the surface. An example case is that the concentration of additives near the surface is decreased by scattering them near the surface due to an increase in drying temperature. An example is that a cast film is peeled under drying condition to result in non-uniform content of residual solvents or non-uniform solvent compositions and subsequently the film is dried whereby the concentration distribution results due to migration and diffusion of additives through the thickness. The degree of distribution varies depending on additives. Further, it is possible to provide a layer incorporating additives in differing amounts on the surface via successive casting or co-casting. When additives intentionally or unintentionally results in a content distribution through the thickness, it is possible to determine the side onto which a functional layer is applied or to which a polarizer is adhered, upon considering the productivity of each of the converting processes and post processes.

It is preferable that the cellulose ester film of the present invention is employed as a liquid crystal display member due to its high water-vapor permeability and dimensional stability. The liquid crystal display member, as described herein, refers to a member employed in liquid crystal display units. Examples include a polarizing plate, a polarizing plate protective film, a retardation plate, a reflection plate, a viewing angle enhancing film, an optical compensation film, an antiglare film, a non-reflection film, an antistatic film, an antireflection film, a light diffusion film and a brightness enhancing film. Of these, it is preferable to employ a cellulose ester film as the polarizing plate, as the polarizing plate protective film, and as the antireflection film. Specifically, when employed in the uppermost surface of a liquid crystal display as a polarizing plate protective film, it is preferable to provide the antireflection layer on the film surface.

(Polarizing Plate)

The polarizing plate of the present invention and the liquid crystal display of the present invention, employing the polarizing plate will now be described.

<Polarizing Film>

A polarizer (polarizing film), which is a main component of a polarizing plate, is the element which only transmits light having a polarization plane in the definite direction. The representative polarizer which is currently known is a polyvinyl alcohol based polarizing film, which include two types, one which is prepared by dying a polyvinyl alcohol based film with iodine and the other which is prepared by dying the same with a dichroic dye.

It is preferable that the polarizing film is formed employing ethylene-modified polyvinyl alcohol having an ethylene unit content of 1-4 mol %, a degree of polymerization of 2,000-4,000 and a saponification ratio of 99.0-99.99 mol %. The cutting temperature in hot-water of the film is preferably 66-73° C. Further, in order to decrease color spots, it is more preferable that the difference between the hot water cutting temperatures of the two points 5 cm apart in the TD direction of the film is at most 1° C. Further, in order to decrease color spots, it is still more preferable that the difference between the hot water cutting temperatures of the two points 1 cm apart in the TD direction is at most 0.5° C. Further, it is particularly preferable that the film thickness is 10-50 μm, in order to decrease color spots.

Employed as the ethylene-modified polyvinyl alcohol (being the ethylene-modified PVA) is prepared in such a manner that an ethylene-vinyl ester polymer, prepared by copolymerizing ethylene and vinyl ester based monomers, is saponified, whereby vinyl ester units are changed to vinyl alcohol units. Examples of a vinyl ester monomer include: vinyl formate, vinyl acetate, vinyl propionate, vinyl valerate, vinyl laurate, vinyl stearate, vinyl benzoate, vinyl pivaliate, and versatic acid vinyl esters. Of these, it is preferable to employ vinyl acetate.

The content (being the copolymerized amount of ethylene) ethylene units in the ethylene-modified PVA is commonly 1-4 mol %, is preferably 1.5-3 mol %, but is more preferably 2-3 mol %. When the content of the ethylene units is less than 1 mol %, the polarizing performance, the durability enhancing effects, and color spot decreasing effects of the resulting polarizing film are undesirably degraded. On the other hand, when it exceeds 4 mol %, affinity of the ethylene-modified PVA to water is reduced, whereby the uniformity the film surface is undesirably degraded to tend to cause the formation of color spots of the polarizing film.

Further, during copolymerization of ethylene with vinyl ester based monomers, if desired, it is possible to copolymerize copolymerizable monomers in the range (at a ratio of preferably at most 15 mol %, but more preferably at most 5 mol %) in which the effects of the present invention is adversely affected.

Examples of such copolymerizable monomers with vinyl ester monomers include olefins having 3-30 carbon atoms such as propylene, 1-butene, or isobutene; acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, or octadecyl acrylate; methacrylic acid and salts thereof; methacrylic acid esters such as methyl methacrylate, ethyl methacrylate, n-propyl methacrylate, i-propyl methacrylate, n-butyl acrylate, i-butyl acrylate, t-butyl acrylate, 2-ethylhexyl methacrylate, dodecyl methacrylate, or octadecyl methacrylate; acrylamide derivatives such as acrylamide, N-methylacrylamide, N-ethylacrylamide, N,N-dimethylacrylamide, diacetoneacrylamide, acrylamide propane sulfinic acid and salts thereof, acrylamidopropyldimethylanine and salts thereof, N-methylol acrylamide and derivatives thereof; methacrylamide derivatives such as methacrylamide, N-methylmethacrylamide, N-ethylmethacrylamide, methacrylamidopropane sulfonic acid and salts thereof, methacrylamidopropyldimethylamine and salts thereof, or N-methylol methacrylamide and derivatives thereof; N-vinylamides such as N-vinylformamide, N-vinylacetamide, or n-vinylpyrrolidone; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, or stearyl vinyl ether; nitriles such as acrylonitrile or methacrylonitrile; halogenated vinyls such as vinyl chloride, vinylidene chloride, vinyl fluoride, or vinylidene fluoride; allyl compounds such as allyl acetate or allyl chloride; maleic acid, and salts and esters thereof; itaconic acid, and salts and esters thereof; vinylsilyl compounds such as vinylmethoxysilane; and N-vinylamides such as isopropenyl acetate, N-vinylformamide, N-vinylacetamide, or N-vinylpyrrolidone.

The degree of polymerization of ethylene-modified PVA composing the polarizer and of PVA of the polarizing film is commonly 2,000-4,000, is preferably 2,200-3,500, but is more preferably 2,500-3,000 in terms of polarizing performance and durability. When the degree of polymerization of ethylene-modified PVA is less than 2,000, the polarizing performance and durability of the polarizing film are undesirably degraded. On the other hand, the degree of polymerization of at most 4,000 is preferred since color spots of the polarizer are hardly formed.

The degree of polymerization of the ethylene-modified PVA refers to the weight average polymerization degree. This weight average polymerization degree is determined by means of GPC measurement at 40° C. employing hexafluoroisopropanol (HFIP) added with 20 mmol/liter of sodium trifluoroactate in the moving phase employing monodispersed PMMA as a standard product.

In view of polarization performance and durability of a polarizing film, the ratio of saponification of the ethylene-modified PVA constituting the polarizer is preferably 99.0-99.99 mol %, is more preferably 99.9-99.99 mol %, but is most preferably 99.95-99.99 mol %.

Employed as methods to produce a ethylene-modified film, other than a film forming method based on a melt extrusion system employing water-containing ethylene-modified PVA, include, using an ethylene-modified PVA solution prepared by dissolving ethylene-modified PVA in solvents, a casting method, a wet system film forming method (ejected into poor solvents), a gel film forming method (after an ethylene-modified PVA solution is temporality cooled and gelled, solvents are removed via extraction and an ethylene-modified PVA film is prepared), as well as methods of combinations of these. Of these, in view of obtaining an excellent ethylene-modified PVA film, preferred are the casting method and the melt extrusion method. The resulting ethylene-modified PVA film is, if necessary, dried and thermally treated.

Examples of a solvent which dissolves the ethylene-modified PVA employed during production of ethylene-modified PVA film include: dimethylsulfoxide, dimethylformamide, dimethylacetamide, N-methylpyrrolidone, ethylene glycol, glycerin, propylene glycol, triethylene glycol, tetraethylene glycol, trimethylolpropane, ethylenediamine, diethylenetriamine, glycerin and water. These may be employed alone or in combination of two or more. Of these, suitably employed is dimethylsulfoxide, water, or a mixed solvent of glycerin and water.

The ratio of ethylene-modified PVA, incorporated in an ethylene-modified PVA solution or water-containing ethylene-modified PVA employed during production of the ethylene-modified film, varies depending on the degree of polymerization of the ethylene-modified PVA, but is commonly 20-70% by weight, is preferably 25-60% by weight, but is more preferably appropriately 30-55% by weight, but is most preferably 35-50 by weight. When the ratio of the ethylene-modified PVA exceeds 70% by weight, viscosity of the ethylene-modified PVA solution or the water-containing ethylene-modified PVA becomes excessively high, whereby it becomes difficult to prepare a film without foreign matter and defects due to difficult filtration and defoaming. On the other hand, when the ratio of the ethylene-modified PVA is at most 20% by weight, the viscosity of the ethylene-modified PVA solution or the water-containing ethylene-modified PVA becomes excessively low, whereby it becomes difficult to prepare a PVA film at the targeted thickness. Further, if desired, plasticizers, surfactants, and dichroic dyes may be incorporated in the above ethylene-modified PVA solution or water-containing ethylene-modified PVA.

During production of the ethylene-modified PVA film, it is preferable to incorporate polyalcohols as a plasticizer. Examples of polyalcohols include ethylene glycol, glycerin, propylene glycol, diethylene glycol, diglycerin, triethylene glycol, tetraethylene glycol, and trimethylolpropane. These may be employed individually or in combinations of at least two types. Of these, in view of orientation enhancement effects, diglycerin, ethylene glycol, and glycerin are preferable.

The added amount of polyalcohols is preferably 1-30 parts by weight with respect to 100 parts by weight of the ethylene-modified PVA, is more preferably 3-25 parts by weight, but is most preferably 5-20 parts by weight. When the added amount is less than 1 part by weight, dying properties and orientation properties are occasionally degraded, while when it exceeds 30 parts by weight, the ethylene-modified film becomes excessively flexible, whereby handling properties tend to be degraded.

During production of the ethylene-modified PVA film, it is preferable to incorporate a surfactant. The types of surfactants are not particularly limited, but nonionic or cationic surfactants are preferred. Examples of suitable anionic surfactants include: carboxylic acid surfactants such as potassium laurate, sulfuric acid ester surfactants such as octyl sulfate, and sulfonic acid surfactants such as dodecylbenzene sulfonate. Examples of suitable nonionic surfactants include alkyl ether surfactants such as polyoxyethylene oleyl ether; alkyl phenyl ether surfactants such as polyoxyethylene octyl phenyl ether surfactants; alkyl ester surfactants such as polyoxyethylenelaurate; alkylamine surfactants such as polyoxyethylene lauryl aminoether; alkylamide surfactants such as polyoxyethylene lauric acid amide; polypropylene glycol ether surfactants such as polyoxyethylene polyoxypropylene ether; alkanol amide surfactants such as oleic acid diethanolamide; and allyl phenyl ether surfactants such as polyoxyalkylene phenyl ether. These surfactants may be employed individually or in combinations of at least two types.

The added amount of surfactants is preferably 0.01-1 part by weight with respect to 100 parts by weight of the ethylene-modified PVA, is more preferably 0.02-0.5 part by weight, but is most preferably 0.05-0.3 part by weight. When the added amount is less than 0.01 part by weight, effects to improve film casting properties and peeling properties are hardly exhibited, while when it exceeds 1 part by weight, surfactants are dissolved out onto the surface of the ethylene-modified PVA film to result in blocking, whereby handling properties tend to be degraded.

The hot-water cutting temperature of the ethylene-modified PVA film is preferably 66-73° C., is more preferably 68-73° C., but is most preferably 70-73° C. When the hot-water cutting temperature of the ethylene-modified PVA film is less than 66° C., a state occurs in which a film, which starts dissolution, is stretched whereby the polarization performance becomes insufficient due to reduced tendency of molecular orientation. On the other hand, when the hot-water cutting temperature is 73° C. or more, the film tends not to be stretched, whereby the polarization performance of the polarizing film is undesirably degraded. When the ethylene-modified PVA film is dried and thermally treated, it is possible to control the hot-water cutting temperature of the film by varying the temperature and time of the above treatments.

The thickness of the ethylene-modified PVA film employed to prepare a polarizer is preferably 10-80 μm, more preferably 10-50 μm and still more preferably 20-40 μm. When the thickness is more than 10 μm, uniform stretching is easy, whereby color spotting of the polarizing film tends not to occur. On the other hand, when the thickness does not exceeds 80 μm, more preferably does not exceed 50 μm, during production of a polarizing film via uniaxial stretching of the ethylene-modified PVA film, the variation of thickness due to neck-in at the edge tends not to occur, whereby color spotting of the polarizing film becomes less appearing.

Further, to produce a polarizing film employing an ethylene-modified PVA film, for example, the ethylene-modified PVA film may be dyed, uniaxially stretched, fixed and dried, and, if desired, thermally treated. The order of the dying, uniaxial stretching, and fixing is not particularly limited. Further, the uniaxial stretching may be repeated twice or more.

Dying may be performed at any time such as prior to uniaxial stretching, during uniaxial stretching, or after uniaxial stretching. Employed as dyes for dying are dichroic dyes such as iodine-potassium iodide; Direct Black 17, 19, and 154; Direct Brown 44, 106, 195, 210, and 223; Direct Red 2, 23, 28, 31, 37, 39, 79, 81, 240, 242, and 247; Direct Blue 1, 15, 22, 78, 90, 98, 151, 168, 202, 236, 249, and 270; Direct Violet 9, 12, 51, and 98; Direct Green 1 and 85; Direct Yellow 8, 12, 44, 86, and 87; and Direct Orange 26, 39, 106, and 107. These may be employed individually or in combinations of at least two types. Dying is commonly performed by immersing a PVA film into a solution incorporating the above dyes. Alternatively, the above dyes may be blended into a PVA film during casting. The above dying conditions and methods are not particularly limited.

It is possible to conduct uniaxial stretching employing either a wet stretching method or a dry heat stretching method, and in heated water (in a solution containing the above-mentioned dyes or in a fixing bath which will be described below) or in air employing an ethylene-modified PVA film which absorbed water. The temperature during stretching is not particularly limited, however, when the ethylene-modified PVA film is stretched in heated water (being wet system stretching), the stretching temperature is preferably 30-90° C., while in the case of dry heat stretching, it is preferably 50-180° C. The stretching factor (the total stretching factor in the case of multistage uniaxial stretching) is preferably 4 or more with respect to polarization performance of the polarizing film, but is most preferably 5 or more. The upper limit of the stretching factor is not particularly limited, however, the stretching factor is preferably 8 or less, since uniform stretching is readily performed. The film thickness after stretched is preferably 2-20 μm, but is most preferably 10-20 μm.

To strengthen adsorption of the above dyes onto the ethylene-modified PVA film, a fixing treatment is frequently conducted. Commonly, boric acid and/or boron compounds are added to a treatment bath employed for the fixing treatment. Alternatively, if desired, iodine compounds may be added in the treatment bath.

Drying of a prepared polarizer is preferably performed between 30-150° C., but is more preferably performed between 50-150° C.

An optically transparent protective layer, exhibiting desired mechanical strength, is adhered to one or both sides of the polarizer prepared as above to prepare a polarizing plate.

Listed as adhesives for the above adhesion may be a PVA adhesive and an urethane adhesive. Of these, a PVA adhesive is preferable.

The polarizing plate can be produced by a usual method. It is preferable that the back surface of the cellulose ester film of the present invention is subjected to the alkali saponification treatment and is pasted to at least one surface of a polarizing film using an aqueous solution of completely saponified polyvinyl alcohol, the polarizing film being prepared by immersing a polyvinyl alcohol film in an iodine solution, followed by stretching the film. On the other surface of the polarizing film, the cellulose ester film of the present invention may be provided or other polarizing plate protective film may be provided. As the polarizing plate protective film other than the cellulose ester film of the present invention, a cellulose ester film available on the market can be employed. Examples of a cellulose ester film available on the market include: KC8UX2M, KC4UX, KC5UX, KC4UY, KC4FR, KC8UY, KC12UR, KC8UCR-3, KC8UCR-4, KC8UY-HA and KC8UX-RHA (each manufactured by Konica Minolta Opto, Inc.), FUJITAC TD80UF, FUJITAC T80UZ, FUJITAC T40UZ and an antireflection film (FUJI FILM CV CLEAR VIEW UA, produced by Fuji Photo Film Co., Ltd.).

For example, polarizing plate having the following combinations are possible:

Cellulose ester film of the present invention (80 μm)/polarizer/KC8UX-RHA
Cellulose ester film of the present invention (40 μm)/polarizer/KC8UX-RHA
Cellulose ester film of the present invention (80 μm)/polarizer/KC8UCR-5
Cellulose ester film of the present invention (40 μm)/polarizer/KC8UCR-5
Cellulose ester film of the present invention (80 μm)/polarizer/KC4UY
Cellulose ester film of the present invention (40 μm)/polarizer/KC4UY
Cellulose ester film of the present invention (80 μm)/polarizer/KC5UX
Cellulose ester film of the present invention (40 μm)/polarizer/KC5UX
Cellulose ester film of the present invention (80 μm)/polarizer/FUJITAC TD80UF
Cellulose ester film of the present invention (40 μm)/polarizer/FUJITAC TD80UF
Cellulose ester film of the present invention (80 μm)/polarizer/FUJITAC T40UZ
Cellulose ester film of the present invention (40 μm)/polarizer/FUJITAC T40UZ The polarizing plate protective film provided on the other surface of the polarizing film preferably has a hard coat layer or an antiglare layer each having a thickness of 8-20 μm. Preferably employed is a polarizing plate protective film having a hard coat layer or an antiglare layer each being disclosed, for example, in JP-A Nos. 2003-114333, 2004-203009, 2004-354699 or 2004-354828. Further, preferable is to have an antireflection layer containing a low refractive index layer on the hard coat layer or the antiglare layer, and the low refractive index layer preferably contains the above-mentioned hollow particles.

Alternatively, it is also preferable to use a polarizing plate protective film which also serves as an optical compensation film having an optical anisotropic layer formed by orientating a liquid crystal compound such as a discotic liquid crystal, a rod-shaped liquid crystal or a cholesteric liquid crystal. For example, the optical anisotropic layer can be formed by the method described in JP-A No. 2003-98348. The polarizing plate superior in the flatness and having a stable viewing angle enlarging effect can be obtained by the use of such the film in combination with the optical film of the present invention. Moreover, a film of a cyclic olefin resin, an acryl resin, a polyester resin or a polycarbonate resin may be used as the polarizing plate protective film on the other surface of the polarizing plate. In such the case, the film is preferably pasted with the polarizing plate through a suitable adhering treatment because such the film shows low suitability for saponification treatment.

The polarizing film is stretched in one direction (usually in the longitudinal direction). Therefore, when a polarizing plate is kept under a high temperature and high humidity condition, the polarizing film shrinks in the stretching direction, usually in the longitudinal direction, and expands in the direction orthogonal to the stretching direction, usually in the transverse direction. The expansion and shrinkage of the polarizing plate is larger when the polarizing plate protective film is thinner. Specifically the shrinkage in the longitudinal direction is larger. It is important to inhibit the expansion and shrinkage of the film in the casting direction because the stretching direction of the polarizing film is usually the same as the casting direction (MD direction) of the polarizing plate protective film. The cellulose ester film of the present invention is superior in the dimensional stability, accordingly, it is suitably employed as a polarizing plate protective film.

A polarizing plate may be constituted by pasting a polarizing plate protective film on one surface of the polarizing plate and a separable film on the other surface. The polarizing plate protective film and the separable film are employed for protecting the polarizing plate in the course of forwarding and inspection of the product. In this case, the protective film is pasted onto the surface of the polarizing plate opposite to the surface to be pasted with the liquid crystal cell for protecting the surface of the polarizing plate. A separable film is employed for covering the adhesive layer for pasting the polarizing plate to the liquid crystal cell and applied onto the surface of the polarizing plate to be pasted with the liquid crystal cell.

(In-Plane Switching Mode Liquid Crystal Display)

The liquid crystal display having superior visibility and enlarged viewing angle according to the present invention can be produced by incorporation of the polarizing plate of the present invention into an IPS mode liquid crystal display available on the market.

The in-plane switching mode liquid crystal display of the present invention includes a fringe-field switching (FFS) mode liquid crystal display; therefore, the polarizing plate of the present invention can also be incorporated in the FFS mode liquid crystal display and can exhibit the same effect as that in the case of the IPS (In Plane Switching) mode liquid crystal display.

In a liquid crystal display, an upper side polarizing film and a lower side polarizing film are provided on a pair of substrates provided in the upper side and the lower side of the liquid crystal cell for driving the display. It is preferable that the cellulose ester film of the present invention is provided between the upper substrate and the upper side polarizing film or between the lower substrate and the lower side polarizing film, or, alternatively, the cellulose ester film of the present invention is provided between the upper substrate and the upper side polarizing film and between the lower substrate and the lower side polarizing film.

EXAMPLE

The invention is concretely described below referring examples but the invention is not limited to the examples.

Example 1

(Preparation of Mold by Laser Interference Exposure)

Resist was coated on a quartz glass substrate of 70 mm square having a thickness of 1.2 mm by spin coating. The resist was a positive type resist TDUR-009P, manufactured by Tokyo Ouka Co., Ltd., by which exposed portion of the resist was removed.

Fine patters were imaged on the resist by using a liquid immersing optical system. In the liquid immersing optical system, interference fringes were firstly formed by irradiating two beams of UV ray of 266 nm at a slant angle of 35° to the normal line direction of the quartz substrate for giving first exposure. A laser light source MBD266, manufactured by Coherent Co., Ltd., was used. The glass substrate was developed so as to only remain the resist at the portion where the light portion of the interference fringe was crossed. Regularly oriented lines of the resist having a pitch of 150 nm, a depth of 150 nm and a concave width of 60 nm were formed on the quartz substrate by the above processing. Fine line structure of 50 mm square having a pitch of 150 nm, a depth of 150 nm and a concave width of 60 nm was formed on the quartz substrate by dry etching.

Thereafter, the convexoconcave structure of the quartz mother matrix was completely transferred onto a plate of acryl resin of 1,000 mm square having a thickness of 1 mm by nona-imprinting (thermal imprint) by step and repeat method to form lines of line having a pitch of 150 nm, a depth of 150 nm and a concave width of 60 nm. The resin sheet was shaped into a cylinder so that the surface having the convexoconcave image was inside, and the convexoconcave patterns formed inside of the cylinder was subjected to electric cast by nickel. After that, cylindrical resin was peeled off to obtain a roller-shaped nickel mold having a diameter of 30 cm, a thickness of 1 mm and a image size of 1,000 mm square, on the surface of which lines of lines having a pitch of 150 nm, a depth of 150 nm and a concave width of 60 nm was formed.

The nickel mold was subjected to surface treatment by a chlorine-containing fluorosilane coupling agent of tridecafluoro-1,1,2,2-tetrahydrooctyltrichlorosilane [$CF_3$—$(CF_2)_5$—$CH_2$—$CH_2SiCl_3$] to form a chemical absorption layer on the surface of the fine structure.

(Preparation of Cellulose Ester Resin Solution)

Cellulose ester type resin was dissolved to prepare a resin solution.

Cellulose ester type resins, the same as those used in the following cellulose ester films 1 to 3 were respectively used.

The solvent was prepared by mixing methylene chloride and ethanol in a weight ratio of 10:1. The ratio of cellulose ester to the solvent was 1:5.

(Coating of Resin Solution—Pasting with Film—Peeling)

The apparatus shown in FIG. 1 was used for coating the resin solution.

The roller-shaped mold was rotated at a conveying speed of 1 m/minute.

The resin solution was coated on the convexoconcave patterns of the roller mold by an extrusion coater so as to make the wet thickness of the coated layer to 20 μm. The coated layer was pasted with the following cellulose ester film 1 before drying and solidifying of the resin solution was dried and solidified. A roller was arranged so that the angle of the coating position to the pasting position was 12° (film was pasted 2 seconds after the coating). The holding angle of the support (angle of the pasting position to the peeling position) on the roller was 90° and the time from the pasting to the peeling was 15 seconds.

A tension roller for peeling was arranged so that the roller was touched to the surface of film opposite to the surface carrying the convexoconcave patterns. The coating of the resin solution and pasting with the film were carried out in the similar manner using Cellulose ester films 2 and 3. In the case of Cellulose Film 2 and 3, the time of from pasting to peeling was 10 seconds and 30 seconds, respectively. Further, the coating of the resin solution and pasting with the film were carried out in the same manner as of the Cellulose Film 1 except that the time of from pasting to peeling was 40 seconds.

The film was wound up and the surface thereof was observed. It was confirmed that the resin layer coated on the mold which has lines having a pitch of 150 nm and a height of 150 nm was transferred on the each of Cellulose Ester Films 1 to 3 in a ratio of 99% or more. It was observed by a scanning type electron microscope that the pitch and the height have excellent uniformity.

Cellulose ester film 1 was prepared in the same manner in the above-described one except that the film was dried for 40 seconds during the pasting and peeling of the film. As a result of that, the adhesion between the film and resin solution layer was kept well and a breakage of the film was not occurred but a part of the pillar-shaped patterns was not transferred.

| (Preparation of Cellulose Ester Film 1) (Fine particle despersion) | |
|---|---|
| Fine particle R972V (Nihon Aerogil Co., Ltd.) | 11 parts by weight |
| Ethanol | 89 parts by weight |

The above composition was stirred by a dissolver for 50 minutes and then dispersed by Manton-Gaulin homogenizer.

(Fine Particle Adding Liquid)

The following cellulose ester was added to methylene chloride put in a dissolving vessel and completely dissolved by heating. The resultant solution was filtered by Azumi Filter Paper No. 244 manufactured by Azumi Roshi Co., Ltd. The fine particle dispersion was gradually added into the filtered cellulose ester solution while satisfactorily stirring, and then further dispersed by an attriter. The resultant dispersion was filtered by Finemet NF, manufactured by Nihon Seisen Co., Ltd., to prepare a fine particle adding liquid.

| | |
|---|---|
| Methylene chloride | 99 parts by weight |
| Cellulose ester (Cellulose acetate propionate, Acetyl group substitution degree: 1.8, Propionyl group substitution degree: 0.7) | 4 parts by weight |
| Fine particle dispersion | 11 parts by weight |

The following main dope was prepared. Methylene chloride and ethanol were charged to a pressure dissolving tank. Cellulose ester was put into the vessel containing the solvents. The cellulose ester was completely dissolved while heating and stirring, and the plasticizer and the UV absorbent were further added and dissolved. The resultant solution was filtered by Azumi Filter Paper No. 244 to prepare a main dope.

Two parts by weight of the fine particle adding liquid was added to 100 parts by weight of the main dope and satisfactorily mixed by an in-line mixer, Static type in-pipe mixer Hi-Mixer SWJ manufactured by Toray Co., Ltd., and then uniformly cast on a stainless steel band having a width of 2 m using a belt casting machine. The solvents were evaporated on the stainless steel band until the remaining solvent ratio became 110% and the web was peeled from the stainless steel band. The web was stretched in a lengthening ratio (MD) of 1.0 by applying tension on the occasion of the peeling. And then the web was stretched in a widening ratio (TD) of 1.3 by holding the web on both side edges thereof at a remaining solvent ratio at the initiation time of stretching of 20% by weight and a temperature of 130° C. After the stretching, the web was held for several seconds while holding the width for relaxing the tension in the width direction and then released from the width holding. The web was further dried at 125° C. for 30 minutes while conveying through a third drying zone. Thus Cellulose Ester Film 1 was prepared, which had a width of 1.5 m a thick ness of 8 μm, and knurling of a height of 8 μm and a width of 1 cm.

| (Composiuion of main dope) | |
|---|---|
| Methylene chloride | 300 parts by weight |
| Ethanol | 60 parts by weight |
| Cellulose ester (Cellulose acerate propionate having an Acetylation degree of 1.8, a propionylation degree of 0.7) | 100 parts by weight |
| Trimethylolpropane tribenzoate | 15 parts by weight |
| UV absorbent Tinubin 109 (Ciba Specialty Chemicals Co., Ltd.) | 1.3 parts by weight |
| UV absorbent Tinubin 171 (Ciba Specialty Chemicals Co., Ltd.) | 0.6 parts by weight |

(Preparation of Cellulose Ester Film 2)

Synthesizing Example 1

Cellulose Ester

The following cellulose ester was synthesized referring Tokuhyou Hei 6-501040 and by controlling the adding amount of propionic acid and acetic acid.

C-1 (Acetylation degree: 1.4, Propionylation degree: 1.4, Total acylation degree: 2.8)

Synthesizing Example 2

Synthesis of Compound 103 and 103A Represented by Formula R

A mixture of 3-(3,4-dimethylphenyl)-5,7-di-tert-butyl-3H-benzo-furan-2-one (Compound 103) and 3-(2,3-dimethylphenyl)-5,7-di-tert-butyl-3H-benzofuran-2-one (Compound 103A isomer) in a ratio of 5.7:1 was synthesized from 2,4-di-tert-butyl-phenol, glyoxylic acid, o-xylene and Fulcat or Flumont as a catalyst.

Into a 1,500 ml double layer reacting vessel having a moisture separation device, 206.3 g (1 mole) of 2,4-di-tert-butyl-phenol, 485 g (5.5 moles) of o-xylene, 0.5 g of p-toluene-sulfonic acid monohydrate (2.6 mmoles) and 163 f id 50% aqueous solution of glyoxylic acid (1.1 moles) were charged. The mixture was heated by a temperature of from 85 to 90° C. while stirring and the internal pressure of the vessel was reduced by about 450 mbar. Distillation of a mixture of o-xylene and water was immediately begun when the internal temperature of the vessel was come up to 85 to 90° C. and o-xylene was refluxed and water was removed from the system. The reduced pressure in the vessel was continuously raised so as to maintain the temperature at 85 to 90° C. About 90 to 100 ml of water was entirely distilled out spending 3 to 4 hours. The reduced pressure was released by nitrogen and 40 g of the catalyst (Fulcat 30 or 40, or Fulmont XMP-3 or XMP-4) was added to the yellow and transparent solution. The internal pressure of the vessel was reduced by 700 mbar and the resultant suspension was stirred at a heating bath temperature of 156° C. Reaction product of water was distillated out from the system as an azeotropic mixture at a temperature of 128° C. or more. The temperature in the vessel was raised by 140° C. at the later period of the reaction. About 20 ml in total of water was removed spending 1 to 2 hours. Then the reduced pressure was released by nitrogen. The reaction mixture was cooled by 90 to 100° C. and filtered. The apparatus and the filtered residue were rinsed by 100 g of o-xylene. The filtrate was moved to a double layer reaction vessel and concentrated under reduced pressure, and 360 g of o-xylene was recovered. The reddish yellow residue was cooled by 70° C. and 636 g of methanol was carefully added from a dropping funnel while the temperature was held at 60 to 65° C. Seeds crystals were added to the resultant solution and crystals were precipitated by stirring for about 30 minutes at a temperature of 60 to 65° C. The surely of the crystals was cooled by −5° C. spending 2 hours and further stirred for 1 hour at this temperature. The crystals were collected by suction filtration and washed for five times using 400 ml in total of methanol cooled at −5° C. Satisfactorily pressed and dried product was dried in vacuum at a temperature of 50 to 60° C. Thus 262 g of white solid substance was obtained. As a result of gas chromatographic analysis, the obtained substance was composed of about 85% of 3-(3,4-dimethylphenyl)-5,7-di-tert-butyl-3H-benzo-furan-2-one (Compound 103) and about 15% of 3-(2,3-dimethylphenyl)-5,7-di-tert-butyl-3H-benzo-furan-2-one isomer (Compound 103A). Cellulose Ester Film 2 was prepared using the compound prepared in the above synthesizing example by a melt-casting method.

| | |
|---|---|
| Cellulose ester (C-1) | 84 parts by weight |
| Additive 1 (Exemplified Compound 1 (Compound 1) of the compound having a furanose structure or pyranose structure) | 5 parts by weight |
| Additive 2 (PETB: Pentaerythritol tetrabenzoate, Aldrich Co., Ltd.) | 10 parts by weight |
| Additive 3 (A mixture of 3-(3,4-dimethylphenyl)-5,7-di-tert-butyl-3H-benzo-furan-2-one (Compound 103) and 3-(2,3-dimethylphenyl)-5,7di-tert-butyl-3H-benzofuran-2-one (Compound 103A isomer) in a ratio of 5.7:1 prepared in Synthesizing Example 2 | 0.5 parts by weight |
| Irganox-1010 (Ciba Specialty Chemicals) | 0.5 parts by weight |
| High molecular weight UV absorbent (1-(2-benzotriazole)-2-hydroxy-5-(2-vinyloxycarbonylethyl)benzene) | 1 part by weight |

The cellulose ester was dried at 70° C. for 3 hours under reduced pressure and cooled by room temperature, and then the additives were mixed.

The above mixture was melted at 240° C. and extruded from a casting die 4 onto a first cooling roller 5 and pressed between the first cooling roller 5 and a touching roller 6. Silica particles were added as a sliding agent through a hopper opening provided at midway of the extruder 1 so that the ratio of the silica was made to 0.1% by weight.

The gap width of the casting die 4 was adjusted by heat bolts to 0.5 mm within the range of distance of from the end in the width directionless than 30 mm and to 1 mm at the other portion. Touch roller A was used as the touch roller and water of 80° C. was flown in the roller as cooling water.

The length L along the circumference of the first cooling roller of from the position P1 where the resin extruded from the casting die 4 was touched to the cooling roller 5 to the position P2 of the end on the upper stream side in the rotating direction of the first cooling roller 5 of the nipping portion of the first cooling roller and the touching roller 6 was set at 20 mm. After that, The touching roller 6 was released from the first cooling roller 5 and the temperature T at the melted portion just before nipping by the first cooling roller 5 and the touching roller 6 was measured. In the example and the comparative example, the temperature T at the melted portion just before nipping by the first cooling roller and the touching roller 6 was measured at the point parting 1 mm to upper stream from the upper stream end P2 of the nipping potion by a thermometer HA-200E manufactured by Anritsu Keiki Co., Ltd. As a result of the measurement in this example, the temperature T was 141° C. The line pressure of the touching roller 6 to the first cooling roller 5 was 14.7 N/cm. The web was introduced into a tenter and stretched by 1.3 times in the width direction at 160° C. and cooled by 30° C. while relaxing by 3% in the width direction and released from the clips. After that, the clipped portion of the film was cut off and knurling having a width of 10 mm and a height of 5 μm was provided on the both sides of the film and then the film was wound up on a winding core with a winding tension of 220 N/m and a taper of 30%. The winding core has an internal diameter of 152 mm, an external diameter of 165 to 180 mm and a length of 1550 mm. The material of the core was prepreg constituted by glass fiber or carbon fiber impregnated with epoxy resin. The surface of the winding core was coated with electroconductive epoxy resin and polished so as to make the surface roughness Ra to 0.3 μm. Thus Cellulose Ester Film 2 having a width of 1.5 m and a thickness of 80 μm was obtained.

(Preparation of Cellulose Ester Film 3)
(Synthesis of Polymer X)

Into a glass flask having a stirrer, two dropping funnels, a gas introducing pipe and a thermometer, 40 g of a mixture of monomers Xa and Xb, 2 g of mercaptopropionic acid as a chain-transfer agent and 30 g of toluene were charged and heated by 90° C.; the kind of monomer and ratio thereof described in Table 1. Then 60 g of the mixture of monomers Xa and Xb described in Table 1 was dropped spending 3 hours from one of the dropping funnels, and 0.4 g of azo-bis-isobutylonitrile dissolved in 14 g of toluene was dropped from the other dropping funnel at the same time spending 3 hours. Thereafter, 0.6 g of azo-iso-butylylonitrile dissolved in 56 g of toluene was further dropped spending 2 hours. The reaction was further continued for 2 hours to obtain Polymer X. The weight average molecular weight of Polymer X measured by following method is shown in Table 1.

MA, MMA and HEA described in Table 1 are acronyms of the following compounds.

MA: Methyl acrylate
MMA: methyl methacrylate
HEA: 2-hydroxyethyl acrylate
(Measurement of Molecular Weight)

The weight average molecular weight was measured by a high-performance liquid chromatography.

The measuring conditions were as follows.
Solvent: Methylene chloride
Column: Shodex K806, K805 and K803G, manufactured by Showa Denko Co., Ltd., were connected for use.
Temperature of column: 25° C.
Sample concentration: 0.1% by weight
Detector: RI Model 504 (GL Science Co., Ltd.)
Pump: 10 ml/min.
Calibration curve: A calibration curve according to 13 samples of Mw of from 500 to 1,000,000 of STK Standard Polystyrene Manufactured by Toso Co., Ltd., was used. The 13 kinds of the samples were used at about equal intervals.

(Synthesis of Polymer Y)

Polymer Y was synthesized by a bulk polymerization method described in Tokkai 2000-128911. Into a glass flask having a stirrer, a nitrogen introducing pipe, a thermometer, a material charging opening and a reflux condenser, the following methyl acrylate or methyl methacrylate was charged and air in the flask was replaced by introducing nitrogen gas, and then the following thioglycerol was dropped while stirring. After the addition of the thioglycerol, polymerization was carried out for 4 hours while the temperature of the content was suitably controlled. The temperature of the content of the flask was restored and 20 parts by weight of a 5 weight-% tetrahydrofuran solution of benzoquinone was added to stop the polymerization reaction. The content was transferred to an evaporator and tetrahydrofuran, remaining monomer and thioglycerol were removed at 80° C. under reduced pressure. Thus Polymer Y described in Table 1 was obtained. The weight average molecular weight of Polymer Y measured by the above method is shown in Table 1.

| Methyl acrylate | 100 parts by weight |
| Thioglycerol | 5 parts by weight |

TABLE 1

| Cellulose Ester Film No. | Polymer X | | | | | Polymer Y | | Adding amount *1 | |
| | Xa | | Xb | | Weight average molecular weight | | Weight average molecular weight | | |
| | Kind of monomer | Ratio (%) | Kind of monomer | Ratio (%) | | Kind of monomer | | Polymer X | Polymer Y |
| 3 | MMA | 80 | HEA | 20 | 4500 | MA | 1000 | 12 | 7 |

*1: Adding amount in weight per 100 parts by weight of cellulose ester

Synthesis Example of Polymer UV Absorbent P-1

(2-methacryloyloxy)ethyl ester-2H-benzotriazole of 2(2-hydroxy-5'-t-butyl-phenyl)-5-carboxylic acid (Exemplified compound UV-19) was synthesized according to the following method.

In 160 ml of water, 20.0 g of 3-nitro-4-amino-benzoic acid was dissolved and 43 ml of concentrated hydrochloric acid was added. After adding 8.0 g of sodium nitrite dissolved in 20 ml of water, the solution was stirred for 2 hours at 0° C. Into the resultant solution, 17.3 g of 4-t-butyl phenol dissolved in 50 ml of water and 100 ml of ethanol was dropped while holding the alkaline of the liquid by potassium carbonate and the temperature at 0° C. The solution was stirred for 1 hour at 0° C. and further stirred for 1 hour at room temperature. The reaction liquid was acidified by hydrochloric acid and formation of precipitation resulted. The precipitation was filtered and satisfactorily washed by water.

The filtered precipitation was dissolved by 500 ml of 1 mole/L solution aqueous of NaOH. To the solution, 35 g of zinc powder was added and 110 g of 40% aqueous solution of NaOH was dropped. After the dropping, the solution was stirred 2 hours, filtered and washed and the filtered solution was neutralized by hydrochloric acid. Precipitated substance was filtered, washed and dried, and recrystallized using a mixed solvent of ethyl acetate and acetone to obtain 2(2'-hydroxy-5'-t-butyl-phenyl)-5-carboxylic acid-2H-benzotriazole.

Then 10.0 g of 2(2'-hydroxy-5'-t-butyl-phenyl)-5-carboxylic acid-2H-benzotriazole, 0.1 g of hydroquinone, 4.6 g of 2-hydroxyethyl methacrylate and 0.5 g of p-toluenesulfonic acid were added to 100 ml of toluene and heated and refluxed for 10 hours in a reaction vessel having an ester-tube. The reacting liquid was poured into water and resulted precipitate was filtered, washed by water and recrystallized by using ethyl acetate. Thus 2(2'-hydroxy-5'-t-butyl-phenyl)-5-carboxylic acid (2-methacryloyloxy)ethyl ester-2H-benzotriazole or Exemplified Compound MUV-19 was obtained.

A copolymer (Polymer UV absorbent P-1) of 2(2'-hydroxy-5'-t-butyl-phenyl)-5-carboxylic acid (2-methacryloyloxy)ethyl ester-2H-benzotriazole and methyl methacrylate was synthesized by the following method.

Into 80 ml of tetrahydrofuran, 4.o g of 2(2'-hydroxy-5'-t-butyl-phenyl)-5-carboxylic acid (2-methacryloyloxy)ethyl ester of 2H-benzotriazole synthesized in the above Synthesizing Example 3 and 6.0 g of methyl methacrylate were added and then 1.14 g of azo-isobutylnitorile was added and refluxed for 9 hours under nitrogen atmosphere. Tetrahydrofuran was distillated out under reduced pressure and the residue was re-dissolved by 20 ml of tetrahydrofuran. The resultant solution was dropped into excessive amount of methanol. Thus formed precipitation was separated by filtering and dried in vacuum at 40° C. Thus 9.1 g of grayish white powdered polymer of polymer UV absorbent P-1 was obtained. It was confirmed that the copolymer has a number average molecular weight of 4,500 by GPC analysis using standard polystyrene. It was also confirmed that the above copolymer was a copolymer of 2(2'-hydroxy-5'-t-butyl-phenyl)-5-carboxylic acid (2-methacryloyloxy)ethyl ester-2H-benzotriazole and methyl methacrylate. The ratio of 2(2'-hydroxy-5'-t-butyl-phenyl)-5-carboxylic acid (2-methacryloyloxy)ethyl ester of 2H-benzotriazole to methyl methacrylate in the above polymer was approximately 40:60.

(Preparation of dope)

| | |
|---|---|
| Cellulose triacetate (Acetylation degree: 2.92, Mn: 100,000, Mw: 220,000 and Mw/Mn: 2.2) | 100 parts by weight |
| Polymer X | 12 parts by weight |
| Polymer Y | 5 parts by weight |
| Polymer UV absorbent P-1 | 3 parts by weight |
| Silicon oxide tine particle Aerogil R972V (Nihon Aerogil Co., Ltd.) | 0.1 parts by weight |
| Methylene chloride | 440 parts by weight |
| Ethanol | 40 parts by weight |

(Formation of Cellulose Ester Film 3)

The above prepared dope was filtered by Finemet NF, manufactured by Nihon Seisen Co., Ltd., and uniformly cast in a width of 2 m at 22° C. on a stainless steel band support using a belt casting machine. The solvent was evaporated on the stainless steel band until the remaining amount of the solvent become 100% and then peeled off from the stainless band at a peeling tension of 120 N/m. The solvent remaining in the peeled web of the cellulose ester film was evaporated at 35° C., and the film was slit into 1.6 meter width and dried at 135° C. in a tenter while stretching for 1.1 times in the width direction. The amount of remaining solvent at the time of beginning the stretch by the tenter was 10%. After the stretching by the tenter, the film was subjected to the following heating treatment and pressing treatment with the following atmosphere exchanging ratio for completing the drying. The dried film was slit into 1.5 m width and subjected to knurling treatment of a width of 10 mm and a height of 5 μm on both side edges, and then wound up on a core of inner diameter of 6 inches at an initial tension of 220 N/m and a final tension of 110 n/m. Thus Cellulose Ester Film 3 was obtained. The stretching magnitude in the MD direction calculated from the rotation speed of the stainless steel band support and the driving speed of the tenter was 1.1. The remaining amounts of the solvents were each 0.1%° and the film thickness was 80 μm.

<Heating Treatment>

The web was dried, after stretching by the tenter, in a conveying and drying process by drying wind of 105° C. until remaining solvent become 0.3% by weight to obtain the film. The resultant film was subjected to the pressing treatment by applying pressure of 10 kPa in the thickness direction of the film by nipping rollers arranged at multi-steps in the course of the heat treatment for 20 minutes at 135° C. at an atmosphere exchanging rate of 25 times per hour. After that, the film was cooled by room temperature and wound up. Thus Cellulose Ester Film 3 was prepared, which had a free volume radius of 0.275 nm and a half width of 0.05 nm.

The above atmosphere exchanging rate of the heat treatment process is the number of exchanging times per unit hour of atmosphere by fresh air calculated by the following expression in which V ($m^2$) is the volume of the atmosphere of the thermal treatment chamber and FA ($m^2$/hour) is the blowing amount of fresh air.

$$\text{Atmosphere exchanging rate} = FA/V \text{ (times/hour)}$$

(Measurement of Free Volume Radius and Half Value Width Capable of Being Determined by Positron Extinction Lifetime Method)

The free volume radius of each of the cellulose ester films was measured in accordance with the foregoing positron extinction lifetime method.

Example 2

Metal fine lines of aluminum were formed at the concave portions of each of the cellulose ester films having the convexoconcave patters in the surface thereof prepared in Example 1.

The metal was put only on the concave portion of the film surface having the convexoconcave structure by vapor depositing the metal at a slanted direction. The thickness of the aluminum was 100 nm.

Thus prepared film on which the aluminum fine lines were formed had properties that the film permeated light polarized in the perpendicular direction to the fine lines and reflected light polarized in the direction of the fine lines. It could be confirmed that the luminance at the front surface of a liquid crystal display was raised by 1.4 times when the film was used as the luminance increasing film for the backlight of the liquid crystal display.

The cellulose ester films having the convexoconcave structure prepared in Example 1 were each subjected to the saponification treatment and used to prepare polarization plates.

| (Alkali saponification treatment) | | | |
|---|---|---|---|
| Saponification process | 2M-NaOH | 50° C. | 90 seconds |
| Washing process | Water | 30° C. | 45 seconds |
| Neutralization process | 10 weight-% HCl | 30° C. | 45 seconds |
| Washing process | Water | 30° C. | 45 seconds |

After the saponification treatment, the processing was applied in the order of the washing, neutralization and washing, and the drying process was applied at 80° C.

<Preparation of Polarization Element>

A long length poly(vinyl alcohol) film was immersed into 100 parts by weight of an aqueous solution containing 1 part by weight of iodine and 4 parts by weight of boric acid and stretched for 5 times at 50° C. in the conveying direction to prepare a polarization membrane.

The foregoing Cellulose Ester Films 1 to 3 saponificated by the alkali treatment were respectively pasted on both sides of the above polarization membrane by using a 5% aqueous solution of completely saponified poly(vinyl alcohol) as an adhesive to prepare Polarization Plates 1 to 3.

<<Preparation of Liquid Crystal Display>>

The polarization plate previously pasted on the viewing side of a VA type liquid crystal 15 size display VL-150SD, manufactured by Fujitsu Co., Ltd., was peeled off and the above prepared Polarization Plates 1 to 3 were each pasted onto the glass surface of the liquid crystal cell (AV type) to prepare Crystal Liquid Displays 1 to 3, respectively. The pasting direction of the polarization plate was decided so that the absorption axis of the plate was agreed with that of the previously pasted polarization plate.

The viewing angle of each of thus prepared liquid crystal displays was measured by EZ-contrast manufactured by ELDIM Co., Ltd. The viewing angle was expressed by the angle with the normal line to the panel surface, in which the contrast of the white image to black image displayed on the display is not less than 10.

As a result of that, it is confirmed that the polarization plates using Cellulose Ester Films 1 to 3 shown a viewing angle in the up-down direction was 25° or more that in the light-left direction was 60° or more and that the films were each superior as the retardation film for widening the viewing angle.

What is claimed is:

1. A manufacturing method of an optical film provided with a convexoconcave structure, comprises the steps of:
    coating a resin solution including a first resin solved by a solvent onto an endless or roll-like mold provided with a convexoconcave structure, and forming a resin solution layer on the mold;
    laminating a film substrate directly onto the resin solution layer to make a laminated film before the solvent in the resin solution layer is completely dried, the film substrate including a second resin, which absorbs the solvent or is soluble by the solvent; and
    peeling the laminated film from the mold before the solvent in the laminated film is completely dried.

2. The manufacturing method of claim 1, wherein the first resin is substantially the same as the second resin.

3. The manufacturing method of claim 1, wherein the first resin is cellulose ester.

4. The manufacturing method of claim 1, wherein the second resin is cellulose ester.

5. The manufacturing method of claim 2, wherein the first resin and the second resin are cellulose ester.

6. The manufacturing method of claim 1, wherein the time from lamination of the film substrate onto the resin solution layer to the peeling of the laminated film is 30 seconds or less.

* * * * *